US011413955B2

(12) United States Patent
Yamamoto et al.

(10) Patent No.: US 11,413,955 B2
(45) Date of Patent: Aug. 16, 2022

(54) WORKING MACHINE

(71) Applicant: KUBOTA CORPORATION, Osaka (JP)

(72) Inventors: Tatsuro Yamamoto, Sakai (JP); Yoshiyuki Enomoto, Sakai (JP); Akira Komukai, Sakai (JP); Daisuke Yoshida, Sakai (JP); Masahiro Yamamoto, Sakai (JP); Toyoharu Hashima, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/124,279

(22) Filed: Dec. 16, 2020

(65) Prior Publication Data

US 2021/0114451 A1 Apr. 22, 2021

Related U.S. Application Data

(63) Continuation of application No. PCT/JP2019/024950, filed on Jun. 24, 2019.

(30) Foreign Application Priority Data

Jun. 29, 2018 (JP) .............................. JP2018-125473
Jun. 29, 2018 (JP) .............................. JP2018-125474
(Continued)

(51) Int. Cl.
*B60K 11/04* (2006.01)
*F01P 11/10* (2006.01)
(Continued)

(52) U.S. Cl.
CPC ............... *B60K 11/04* (2013.01); *F01P 11/10* (2013.01); *E02F 3/325* (2013.01); *E02F 3/964* (2013.01);
(Continued)

(58) Field of Classification Search
CPC ....... B60K 11/04; F01P 11/10; F01P 2060/04; F01P 2003/185; F01P 3/18;
(Continued)

(56) References Cited

U.S. PATENT DOCUMENTS 6,230,834 B1    5/2001    Van Hout et al.
6,907,916 B2 *   6/2005    Koyama ................. F28F 9/002
                                                                                                                                            165/67
(Continued)

FOREIGN PATENT DOCUMENTS

EP    2 311 681 A    4/2011
JP    1-314624 A    12/1989
(Continued)

*Primary Examiner* — Hung Q Nguyen
(74) *Attorney, Agent, or Firm* — Birch, Stewart, Kolasch & Birch, LLP

(57) ABSTRACT

A working machine includes a support bracket attached to a machine body, a first mounting member provided to the support bracket and formed of an elastic member, a first cooler and a second cooler arranged in parallel to a horizontal direction and mounted on the support bracket with the first mounting member, a fitting bracket detachably fitted to upper portions of the first and second coolers, and a second mounting member arranged between the fitting bracket and the first and second coolers and formed of elastic member.

10 Claims, 118 Drawing Sheets

(30) Foreign Application Priority Data

| | | |
|---|---|---|
| Jun. 29, 2018 | (JP) | JP2018-125475 |
| Jun. 29, 2018 | (JP) | JP2018-125476 |
| Jun. 29, 2018 | (JP) | JP2018-125477 |
| Jun. 29, 2018 | (JP) | JP2018-125478 |
| Jun. 29, 2018 | (JP) | JP2018-125479 |
| Jun. 29, 2018 | (JP) | JP2018-125480 |
| Jun. 29, 2018 | (JP) | JP2018-125481 |
| Jun. 29, 2018 | (JP) | JP2018-125482 |
| Jun. 29, 2018 | (JP) | JP2018-125483 |
| Jun. 29, 2018 | (JP) | JP2018-125484 |
| Jun. 29, 2018 | (JP) | JP2018-125485 |
| Jun. 29, 2018 | (JP) | JP2018-125486 |
| Jun. 29, 2018 | (JP) | JP2018-125487 |
| Jun. 29, 2018 | (JP) | JP2018-125488 |
| Jun. 19, 2019 | (JP) | JP2019-113796 |

(51) Int. Cl.
*E02F 3/32* (2006.01)
*E02F 3/96* (2006.01)
*E02F 9/08* (2006.01)

(52) U.S. Cl.
CPC ......... *E02F 9/0866* (2013.01); *F01P 2060/04* (2013.01)

(58) Field of Classification Search
CPC ....... F01P 2050/24; E02F 3/325; E02F 3/964; E02F 9/0866; E02F 9/0816; E02F 9/0833; E02F 9/0883; E02F 9/0891; E02F 9/166; E02F 9/2275
USPC ...................................................... 180/68.1
See application file for complete search history.

(56) References Cited

U.S. PATENT DOCUMENTS

| | | | | |
|---|---|---|---|---|
| 7,806,214 B2* | 10/2010 | Tsukui | ........... | B62D 25/12 180/89.17 |
| 8,162,087 B2* | 4/2012 | Kobayashi | ........... | E02F 9/0891 180/68.6 |
| 8,365,855 B2* | 2/2013 | Mamada | ........... | B62D 49/085 180/68.1 |
| 8,640,803 B2* | 2/2014 | Kinoshita | ........... | F01P 11/10 180/68.1 |
| 2005/0279548 A1* | 12/2005 | Kurtz, Jr. | ........... | B60K 11/04 180/68.6 |
| 2007/0163826 A1* | 7/2007 | Youn | ........... | B60K 11/04 180/89.17 |
| 2008/0257623 A1* | 10/2008 | Yonetake | ........... | E02F 9/0866 180/68.1 |
| 2010/0163324 A1* | 7/2010 | Jyoutaki | ........... | B60K 11/04 180/68.1 |
| 2012/0325569 A1* | 12/2012 | Takeda | ........... | E02F 9/0891 180/68.1 |
| 2014/0301816 A1* | 10/2014 | Kokuryo | ........... | E02F 9/0866 414/687 |
| 2015/0056052 A1* | 2/2015 | Kokuryou | ........... | E02F 3/32 414/687 |
| 2016/0369478 A1 | 12/2016 | Kokuryou et al. | | |

FOREIGN PATENT DOCUMENTS

| | | |
|---|---|---|
| JP | 3-42717 U | 4/1991 |
| JP | 11-280117 A | 10/1999 |
| JP | 2001-348911 A | 12/2001 |
| JP | 2003-285653 A | 10/2003 |
| JP | 2005-16847 A | 1/2005 |
| JP | 2005-61308 A | 3/2005 |
| JP | 2007-153310 A | 6/2007 |
| JP | 2009-243118 A | 10/2009 |
| JP | 2010-117046 A | 5/2010 |
| JP | 2010-144408 A | 7/2010 |
| JP | 2013-1354 A | 1/2013 |
| JP | 2015-158079 A | 9/2015 |
| JP | 2015-161073 A | 9/2015 |
| JP | 2017-2646 A | 1/2017 |
| JP | 2017-65569 A | 4/2017 |
| JP | 2017-66791 A | 4/2017 |
| JP | 2017-180067 A | 10/2017 |
| JP | 2018-40251 A | 3/2018 |
| JP | 2018-71122 A | 5/2018 |
| JP | 2018-71850 A | 5/2018 |
| WO | WO 2013/099519 A1 | 7/2013 |

\* cited by examiner

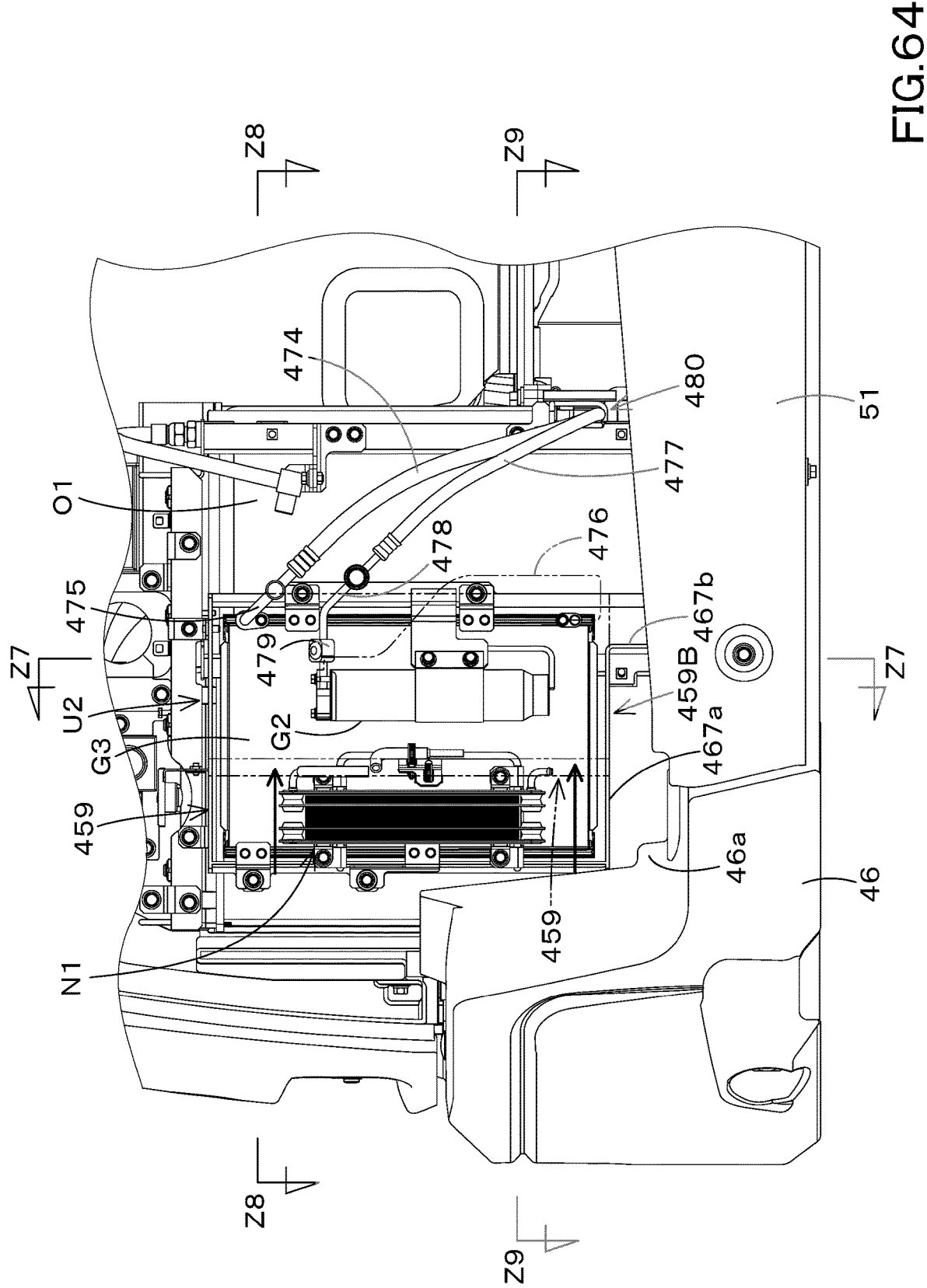

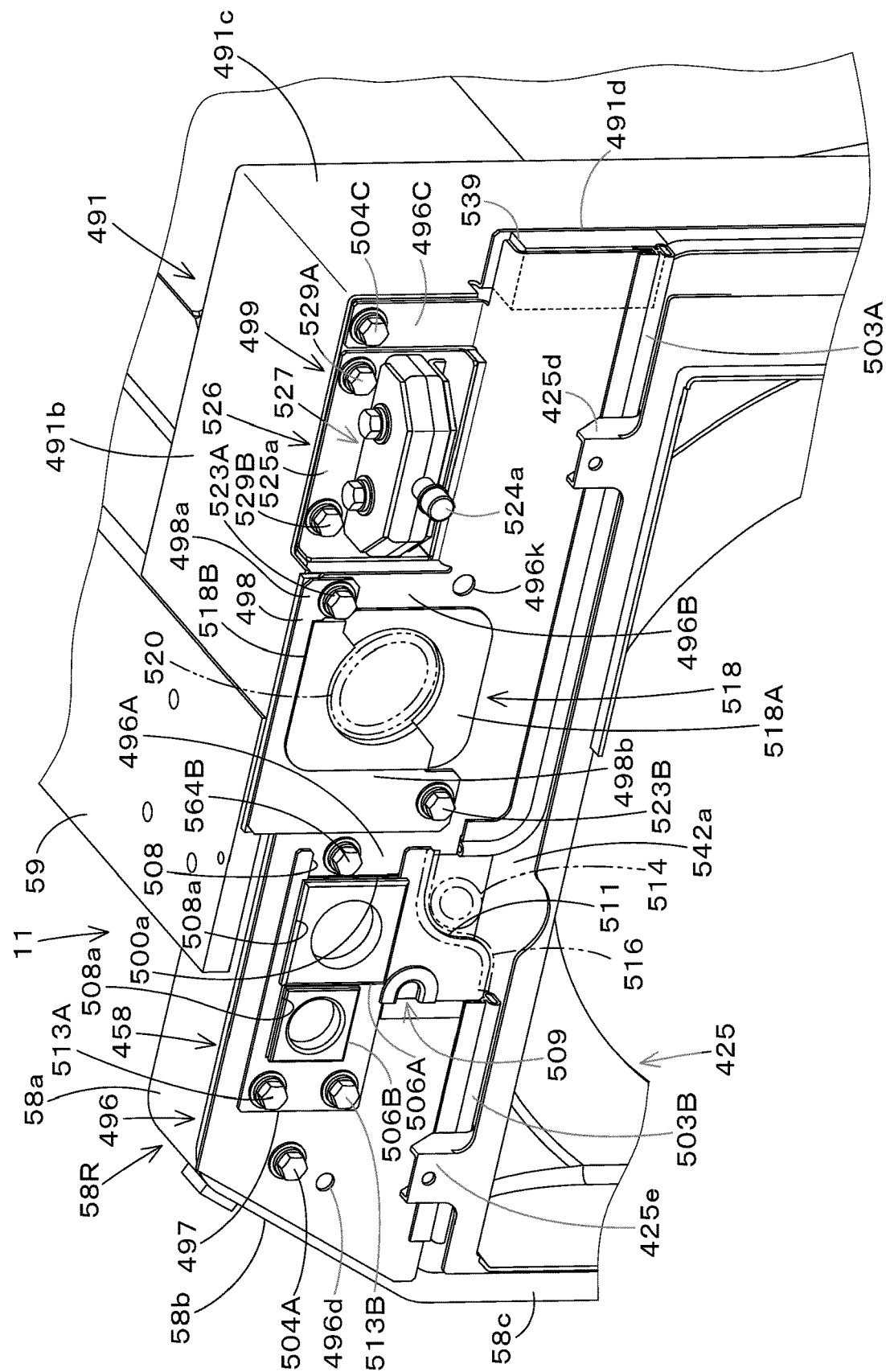

WORKING MACHINE

CROSS-REFERENCE TO RELATED APPLICATIONS

The present application is a continuation application of International Application No. PCT/JP2019/024950, filed Jun. 24, 2019, which claims priority to Japanese Patent Application No. 2018/125473, filed Jun. 29, 2018, to Japanese Patent Application No. 2018/125474, filed Jun. 29, 2018, to Japanese Patent Application No. 2018/125475, filed Jun. 29, 2018, to Japanese Patent Application No. 2018/125476, filed Jun. 29, 2018, to Japanese Patent Application No. 2018/125477, filed Jun. 29, 2018, to Japanese Patent Application No. 2018/1254978 filed Jun. 29, 2018, to Japanese Patent Application No. 2018/125479, filed Jun. 29, 2018, to Japanese Patent Application No. 2018/125480, filed Jun. 29, 2018, to Japanese Patent Application No. 2018/125481, filed Jun. 29, 2018, to Japanese Patent Application No. 2018/125482, filed Jun. 29, 2018, to Japanese Patent Application No. 2018/125483, filed Jun. 29, 2018, to Japanese Patent Application No. 2018/125484, filed Jun. 29, 2018, to Japanese Patent Application No. 2018/125485, filed Jun. 29, 2018, to Japanese Patent Application No. 2018/125486, filed Jun. 29, 2018, to Japanese Patent Application No. 2018/125487, filed Jun. 29, 2018, to Japanese Patent Application No. 2018/125488, filed Jun. 29, 2018, and to Japanese Patent Application No. 2019/113796, filed Jun. 19, 2019. The contents of these applications are incorporated herein by reference in their entirety.

BACKGROUND OF THE INVENTION

Field of the Invention

The present invention relates to a working machine such as a backhoe.

Description of Related Art

Conventionally, the work equipment disclosed in Japanese Unexamined Patent Publication No. 2017-65569 to Japanese Unexamined Patent Publication No. 2009-243118 is known.

In the work equipment disclosed in Japanese Unexamined Patent Publication No. 2017-65569, a first cooler (radiator) and a second cooler (oil cooler) are arranged in series in the width direction of the machine. An oil cooler bracket is attached to the radiator bracket to which the radiator is attached, and an oil cooler bracket to which the oil cooler is attached.

The work equipment disclosed in Japanese Unexamined Patent Publication No. 2018-40251 has a swivel frame rotatably supported on the running unit around the longitudinal axis center. A hydraulic pipeline is arranged on the swivel frame and a retaining member is provided to hold the hydraulic pipeline on the swivel frame.

The work equipment disclosed in Japanese Unexamined Patent Publication No. 2010-117046 is equipped with a plurality of coolers arranged in series with respect to the width of the machine.

The work equipment disclosed in Japanese Unexamined Patent Publication No. 2018-71850 has a prime mover and a cooler disposed at a side of the prime mover. A shroud is provided between the cooler and the prime mover. Above the shroud, a cut-off structure is provided above the shroud, which separates the prime mover room housing the prime mover from the side where the cooler is arranged.

The work equipment disclosed in Japanese Unexamined Patent Publication No. 2018-71850 has a prime mover mounted on the body of the machine and a bonnet comprising a prime mover room that houses the prime mover.

The work equipment disclosed in Japanese Unexamined Patent Publication No. 2010-117046 has a swivel substrate capable of turning around a vertical axis center. A radiator (cooler) is mounted on the swiveling substrate, and an oil cooler (cooler) is disposed on the side of the radiator.

In the work equipment disclosed in Japanese Unexamined Patent Publication No. 2018-71122, a tank stand (support stand) to which a tank (hydraulic oil tank) is attached is fixed to the airframe. The tank stand has a support plate erected on the fuselage and a tank mounting plate arranged so that the face of the plate faces up and down and to which the tank is bolted.

The work machine disclosed in Japanese Unexamined Patent Publication No. 2017-66791 has a swivel frame supported by the driving unit that can be swiveled around a vertical axis center. A swivel joint is provided at the position of the longitudinal axis center of the swivel frame. The swivel joint is inserted through an opening hole formed in the swivel frame.

The work machine disclosed in Japanese Unexamined Patent Publication No. 2017-180067 has a fuselage rotatably supported on a running unit, rotatably supported around a vertical axis center. A weight is provided at the rear of the fuselage.

The work machine disclosed in Japanese Unexamined Patent Publication No. 2017-2646 has a sedimenter for separating and removing water from the fuel of the prime mover in the prime mover chamber, which houses the prime mover.

The work equipment disclosed in Japanese Unexamined Patent Publication No. 2010-144408 is equipped with a prime mover and a fuel tank for storing fuel for the prime mover in the fuselage.

In the work equipment disclosed in Japanese Unexamined Patent Publication No. 2018-40251, the fuselage is provided with a battery stand to which a battery is attached.

In the work equipment disclosed in Japanese Unexamined Patent Publication No. 2018-71122, a cover member or the like is deployed on a side of the fuselage.

In the work equipment disclosed in Japanese Unexamined Patent Publication No. H11-280117, a movable body is supported on the fuselage in an adjustable forward and backward position, and the movable body is provided with an operation lever and a driver's seat is supported.

The work equipment disclosed in Japanese Unexamined Patent Publication No. 2009-243118 has a prime mover mounted on the fuselage. A driver's seat is arranged in front of the prime mover. Between the prime mover and the driver's seat, a bulkhead member (partition) is provided between the prime mover and the driver's seat, separating the area of the driver's seat side from the prime mover chamber that houses the prime mover. The bulkhead member has an inspection opening (opening window) for access into the prime mover chamber and a closing plate (lid member) to block the inspection opening.

The work equipment disclosed in Japanese Unexamined Patent Publication No. 2017-65569 has a prime mover mounted on the rear of the fuselage, and a shroud covering a cooling fan is provided on the side of the prime mover. A support frame is erected on the fuselage to support the bonnet which forms the prime mover chamber. The lower rear of the prime mover is covered by a weight.

SUMMARY OF THE INVENTION

A working machine according to one aspect of the present invention, includes: a support bracket attached to a machine body; a first mounting member provided to the support bracket and formed of an elastic member; a first cooler and a second cooler arranged in parallel to a horizontal direction and mounted on the support bracket with the first mounting member; a fitting bracket detachably fitted to upper portions of the first and second coolers; and a second mounting member arranged between the fitting bracket and the first and second coolers and formed of elastic member.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 55 is a perspective view illustrating an arrangement portion of cooling devices and the like;
FIG. 56 is a perspective view of cooling devices and the like.

FIG. 61 is a perspective view illustrating cooling devices and the like;

FIG. 64 is a side surface view illustrating an arrangement portion of a cooling device;

FIG. 70A is a perspective view illustrating an attachment portion of a partition structure body;

DESCRIPTION OF THE EMBODIMENTS

Figure 1:
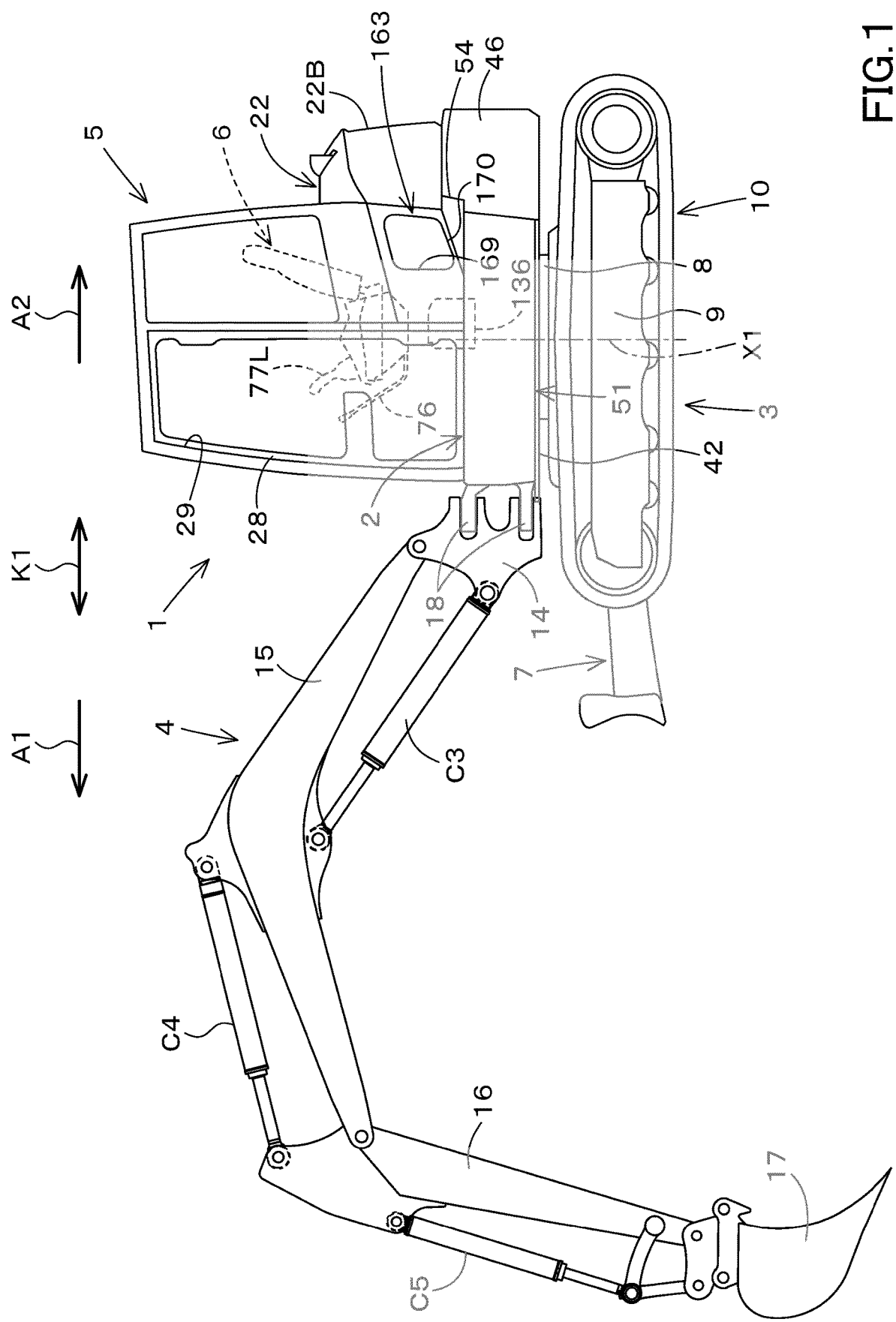
FIG. 1 is a side view of a working machine.

The embodiments of the present invention will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with appropriate reference to the drawings.

Figure 2:
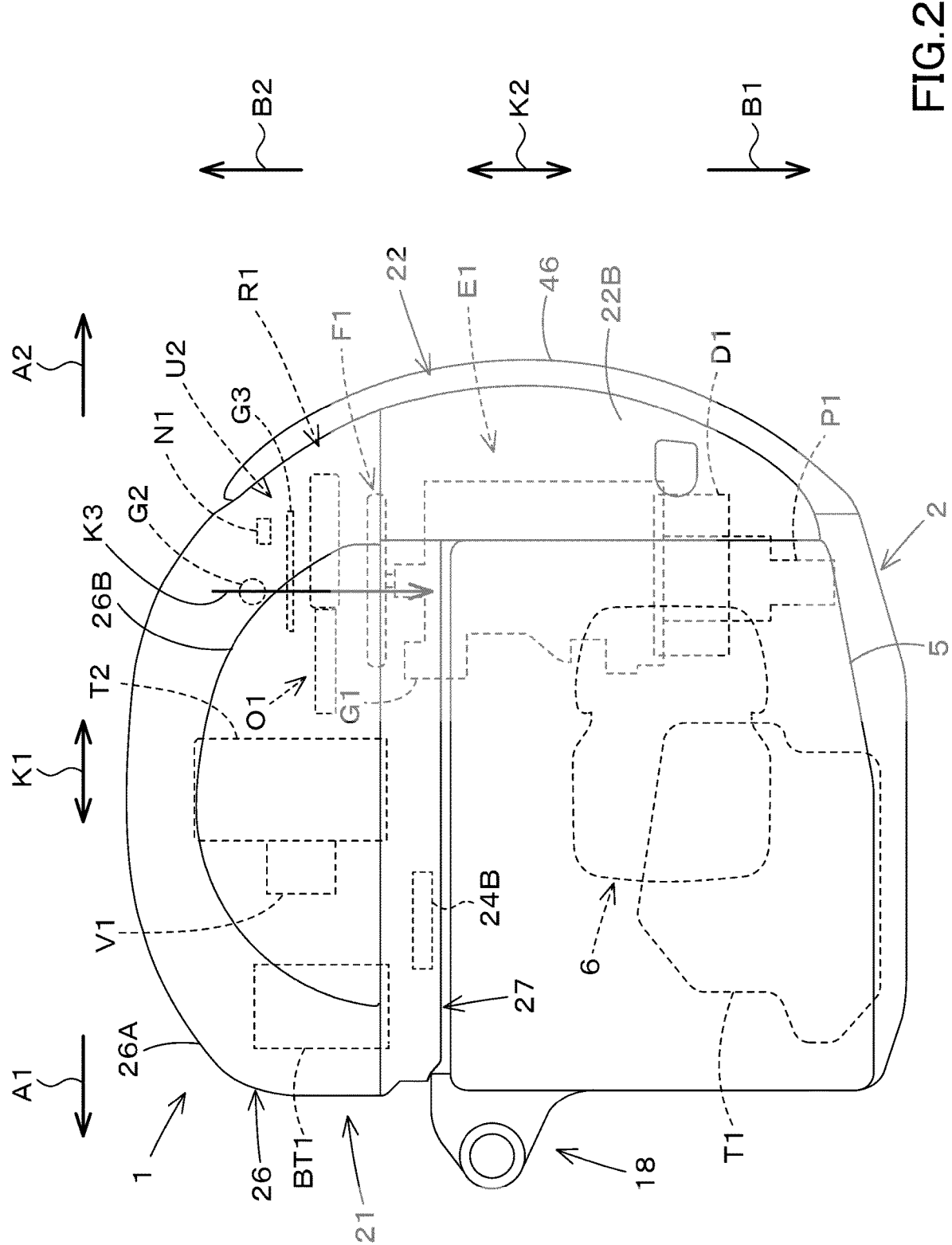
FIG. 2 is a plan view of a working machine.

FIG. 1 is a schematic side view showing an overall configuration of the working machine 1 in the present embodiment. FIG. 2 is a schematic plan view of the working machine 1 omitting the working device. In this embodiment, a backhoe, which is a swivel working machine, is illustrated as the working machine 1.

As shown in FIG. 1 and FIG. 2, the working machine 1 is provided with an machine body (swivel platform) 2, a traveling device 3, and a working device 4. The machine body 2 is provided with a cabin 5. The cabin 5 is mounted near the left and front of the machine body 2. An operator seat portion 6 is provided in the interior of the cabin 5, in which an operator (driver) is seated. The operator seat portion 6 is housed by the cabin 5.

In an embodiment of the present invention, the front side of the operator seated in the operator seat portion 6 of the working machine 1 (a direction of an arrowed line A1 in FIG. 1 and FIG. 2) is described as the front, the rear side of the operator (a direction of an arrowed line A2 in FIG. 1 and FIG. 2) is described as the rear, the left side of the operator (a front surface side of FIG. 1 and a direction of an arrowed line B1 in FIG. 2) is described as the left, and the right side of the operator (a back surface side of FIG. 1 and a direction of an arrowed line B2 in FIG. 2) is described as the right.

The horizontal direction, which is perpendicular to the front-to-rear direction K1, will be explained as the machine width direction K2 (see FIG. 2). The direction from the center of the machine body 2 in the width direction to the right or left is explained as the outward direction of the machine body. In other words, the outward direction of the machine body is the machine width direction K2 separating away from the center of the machine body 2 in the width direction. The direction opposite to the machine outward direction is explained as the inward direction of the machine body. In other words, the inward direction of the machine body is the machine width direction K2 approaching closer to the center of the machine body 2 in the width direction.

As shown in FIG. 1, the traveling device 3 has a traveling frame 9 and a traveling mechanism 10. The traveling mechanism 10 is composed of a crawler-type traveling mechanism driven by a hydraulic motor. In the present embodiment, the traveling device 3 is a crawler-type traveling device. The traveling mechanism 10 is provided on the left and right sides of the traveling frame 9. A dozer device 7 is mounted at the front portion of the traveling device 3. The dozer device 7 can be raised and lowered by a hydraulic cylinder.

As shown in FIG. 1, the working device 4 is provided at the front portion of the machine body 2 and has a boom 15, an arm 16, and a bucket (working tool) 17. The base portion of the boom 15 is pivotally supported (pivotally up and down) around a horizontal axis center (an axis center extending in the machine width direction K2 of the machine body) to the swing bracket 14. The swing bracket 14 is pivotally supported on a support bracket 18 at the front portion of the machine body 2, pivoting around the vertical axis center (axis center extending in the vertical direction). The arm 16 is pivotally pivotable (pivoting back and forth or up and down) around the horizontal axis center to the end potion of the boom 15. The bucket 17 is provided on the end side of the arm 16 for scooping and dumping operations. The working machine 1 can be fitted with other work tools (hydraulic attachments) that can be driven by a hydraulic actuator instead of or in addition to the bucket 17. Examples of these other work implements include hydraulic breakers, hydraulic crushers, angle brooms, earth augers, pallet forks, sweepers, mowers, snow blowers, and the like.

The swing bracket 14 is pivoted around the longitudinal axis center by the stretching and shortening of the hydraulic cylinder. The boom 15 pivots by the stretching and shortening of the boom cylinder C3. The arm 16 pivots by the stretching and shortening of the arm cylinder C4. The bucket 17 is pivoted by the stretching and shortening of the bucket cylinder (work tool cylinder) C5 to make a scooping and dumping motion. The boom cylinder C3, the arm cylinder C4, and the bucket cylinder C5 are composed of a hydraulic cylinder (hydraulic actuator).

As shown in FIG. 1, the machine body 2 is supported on the traveling frame 9 by a swivel bearing 8 and rotatable around the longitudinal axis center (capable of turning left and right). A weight 46 is provided at the rear portion of the machine body 2.

As shown in FIG. 2, a prime mover E1 is mounted at the rear portion of the machine body 2. The prime mover E1 is a diesel engine. The prime mover E1 may be a gasoline engine, an LPG engine or an electric motor, or it may be a hybrid type having an engine and an electric motor. The prime mover E1 is located on the rear side of the cabin 5.

On the left side of the prime mover E1, a hydraulic pump P1 and an exhaust gas purification system D1 are provided. The hydraulic pump P1 is driven by the power of the prime mover E1. The hydraulic pump P1 outputs hydraulic fluid (pressured fluid) to drive hydraulic motors, hydraulic cylinders, and other hydraulic actuators mounted on the working machine 1. The hydraulic pump P1 also outputs pilot pressure to operate the hydraulic valves and hydraulic pressure for signals. The hydraulic pump P1 includes, for example, a plurality of pumps.

The exhaust gas purification system D1 is a device for purifying exhaust gas emitted from the prime mover E1, for example, a diesel particulate filter (DPF).

As shown in FIG. 2, a cooling fan F1 and a compressor G1 are provided on the right side of the prime mover E1. Thus, the exhaust gas purification system D1 is arranged on the side of the prime mover E1, on the side opposite the cooling fan F1. The cooling fan F1 and the compressor G1 are driven by the power of the prime mover E1. The cooling fan F1 is a suction fan that draws in air (outside air) from the right side of the machine body 2 and flushes it toward the prime mover E1 and the exhaust gas purification system D1 to cool the prime mover E1 and the exhaust gas purification system D1, and the like. The direction of the arrowed line K3 in FIG. 2 indicates the direction of the cooling air flow by the cooling fan F1. The compressor G1 is a device that forms part of an air conditioner device installed in the working machine 1, and compresses a coolant (air conditioner gas) into a semi-liquid state.

As shown in FIG. 2, a radiator (first cooler) R1 and an oil cooler (second cooler) O1 are arranged on the right side of the cooling fan F1. The oil cooler O1 is arranged in front of the radiator R1. Both the radiator R1 and the oil cooler O1 are arranged so that the core portion faces the machine width direction K2 (so that the thickness direction of the core corresponds to the machine width direction K2). In other words, the radiator R1 and the oil cooler O1 are arranged side-by-side in the front-to-rear direction. In other words, the radiator R1 and the oil cooler O1 are arranged side by side in the front-to-rear direction in parallel with the machine width direction K2 (cooling air flow direction K3). The radiator R1 is a cooler (heat exchanger) that cools the cooling fluid of the prime mover E1. The oil cooler P1 is a cooler that cools the hydraulic fluid returning to the hydraulic fluid tank T2. The radiator R1 and the oil cooler O1 are cooled by the cooling air drawn in by the cooling fan F1.

On the right side of the radiator R1, the condenser G3 (third cooler) and receiver (cooling system device) G2, which are devices of the cooling system of the air conditioner device, and the fuel cooler (fourth cooler) N1 are located on the right side of the radiator R1. The condenser G3 is arranged opposite the right side of the radiator R1. The fuel cooler N1 is arranged on the right side of the rear portion of the condenser G3. Thus, the condenser G3, the radiator R1, and the fuel cooler N1 (a plurality of coolers) are arranged in series with the machine width direction K2 (cooling air flow direction K3). The receiver G2 is located on the right side of the front portion of the condenser G3 and in front of the fuel cooler N1.

The condenser G3 is a cooler which cools the coolant made into a semi-liquid state by compressor G1 to promote liquefaction. The receiver G2 separates the coolant that could not be liquefied by the condenser G3 from the liquefied coolant, and removes water and impurities. The fuel cooler N1 is a cooler that cools the return fuel from the prime mover E1 before returning it to the fuel tank T1. The fuel tank T1 is a tank for storing fuel for the prime mover E1. The fuel tank T1 is mounted on the left front of the machine body 2.

The radiator R1, the oil cooler O1, the condenser G3, and the fuel cooler N1 are collectively referred to as the cooler. The radiator R1, the oil cooler O1, the condenser G3, the fuel cooler N1, and the receiver G2 are also referred to as the cooling device unit U2.

A hydraulic fluid tank T2 and a control valve V1 are located in front of the cooling device unit U2. A control valve V1 is mounted on the front side of the hydraulic fluid tank T2. The hydraulic fluid tank T2 is a tank for storing hydraulic fluid to be supplied to the hydraulic pump P1. The control valve V1 is a valve unit that consolidates each control valve that controls each hydraulic actuator installed in the working machine 1. A battery BT1 is located in front of the control valve V1 and the hydraulic fluid tank T2. The battery BT1 is a storage battery that supplies power to the electrical components provided with the working machine 1.

A controller 24B is arranged on the left side of the control valve V1. The controller 24B is an electronic control unit, referred to as the prime mover ECU (engine ECU), which controls the prime mover E1. For example, the controller 24B controls the speed of the prime mover E1 by controlling the operation of the supply pump, each injector, and the like to adjust the amount of fuel injection. The controller 24B is configured using a microcomputer provided with a CPU, EEPROM, and the like.

The working machine 1 has an electronic control unit (controller), which together with the above controller 24B is a controller including a control device, and which is called a main ECU, which controls the overall operation of the working machine 1 (controlling the electrical equipment equipped in the working machine 1). This main ECU, for example, controls a solenoid valve in the hydraulic circuit to control the flow rate of the hydraulic fluid, and controls the filter regeneration of the exhaust gas purification system D1.

As shown in FIG. 1, an air conditioner body 136 is provided below the operator seat portion 6 in the interior of the cabin 5. The air conditioner body 136 includes the main body of the air conditioner device (air conditioner). The air conditioner body 136 has a case and a blower, evaporator, and the like, housed in the case. The cooling system of the air conditioner device has a compressor G1, a receiver G2, and a condenser G3. The heating system of the air conditioner device uses the heat of the prime mover E1.

As shown in FIG. 1 and FIG. 2, a weight 46 is provided at the rear portion of the machine body 2. The weight 46 is located at the lower rear portion of the prime mover E1 and covers the lower rear portion of the prime mover E1.

Figure 17:
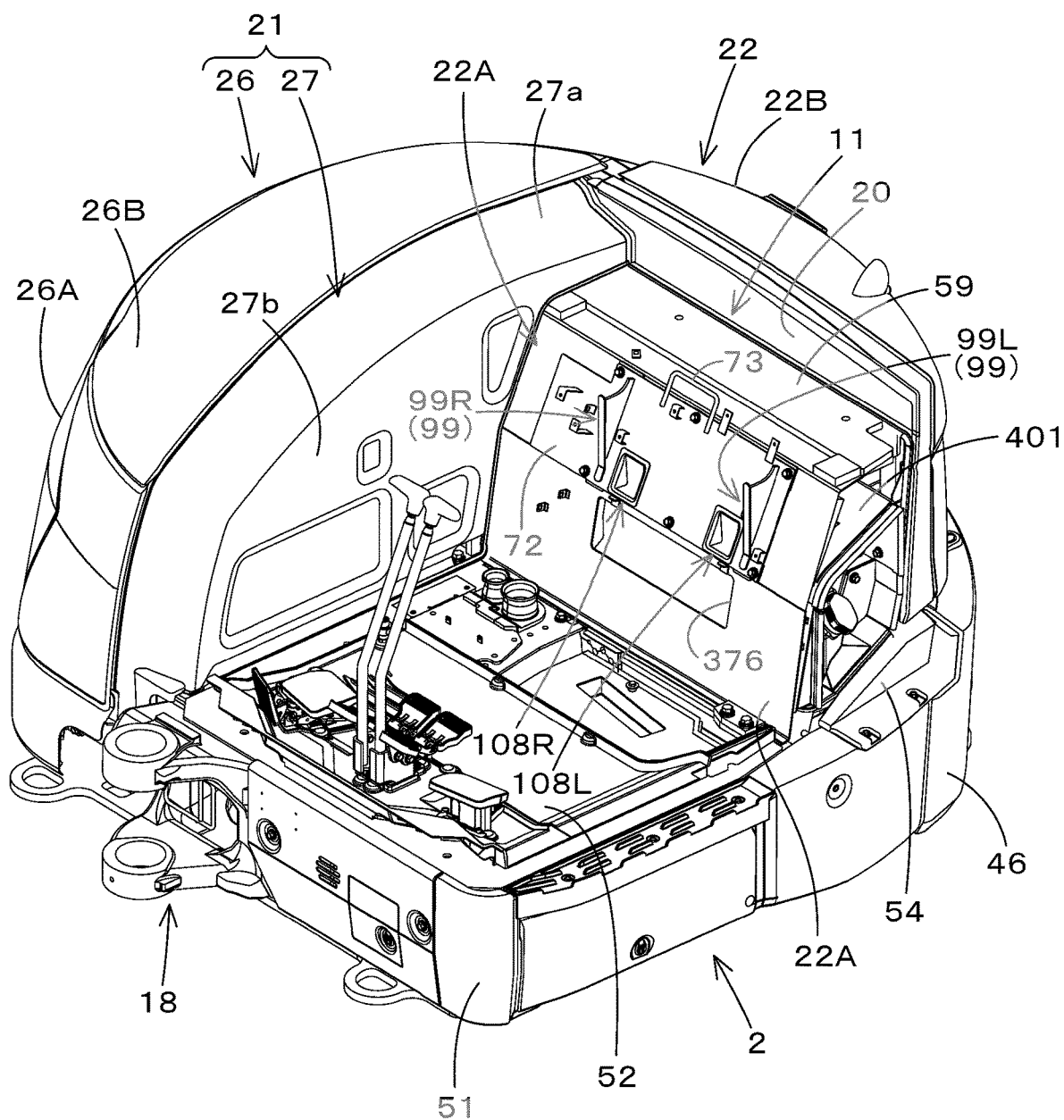
FIG. 17 is an exterior view of machine body.

As shown in FIG. 2, the prime mover E1, the exhaust gas purification system D1, the hydraulic pump P1, the cooling fan F1 and the compressor G1, and the like are covered by the bonnet 22. As shown in FIG. 17, the bonnet 22 is located at the rear portion of the machine body 2.

As shown in FIG. 2, the battery BT1, the control valve V1, the hydraulic fluid tank T2, the controller 24B, the radiator R1, the oil cooler O1, the receiver G2, and the condenser G3 are covered by the side cover (cover body) 21. The side cover 21 is provided from the front to the rear portion of the right part of the machine body 2, and covers the upper portion of the swiveling frame 41, which will be described below. The side cover 21 is located on the side (right side) of the cabin 5.

As shown in FIG. 2 and FIG. 17, the right side of the bonnet 22 is connected to the rear portion of the side cover 21. An opening is formed on the right side of the rear side of the side cover 21 to allow air to enter the rear portion of the side cover 21 and the interior of the bonnet 22. The side cover 21 has a first cover member 26 and a second cover member 27.

As shown in FIG. 2, the first cover member 26 has an outer wall portion 26A and an upper wall portion 26B. The first cover member 26 houses the battery BT1, the control valve V1, the hydraulic fluid tank T2, the radiator R1, the oil cooler O1, the receiver G2 and the condenser G3. As shown in FIG. 2 and FIG. 17, the first cover member 26 has a side portion 26A and a top portion 26B.

As shown in FIG. 2, the second cover member 27 is arranged between the first cover member 26 and the cabin 5. A controller 24B is housed in the second cover member 27. As shown in FIG. 17, the second cover member 27 has a periphery wall portion 27a and a side wall portion 27b covering the side of the cabin 5. The second cover member 27 is connected to the first cover member 26.

Figure 3:
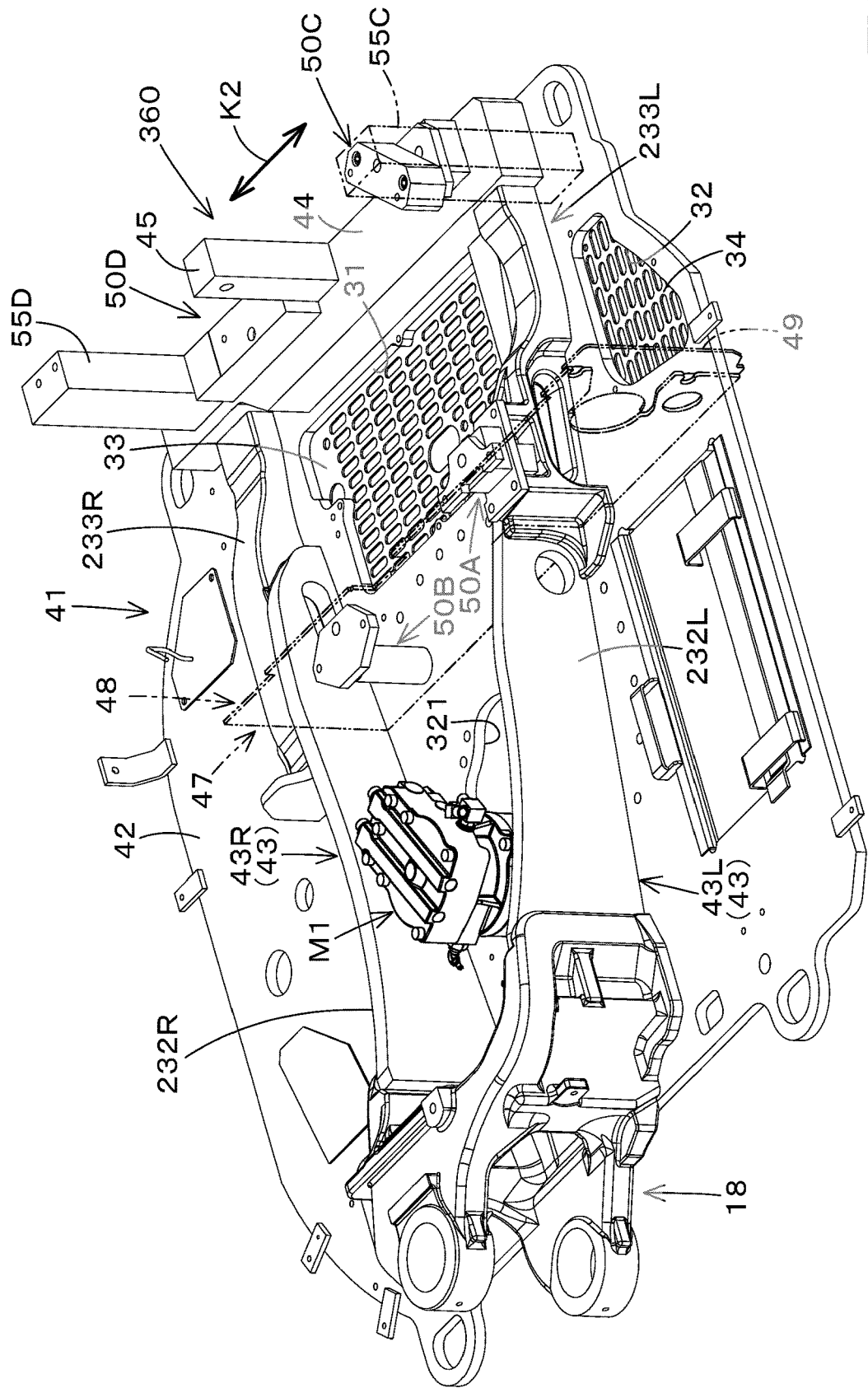
FIG. 3 is a perspective view of a swivel frame.
Figure 4:
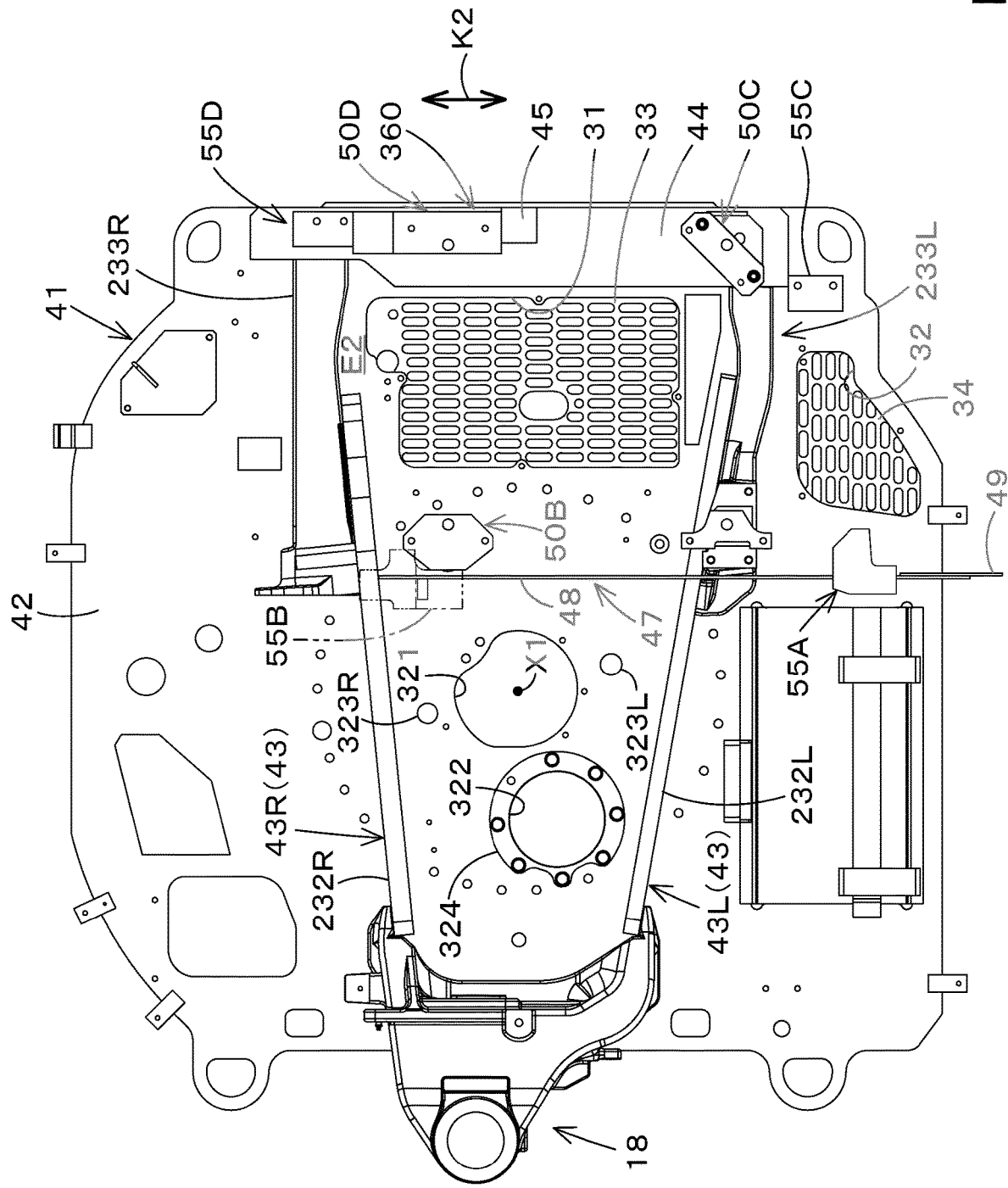
FIG. 4 is a plan view of a swivel frame.

As shown in FIG. 3 and FIG. 4, the machine body 2 has a swivel frame 41, which serves as a skeleton. The swivel frame 41 has a swivel base plate 42 which constitutes the bottom of the machine body 2, a reinforcement rib 43 which reinforces the swivel base plate 42, and a support bracket 18. The swivel frame 41 also has brackets, stays, and the like for attaching devices, tanks, and other components to be mounted on the machine body 2. The swivel base plate 42 is formed by a thick plate of steel plate or the like. The brackets, stays, and the like mounted on the swivel frame 41 are fixed on the swivel base plate 42 by welding. The swivel base plate 42 is freely rotatably supported on the traveling device 3 via the swivel bearing 8 around the vertical axis center (swivel axis center X1) (see FIG. 1). The rear end potion of the swivel base plate 42 is formed in the form of a flat surface along the machine width direction K2. In detail, the rear end potion of the swivel base plate 42 protrudes slightly rearwardly in the center of the machine width direction K2 than the left and right sides of the machine width direction K2.

The reinforcement rib 43 is provided on the swivel base plate 42 from the front (one end side) to the rear (other end side). The reinforcement rib 43 is fixed to the swivel base plate 42 by welding to reinforce the swivel base plate 42. The reinforcement rib 43 includes a first rib 43L on the left side of the swivel base plate 42 and a second rib 43R on the right side of the swivel base plate 42.

The first rib 43L has a front rib 232L and a rear rib 233L. The front rib 232L is a sheet metal rib (sheet metal rib) and the rear rib 233L is a cast steel rib (cast steel rib). The front rib 232L is erected on the swivel base plate 42 in a vertical orientation (with the plate thickness direction aligned with the horizontal direction). The rear portion of the front rib 232L and the front portion of the rear rib 233L overlap in side view and are fixed (connected) to each other by welding.

The second rib 43R has a front rib 232R and a rear rib (reinforcement member) 233R. The front rib 232R is a sheet metal rib and the rear rib 233R is a cast steel rib. The front rib 232R is erected on the swivel base plate 42 in a vertical orientation. The rear portion of the front rib 232R and the front portion of the rear rib 233R overlap in side view and are fixed (connected) to each other by welding. The rear end potion of the rear rib 233R is located further back than the rear end potion of the rear rib 233L.

The support bracket 18 is fixed to the front portion of the swivel base plate 42 by welding or other means and is connected to the front portion of the reinforcement rib 43 (front of the front rib 232L and front rib 232R).

As shown in FIG. 3 and FIG. 4, a partition plate 47 is provided along the machine width direction K2 near the rear portion of the center of the swivel base plate 42 in the front-to-rear direction K1. The partition plate 47 has a main partition plate 48 and a sub partition plate 49. The main partition plate 48 extends from the left side of the second rib 43R across the first rib 43L to the left end potion of the swivel base plate 42 in the machine width direction K2. The main partition plate 48 is fixed and erected on the swivel base plate 42 by welding. The sub-partition plate 49 is superimposed on the back of the main partition plate 48 at the left portion of the swivel base plate 42. The prime mover E1 is mounted behind the partition plate 47 in the swivel base plate 42 (see FIG. 18).

A first opening 31 and a second opening 32 including a substantially rectangular shaped edge formed through the swivel base plate 42 are formed at the rear portion of the swivel base plate 42. The first and second openings 31 and 32 output the cooling air after cooling the prime mover E1. The first opening 31 is formed behind the main partition plate 48 and between the first rib 43L and the second rib 43R. In the first opening 31, a first lid plate 33 formed of a perforated plate having a number of holes covering the opening is arranged. The second opening 32 is formed to the left of the first opening 31 and to the left of the first rib 43L. In the second opening 32, a second lid plate 34 formed of a perforated plate having a number of holes covering the opening is arranged.

A first opening hole (opening hole) 321 is formed in the swivel base plate 42 in the vertical direction through the front portion of the center of the front-to-rear direction K1 and between the first rib 43L and the second rib 43R in the vertical direction. The first opening hole 321 is formed in front of the main partition plate 48. The swivel base plate 42 has a positioning hole 323L located to the left of the first opening hole 321 and a positioning hole 323R located to the right of the first opening hole 321. The positioning holes 323L and the positioning holes 323R are holes for inserting a jig (pin) for positioning the swivel base plate 42 in fixing a member on the swivel base plate 42 by welding. In addition, the swivel base plate 42 has a second opening hole 322, which is located in front of the first opening hole 321, in the vertical direction in a penetrating manner. The second opening hole 322 is formed in a circular shape and has a motor attachment portion 324 around it. A swivel motor M1 including a hydraulic motor is mounted on the motor attachment portion 324 (see FIG. 3). The swivel motor M1 is a motor that drives the machine body 2 around the swivel axis center X1.

As shown in FIG. 17, a weight 46 is provided below the rear portion of the bonnet 22. This weight 46 covers the rear portion of the swivel frame 41. A swivel cover (exterior member) 51 is provided on the left and right sides and front of the machine body 2. This swivel cover 51 covers the left side, right side and front of the swivel frame 41. On the left side of the front portion of the machine body 2, a step 52 is provided. This step 52 covers the left side of the front portion of the swivel frame 41. The step 52 is attached to the swivel frame 41 and includes the floor surface of the cabin 5.

Figure 5:
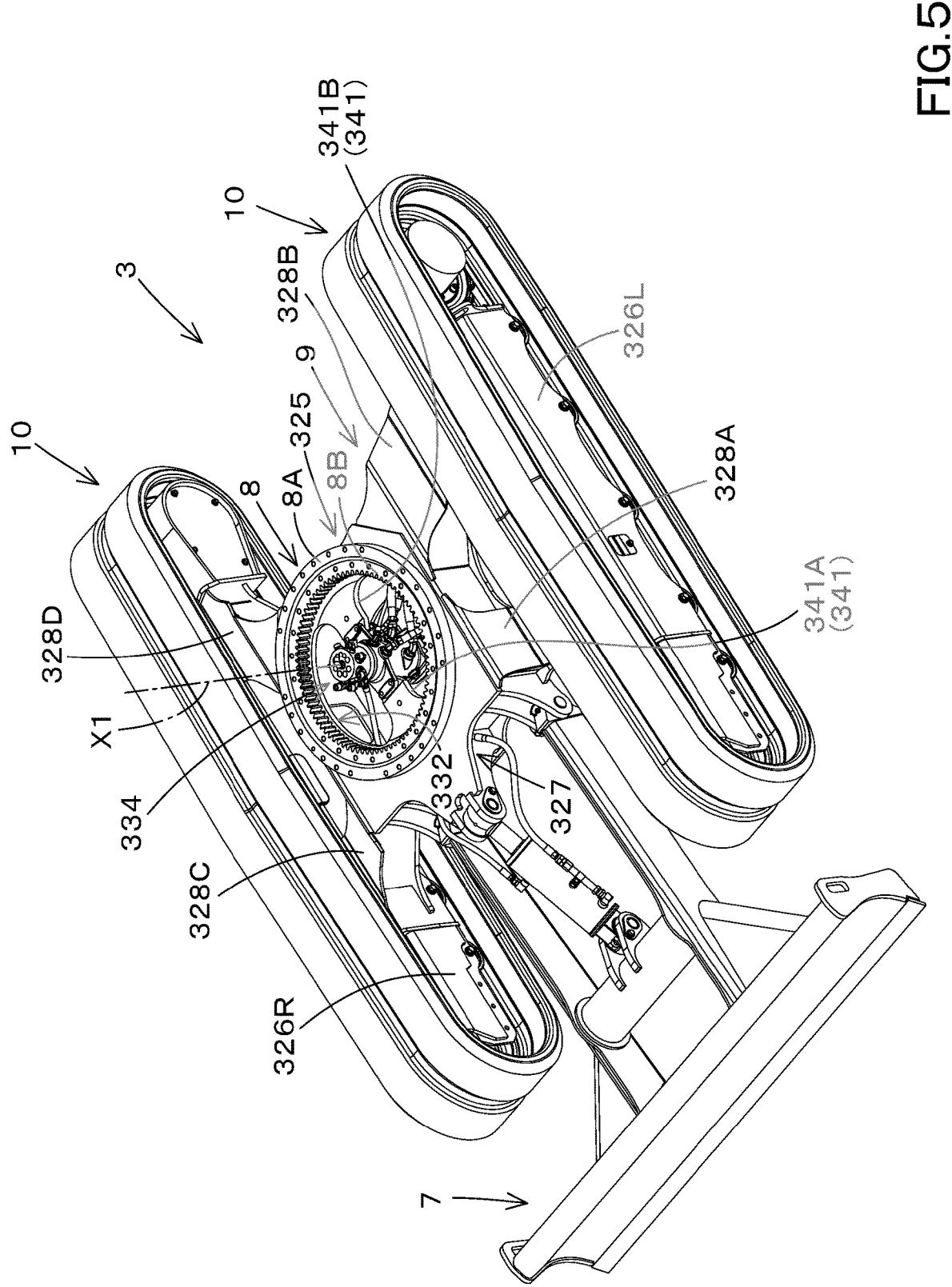
FIG. 5 is a perspective view of a traveling device.

As shown in FIG. 5, the traveling frame 9 has a center frame 325, a first side frame 326L on the left side of the center frame 325, and a second side frame 326R on the right side of the center frame 325. The machine body 2 (swivel frame 41) is rotatably supported on the center frame 325 via a swivel bearing 8. The first side frame 326L and the second side frame 326R are provided with a traveling mechanism 10.

The center frame 325 has a central frame portion 327 and four support legs 328A to 328D extending from the central frame portion 327. The central frame portion 327 has a top plate 329 including a top surface of the center frame portion 327. The support legs 328A and 328B connect the center frame portion 327 to the first side frame 326L. The support legs 328C and 328D connect the center frame portion 327 to the second side frame 326R.

Figure 7:
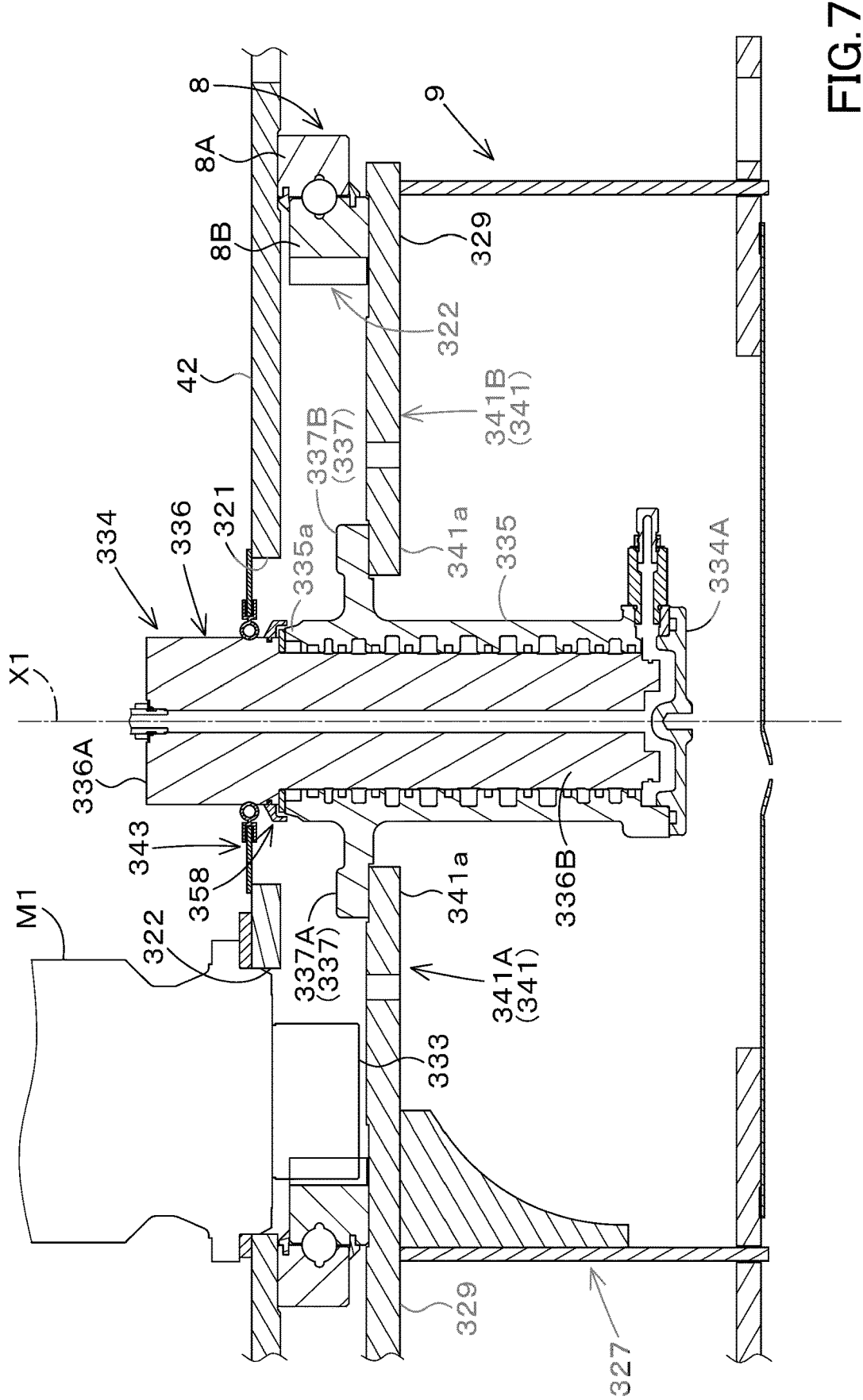
FIG. 7 is a side cross-section view of an attachment portion of a swivel joint.

As shown in FIG. 5 and FIG. 7, the swivel bearing 8 has an outer race (outer race) 8A, an inner race (inner race) 8B provided on the inner periphery of the outer race 8A for free rotation around the swivel axis center X1 via a ball, and an inner tooth gear 332 formed on the inner periphery of the inner race 8B. The outer race 8A is fixed to the swivel base plate 42 by bolts or the like. That is, the outer race 8A is attached to the machine body 2. The inner race 8B is fixed to the top plate 329 (center frame 325) by bolts or the like. That is, the inner race 8B is attached to the traveling device 3.

As shown in FIG. 7, the swivel motor M1 has a swivel pinion 333 mounted on the swivel motor M1. The swivel pinion 333 is arranged on the lower side of the swivel base plate 42 through the second opening hole 322 and engages the inner tooth gear 332. The swivel pinion 333 is driven by the swivel motor M1 to rotate around the vertical axis center. Thus, when the swivel pinion 333 is driven by the swivel motor M1, the swivel pinion 333 moves in the circumferential direction of the swivel bearing 8 while engaging the inner tooth gear 332. This causes the machine body 2 to rotate around the swivel axis X1.

Figure 6:
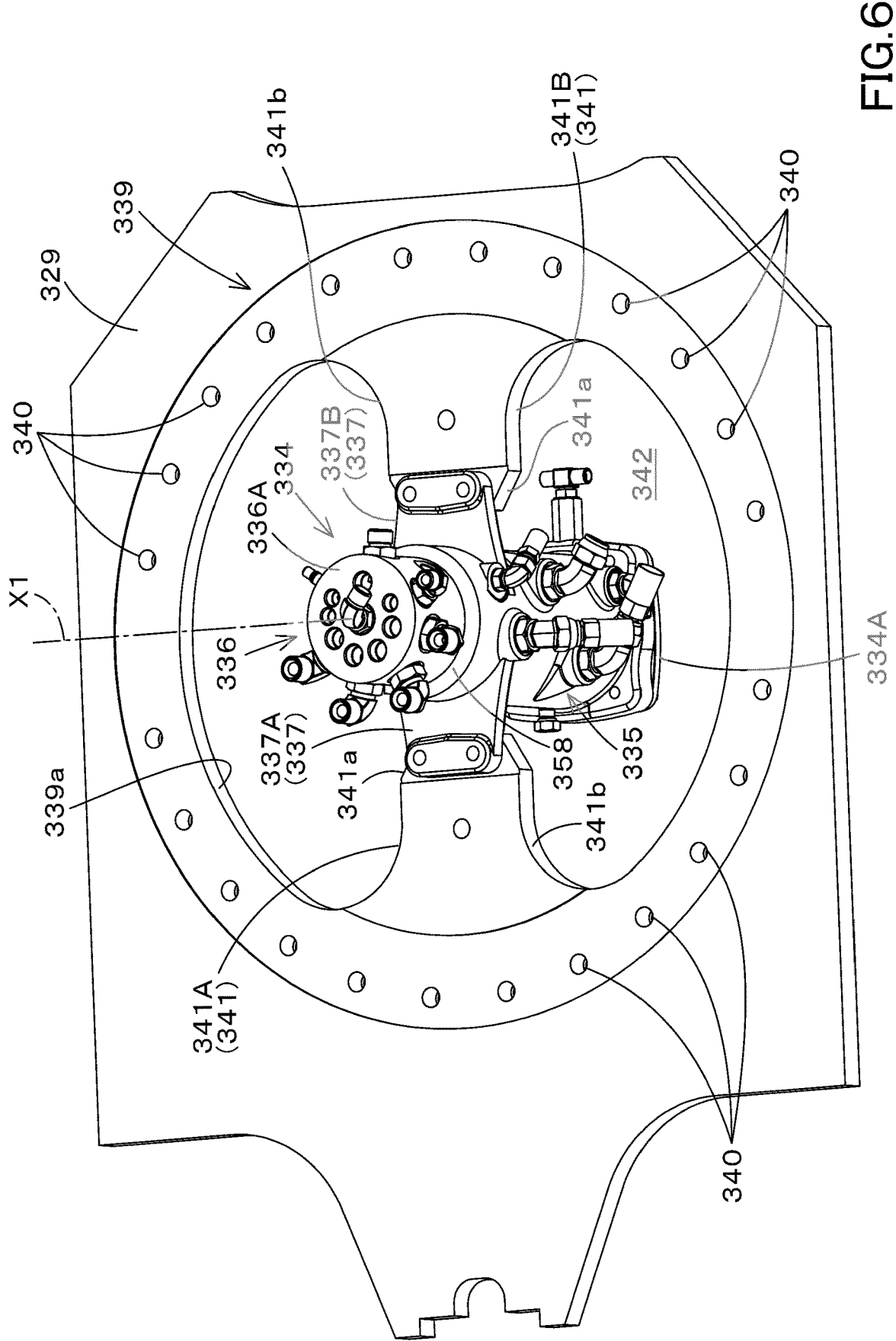
FIG. 6 is a perspective view of an attachment portion of a swivel joint.

As shown in FIG. 6, a swivel joint 334 is arranged on the center side of the swivel bearing 8, that is, at the position of the swivel axis center X1. The swivel joint 334 is a swivel joint that enables hydraulic fluid supply and output between the hydraulic actuator on the travel device 3 side and the control valve V1 on the machine body 2 side.

As shown in FIG. 7, the swivel joint 334 has an outer sleeve 335 attached to the traveling device 3, an inner shaft 336 rotatably inserted into the outer sleeve 335 around the longitudinal axis center, and an attachment wall 337.

The outer sleeve 335 is formed in a tubular shape and is arranged on the lower side of the swivel base plate 42. The upper end potion of the outer sleeve 335 is a receiver portion 335A that supports the inner shaft 336. The lower end potion of the outer sleeve 335 is closed by the lid member 334A.

Figure 9:
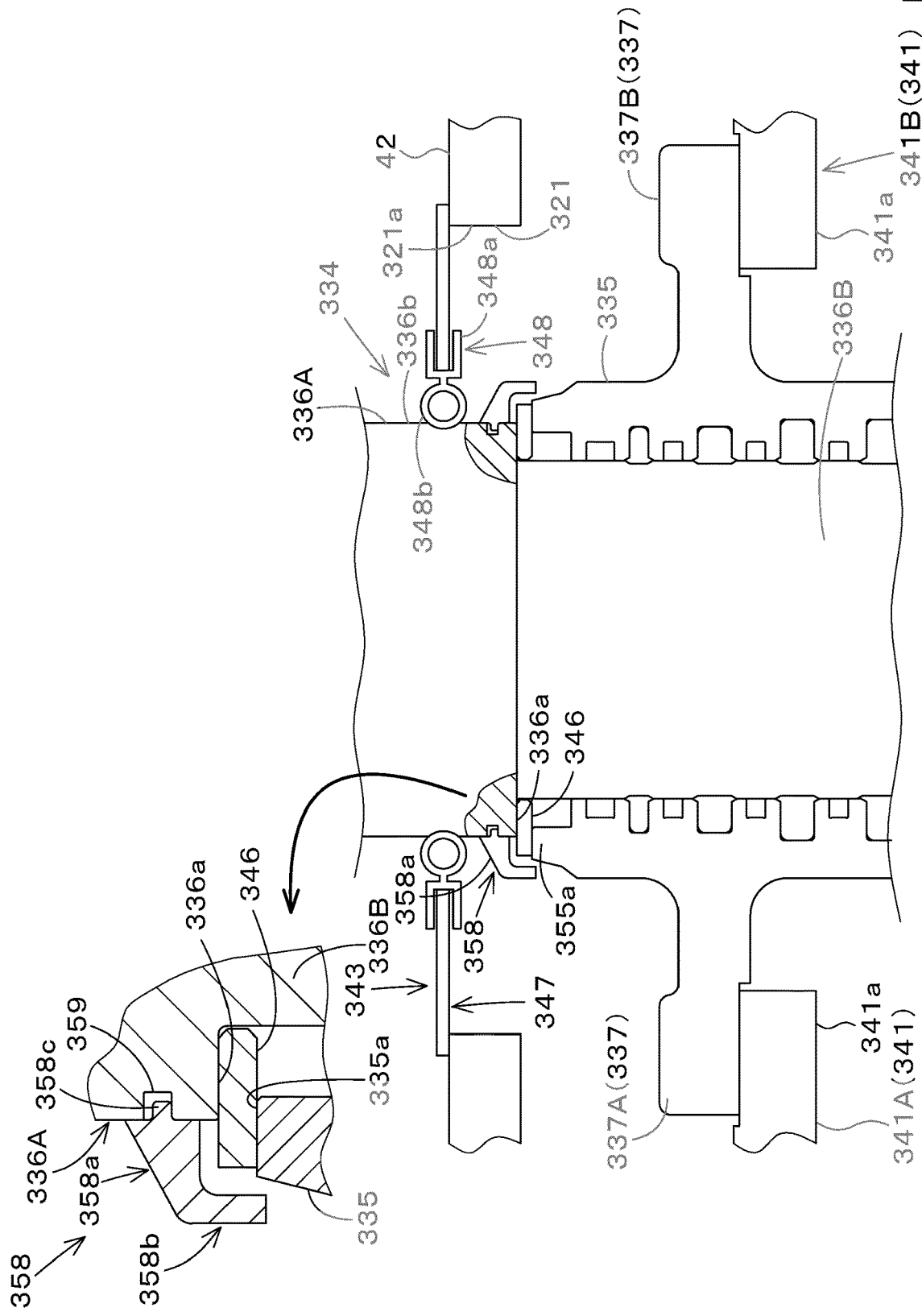
FIG. 9 is a side cross-section view of an upper portion of a swivel joint.

As shown in FIG. 9, the inner shaft 336 has an upper portion 336A above the outer sleeve 335 and a lower portion 336B inserted into the outer sleeve 335. Both the upper portion 336A and the lower portion 336B are cylindrical in shape, with the upper portion 336A being larger in diameter than the lower portion 336B. The lower end potion of the upper portion 336A (the loaded portion 336A) is in contact with the collar 346, which contacts on the receiver portion 335A. Thus, the inner shaft 336 has a loaded portion 336A that is supported on the receiver portion 335A. The collar 346 is a member for smooth rotation of the inner shaft 336 with respect to the outer sleeve 335.

As shown in FIG. 7, the rotational axis center of the inner shaft 336 coincides with the swivel axis center X1. The upper portion 336A of the inner shaft 336 protrudes above the swivel base plate 42 through the first opening hole 321. A rod-shaped engagement member 338 is provided in the upper portion 336A of the inner shaft 336 protruding radially outwardly (see FIG. 11). The engaging member 338 engages with the swivel base plate 42 side (engagement member 344 described below) and rotates integrally with the swivel base plate 42. The engaging member 338 regulates the rotation of the inner shaft 336 with respect to the swivel frame 41. Thus, the inner shaft 336 rotates integrally with the swivel base plate 42.

The attachment wall 337 includes a first attachment wall 337A and a second attachment wall 337B. The first attachment wall 337A and the second attachment wall 337B are integrally formed in the upper portion of the outer sleeve 335. The first attachment wall 337A protrudes from the outer sleeve 335 in one horizontal direction (forward). The second attachment wall 337B protrudes from the outer sleeve 335 in the other (rearward) direction, which is opposite to the one described above. There should be at least one attachment wall 337.

As shown in FIG. 6, an inner ring attachment portion 339 is provided on the top surface of the top plate 329 to which the inner race 8B of the swivel bearing 8 is attached. The inner ring attachment portion 339 is provided with a plurality of bolt insertion holes 340 in which bolts for securing the inner race 8B are inserted, spaced circumferentially. The bolt insertion holes 340 include an annular edge formed through the top plate 329.

As shown in FIG. 6 and FIG. 7, the top plate 329 (traveling device 3) has a joint attachment portion 341 to which the swivel joint 334 is attached. The joint attachment portion 341 protrudes from the inner side of the swivel bearing 8 toward the swivel joint 334. In detail, the joint attachment portion 341 extends horizontally from the inner circumference edge portion 339a of the inner ring attachment portion 339 toward the swivel axis X1. The joint attachment portion 341 includes a first wall portion 341A and a second wall portion 341B. The first wall portion 341A extends rearwardly from a front portion of the inner periphery edge portion 339a of the inner ring attachment portion 339. The second wall portion 341B protrudes forward from a rear portion of the inner periphery edge portion 339 of the inner ring attachment portion 339.

The inner periphery of the inner ring attachment portion 339 is open. In detail, the top plate 329 has an opening 342 including an inner circumference edge portion 339a of the inner ring attachment portion 339, an outer extension of the first wall portion 341A (an edge forming an outline) and an outer extension of the second wall portion 341B.

As shown in FIG. 6 and FIG. 7, the first attachment wall 337A is placed on the extended end side 341A (on the side of the swivel axis X1) of the first wall portion 341A. The second attachment wall 337B is placed on the extended end side 341A of the second wall portion 341B. The first attachment wall 337A is attached to the first wall 341A from below by a bolt. The second attachment wall 337B is attached to the second wall 341B from below by a bolt.

Figure 8:
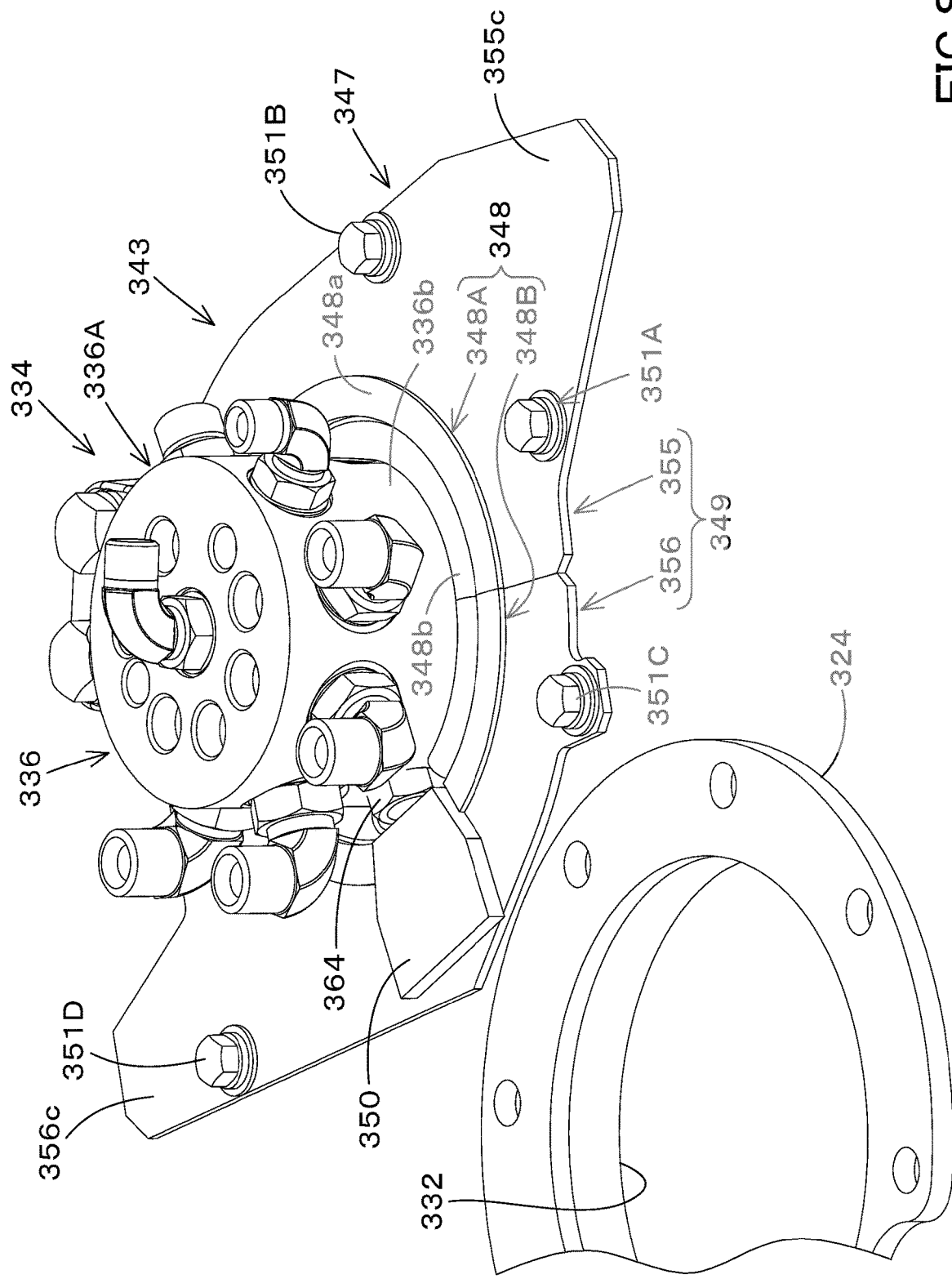
FIG. 8 is a perspective view of an upper portion of a swivel joint.

As shown in FIG. 8, the base portion 341b of the second wall portion 341B is formed with a horizontal width (a width in the machine width direction K2) progressively wider from the tip of the joint attachment portion 341 (the end potion of the swivel joint 334 side) to the base (the end potion of the inner ring attachment portion 339 side). The left and right edges of the base portion 341b are formed in a curved shape that is concave toward the inside of the machine body. Similarly, the base portion 341b of the first wall portion 341A is also formed progressively wider from the tip to the base, and the left and right outer edges of the base portion 341b are formed in a curved shape that is concave toward the inside of the machine body.

Figure 10:
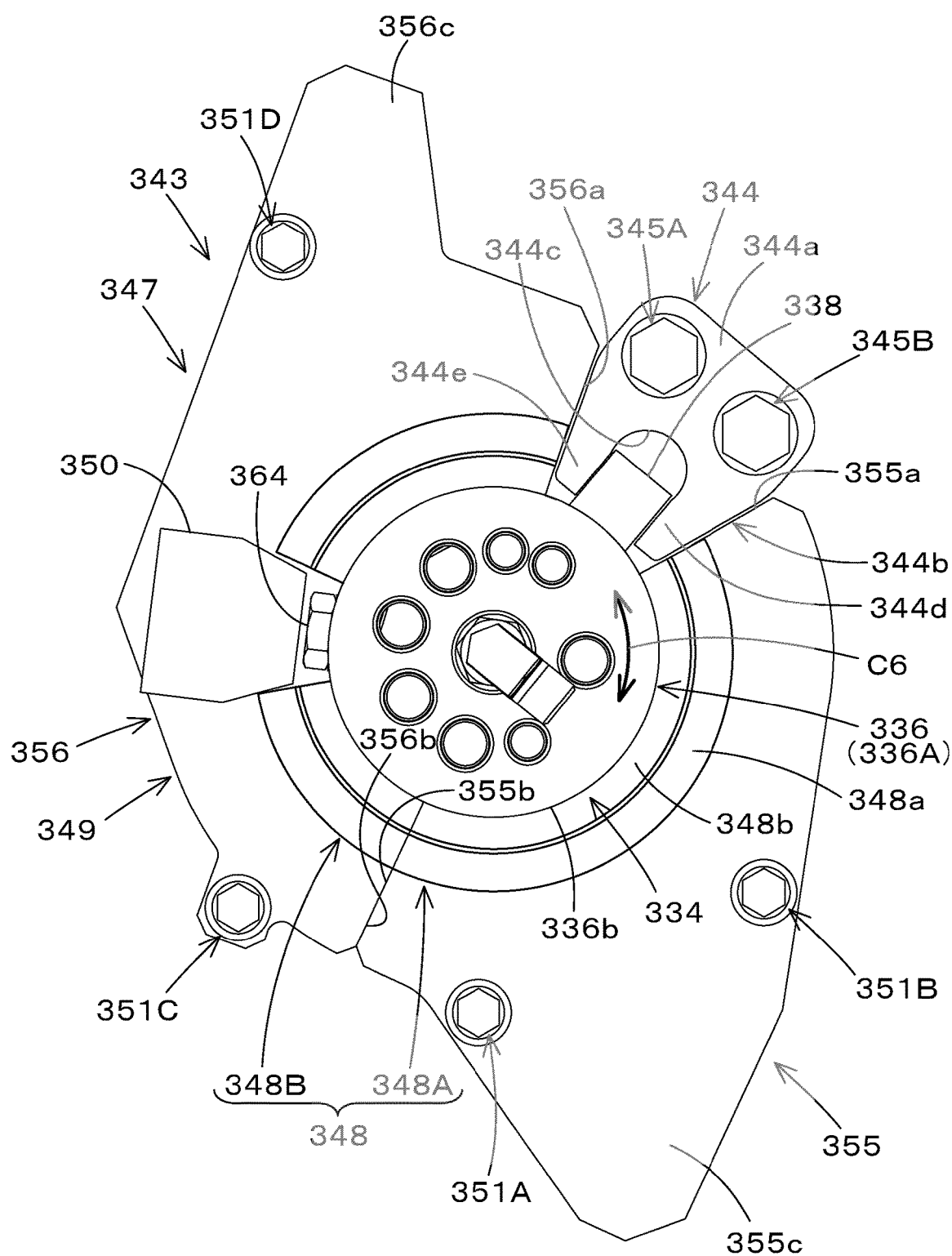
FIG. 10 is a plan view illustrating a cover structure of an upper portion of a swivel joint.

As shown in FIG. 10, a locking member 344 is provided on the top surface of the swivel base plate 42 that engages the engagement member 338. The locking member 344 is provided in the vicinity of the first opening hole 321 and has a fixed portion 344a secured to the swivel base plate 42 by bolts 345A and 345B, and a locking portion 344b that protrudes from the fixed portion 344a toward the swivel joint 334 and engages the engagement member 338. The locking portion 344b has a locking groove 344c formed from an end potion of the swivel joint 334 side toward the radial outward direction of the swivel joint 334. The locking portion 344b is formed in a two-way shape having a first portion 344d forming one side of the locking groove 344c and a second portion 344e forming the other side of the locking groove 344c.

Figure 11:
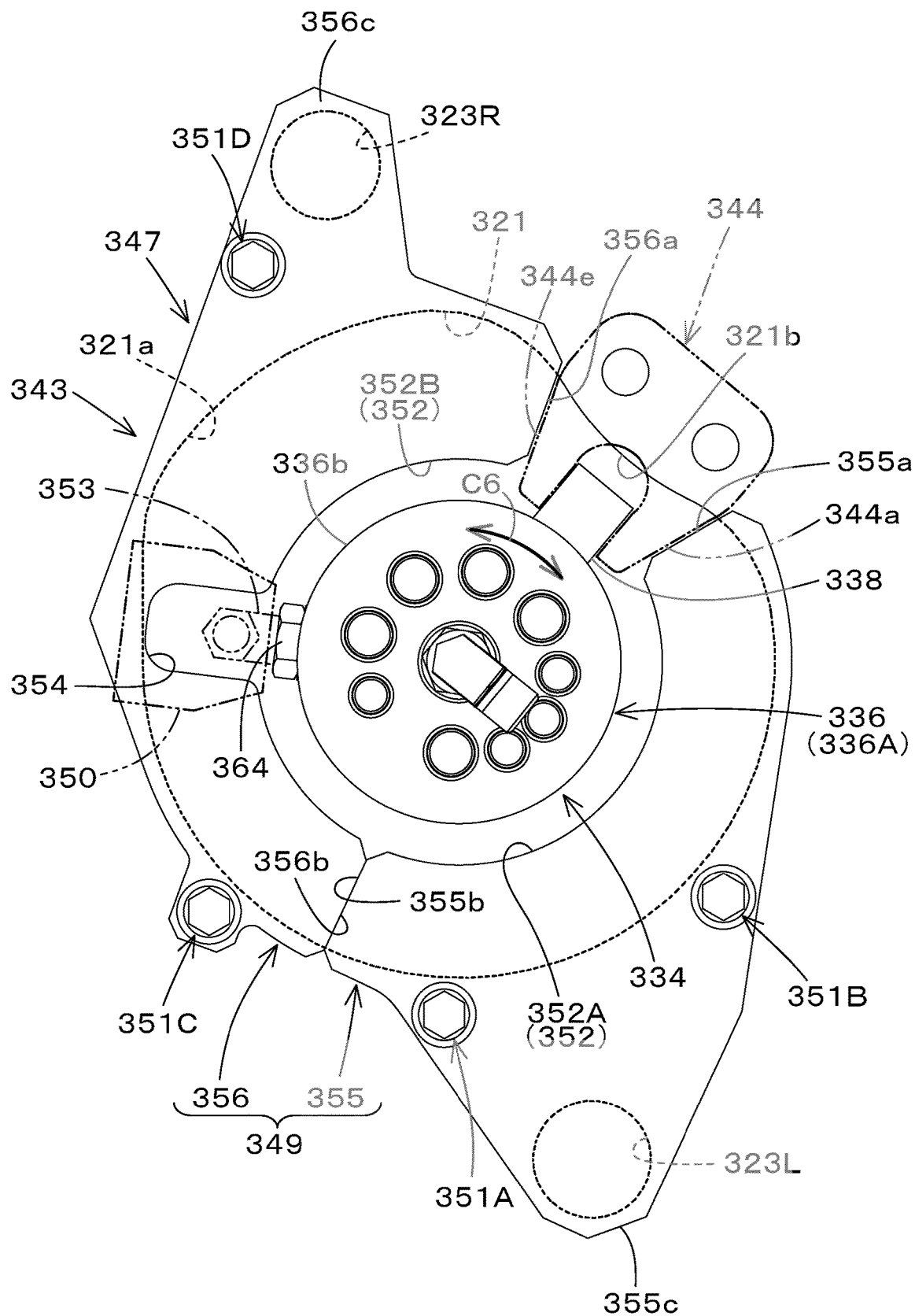
FIG. 11 is a plan view of a protection cover.

As shown in FIG. 11, the first portion 344d and the second portion 344e protrude from the first opening hole 321 and protrude toward the swivel joint 334. The first opening hole 321 has a portion 321b that protrudes in a curved manner toward the swivel joint 334 at the attachment position of the locking member 344.

The engaging member 338 engages the locking member 344 by inserting it into the locking groove 344c (between the first portion 334d and the second portion 334e). When the engaging member 338 engages the locking member 344, the inner shaft 336 rotates integrally with the swivel base plate 42.

The working machine 1 has a closing cover 343 covering the gap between the first opening hole 321 and the swivel joint 334, as shown in FIG. 8 to FIG. 10. The closing cover 343 is formed separately from the swivel joint 334 and is attached to the swivel frame 41. In this embodiment, the closing cover 343 covers (closes) the gap between the inner shaft 336 and the first opening hole 321. The closing cover 343 prevents a foreign object from falling between the swivel joint 334 (inner shaft 336) and the swivel frame 41 (the rim portion 321a of the first opening hole 321). In turn, foreign objects such as soil, pebbles, debris and the like that fall from the gap between the first opening hole 321 and the swivel joint 334 can be prevented from moving (rolling) over the joint attachment portion 341 to the inner tooth gear 332 and the foreign objects can be prevented from getting caught between the inner tooth gear 332 and the swivel pinion 333.

As shown in FIG. 10, the closing cover 343 has a main cover 347 and a sealing member 348. The main cover 347 has a cover plate 349 and an auxiliary cover 350. The cover plate 349 is attached to the swivel base plate 42 by a plurality of bolts 351A to 351D. As shown in FIG. 11, the cover plate 349 has a notched edge portion 352 spaced opposite the outer surface 336b of the inner shaft 336 (swivel joint 334) to cover the first opening hole 321. The notched edge portion 352 is formed in a curved shape along the outer circumference surface 336b of the inner shaft 336.

As shown in FIG. 11, the inner shaft 336 has a connector portion 364 to which a pipe joint 353 can be connected that is selectively attached to the inner shaft 336. The cover plate 349 has a notched groove 354 that prevents interference with the pipe joint 353 when the pipe joint 353 is connected. The notched groove 354 is formed from the notched edge portion 352 toward the radial outward direction of the swivel joint 334 and is continuous with the notched edge portion 352. The notched groove 354 is covered by an auxiliary cover 350. The auxiliary cover 350 is formed by a plate thicker than the cover plate 349. The auxiliary cover 350 is fixed to the cover plate 349 by welding or other means in the case of the standard specification working machine 1, and is not attached to the cover plate 349 in the case of an optional hydraulic actuator other than the hydraulic actuator provided as standard on the working machine 1.

As shown in FIG. 10 and FIG. 11, the cover plate 349 has a first plate member 355 and a second plate member 356, and is formed in a divided form. The first plate member 355 and the second plate member 356 are arranged between the inner shaft 336 (swivel joint 334). The first plate member 355 is attached to the first plate member 355 by bolts 351A and 351B. The second plate member 356 is attached by bolts 351C and 351D. The notched edge portion 352 includes a first notched edge portion 352A formed in the first plate member 355 and a second notched edge portion 352A formed in the second plate member 356. The notched groove 354 is formed in the first plate member 355.

As shown in FIG. 11, the first plate member 355 has an edge (first edge) 355a on one end side of the circumferential direction C6 (referred to as the swivel circumferential direction) centered on the swivel axis X1 and an edge portion 355b on the other end potion of the swivel circumferential direction C6. The second plate member 356 also has an edge (second edge) 356a on one end side of the swivel circumferential direction C6 and an edge portion 356b on the other end potion of the swivel circumferential direction C6. The edge portion 355a opposes the locking member 344 in close proximity to the locking member 344 in the swivel circumferential direction C6. The edge portion 356a also opposes the locking member 344 proximate to the locking member 344 in the swivel circumferential direction C6. The locking member 344 is sandwiched between the edge portions 355a and the edge portions 356a. Thus, the second plate member 356 has a second edge portion 356a sandwiching the locking member 344 with the first edge portion 355a in the swivel circular circumferential direction C6. The edge portions 355b and the edge portions 356b are in contact with each other butt to butt in the swivel circumferential direction C6.

As shown in FIG. 11, the first plate member 355 has a first extension portion 355c covering the first positioning hole 357A. The second plate member 356 has a second extension portion 356c covering the second positioning hole 357B.

As shown in FIG. 9, the sealing member 348 protrudes from the notched edge portion 352 toward the outer surface 336B of the inner shaft 336 and contacts the outer surface 336B. The sealing member 348 is provided in the notched edge portion 352 in the swivel circumferential direction C6 from the edge portion 355a through the edge portion 355b and the edge portion 356b to the edge portion 356a. Thus, the sealing member 348 covers the gap between the notched edge portion 352 and the swivel joint 334. The sealing member 348 has a base portion 348a fitted into the notched edge portion 352 and a hollow-shaped contact portion 348b that contacts the outer circumference surface 336b. The sealing member 348 has a first sealing member 348A attached to the first plate member 355 and a second sealing member 348B attached to the second plate member 356, and is formed in a divided form.

As described above, the closing cover 343 is divided into a member including the first plate member 355 and the first sealing member 348A and a member including the second plate member 356 and the second sealing member 348B. By configuring the closing cover 343 in a divided manner, the closing cover 343 can be attached to the swivel base plate 42 with the swivel joint 334 assembled to the traveling device 3 and the swivel frame 41 assembled to the traveling device 3, and the ease of assembly is good.

As shown in FIG. 9, the swivel joint 334 has a sealing cover 358 covering between the receiver portion 335a and the attachment portion 336a. The sealing cover 358 is generally formed in an annular shape surrounding the inner shaft 336 in a circumferential direction.

As shown in FIG. 9, the sealing cover 358 is provided at a lower end potion of the upper portion 336A of the inner shaft 336. The sealing cover 358 has a base portion 358A, an extension portion 358B, and a protruding portion 358C. The base portion 358a is located above the collar 346 and covers the upper portion of the collar 346. The base portion 358a surrounds the outer perimeter of the upper portion 336A and is tangent (closely) to the outer perimeter thereof. Further, the upper surface of the base portion 358a is formed in an inclined shape that shifts downwardly as extending outwardly in the radial direction. The extension portion 358b extends downwardly from an outer peripheral end potion of the base portion 358a and covers the outer side of the collar 346 and the receiver portion 355a. These base portions 358a and the extended portions 358b prevent foreign matter such as dust, water, oil, and the like from entering the swivel joint 334 from the joint between the inner shaft 336 and the outer sleeve 335 (between the receiver portion 335a and the receiver portion 336a).

The protruding portion 358c protrudes from the inner surface of the base portion 358a and is fitted into the circumferential groove 359 formed in the outer surface 336b of the inner shaft 336. The sealing cover 358 is thereby detached and mounted to the inner shaft 336.

As shown in FIG. 3 and FIG. 4, a weight attachment body 360 is provided at the rear portion of the swivel base plate 42 to which a weight 46 is mounted and supported. The weight attachment body 360 is formed by general structural rolled steel (SS material). The weight attachment body 360 has a first weight attachment portion (also referred to as a weight support) 44 and a second weight attachment portion (also referred to as a weight support member) 45.

The weight support portion 44 is formed by a thicker plate material that is thicker than the swivel base plate 42. Thick plate material having a thicker plate thickness than the swivel base plate 42 means that the maximum plate thickness of the weight support portion 44 is thicker than the maximum plate thickness of the swivel base plate 42. The plate thickness (vertical dimension) of the weight support portion 44 is formed in this embodiment to be roughly four times thicker than the swivel base plate 42. Although the plate thickness of the weight support portion 44 is not limited, it is preferred that the plate thickness of the weight support portion 44 is 2.5 times or more than the plate thickness of the swivel base plate 42.

Figure 12:
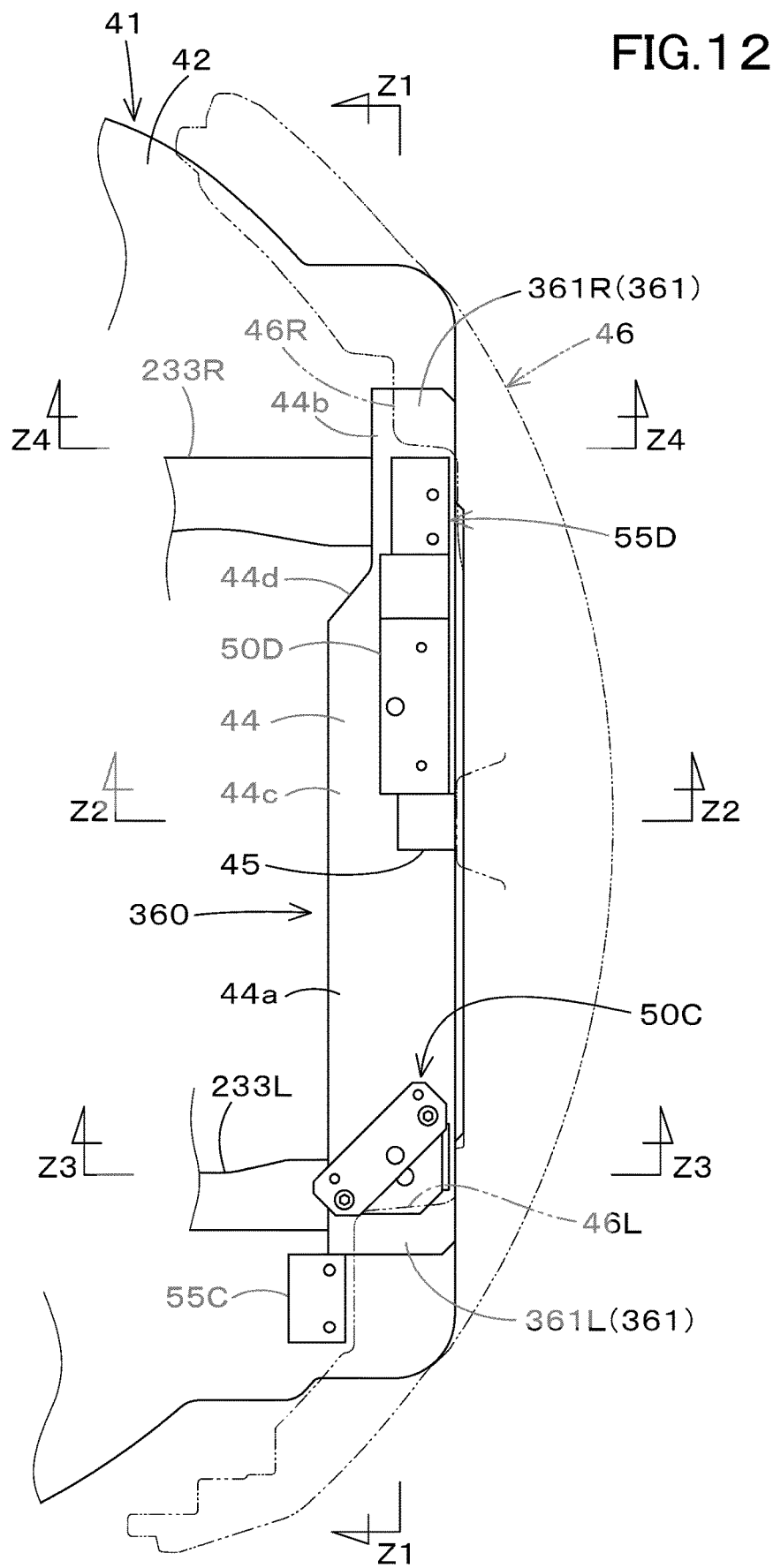
FIG. 12 is a plan view of a rear end portion of a swivel frame.

As shown in FIG. 12, the weight support portion 44 is formed in the form of a block of thick plates long in the machine width direction K2. The weight support portion 44 is formed from one side to the other side of the rear portion of the swivel base plate 42 in the machine width direction K2. The back and top surfaces of the weight support portion 44 are formed in the form of a flat surface along K2 in the machine body width direction and uniformly flat in the machine width direction K2. The width of the weight support portion 44 (in the front-to-rear direction) is formed so that the left portion 44a and the center portion 44c are wider, and the right portion 44b is narrower than the left portion 44a and the center portion 44c. The front surface of the weight support portion 44 and between the center portion 44c and the right portion 44b are formed in an inclined plane 44d which shifts backwards as it moves to the right. The front portion of the weight support portion 44, except for the inclined plane 44d, is formed as a flat surface along the machine width direction K2. The weight support portion 44 is fixed to the swivel base plate 42 by welding.

A rear rib 233L of the first rib 43L is connected to the left portion 44a of the weight support portion 44. A rear rib 233R of the second rib 43R is connected to the right portion 44b of the weight support portion 44.

Since the right portion 44b of the weight support portion 44 is formed in a straightforward manner, the yield of forming the weight support portion 44 is good in forming the weight support portion 44. That is, when forming two weight supports 44 from a single sheet of plate material, the right portion 44b is cut out so that the right portions 44b are opposite each other, thereby improving the yield in forming the weight support portion 44.

Figure 13:
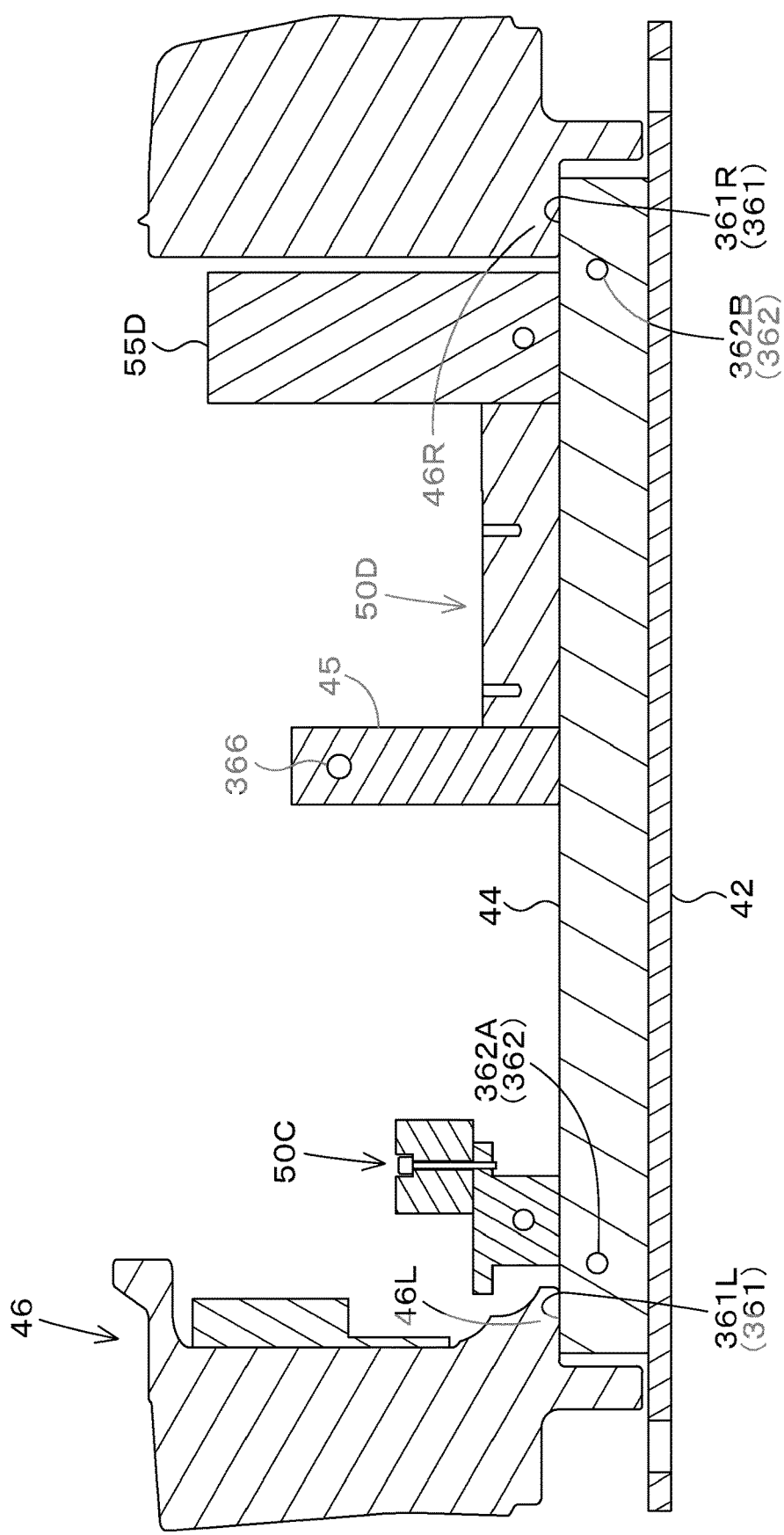
FIG. 13 is a cross section view of FIG. 12 in a Z1-Z1 arrowed line.

As shown in FIG. 13, the weight support portion 44 has a weight support surface 361 for placing and supporting the weight 46 and a mounting hole (referred to as the first mounting hole) 362 for attaching the weight 46. The weight support surface 361 includes a first support surface 361L on one side (left side) of the weight support portion 44 in the machine width direction K2 and a second support surface 361R on the other side (right side) of the machine width direction K2. On the first support surface 361L, a first attachment portion 46L on the left side of the weight 46 is placed. On the second support surface 361R, a second attachment portion 46R on the right side of the weight 46 is placed. The weights 46 are placed on the weight support portion 44 while floating off the swivel base plate 42.

The first attachment hole 362 is a threaded hole in which a bolt 363 for mounting the weight 46 (referred to as the first mounting bolt) is threaded through the weight 46 from the rear (in a horizontal direction). The threaded hole is a hole with a female thread formed on the inner surface of the cylindrical hole.

As shown in FIG. 13, the first attachment hole 362 includes a first screw hole 362A on one side (left side) of the weight support portion 44 in the machine width direction K2, and a second screw hole 362B on the other side of the machine width direction K2.

Figure 15:
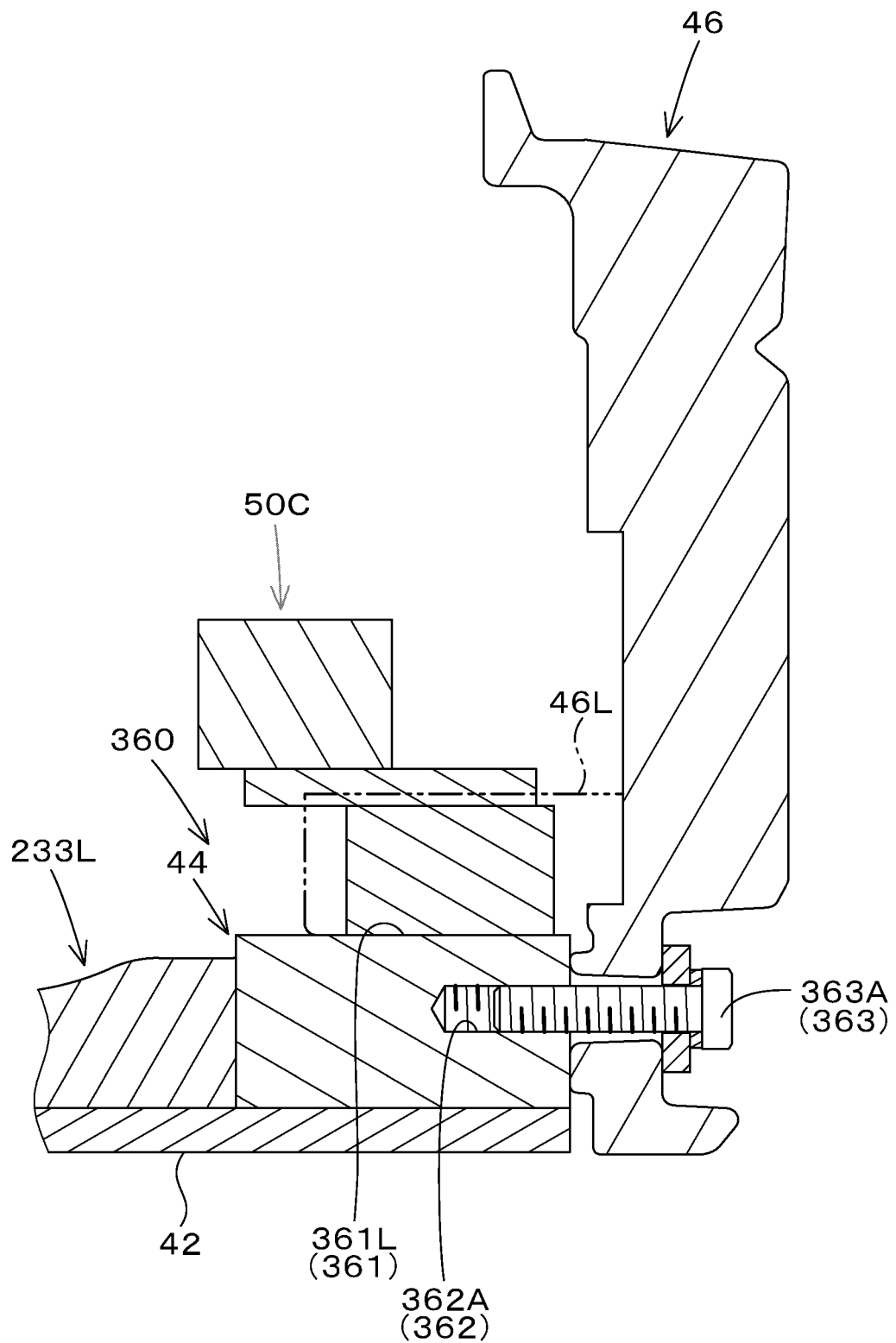
FIG. 15 is a cross section view of FIG. 12 in a Z3-Z3 arrowed line.
Figure 16:
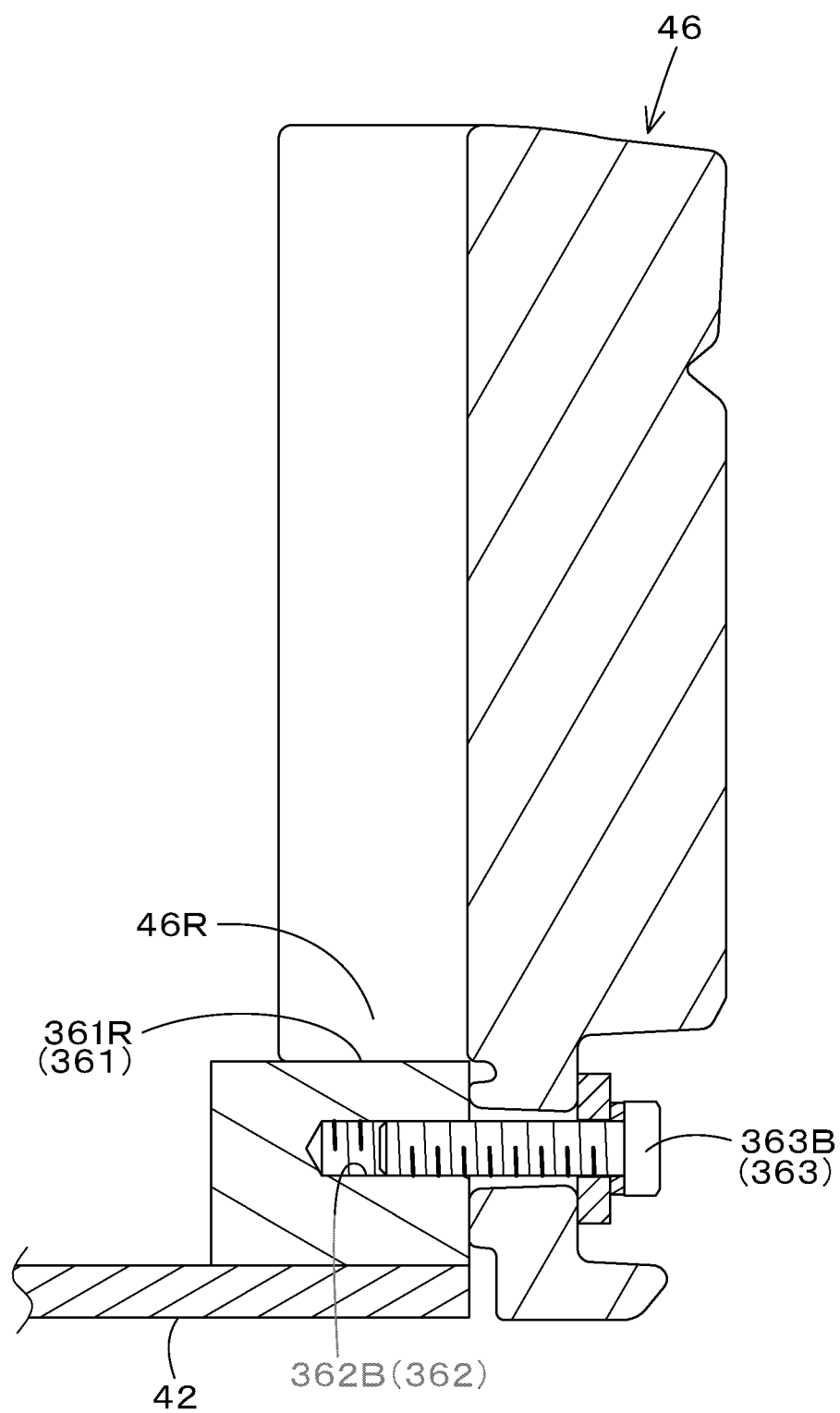
FIG. 16 is a cross section view of FIG. 12 in a Z4-Z4 arrowed line.

The first attachment bolt 363 includes a first bolt 363A (see FIG. 15) which penetrates the weight 46 from the rear to the front-to-rear direction K1 and is threaded into the first threaded hole 362A (see FIG. 15), and a second bolt 363B (see FIG. 16) which penetrates the weight 46 from the rear to the front-to-rear direction K1 and is threaded into the second threaded hole 362B.

As shown in FIG. 3, the weight support member 45 is formed in the shape of a rectangular column and is arranged in the center of the rear portion of the swivel base plate 42 in an abbreviated portion of the machine width direction K2 and is erected on the weight support portion 44. The weight support member 45 is fixed to the weight support portion 44 by welding the weight support member 45 to the weight support portion 44. As shown in FIG. 13, the weight support member 45 has a mounting hole (referred to as a second mounting hole) 366 in the upper portion of the back.

Figure 14:
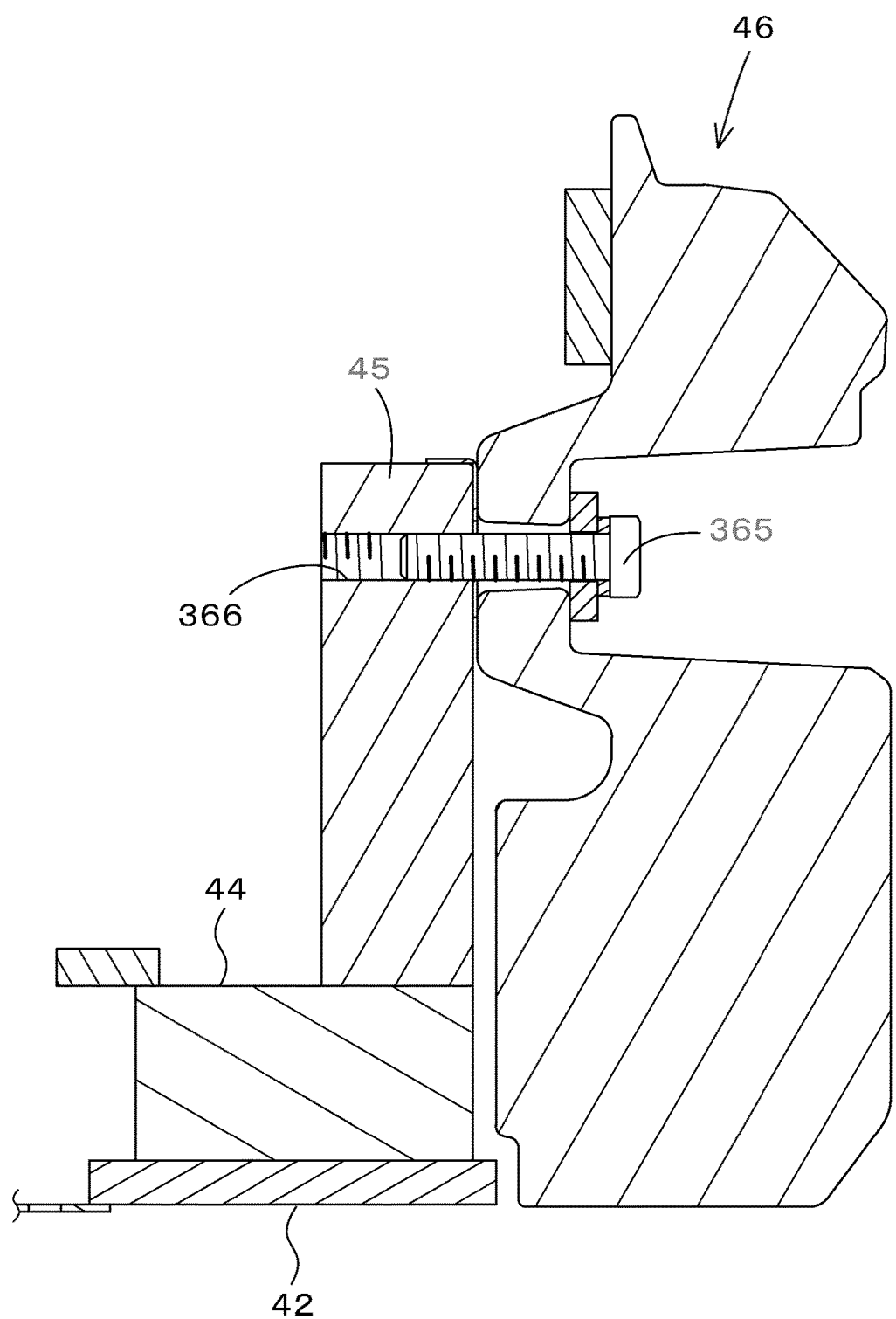
FIG. 14 is a cross section view of FIG. 12 in a Z2-Z2 arrowed line.

As shown in FIG. 14, the second attachment hole 366 is a threaded hole into which a bolt (referred to as the second mounting bolt) 365 is screwed. The second attachment bolt 365 is threaded into the third attachment hole 366 by penetrating the weight 46 from behind in the front-to-rear direction K1 (horizontal direction).

As described above, the weight 46 is attached to the weight attachment body 360 by the first bolt 363A, the second bolt 363B, and the second attachment bolt 365 with the weight support portion 44 of a thicker plate than the swivel base plate 42, while being placed on the thicker plate weight support portion 44. By receiving the load of the weight 46 by the first support surface 361L and the second support surface 361R of the thick plate weight support portion 44, it is possible to suppress the shear stress on the first attachment bolt 363 (first bolt 363A, second bolt 363B) and the second attachment bolt 365 compared to the case where the load of the weight 46 is received by the swivel base plate 42.

Since a weight support surface 361 for placing and supporting the weight 46 on the weight support portion 44, which is a thick plate without distortion, can be formed, the accuracy of the height of the weight 46 can be improved. In addition, the assembly accuracy of the weight 46 with respect to the machine width direction K2 is improved (the tilting of the weight 46 in the machine width direction K2 can be prevented), and the bonnet rear portion 22B, which will be described later, can be erected better, and the erection adjustment of the bonnet rear portion 22B can be eliminated.

By providing a weight support portion 44 including a thick steel plate, the steel has a greater specific gravity than cast iron, so that the weight support portion 44 can function as a part of the county weight and the weight 46 can be reduced in size.

Although the thickness of the weight support portion 44 is not particularly limited, it is preferable to have a plate thickness of 50 mm or more, and 70 mm or more is more preferable to have a plate thickness of 70 mm or more in order to properly obtain the effects described above.

As shown in FIG. 3, a first support stand 50A and a second support stand 50B are provided on the swivel base plate 42 and behind the partition plate, and a third support stand 50C and a fourth support stand 50D are provided on the weight support portion 44. These first to fourth support platforms 50A to 50D are support platforms for the prime mover E1. The prime mover E1 is supported on this support stand via a vibration-absorbing member.

As shown in FIG. 4, the swivel frame 41 is provided with a first frame attachment portion 55A, a second frame attachment portion 55B, a third frame attachment portion 55C, and a fourth frame attachment portion 55D. These first frame attachment portion 55A to the fourth frame attachment portion 55D are the frame attachment portions to which the support frame 11 described below is attached.

The first frame attachment portion 55A is fixed to the left portion of the top end potion of the main partition plate 48. The second frame attachment portion 55B is fixed to the right part of the upper end potion of the main partition plate 48. The third frame attachment portion 55C is located on the left side of the weight support portion 44 and is erected on the swivel base plate 42. The fourth frame attachment portion 55D is located on the right part of the weight support portion 44 and is erected on the right part of the weight support portion 44.

Figure 18:
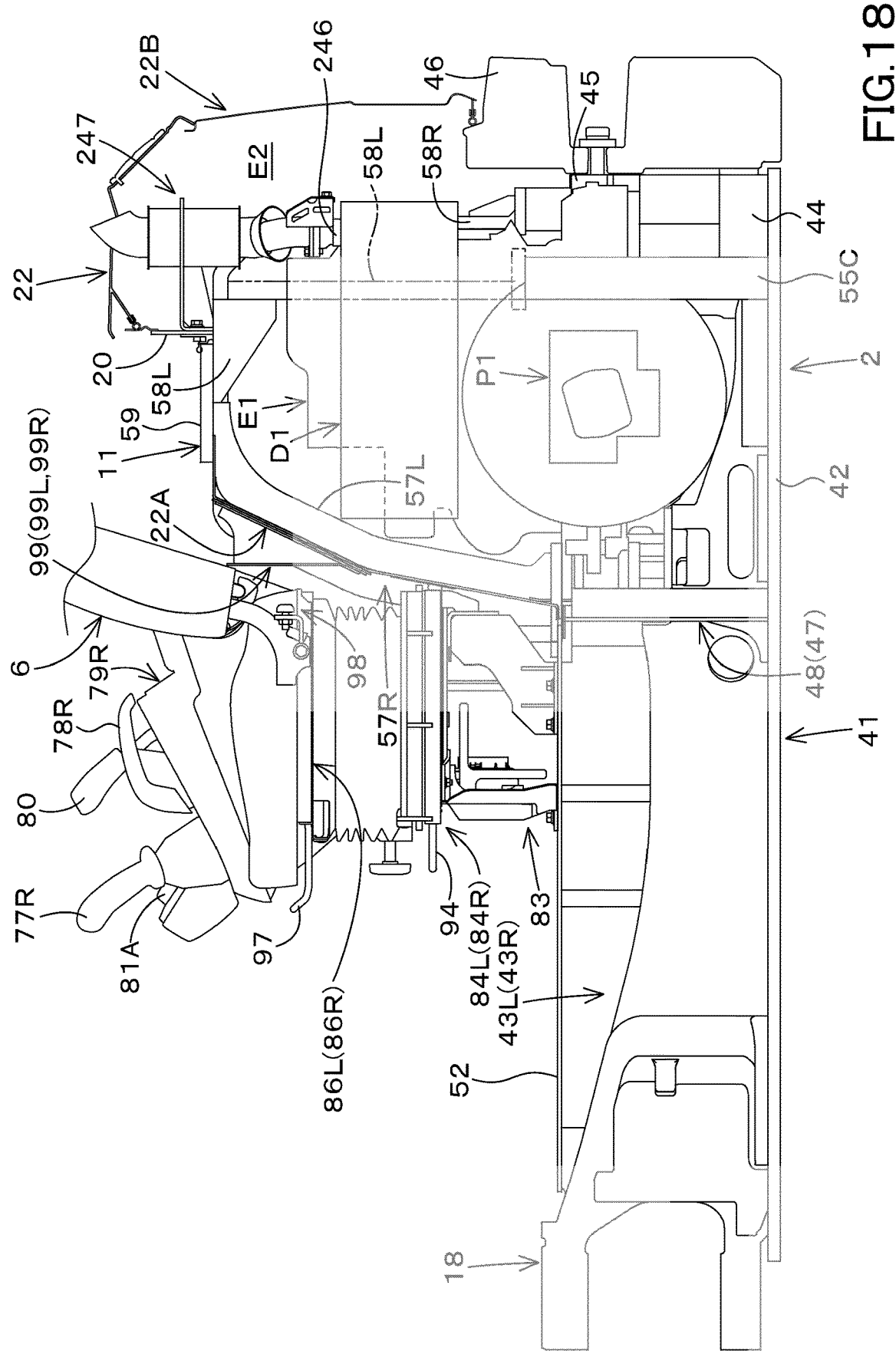
FIG. 18 is a side view of an operator sea and a prime mover assembled to a machine body.

As shown in FIG. 18, the prime mover E1 is covered by a bonnet 22. The bonnet 22 forms the prime mover room E2, which houses the prime mover E1. The prime mover room E2 is formed on the swivel base plate 42. An exhaust gas purification system D1 is provided in the prime mover room E2.

The bonnet 22 has a bulkhead member (bulkhead plate) 22A covering the front (upper front) of the prime mover E1, and a bonnet rear portion 22B covering the rear portion of the prime mover E1. A support frame 11 is provided within the bonnet 22 to support the bonnet 22. The support frame 11 is erected on the machine body 2 (swiveling frame 41). The bulkhead member 22A is a member that separates the prime mover room E2 from the arrangement side of the operator seat portion 6 (the area on the operator seat portion 6 side rather than the prime mover room E2). In other words, the bulkhead member 22A is a member that separates the prime mover room E2 from the interior of the cabin 5. The bulkhead member 22A is, for example, made of sheet metal. By forming the bulkhead member 22A from sheet metal, the sound insulation property is improved compared to the plastic bulkhead member. In addition, a support bracket for supporting a harness or other plan components can be easily attached to the bulkhead member 22A by welding, screwing, or the like. In addition, the strength of the machine body 2 can be improved by the bulkhead member 22A. The bulkhead member 22A is fixed to the support frame 11. A partition plate 47 is provided below the bulkhead member 22A. The partition plate 47 divides the lower front of the prime mover room E2. The rear portion of the bonnet 22B is vertically pivotally supported by the support frame 11 and opens and closes the prime mover room E2 by pivoting up and down. In detail, the bonnet rear portion 22B is rotatably supported on the support frame 11 by the upper front portion of the bonnet rear portion 22B, which is rotatably supported on the support frame 11 around an axis extending in the machine width direction K2, and when pivoted upward to open, the upper rear side of the prime mover compartment E2 becomes open. The weight 46 is arranged below the hood rear portion 22B, and the rear portion of the lower portion of the prime mover E1 is covered by the weight 46.

As shown in FIG. 17, the space between the left end potion of the bulkhead member 22A and the rear hood 22B is open toward the outside of the machine body, and this open area is blocked by the rear lower portion on the left side of the cabin 5, as shown in FIG. 1.

The space between the right end potion of the bulkhead member 22A and the rear portion of the hood 22B is also open. As mentioned above, the right side of this bonnet 22 is connected to the rear portion of the side cover 21, and external air is drawn into the prime mover room E2 by the cooling fan F1.

The support frame 11 is attached to a plurality of frame attachment portions (first frame attachment portion 55A to fourth frame attachment portion 55D) shown in FIG. 4 as described above.

Figure 19:
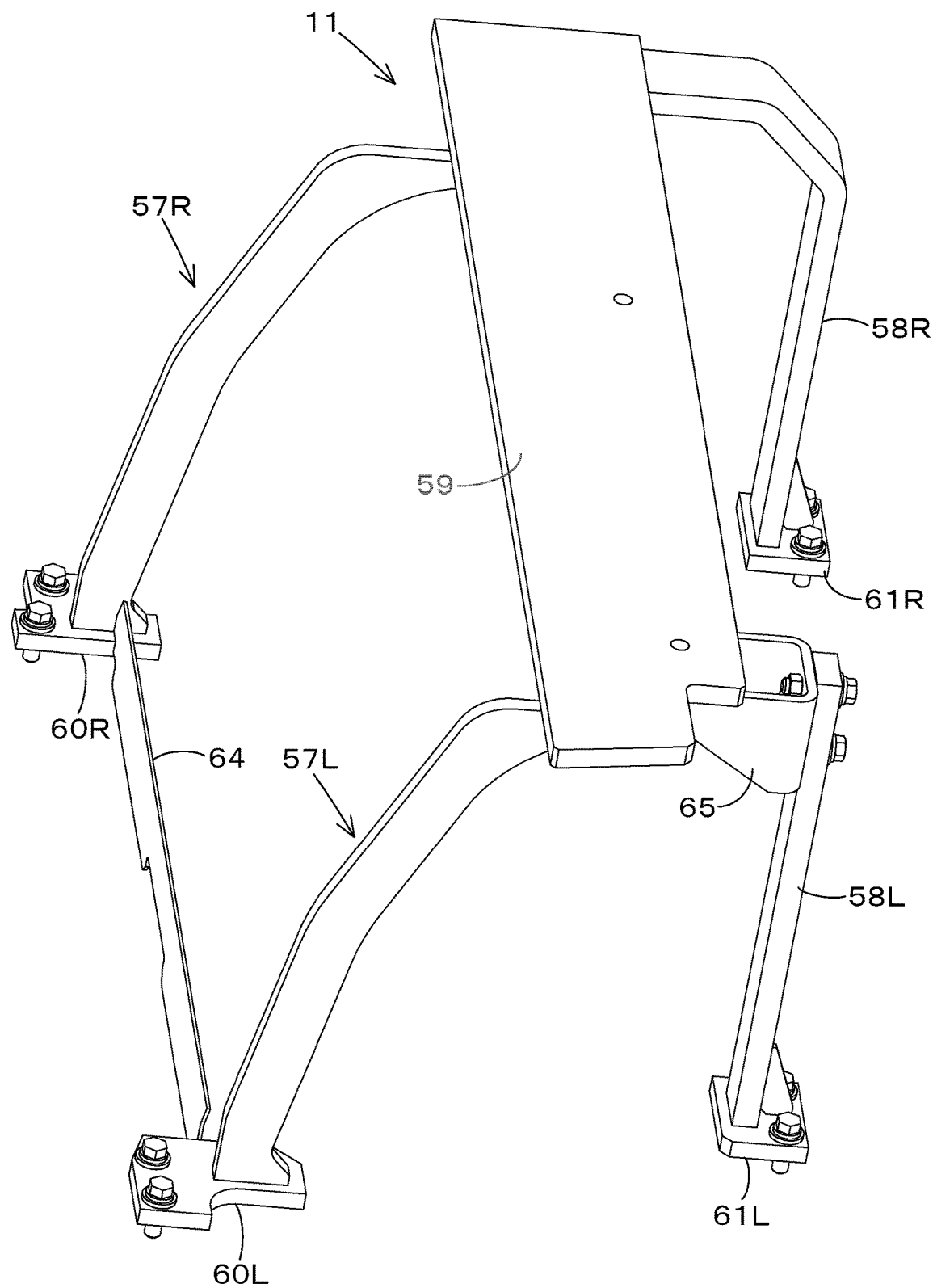
FIG. 19 is a perspective view of a support frame.

As shown in FIG. 19, the support frame 11 has a plurality of leg bodies (first front leg 57L, second front leg 57R, first rear leg 58L, second rear leg 58R) and an upper plate 59. The plurality of legs and the upper plate 59 are formed by a plate material.

The first front leg 57L and the second front leg 57R are arranged on the front side of the prime mover E1. The first front leg 57L and the second front leg 57R are arranged with a space between them in the machine width direction K2. The first front leg 57L and the second front leg 57R are arranged with the plate thickness direction aligned with the machine width direction K2.

As shown in FIG. 19, a first front attachment plate 60L, which is bolted to the first frame attachment portion 55A, is fixed to the lower end potion of the first front leg 57L. A second front attachment plate 60R bolted to the second frame attachment portion 55B is fixed to the lower end potion of the second front leg 57R. The first front attachment plate 60L and the second front attachment plate 60R are connected to the first front attachment plate 60L and the second front attachment plate 60R by a connector plate 64.

As shown in FIG. 19, the upper plate 59 is fixed to the upper portion 62b of the first front leg 57L and the upper portion 63b of the second front leg 57R. As shown in FIG. 18, the upper plate 59 and the cover plate 20, which is protruding upwardly on the rear end potion of the upper plate 59, block the upper space between the bulkhead member 22A and the rear portion of the bonnet 22B.

The first rear leg 58L and the second rear leg 58R are located on the rear side of the prime mover E1. As shown in FIG. 19, the first rear leg 58L and the second rear leg 58R are spaced apart in the machine width direction K2. The first rear leg 58L and the second rear leg 57R are arranged with the plate width direction aligned with the machine width direction K2. The upper portion of the first rear leg 58L is attached to an attachment member 65 fixed to the left side of the upper plate 59. A first rear attachment plate 61L is secured to the lower end potion of the first rear leg 58L, which is bolted to the third frame attachment portion 55C. The upper portion of the second rear leg 58R is secured to the lower surface of the upper plate 59. A second rear attachment plate 61R, which is bolted to the fourth frame attachment portion 55D, is secured to the lower end potion of the second rear leg 58R.

The rear legs may be one. That is, the support frame 11 has two front legs and at least one rear leg.

The weight of the support frame 11 can be reduced by fixing a sheet metal bulkhead member 22A over the first front leg 57L and the second front leg 57R to strengthen the strength of the support frame 11 in the machine width direction K2, and by matching the thickness direction of the first front leg 57L and the second front leg 57R to the machine width direction K2 to strengthen the strength in the front-to-rear direction K1.

As shown in FIG. 18, an operator seat portion 6 is arranged in front of the bulkhead member 22A. That is, the operator seat portion 6 is mounted in front of the prime mover E1 and at the rear portion of the step 52.

Figure 20:
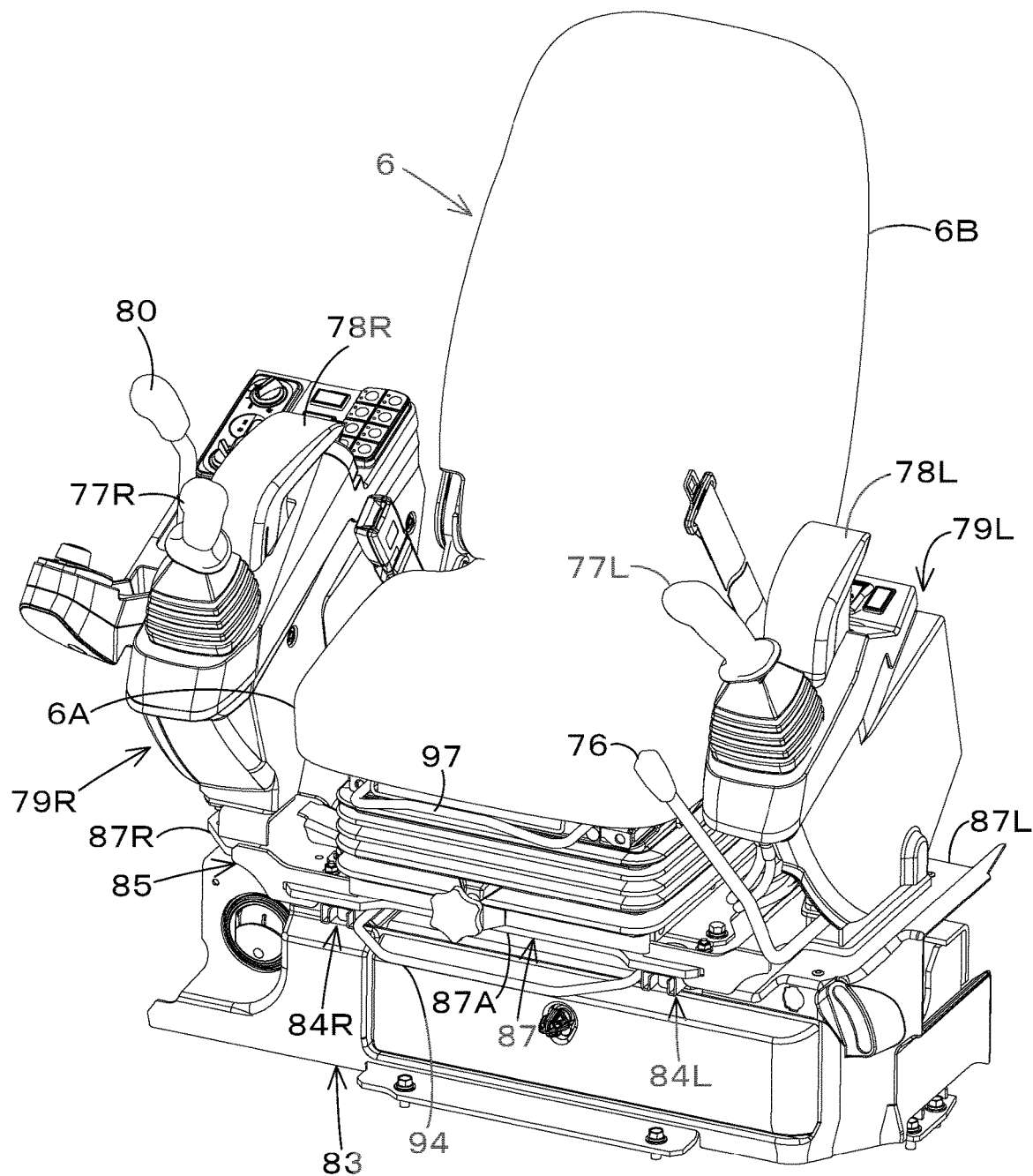
FIG. 20 is a perspective view illustrating periphery of an operator seat.

As shown in FIG. 20, a left console 79L is provided on the left side of the operator seat portion 6. The console 79L is provided with an unloading lever 76, a left control lever 77L and a left armrest 78L, and the like. A right console 79R is provided on the right side of the operator seat portion 6. The console 79R is provided with a right operation lever 77R, a right armrest 78R, and a dozer lever (lever) 80.

The operator seat portion 6 has a seat portion 6A for supporting the operator's buttocks and a backrest 6B for supporting the operator's back.

The unloading lever 76 is a lever that switches between a state in which a supply of hydraulic fluid is allowed to be supplied to the hydraulic device (for example, the hydraulic cylinder driving the working device 4, the swivel motor M1 for turning the machine body 2, and the like) and a state in which no hydraulic fluid can be supplied to the hydraulic device. When the unloading lever 76 is in the state shown in FIG. 20, the supply of hydraulic fluid is permitted to the hydraulic device, and when the unloading lever 76 is pivoted upward from this state, the hydraulic fluid cannot be supplied to the hydraulic device. When the unloading lever 76 is pivoted upward, the console 79L pivots upward with the lower portion of the rear end as a fulcrum. This makes it easier for the operator to get in and out of the cabin without the control lever 77L and console 79L getting in the way of the operator. As shown in FIG. 1, the cabin 5 has an exit 29 on the left side for the operator to get in and out of the cabin, and the exit 29 can be opened and closed by a door 28.

The control lever 77L can operate two operation objects, for example, the swinging operation of the machine body 2 and the rocking operation of the arm 16. The operation lever 77R is also capable of operating two operating objects, for example, pivoting operation of the boom 15 and pivoting operation of the bucket 17. The operation lever 77L operates the machine body 2 and arm 16 by operating a pilot valve located at the front portion of the console 79L. The operation lever 77R operates the boom 15 and bucket 17 by operating a pilot valve located at the front portion of the console 79R.

The dozer lever 80 is a lever that operates the dozer device 7. The dozer lever 80 operates the dozer device 7 by operating a pilot valve located in the middle of the console 79R.

The pilot valve operated by the operation lever 77L, the operation lever 77R, and the dozer lever 80 is connected to the control valve V1 via a hydraulic hose, a hydraulic coupling, or the like.

Figure 21:
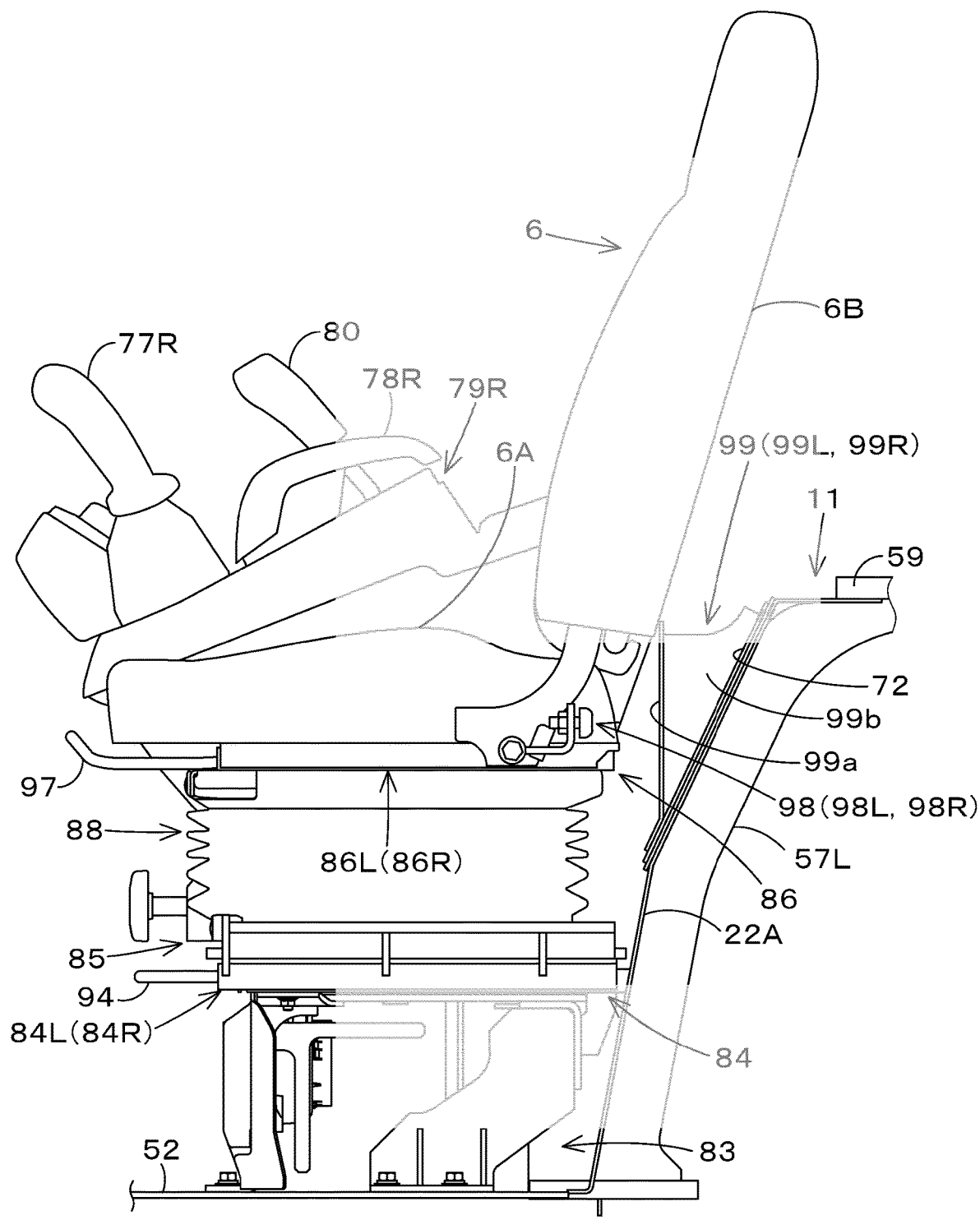
FIG. 21 is a side view illustrating periphery of an operator seat.
Figure 22:
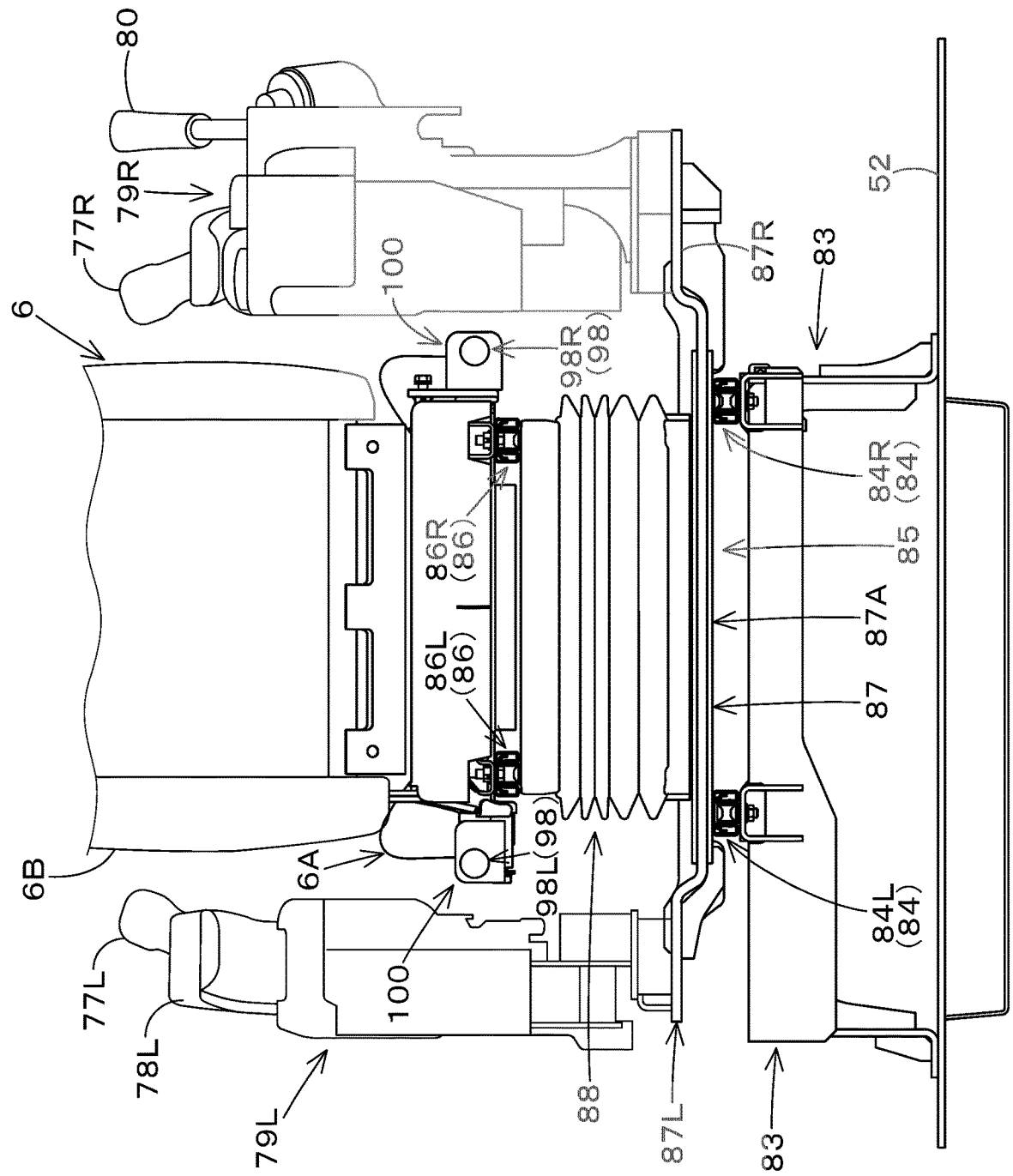
FIG. 22 is a back view illustrating periphery of an operator seat.

As shown in FIG. 21 and FIG. 22, a support platform 83 is provided below the operator seat portion 6. The support platform 83 is attached to the step 52 (machine body 2). On the support platform 83, a movable body 85 is supported by a first rail device (rail device) 84, which can be adjusted in the front-to-rear direction positions. The first rail device 84 includes a left first slide rail 84L and a right first slide rail 84R.

On the movable body 85, the operator seat portion 6 is supported in an adjustable front and rear position via a second rail device (or other rail device) 86. The second rail device 86 includes a second slide rail 86L on the left and a second slide rail 86R on the right.

The movable body 85 has a slide frame 87 attached to the support platform 83 via the first slide rails 84L and 84R, and a suspension 88 mounted on the slide frame 87. The slide frame 87 has a first attachment portion 87A to which the suspension 88 is mounted, a second attachment portion 87L extending leftwardly from the first attachment portion 87A, and a third attachment portion 87R extending rightwardly from the first attachment portion 87A. The console 79L is attached to the second attachment portion 87L and the console 79R is attached to the third attachment portion 87R.

The operator seat portion 6 is attached to the suspension 88 via a second slide rails 86L and 86R. The suspension 88 is a shock-absorbing device that supports the load of the operator acting on the operator seat portion 6 and also mitigates the transmission of vibrations and shocks from below to the operator seat portion 6. The suspension 88 may have a height adjustment mechanism to adjust the height of the operator seat portion 6.

Figure 23:
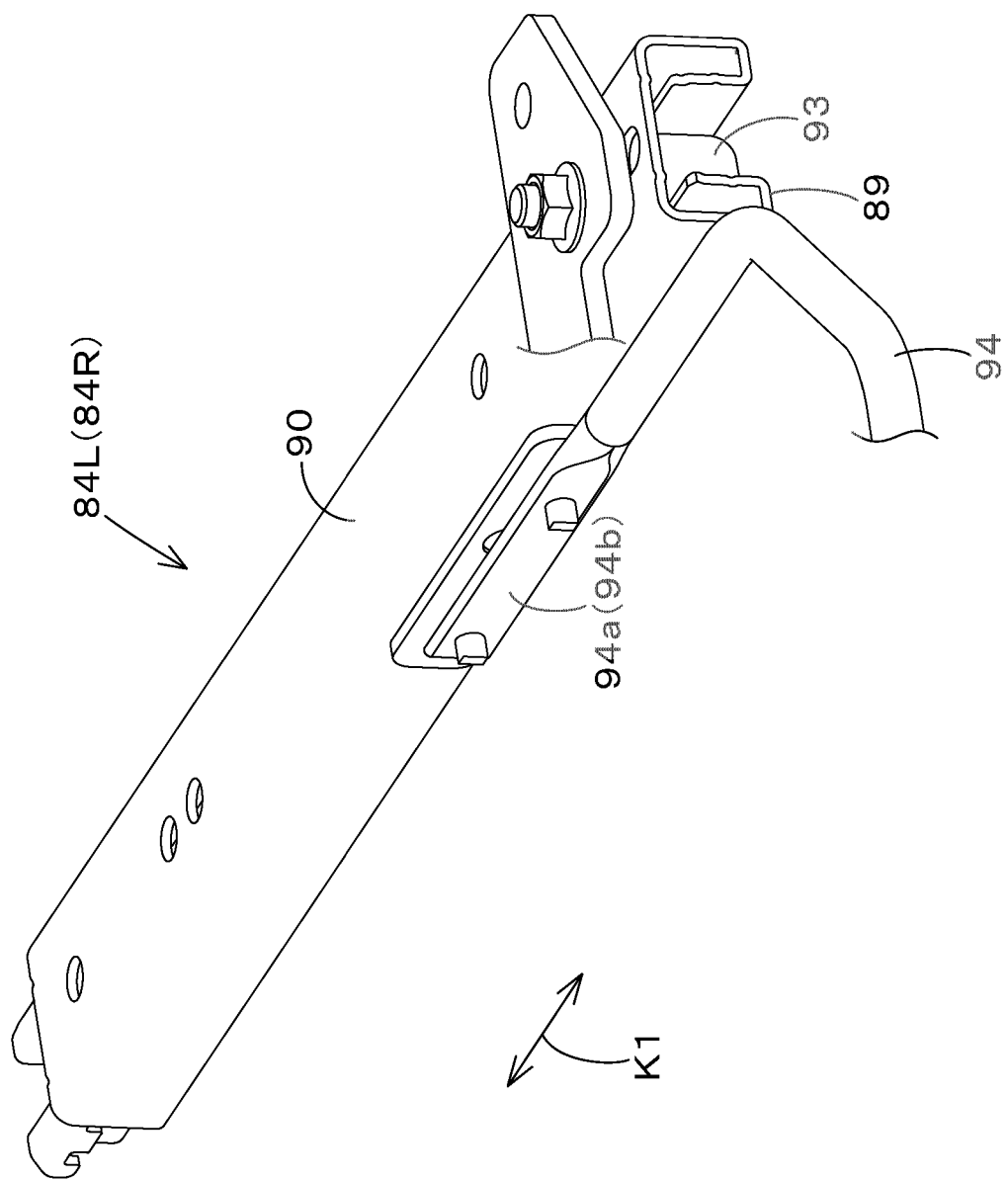
FIG. 23 is a perspective view of a first slider rail.
Figure 24:
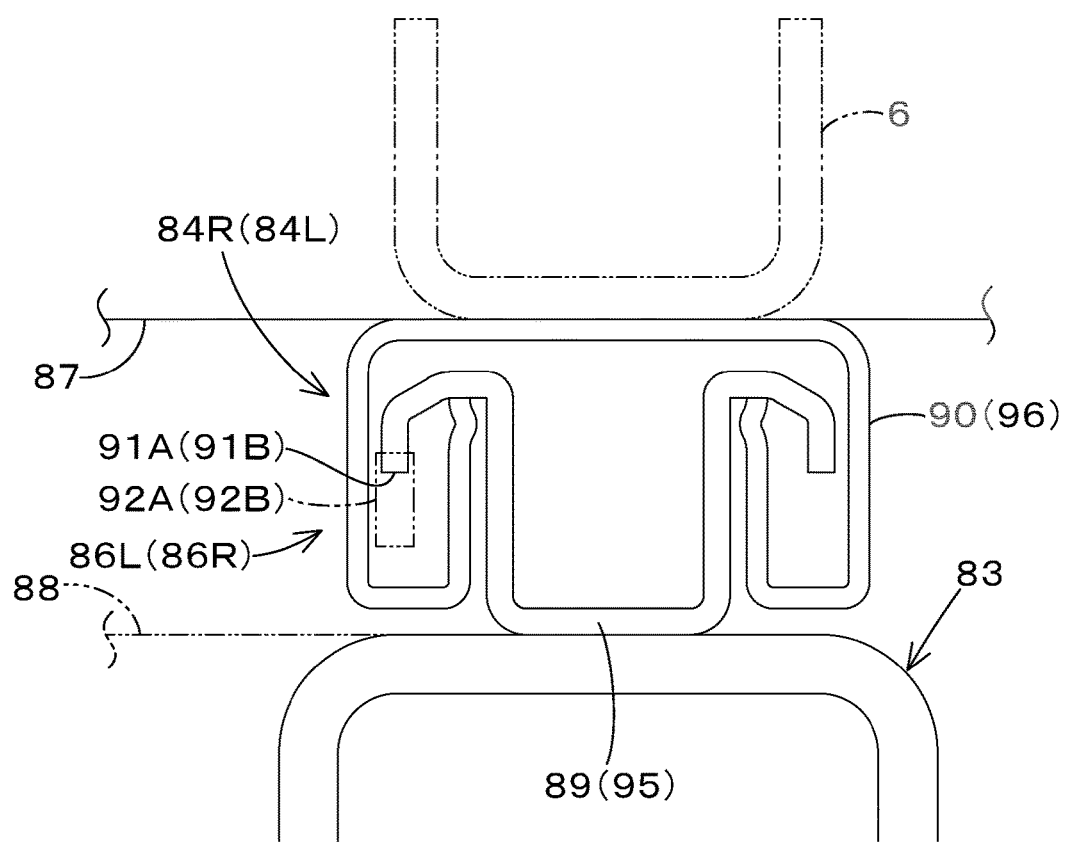
FIG. 24 is a back view of a first slider rail and a second slider rail.

As shown in FIG. 23, the first slide rails 84L and 84R are formed long in the front-to-rear direction K1 and have a lower rail 89 and an upper rail 90. As shown in FIG. 24, the lower rail 89 is attached to the support platform 83. The upper rail 90 is movably fitted to the lower rail 89 in the front-to-rear direction K1 and is attached to the slide frame 87. This allows the movable body 85 to move in the front-to-rear direction K1 with respect to the support platform 83.

Figure 25:
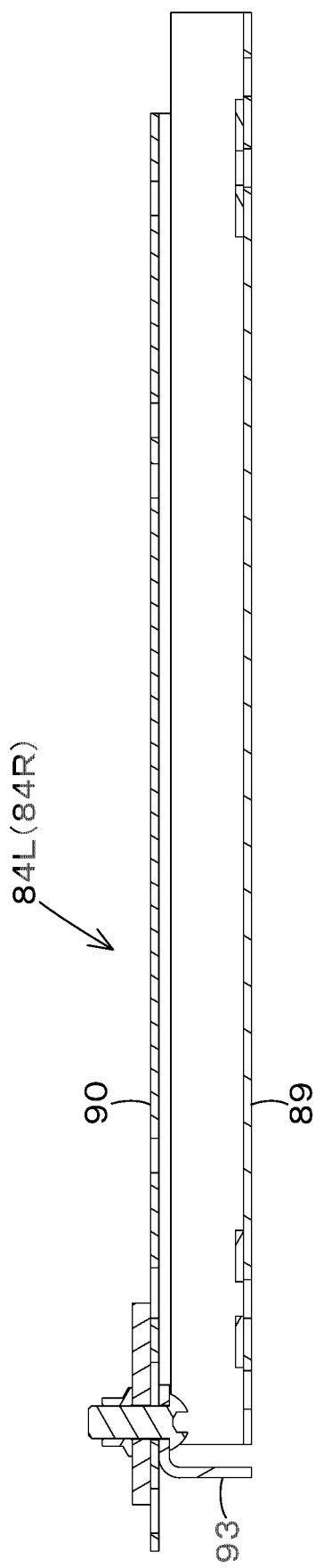
FIG. 25 is a cross section view illustrating a side surface of a first slider rail.

As shown in FIG. 25, a regulator member 93 is attached to the front portion of the upper rail 90 that regulates the rearward movement of the upper rail 90 with respect to the lower rail 89 by contacting the front end potion of the lower rail 89.

Figure 26:
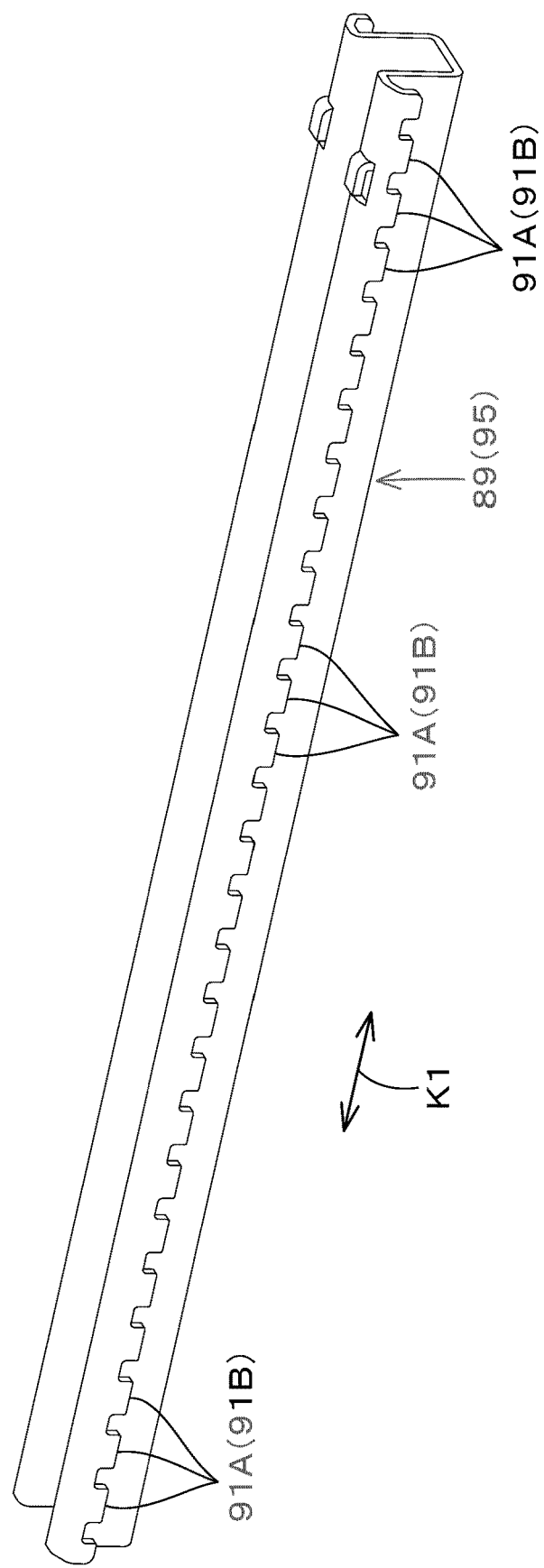
FIG. 26 is a perspective view of a lower rail.

As shown in FIG. 26, the lower rail 89 has a number of engagement portions 91A spaced in the front-to-rear direction K1 and formed from the front to the rear portion of the lower rail 89. As shown in FIG. 24, an engagement member 92A is provided in the upper rail 90 that engages the engagement portions 91A. With the engaging member 92A engaged with the engaging portion 91A, the forward and backward movement of the upper rail 90 with respect to the lower rail 89 is regulated (the first slide rails 84L and 84R are locked).

As shown in FIG. 23, an operation rod 94 is attached to the upper rail 90. The operation rods 94 have one end portion 94a attached to the upper rail 90 of the first slide rail 84L on the left, and the other end portion 94b is attached to the upper rail 90 of the first slide rail 84L on the right. The operation rods 94 are linked to the engagement member 92A, and by pulling up the operation rods 94, the engagement member 92A is disengaged from the engagement portion 91A. This permits the forward and backward movement of the upper rail 90 with respect to the lower rail 89. When the operating force of the operation rod 94 is released, the operation rod 94 is pulled downward by the force of the spring, and the engagement member 92A is engaged with the engagement portion 91A.

Figure 27:
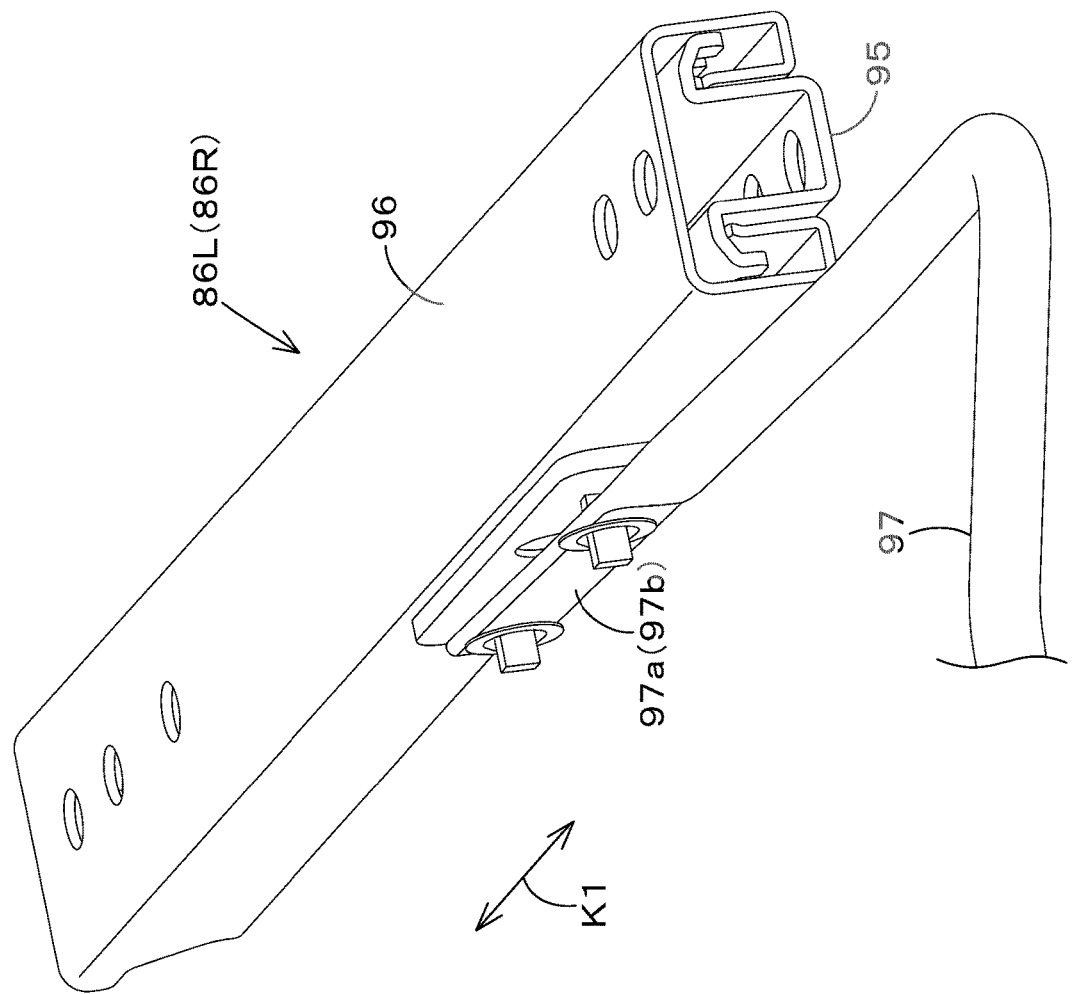
FIG. 27 is a perspective view of a second slider rail.

As shown in FIG. 27, the second slide rails 86L and 86R are formed long in the front-to-rear direction K1 and have a lower rail 95 and an upper rail 96. As shown in FIG. 24, the lower rail 95 is attached to the suspension 88. The upper rail 96 is movably fitted to the lower rail 95 in the front-to-rear direction K1 and is attached to the operator seat portion 6. This allows the operator seat portion 6 to move in the front-to-rear direction K1 with respect to the movable body 85.

As shown in FIG. 26, the lower rail 95 has a number of engagement portions 91B spaced in the front-to-rear direction K1 and formed from front to rear. As shown in FIG. 24, an engagement member 92B is provided in the upper rail 96 that engages the engagement portions 91B. In a state where the engaging member 92B is engaged with the engaging portion 91B, the forward and backward movement of the upper rail 96 with respect to the lower rail 95 is regulated (the second slide rails 86L and 86R are locked).

As shown in FIG. 27, an operation rod 97 is attached to the upper rail 96. The operation rods 97 have one end portion 97a attached to the upper rail 96 of the first slide rail 84L on the left, and the other end portion 97b is attached to the upper rail 96 of the first slide rail 84L on the right. The operation rods 97 are linked to the engagement member 92B, and by pulling up the operation rods 97, the engagement member 92B is released from the engagement portion 91B. This permits the forward and backward movements of the upper rail 96 with respect to the lower rail 95. When the operating force of the operation rod 97 is released, the operation rod 97 is pulled downward by the force of the spring, and the engagement member 92B is engaged with the engagement portion 91B.

By adjusting the position of the operator seat portion 6 in the front-to-rear direction K1 with respect to the movable body 85, the position of the operator and the operation levers 77L and 77R in the front-to-rear direction K1 can be adjusted. This allows the position of the operator seat portion 6 to be set to a state in which the operator can operate the operation levers 77L and 77R in a posture with an easy bend in the elbow. By adjusting the position of the movable body 85 back and forth, the front-to-rear direction positions of the operator seat portion 6 can be adjusted while maintaining the position of the operator and the operation levers 77L and 77R in the front-to-rear direction K1.

As shown in FIG. 21, a stopper 98 is provided at the rear portion of the operator seat portion 6. A contacting member 99 is provided behind the stopper 98, with which the stopper 98 can contact the contacting member 99. The stopper 98 can regulate the rearward movement of the operator seat portion 6 by coming in contact with the contacting member 99. The stopper 98 contacts the contacting member 99 before the operator seat portion 6 interferes with the bulkhead member 22A. This prevents the operator seat portion 6 from interfering with the bulkhead member 22A.

Figure 28:
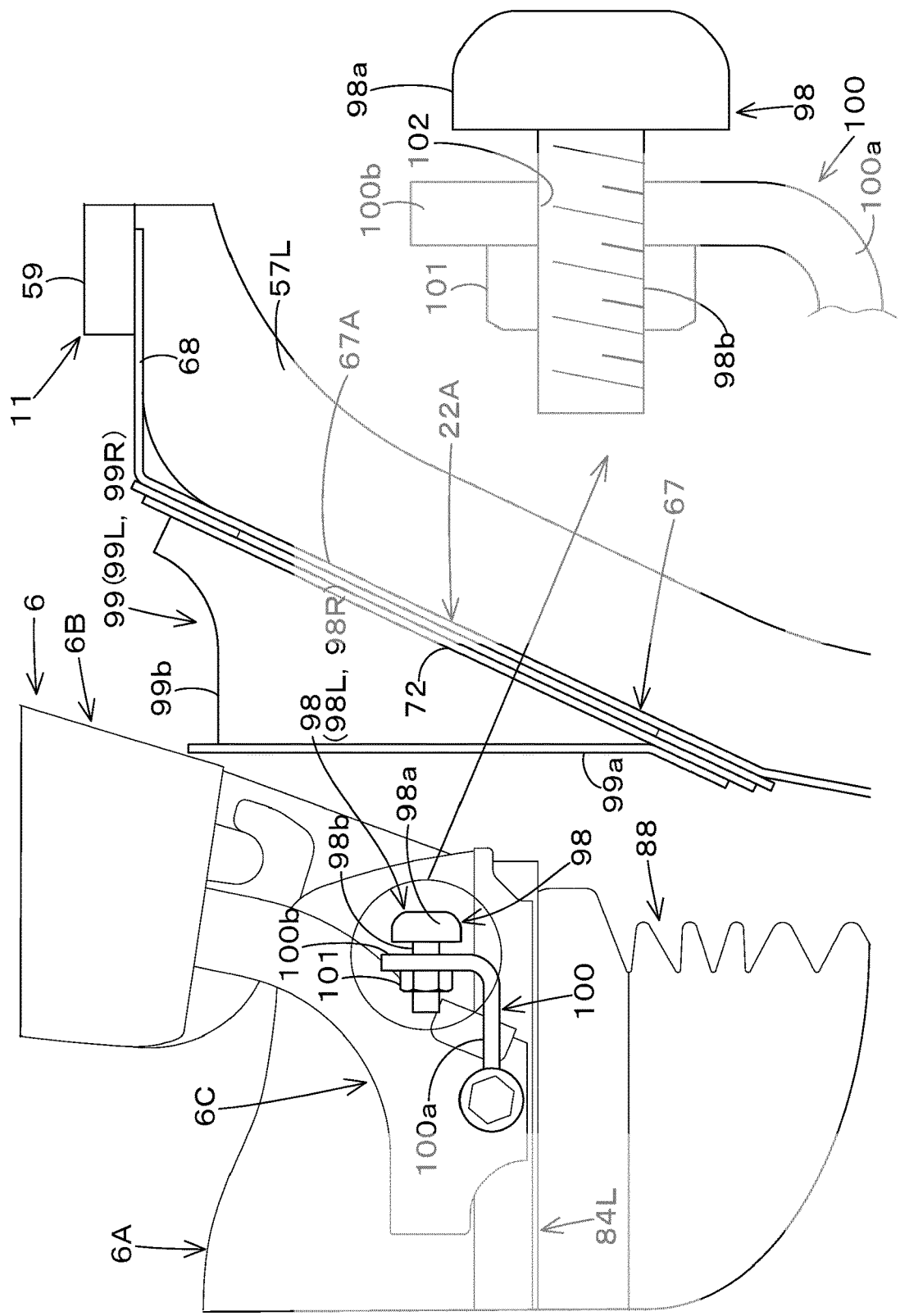
FIG. 28 is an enlarged view illustrating a side view of a rear portion of an operator seat.

As shown in FIG. 28, the stopper 98 is positionally adjustable in the front-to-rear direction K1 to a support bracket 100 attached to the seat frame 6C, which forms the framework of the operator seat portion 6. The stopper 98 has a perforated portion 98a that contacts the contacting member 99 and a threaded shaft 98b that projects forward from the perforated portion 98a. The threaded shaft 98b is a member having a male thread formed on an outer surface of a rod material. In particular, the threaded shaft 98b includes a bolt, the head of the bolt being buried in the percussion portion 98a.

The support bracket 100 has a first portion 100a attached to the seat frame 6C and a second portion 100b extending upwardly from the rear end potion of the first portion 100a. The second portion 100b has a threaded hole 102 having an axis center in the front-to-rear direction K1. The threaded hole 102 is a hole formed with a female thread on the inner surface of a through hole formed through the support bracket 100. The threaded shaft 98b is threaded into the threaded hole 102. By screwing (screwing in) or screwing back (loosening) the threaded shaft 98b, the stopper 98 can be adjusted in the longitudinal direction K1 with respect to the contacting member 99. The screw shaft 98b is threaded with a lock nut 101 that fixes the position of the stopper 98.

As shown in FIG. 22, the stopper 98 includes, in this embodiment, a first stopper 98L provided on the left side of the rear portion of the seat portion 6A and a second stopper 98R provided on the right side of the rear portion of the seat portion 6A.

When the movable body 85 is moved to the rear end potion of the moving region, the rearward movement of the movable body 85 and the operator seat portion 6 is regulated by the regulator member 93 when the stopper 98 does not touch the contacting member 99. When the movable body 85 is moved to the rear end potion of the moving area and the stopper 98 is in contact with the contacting member 99, the rearward movement of the movable body 85 and the operator seat portion 6 is regulated by the stopper 98. When only the operator seat portion 6 is moved rearwardly, the rearward movement of the operator seat portion 6 is regulated by the stopper 98. That is, the stopper 98 regulates both the position of the movable body 85 when the movable body 85 is moved rearwardly and the position of the operator seat portion 6 only when the operator seat portion 6 is moved rearwardly.

With the movable body 85 moved to the rear end potion of the moving area and with the rearward movement of the stopper 98 regulated by the contacting member 99, the operator seat portion 6 has a rearwardly adjustable room with respect to the movable body 85. Thus, when the movable body 85 is moved forward from this state, the operator seat portion 6 can be moved rearwardly. By moving the operator seat portion 6 rearward, the distance between the operation levers 77L and 77R and the operator seat portion 6 in the front-to-rear direction can be increased. This allows the operator to have a comfortable posture (a posture in which the elbows are not too bent and the arms are moderately extended) that makes it easy for the operator to operate the control levers 77L and 77R during driving.

By adjusting the front-to-rear direction positions of the operator seat portion 6 with respect to the movable body 85 so that the stopper 98 is in contact with the contacting member 99 when the operator gets in and out of the vehicle, the operator seat portion 6 and the movable body 85 can be placed in close proximity to the bulkhead member 22A by adjusting the front-to-rear direction positions of the operator seat portion 6 with respect to the movable body 85 so that the stopper 98 is in contact with the contacting member 99 when the movable body 85 is moved to the rear end potion of the movement area. That is, when getting in and out of the vehicle, the operator seat portion 6 and the operation lever 77L can be slid close to the bulkhead member 22A so as not to interfere with the operation lever 77L.

The first slide rails 84L and 84R are locked in an inability to move backward and forward with a gap between the stopper 98 and the contacting member 99 after the movable body 85 is moved backward and the stopper 98 comes into contact with the contacting member 99. That is, when the stopper 98 comes into contact with the contacting member 99, the engagement member 92A does not engage the engagement portion 91A, but when the movable body 85 is moved slightly forward from the state where the stopper 98 comes into contact with the contacting member 99, the engagement member 92A engages the engagement portion 91A, and the first slide rails 84L and 84R are locked.

Since the operator seat portion 6 is supported by the suspension 88, the machine body 2 and the operator seat portion 6 move up and down relative to the machine body 2 and the operator seat portion 6 when the operator is seated in the operator seat portion 6 or due to vertical vibrations of the machine body 2. When the first slide rails 84L and 84R are locked while the stopper 98 is in contact with the contacting member 99, the stopper 98 and the contacting member 99 rub against each other. Thus, by providing a gap between the stopper 98 and the contacting member 99, the stopper 98 and the contacting member 99 can be prevented from rubbing against each other.

For the same reason as described above, the second slide rails 86L and 86R are locked in a state of inability to move back and forth with a gap between the stopper 98 and the contacting member 99 after the stopper 98 contacts the contacting member 99.

Figure 29:
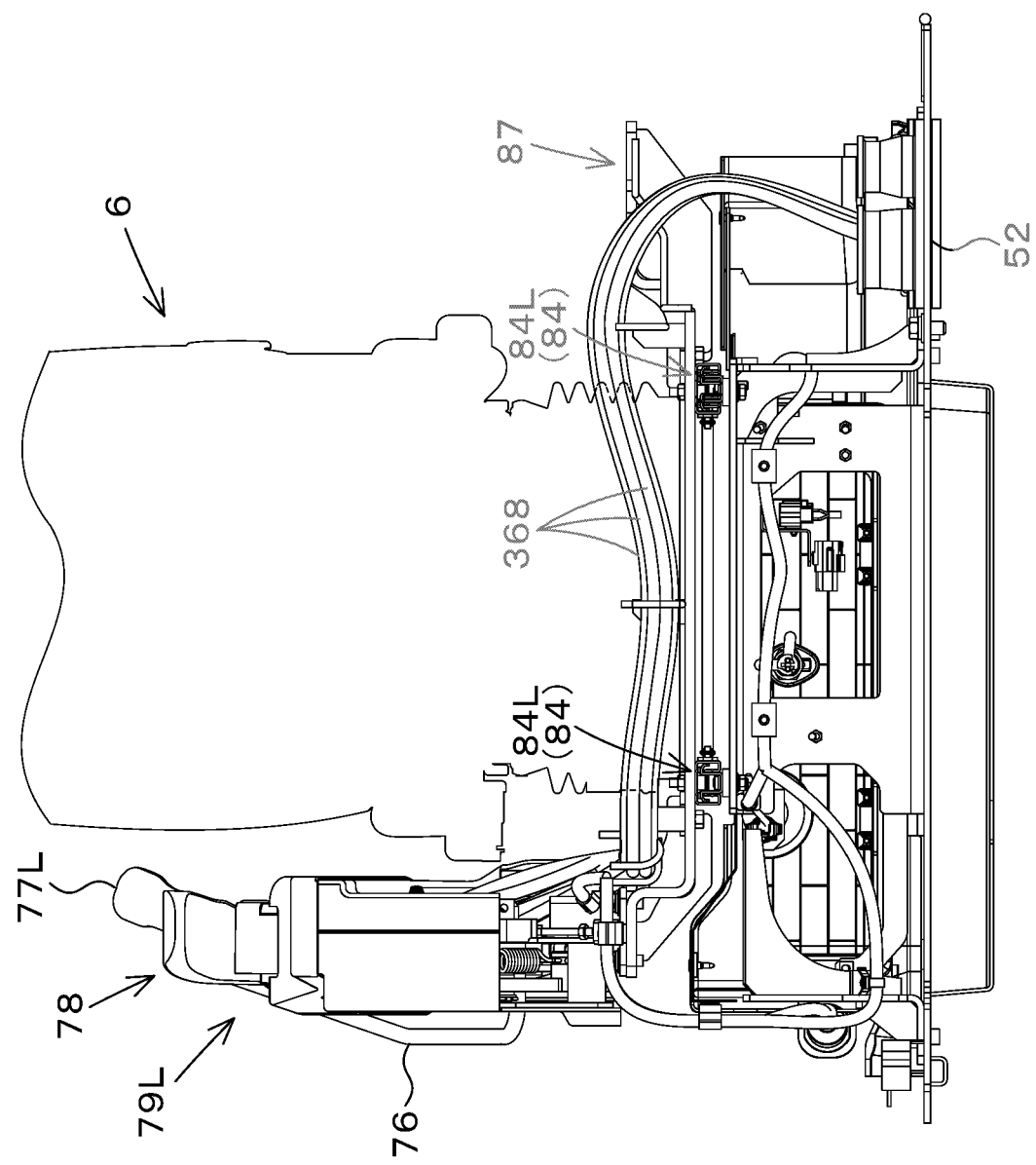
FIG. 29 is a back view illustrating periphery of an operator seat.

As shown in FIG. 29, a plurality of hydraulic hoses 368 are arranged on the rear side of the movable body 85. The plurality of hydraulic hoses 368 include hydraulic hoses arranged from the pilot valve operated by the control lever 77L to the control valve V1, hydraulic hoses connecting the pilot valve to the hydraulic pump side, and hydraulic hoses connecting the pilot valve to the hydraulic fluid tank side. A plurality of hydraulic hoses 368 are arranged from left to right across the lower rear portion of the suspension 88 and above the second rail system 86.

Figure 30:
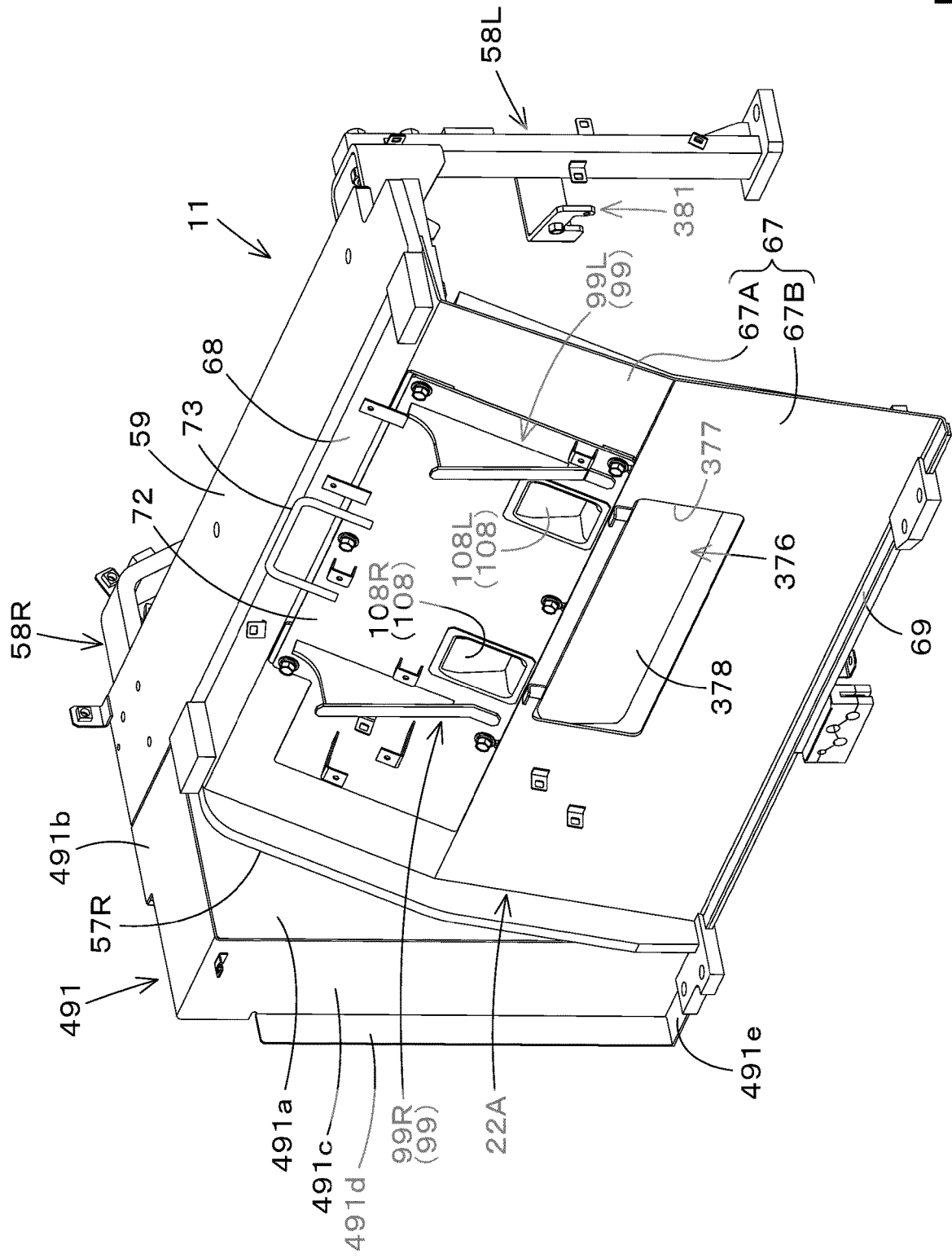
FIG. 30 is a perspective view of a bulkhead member.

As shown in FIG. 18, the first front leg 57L is fixed by welding or otherwise with the front surface touching the back of the left portion of the bulkhead member 22A. As shown in FIG. 30, the second front leg 57R is arranged on the right side of the bulkhead member 22A. The second front leg 57R is arranged closer forward than the first front leg 57L, and the right end potion of the bulkhead member 22A is fixed to the left side of the second front leg 57R by welding.

Figure 33:
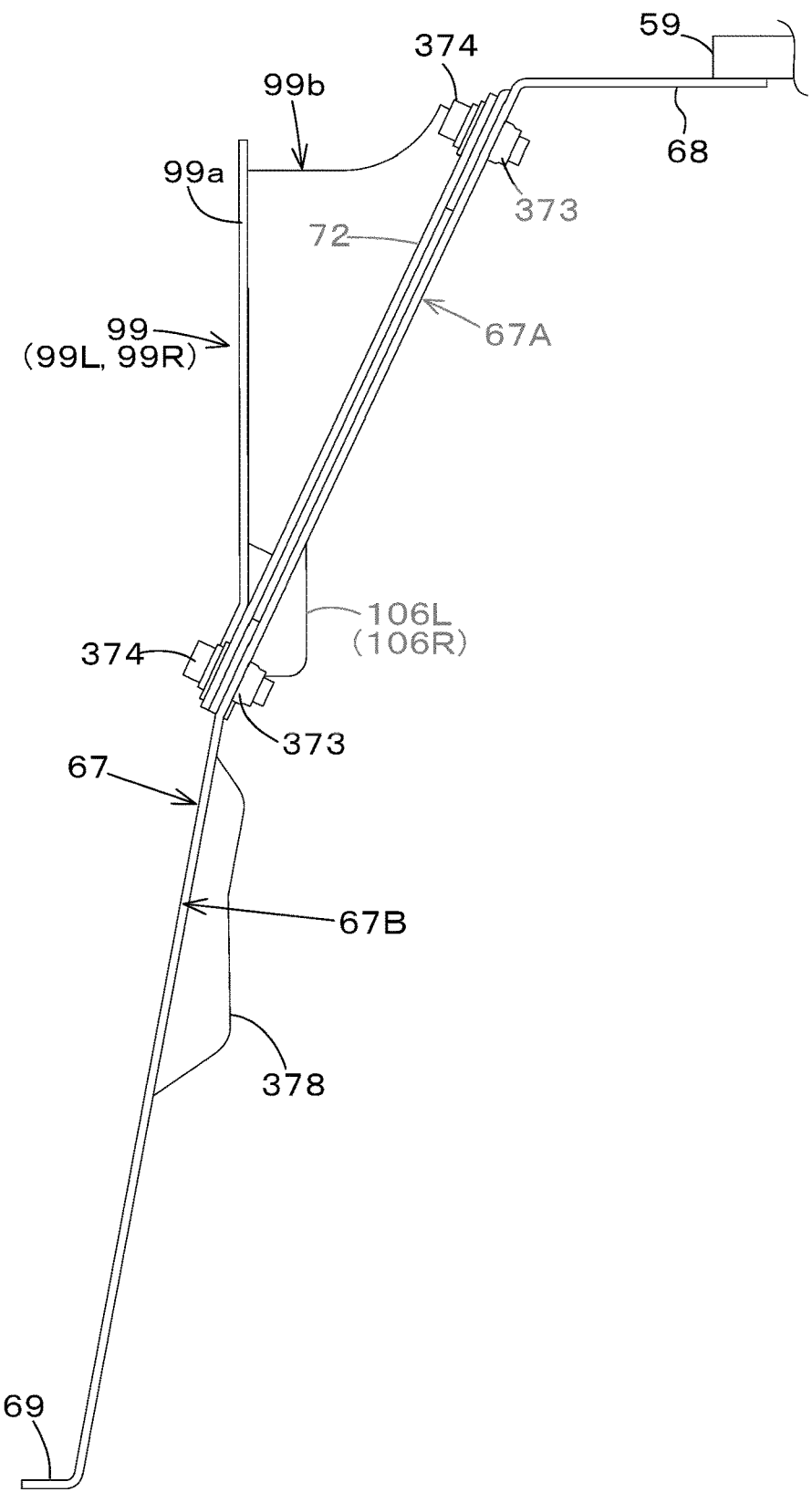
FIG. 33 is a side view of a bulkhead member.

As shown in FIG. 30 and FIG. 33, the bulkhead member 22A has a bulkhead body 67 that substantially divides the interior of the cabin 5 from the prime mover room E2, an upper extending portion 68 extending rearwardly from a top end potion of the bulkhead body 67, and a lower extending portion 69 extending forwardly from a lower end potion of the bulkhead body 67. The bulkhead body 67 has a first portion 67A on the upper side and a second portion 67B on the lower side. The first portion 67A and the second portion 67B are formed in an inclined shape that shifts backwardly as extending upwardly. The first portion 67A is inclined to migrate backwardly as extending upwardly from the top end potion of the second portion 67B to the second portion 67B. That is, the inclination angle of the first portion 67A and the second portion 67B with respect to the vertical direction is greater in the first portion 67A than in the second portion 67B. Thus, the bulkhead member 22A is bent at the midpoint of the vertical direction. The left portion of the upper extension 68 is fixed by welding on the upper portion 62B of the first front leg 57L.

Figure 31:
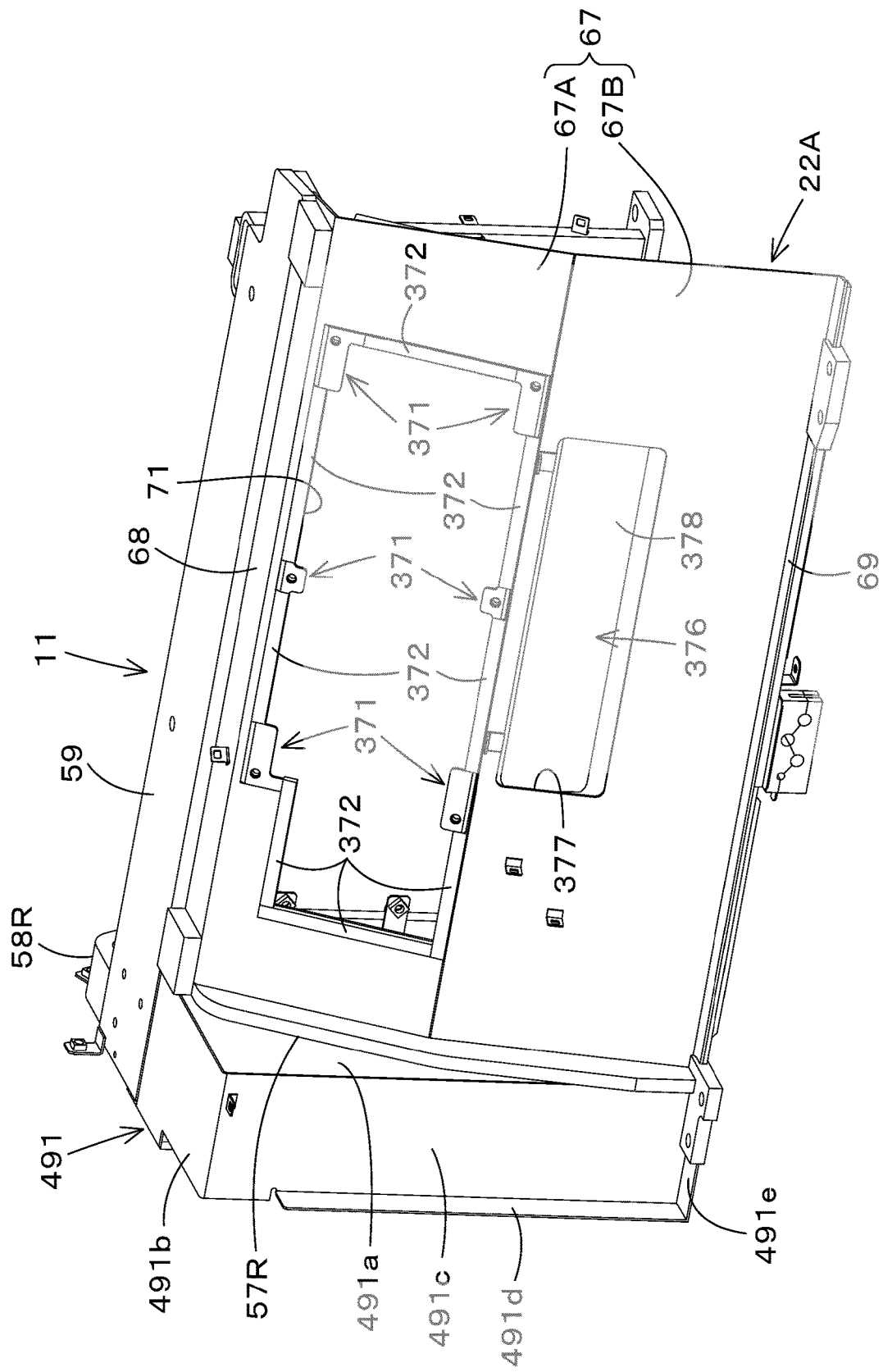
FIG. 31 is a perspective view of a bulkhead member under a state where an inspection opening.
Figure 32:
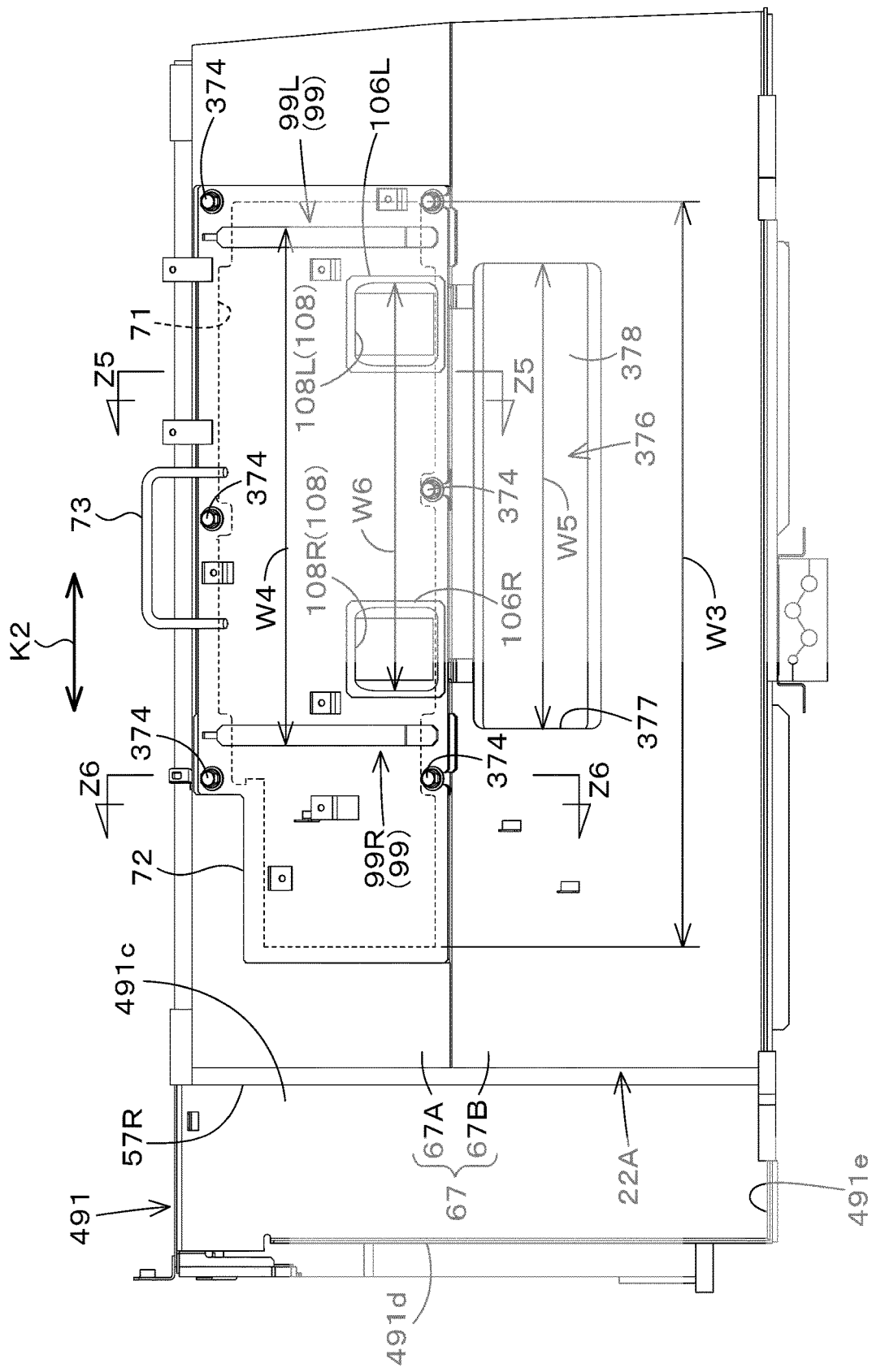
FIG. 32 is a front view of a bulkhead member.

As shown in FIG. 30, FIG. 31, and FIG. 32, the bulkhead member 22A has an inspection opening 71 for accessing parts and the like in the prime mover room E2 and a closer plate 72 that blocks the inspection opening 71 from the front side. The inspection opening 71 is formed in the bulkhead body 67. In detail, the inspection opening 71 is formed through the first portion 67A. The inspection opening 71 is formed from one side of the first portion 67A in the machine width direction K2 to the other side of the first portion 67A. The closer plate 72 is bolted to the first portion 67A from the front side.

As shown in FIG. 31, a plurality of plate attachment portions 371 and a sealing member (referred to as an edge seal) 372 are provided around the inspection opening 71 in the first portion 67A (bulkhead body 67). The edge seal 372 is provided in a plurality of portions and is provided in an area excluding the plate attachment portion 371.

Figure 34:
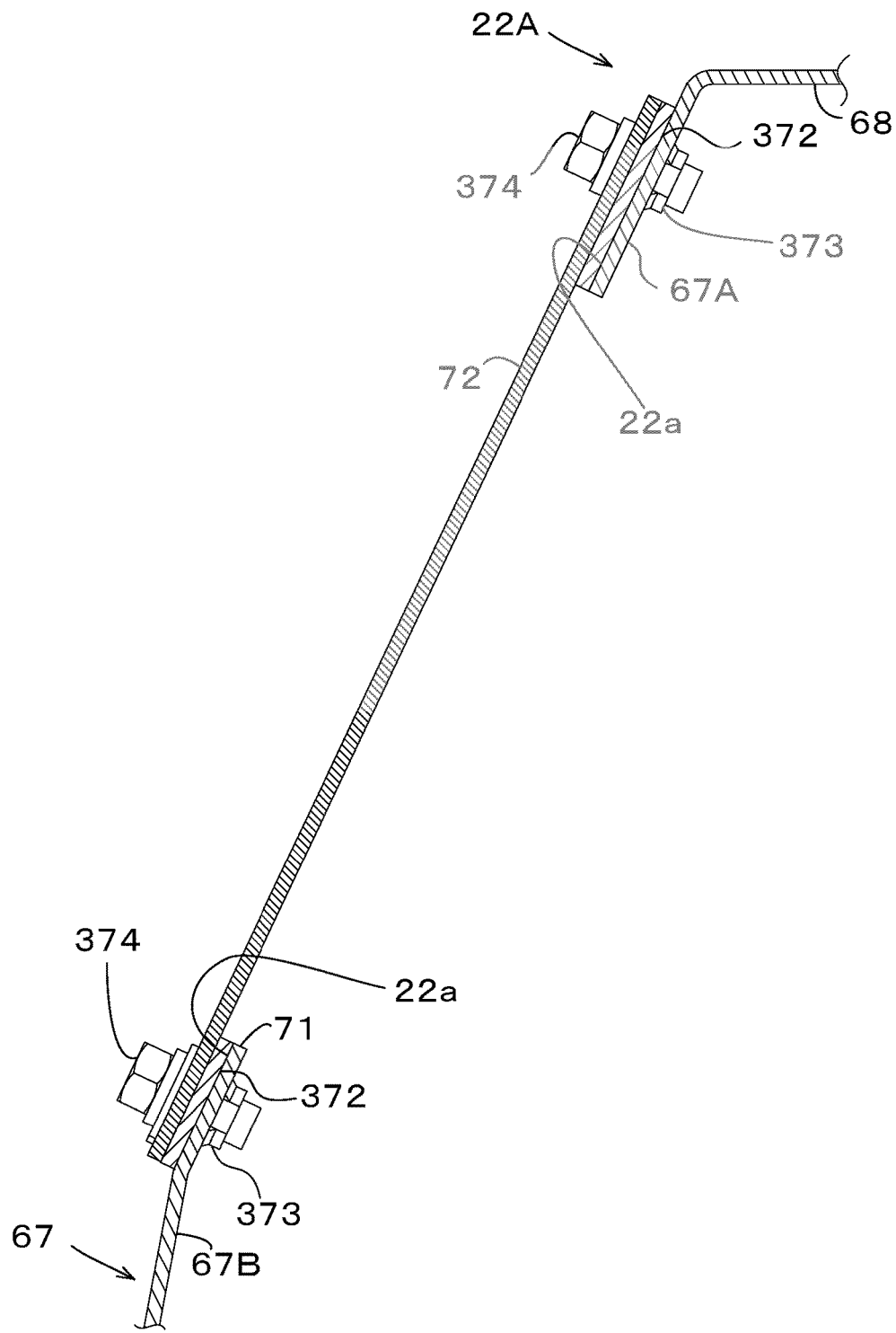
FIG. 34 is a cross section view of FIG. 32 in a Z5-Z5 arrowed line.

As shown in FIG. 34, the outer periphery of the closer plate 72 contacts the edge seal 372. The edge seal 372 seals between the seal perimeter surface 22a around the inspection opening 71 in the bulkhead body 67 and the outer periphery of the closer plate 72 corresponding to the seal perimeter surface 22a.

Figure 35:
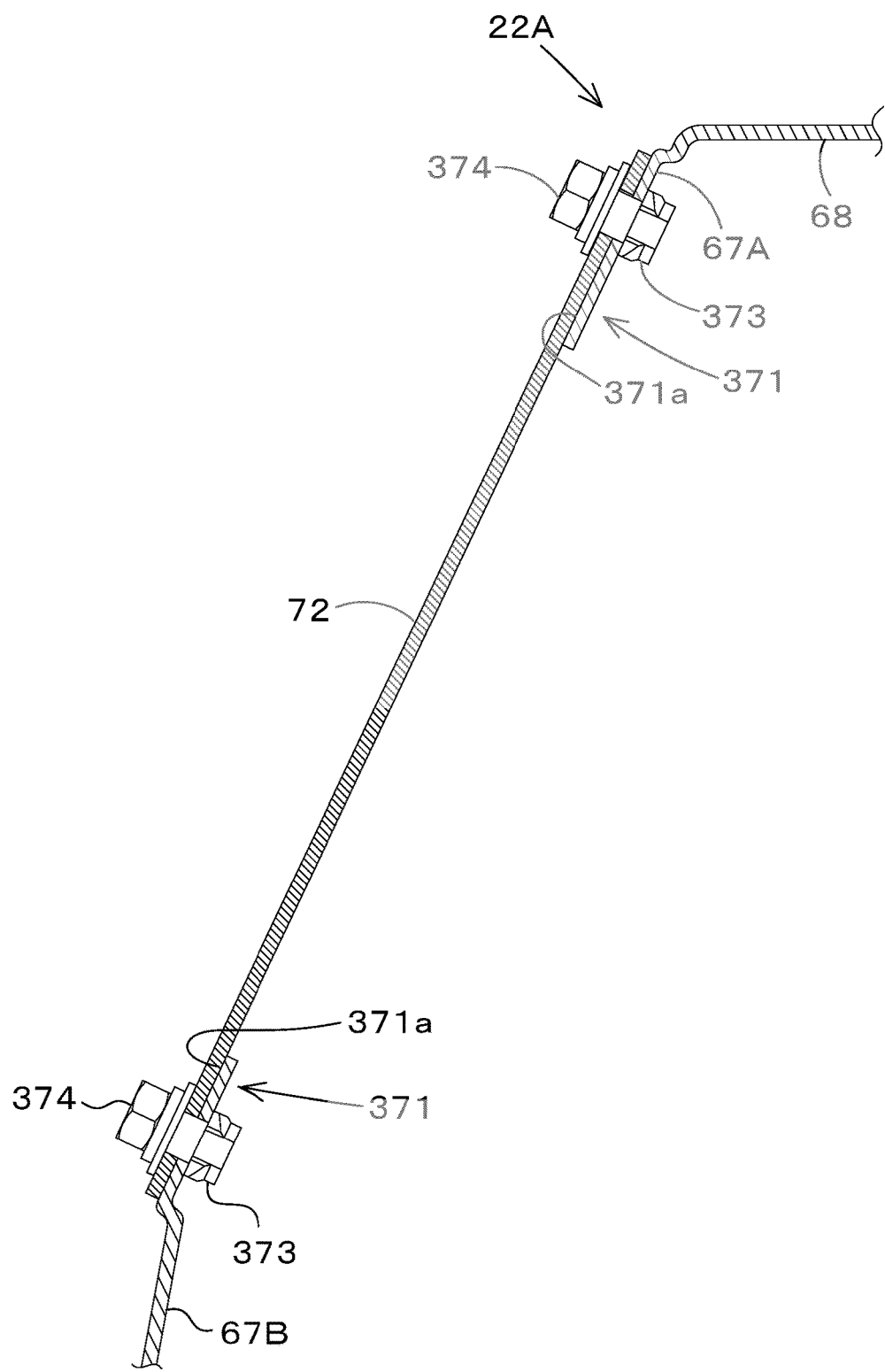
FIG. 35 is a cross section view of FIG. 32 in a Z6-Z6 arrowed line.

As shown in FIG. 35, the plate attachment portion 371 is formed in a stepped shape by pressing forward when the bulkhead member 22A is formed by press molding. That is, the plate attachment portion 371 is integrally formed with the main bulkhead body 67 (the bulkhead member 22A) such that the plate contact surface 371a with which the closer plate 72 contacts is located forward of the seal contact surface 22a. A nut member 373 is fixed to the back side of the plate attachment portion 371. The closer plate 72 is attached to the bulkhead body 67 by means of a fixing bolt 374 which is screwed (threaded) into the nut member 373 through the closer plate 72 and the plate attachment portion 371.

As shown in FIG. 30 and FIG. 32, the closer plate 72 is provided with a contacting member 99 with which the stopper 98 of the operator seat portion 6 contacts the closer plate 72. The contacting member 99 is attached to the front side of the closer plate 72 by welding or otherwise. The contacting member 99 includes a first contacting member 99L provided in the upper left portion of the bulkhead member 22A and a second contacting member 99R provided in the upper right portion of the bulkhead member 22A. The first stopper 98L contacts the first contacting member 99L, and the second stopper 98R contacts the second contacting member 99R.

As shown in FIG. 33, the contacting member 99 has a contact plate 99a and an attachment piece 99b fixed to the back of the contact plate 99a. The attachment piece 99b is fixed to the closer plate 72 by welding. The contacting plate 99a is formed vertically from the top to the bottom of the contacting plate 99a. Vertical length means that the length in the vertical direction is longer in relation to the width of the machine width direction K2. The front surface of the contact plate 99a is the contact surface on which the stopper 98 contacts and is vertical (the surface along the vertical direction). By forming the contacting plate 99a (contacting member 99) longitudinally, it is possible to accommodate the sinking of the operator seat portion 6 and the height adjustment of the operator seat portion 6.

As shown in FIG. 32, the leftmost edge of the leftmost edge of K2 in the machine width direction K2 of the inspection opening 71 is located outwardly of the machine body than the first contacting member 99L, and the rightmost edge of K2 in the machine width direction K2 is located outwardly of the machine body than the second contacting member 99L. That is, the opening width W3 of the inspection opening 71 in the machine width direction K2 is wider than the width W4 of the machine width direction K2 between the members of the first and second contacting members 99L and 99R, and the inspection opening 71 has a larger opening area. In this embodiment, the width W4 is the dimension between the outer end potion of the machine body of the contact plate 99a of the first contacting member 99L and the outer end potion of the machine body of the contact plate 99a of the second contacting member 99R.

As shown in FIG. 30 and FIG. 32, the bulkhead member 22A has a prevention recess portion 108 at the top that avoids interference with the second rail device 86. The prevention recess portion 108 is provided in the closer plate 72. The prevention recess portion 108 is arranged between the first contacting member 99L and the second contacting member 99R. In detail, the prevention recess portion 108 includes a left recess portion 108L provided near the inner side of the machine body of the first contacting member 99L and a right recess portion 108R provided near the inner side of the machine body of the second contacting member 99R.

Figure 36:
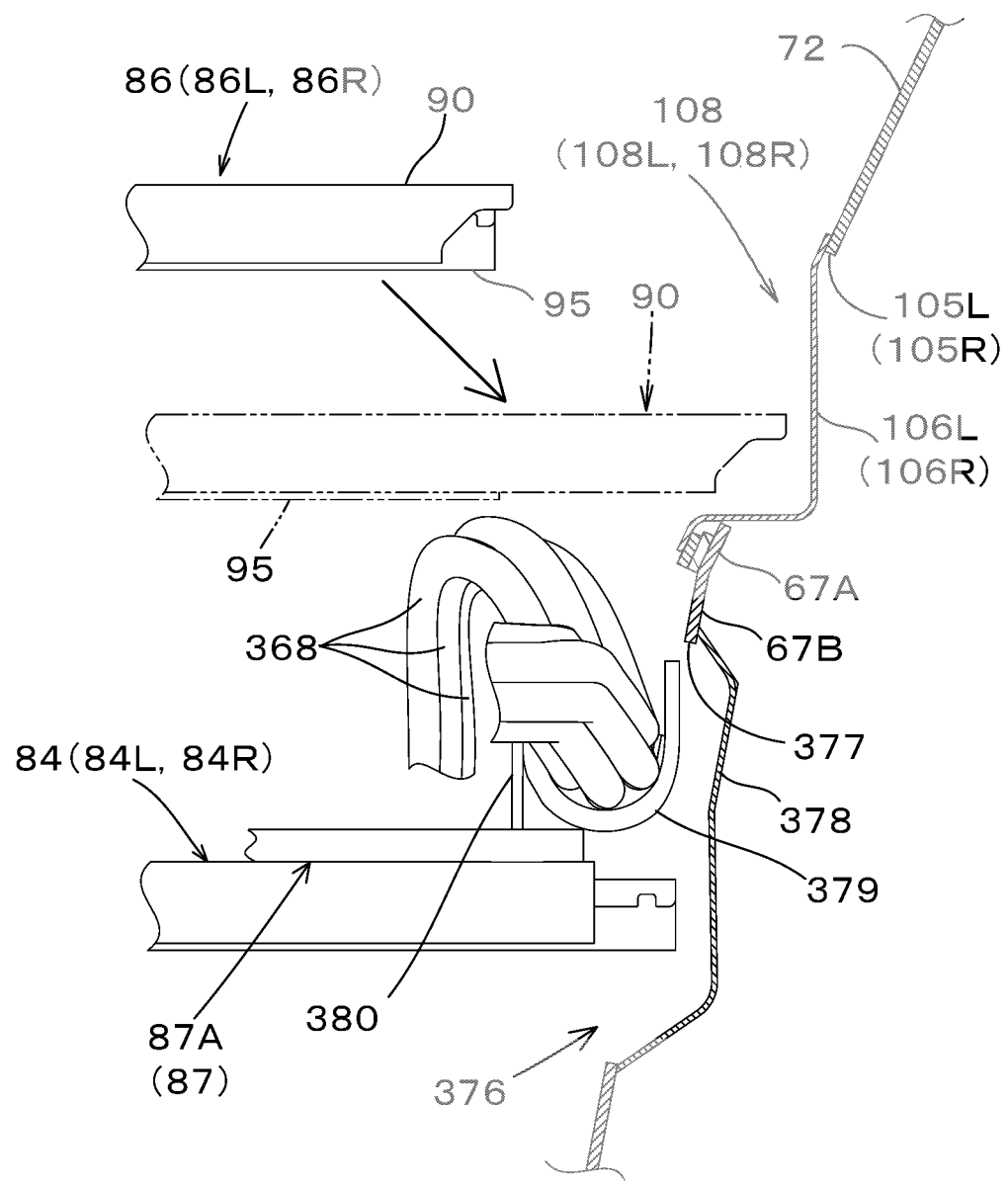
FIG. 36 is a cross section view illustrating a side surface of a bulkhead member.

As shown in FIG. 36, the recessed portion 108L is formed in the cover plate 106L that blocks the insertion hole 105L formed through the bulkhead body 67. The recess portion 108R is formed in the cover plate 106R that blocks the insertion hole 105R formed through the bulkhead body 67. The recess portion 108L is provided in a portion corresponding to the second slide rail 86L, and the recess portion 108R is provided in a portion corresponding to the second slide rail 86R. Thus, when the operator seat portion 6 is moved rearwardly and the stopper 98 contacts the contacting member 99, the rear end potion of the upper rail 90 of the second slide rail 86L enters the recess portion 108L and the rear end potion of the upper rail 90 of the second slide rail 86R enters the recess portion 108R, causing the bulkhead member 22A and the second rail device 86 can be prevented from interfering with the second rail device 86, and, in turn, the operator seat portion 6 can be brought closer to the bulkhead member 22A. In addition, the front space of the operator seat portion 6 can be made wider.

On the other hand, because the operator seat portion 6 is supported by the suspension 88, when the operator is seated in the operator seat portion 6, the operator weight causes the operator seat portion 6 to sink down. In consideration with this, when the operator is not seated in the operator seat portion 6, the second slide rails 86L and 86R are located above the recess portions 108L and 108R, as shown by the solid line in FIG. 36. The prevention recess portion 108 may be formed as an integral part of the closer plate 72 by depressing the closer plate 72 by a press process.

The closer plate 72 is provided with a grip member 73. The grip member 73 is provided in the upper portion of the upper portion of the closer plate 72, midway in the machine width direction K2, and protrudes upwardly from the closer plate 72.

As shown in FIG. 30 and FIG. 32, the bulkhead member 22A has a relief recess portion 376 that prevents interference with a plurality of hydraulic hoses 368 that are arranged on the rear side of the movable body 85 (operator seat portion 6). The relief recess portion 376 is provided in a lower portion of the bulkhead member 22A. In detail, the relief recess portion 376 is provided in the upper portion of the second portion 67B of the bulkhead body 67 and is located below the first and second contacting members 99A and 99B. The relief recess portion 376 is formed in the cover plate 378, which blocks the insertion hole 377 formed through the bulkhead body 67. The relief recess portion 376 may be formed as an integral part of the bulkhead member 22A by depressing the bulkhead member 22A backwardly by press working.

As shown in FIG. 36, the plurality of hydraulic hoses 368 are provided in a position corresponding to the upper portion of the relief recess portion 376. The corresponding position of the relief recess portion 376 has a hose guide 379 that guides and unites the plurality of hydraulic hoses 368. The hose guide 379 is fixed to a stay member 380 erected on the first attachment portion 87A of the slide frame 87.

When the movable body 85 is moved rearward, the hydraulic hose 368 and the hose guide 379 enter the relief recess portion 376, thereby preventing interference between the bulkhead member 22A and the hydraulic hose 368 and the hose guide 379. In addition to extending the operator seat portion 6 closer to the bulkhead member 22A, the front space of the operator seat portion 6 can be made wider.

The length (width) W5 of the relief recess portion 376 in the machine width direction K2 is formed to be a length (a length slightly shorter than the width W4) spanning from the first contacting member 99A side to the second contacting member 99B side. The left end potion of the relief recess portion 376 is located more to the left than the left end potion of the recess portion 108L, and the right end potion of the relief recess portion 376 is located more to the right than the right end potion of the recess portion 108L. That is, the length W5 of the relief recess portion 376 is longer than the dimension W6 from the outer end potion of the machine body of the recess portion 108L to the outer end potion of the machine body of the recess portion 108R.

Figure 37:
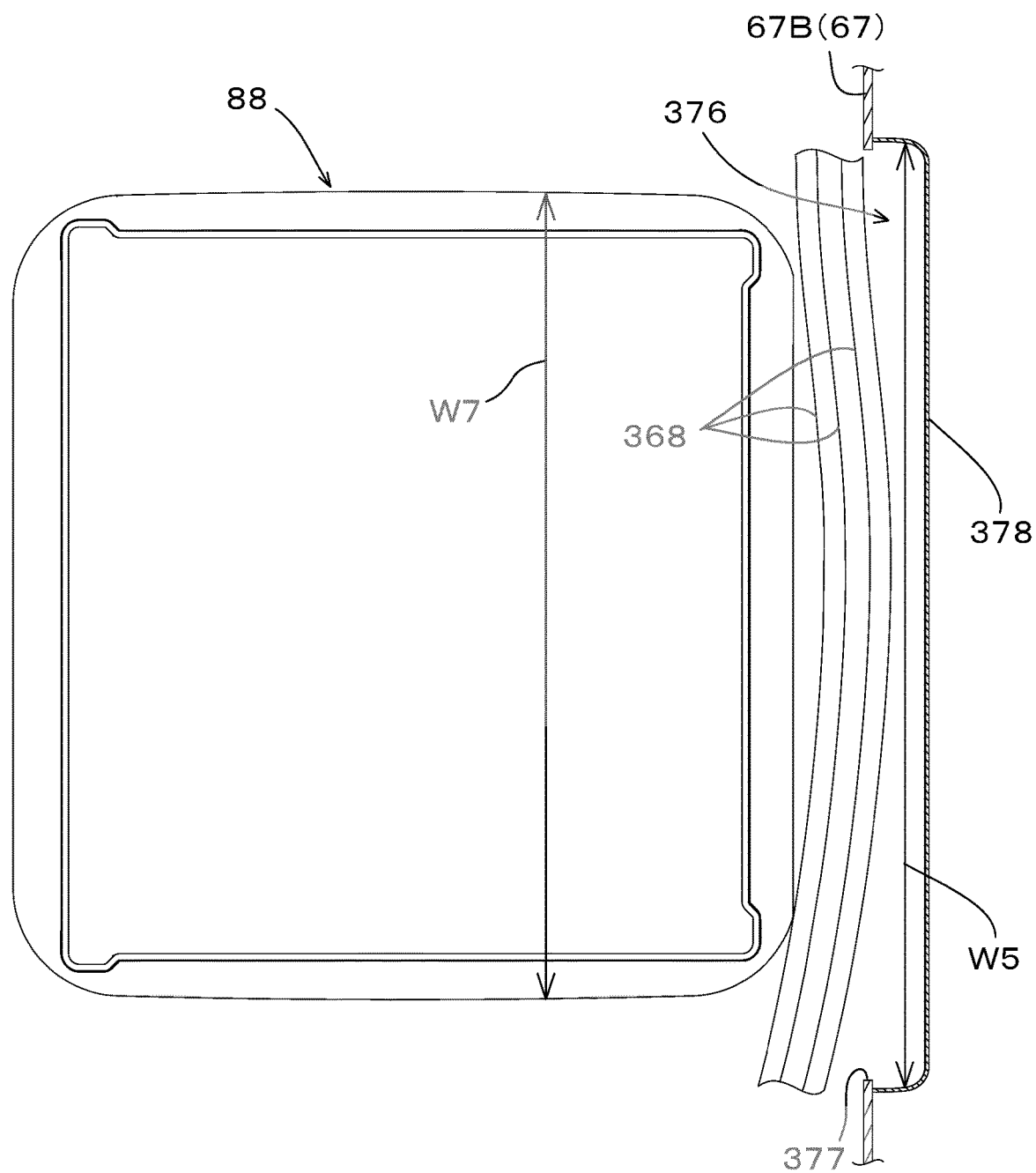
FIG. 37 is a cross section view illustrating a plan surface of an arrangement portion of a hydraulic hose.

As shown in FIG. 37, the left end potion of the relief recess portion 376 is located to the left of the left end potion of the suspension 88, and the right end potion of the relief recess portion 376 is located to the right of the right end potion of the suspension 88. That is, the length W5 in the machine width direction K2 of the relief recess portion 376 is longer than the width W7 of the machine width direction K2 of the suspension 88.

As shown in FIG. 36, the relief recess portion 376 also serves as a prevention recess that prevents interference with the first rail device 84. In detail, the left portion of the relief recess portion 376 is at a position corresponding to the rear portion of the first slide rail 84L, and the right portion of the relief recess portion 376 is at a position corresponding to the rear portion of the first slide rail 84R. The first rail device 84 enters the lower portion of the relief recess portion 376. That is, the relief recess portion 376 constitutes a recess that prevents interference with the first rail device 84 (which also serves as a recess). This prevents interference with the bulkhead member 22A and the first rail device 84. In addition, the operator seat portion 6 can be brought closer to the bulkhead member 22A and the front space of the operator seat portion 6 can be made wider. The left portion of the relief recess portion 376 is located below the recess portion 108L and the right portion is located below the recess portion 108R (see FIG. 32).

Figure 38:
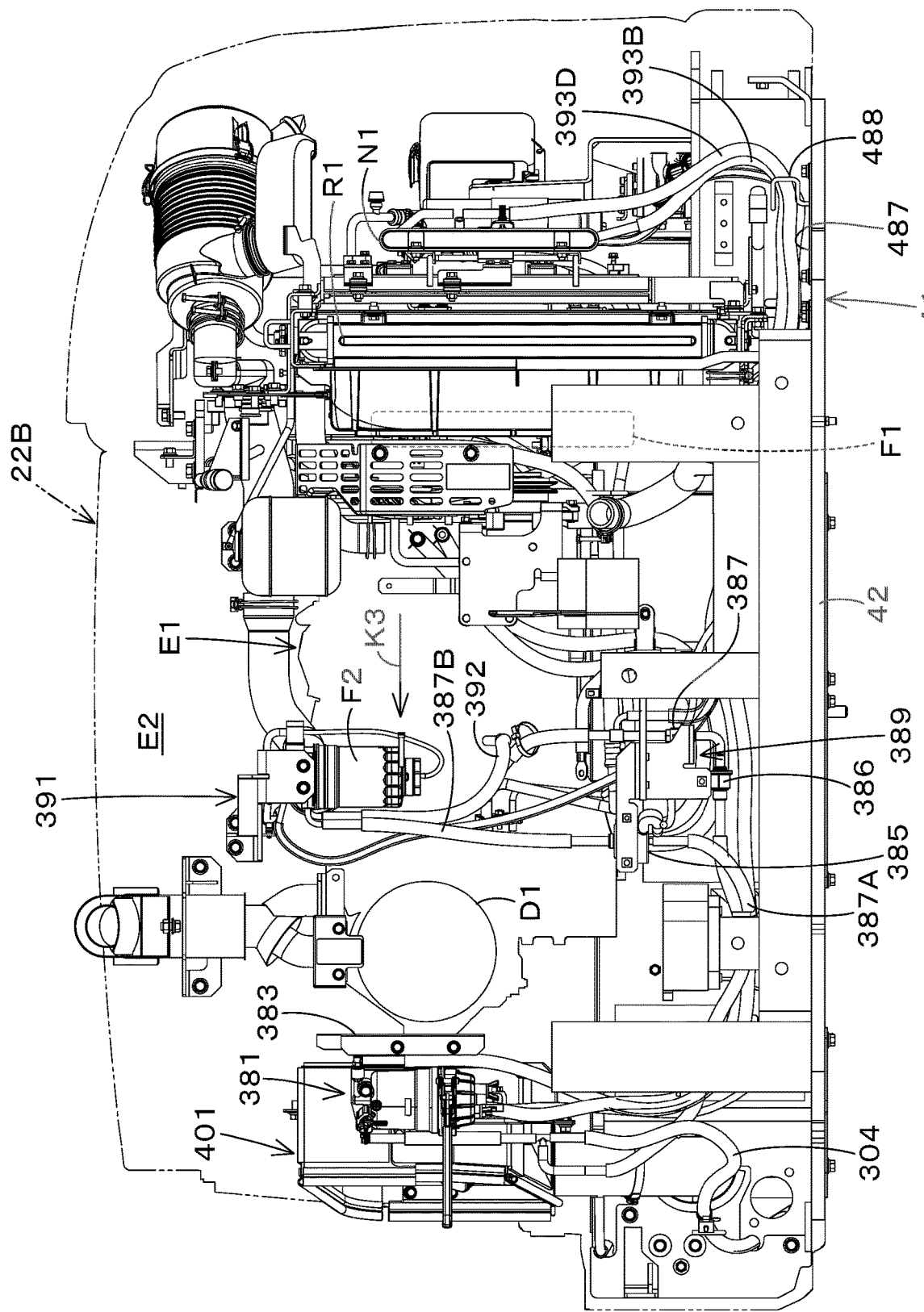
FIG. 38 is a back view of a prime mover room.

As shown in FIG. 38, a sedimenter 381 is provided in the prime mover room E2. The sedimenter 381 is a device for separating and removing water and fine foreign matter mixed in the fuel (diesel oil). The sedimenter 381 is arranged on the opposite side of the arrangement of the cooling fan F1 in the prime mover room E2 and to the left of the exhaust gas purification system D1. That is, the sedimenter 381 is arranged on the downwind side of the cooling air generated by the cooling fan F1. The sedimenter 381 is located at approximately the same height position as the exhaust gas purification system D1, and is arranged at a position where it overlaps with the exhaust gas purification system D1 in the width direction K2 (the direction of the flow of the cooling airflow K3) of the machine body (in this embodiment, the position where it overlaps with the side view). This prevents the cooling air from hitting the sedimenter 381 directly. In extension, the fuel temperature can be prevented from dropping too low and causing waxy effects.

Figure 39:
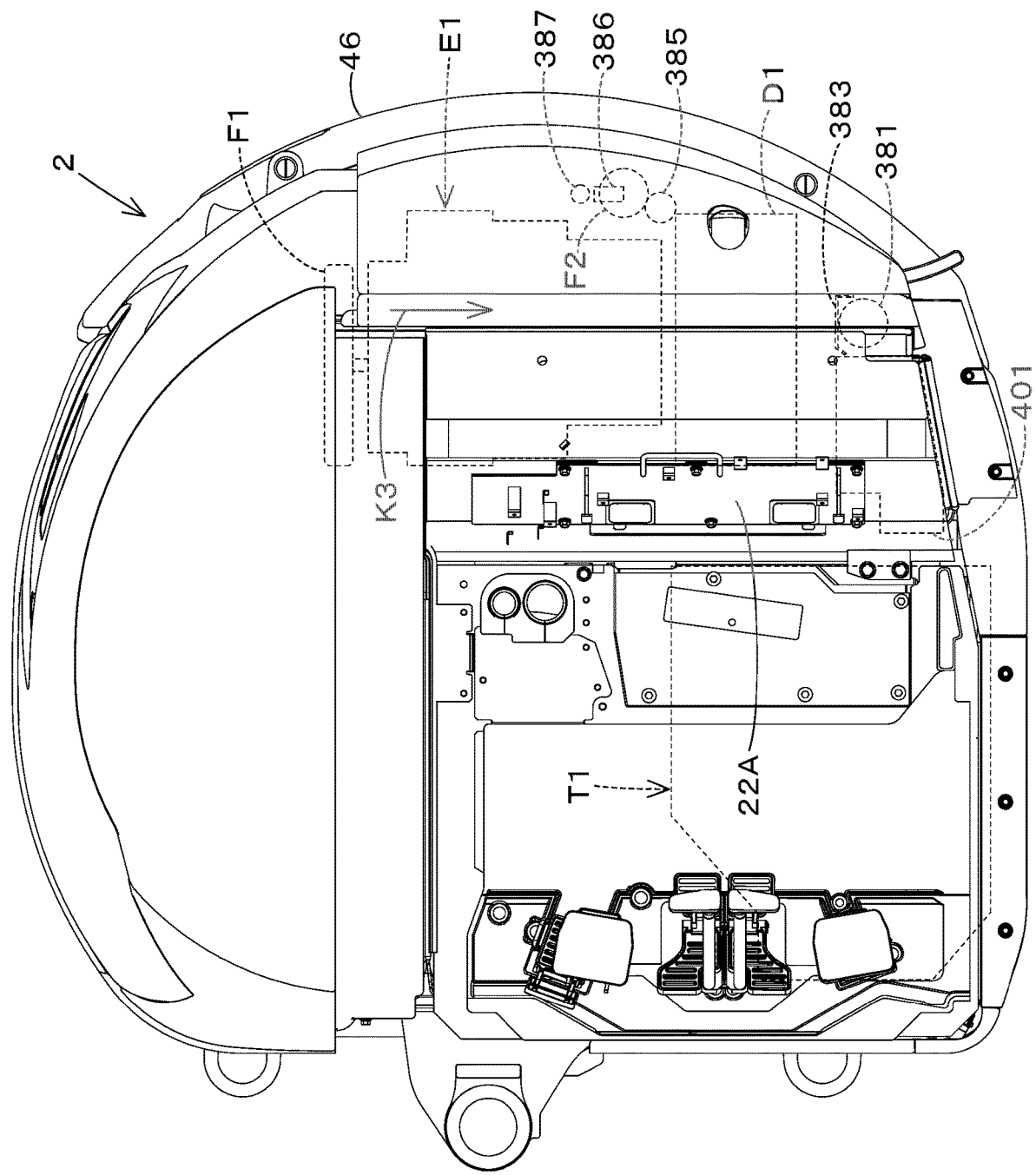
FIG. 39 is a plan view illustrating arrangement of devices in a prime mover room.

As shown in FIG. 39, the sedimenter 381 is arranged at a position corresponding to an substantially center of the exhaust gas purification system D1 in the front-to-rear direction K1.

Figure 41:
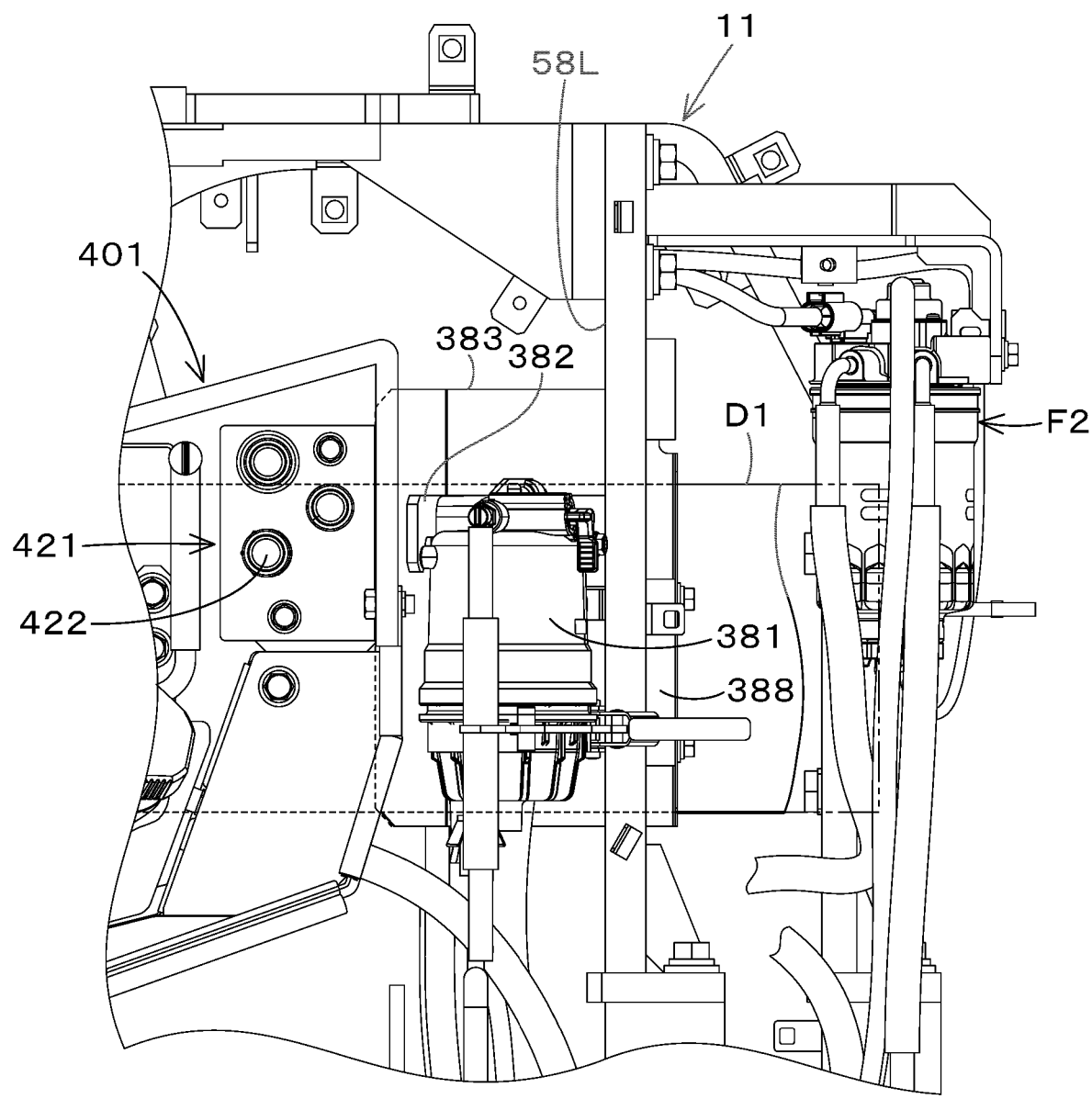
FIG. 41 is a side view of arrangement portion of a sedimenter.
Figure 42:
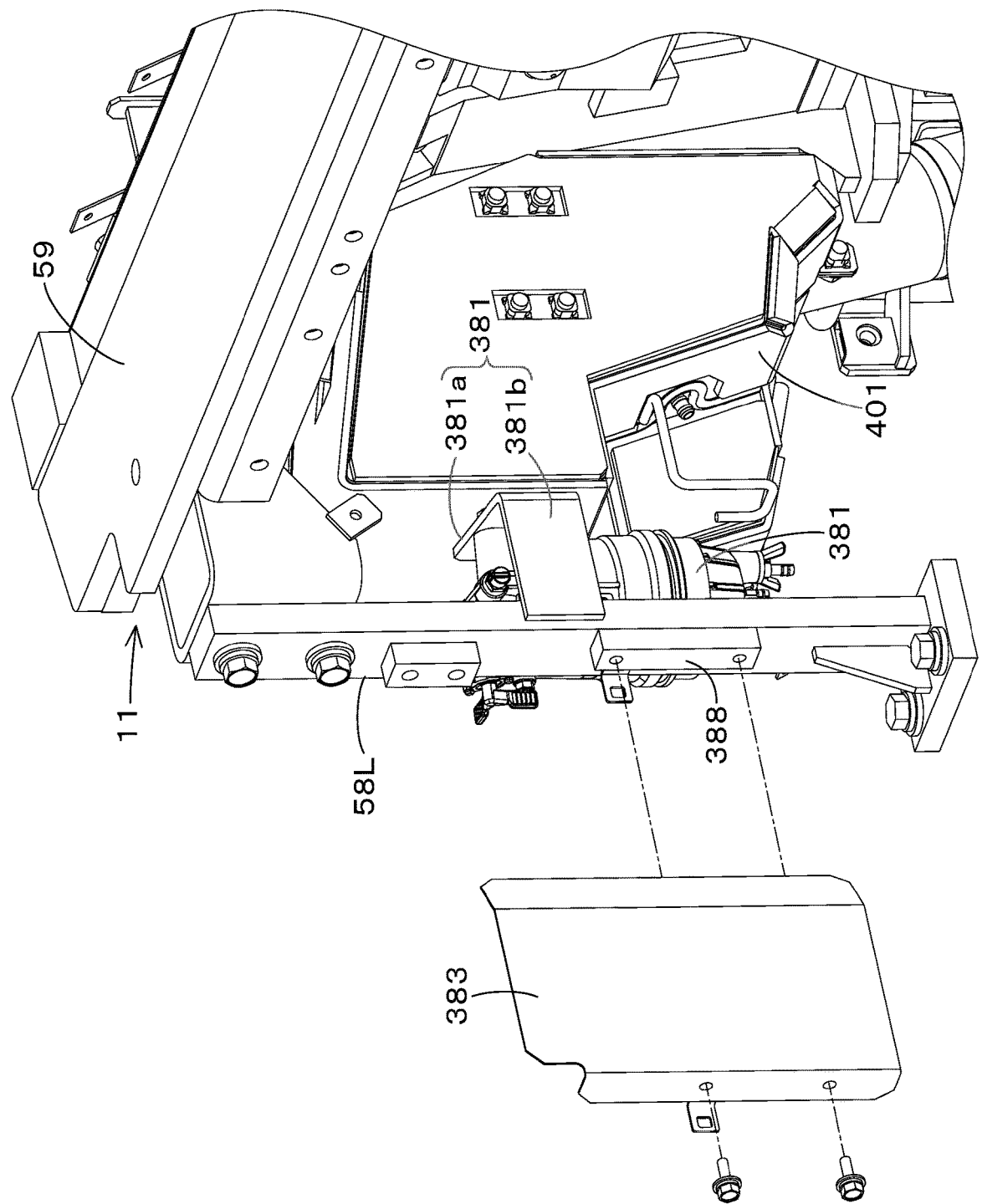
FIG. 42 is a perspective view illustrating attachment of a sedimeter and asedimeter cover.
Figure 43:
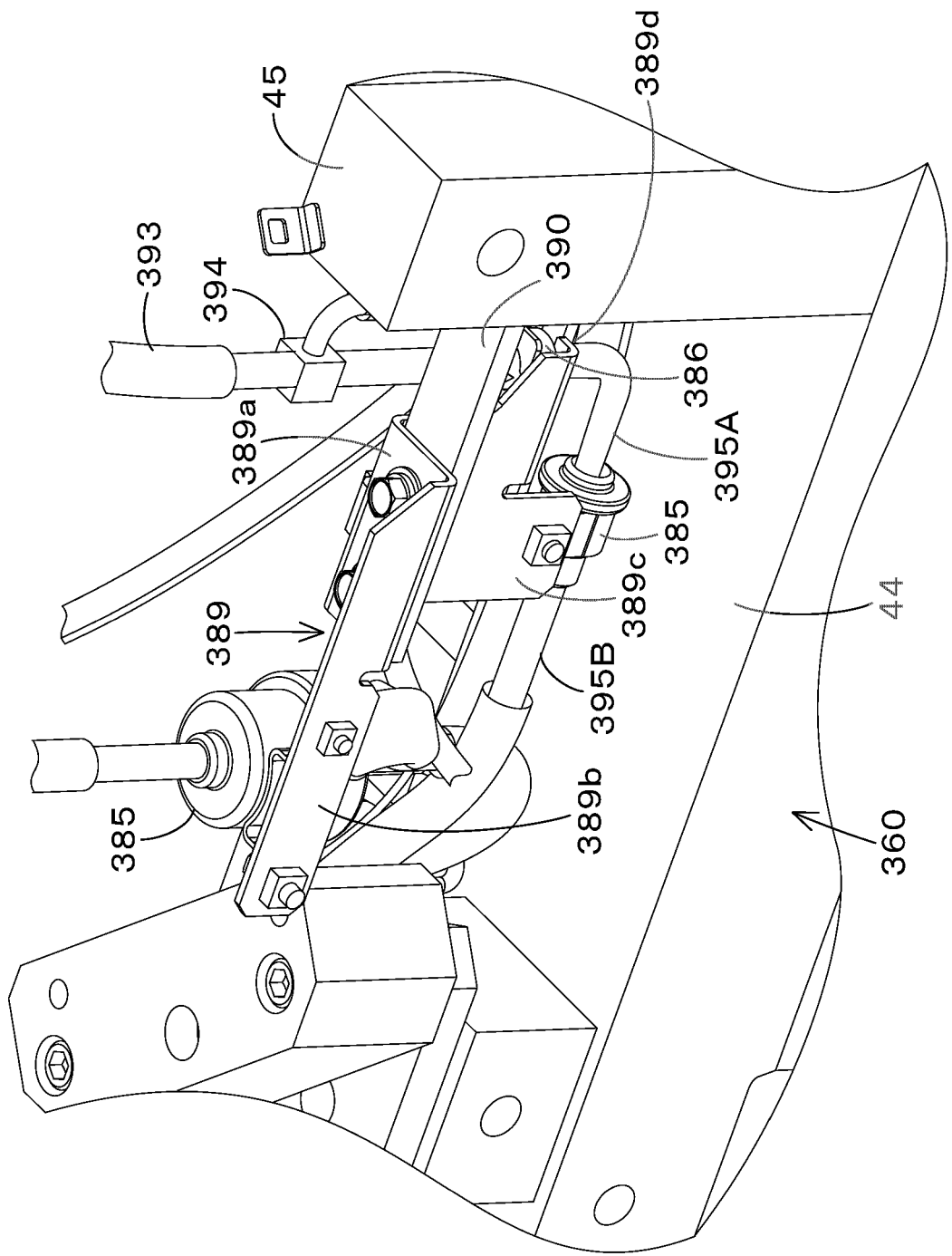
FIG. 43 is a perspective view illustrating a back surface of attachment of a fuel pump, a circulator valve, and a check valve.

As shown in FIG. 41, FIG. 42, and FIG. 43, the sedimenter 381 is arranged in front of the first rear leg 58L and is attached to the sedimenter bracket 382 fixed to the first rear leg 58L. The sedimenter bracket 382 has a first piece portion 381a fixed to the right side of the first rear leg 58L and projecting forward, and a second piece portion 381b extending leftwardly from the projecting end potion of the first piece portion 381a. The sedimenter 381 is located between the first rear leg 58L and the second fragment 381b and is attached to the second fragment 381b. The sedimenter 381 is arranged in the inner vicinity of the hood rear portion 22B, and the sedimenter 381 can be accessed when the hood rear portion 22B is opened.

As shown in FIG. 38, a sedimenter cover 383 is provided between the sedimenter 381 and the exhaust gas purification system D1, covering the sedimenter 381 with respect to the exhaust gas purification system D1. In other words, the sedimenter cover 383 shields the sedimenter 381 from the exhaust gas purification system D1. The sedimenter cover 383 is located closer to the sedimenter 381 between the sedimenter 381 and the exhaust gas purification system D1. In other words, the sedimenter cover 383 is arranged away from the exhaust gas purification system D1 in order to make it less susceptible to the heat of the exhaust gas purification system D1.

As shown in FIG. 42, the rear portion of the sedimenter cover 383 is bolted to an attachment block 388 secured to the rear surface of the first rear leg 58L. The sedimenter cover 383 is detachable separately from the sedimenter 381. This allows the sedimenter 381 to be in a covered or uncovered state, depending on the situation.

As shown in FIG. 38 and FIG. 39, a fuel pump 385, a circular flow valve 386 and a check valve 387 are provided at the rear portion of the prime mover E1. These are provided on the lower side of the prime mover E1 and at the midpoint of the machine width direction K2. The fuel pump 385 is a pump that draws fuel and sends it to the prime mover E1. The circular flow valve 386 is a valve that switches the return fuel (return fuel) from the prime mover E1 to a state in which the return fuel is sent to the fuel cooler N1, or to a state in which the return fuel is not sent to the fuel cooler N1 but is sent to the sedimenter 381. The check valve 387 is a valve that prevents the backflow of fuel from the circular flow valve 386.

Figure 44:
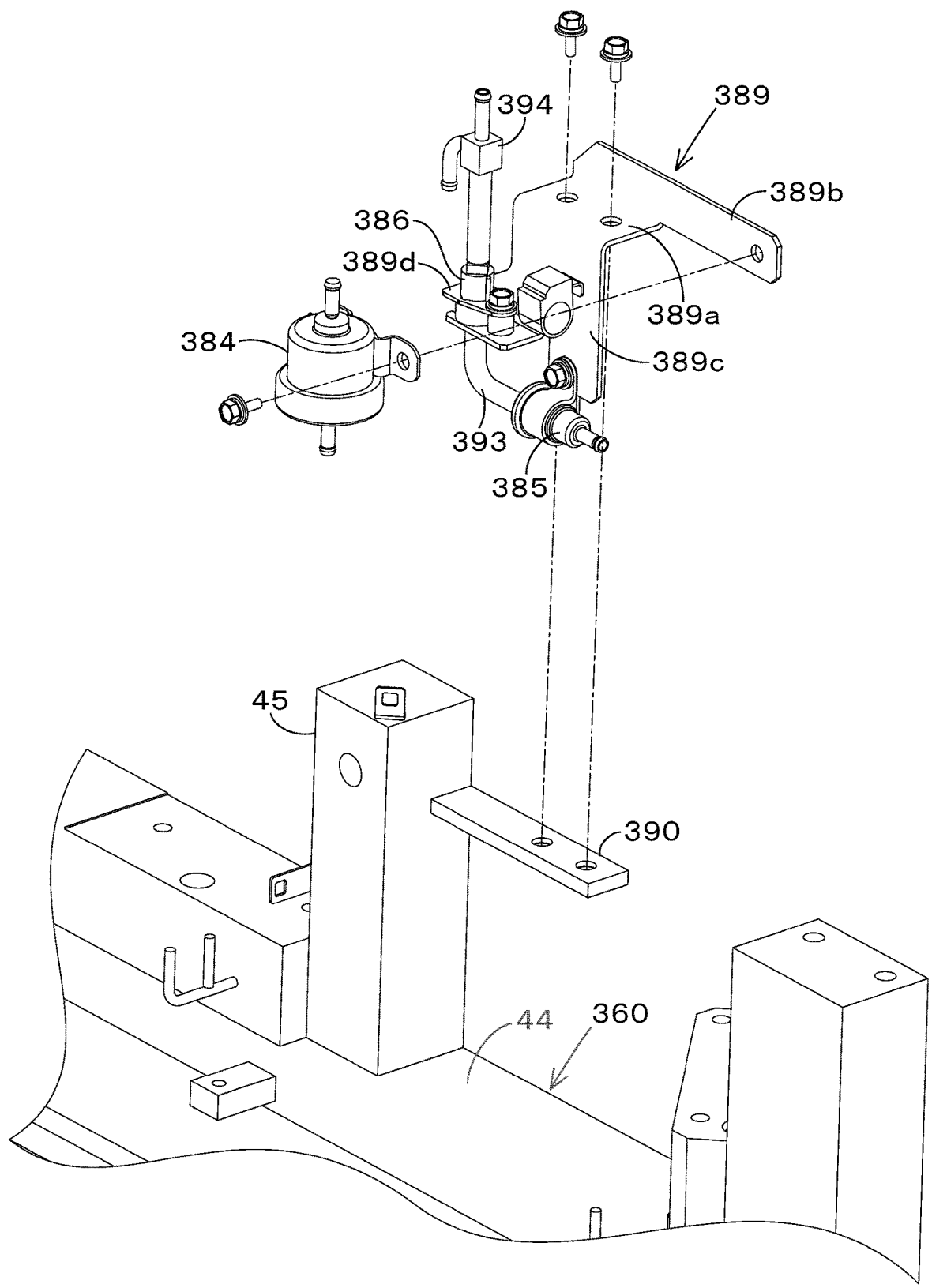
FIG. 44 is a perspective view illustrating development of attachment of a fuel pump, a circulator valve, and a check valve.

As shown in FIG. 43 and FIG. 44, the fuel pump 385, the circular flow valve 386 and the check valve 387 are mounted on a single bracket member 389. This allows the fuel pump 385, the circular flow valve 386 and the check valve 387 to be sub-assembled to the bracket member 389 and assembled to the machine body 2. The bracket member 389 has a first attachment portion 389a, a second attachment portion 389b extending leftwardly from the first attachment portion 389a, a third attachment portion 389c extending downwardly from the first attachment portion 389a, and a fourth attachment portion 389 extending forwardly from a midway portion of the third attachment portion 389c. The first attachment portion 389a is bolted to a stay member 390 fixed to the weight support member 45. The fuel pump 385 is attached to the second attachment portion 389b. The circular flow valve 386 is installed in the third mounting 389c. The check valve 387 is installed in the fourth attachment portion 389.

Figure 40:
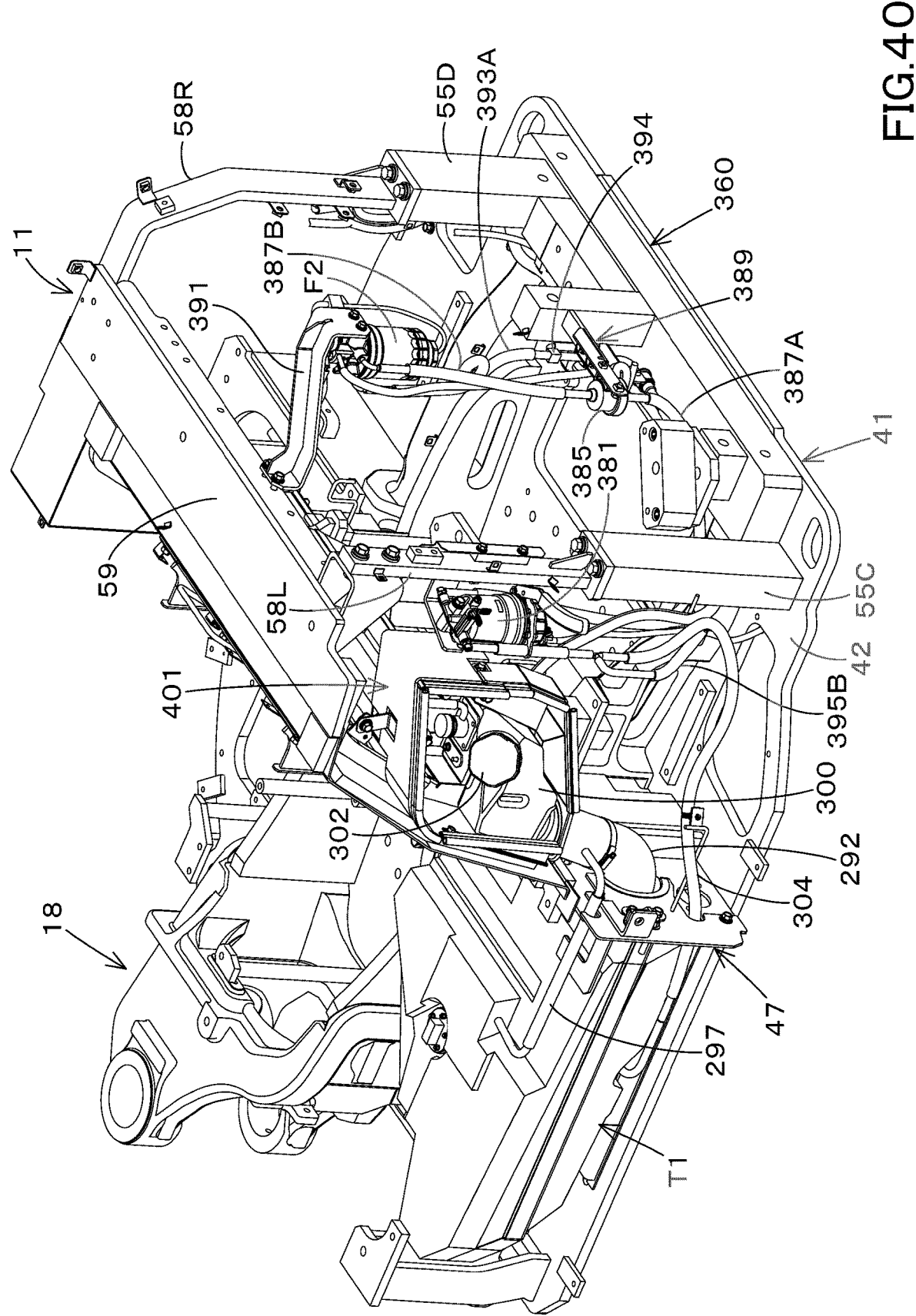
FIG. 40 is a perspective view illustrating arrangement of fuel devices.

As shown in FIG. 38, FIG. 39 and FIG. 40, the fuel filter F2 is arranged behind the prime mover E1 and above the fuel pump 385, the circular flow valve 386 and the check valve 387. Thus, the bracket member 389 is arranged below the fuel filter F2. The fuel filter F2 is a filter for removing dirt and other foreign substances from the fuel before dirt and other foreign substances enters the prime mover E1. The fuel filter F2 is mounted on the rear portion of the filter bracket 391 protruding rearwardly from the upper plate 59 side of the support frame 11.

The sedimenter 381, the fuel pump 385, the circular flow valve 386, the check valve 387, and the fuel filter F2 are located near the inner side of the hood rear portion 22B and are accessible (one-side maintenance is possible) by opening the hood rear portion 22B.

Figure 45:
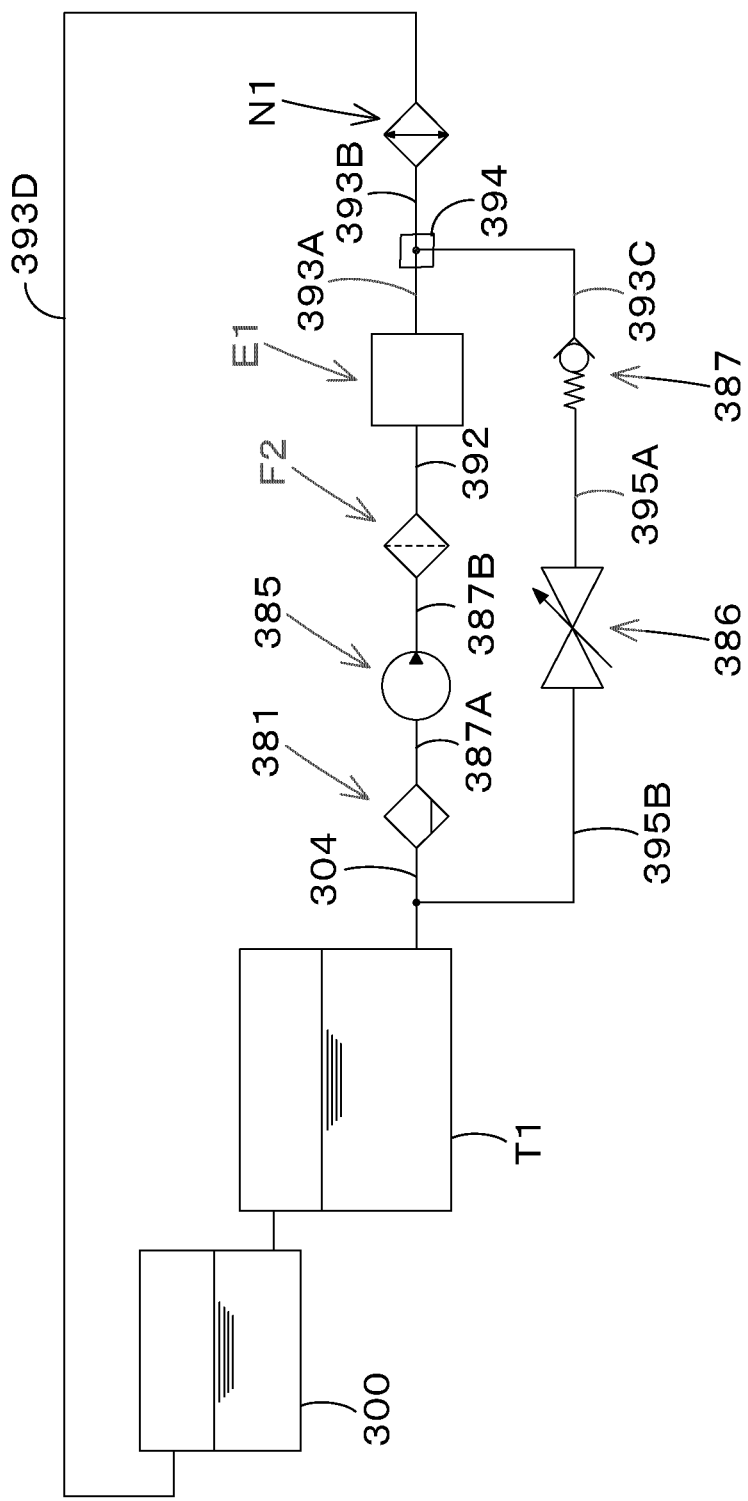
FIG. 45 is a system view illustrating a supply passage of fuel.

As shown in FIG. 38, FIG. 40, and FIG. 45, the sedimenter 381 is connected to the fuel tank T1 via a fuel hose 304 or the like (fuel line). The fuel pump 385 is connected to the sedimenter 381 via the fuel hose 387A and the like on the suction side and to the fuel filter F2 via the fuel hose 387B and the like on the output side. The fuel filter F2 is connected to the prime mover E1 via the fuel hose 392. Thus, fuel is sucked from the fuel tank T1 to the fuel pump 385 via the sedimenter 381 and outputted from the fuel pump 385 and supplied to the prime mover E1 via the fuel filter F2. The return pipeline 393A, which flows the return fuel from the prime mover E1, is connected to the branching member 394. The branching member 394 is connected to the fuel cooler N1 via the return pipeline 393B and is connected to the check valve 387 via the return pipeline 393C. The fuel cooler N1 is connected to the sub tank 300 via the return pipeline 393D. Meanwhile, the check valve 387 is connected to the circular flow valve 386 via circular flow pipeline 395A, and the circular flow valve 386 is connected to the fuel hose 304 via the circular flow pipeline 395B. Thus, when the temperature of the return fuel is low, the return fuel is returned to the sedimenter 381 by opening the circular flow valve 386, and when the temperature of the return fuel is high, the return fuel can be returned to the fuel tank T1 via the fuel cooler N1, the sub tank 300 by closing the circular flow valve 386.

Figure 46:
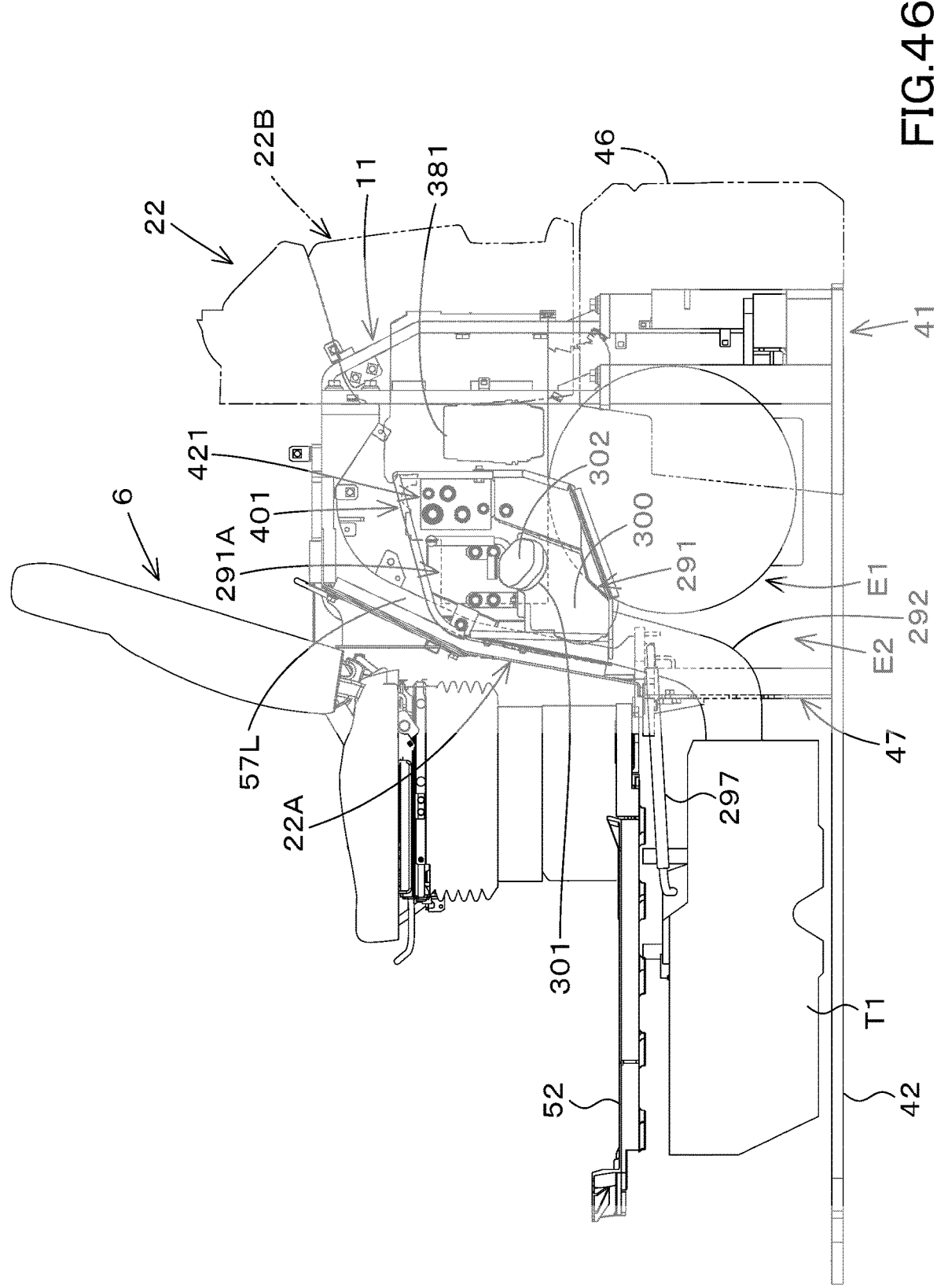
FIG. 46 is a side view of arrangement portion of a sub tank.
Figure 47:
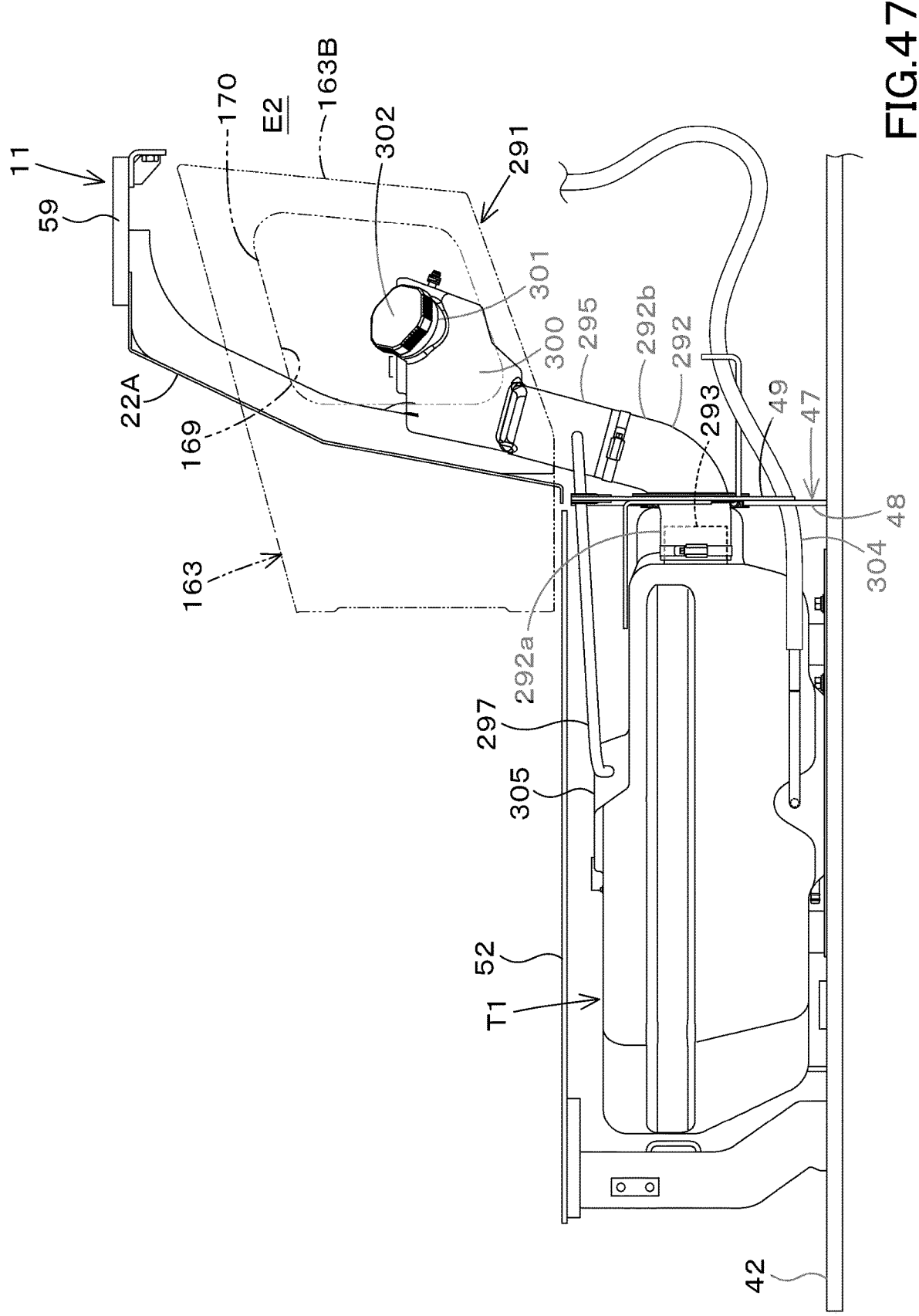
FIG. 47 is a side view of a fuel tank and a sub tank.

As shown in FIG. 46 and FIG. 47, the fuel tank T1 is arranged below the step 52 and in front of the partition plate 47. The prime mover room E2 is provided with a fuel filler portion 291 for injecting fuel to be refilled into the fuel tank T1. Thus, the partition plate 47 divides the prime mover room E2, which is the side where the prime mover E1 and the fuel filler portion 291 are arranged, from the side where the fuel tank T1 is arranged.

As shown in FIG. 40, the fuel filler portion 291 is arranged behind the left portion of the bulkhead member 22A. The fuel filler portion 291 is arranged on the rear and upper side of the fuel tank T1.

As shown in FIG. 46, the fuel tank T1 and the fuel filler portion 291 are connected to the fuel tank T1 by a connector tube 292 provided through the partition plate 47. One end potion of the connector tube 292 is connected to a side surface of the fuel tank T1. The side surface of the fuel tank T1 refers to the vertical wall surface between the top and bottom surfaces and includes the front, left, right and rear surfaces of the fuel tank T1. Connecting the connector tube 292 to the side surface of the fuel tank T1 allows the connector tube 292 to be positioned in a lower position and allows the connector tube 292 to be inserted into the partition plate 47. By allowing the connector tube 292 to be inserted into the partition plate 47, the partition structure between the side of the prime mover E1 and the fuel filler portion 291 and the side of the fuel tank T1 can be simplified.

Figure 48:
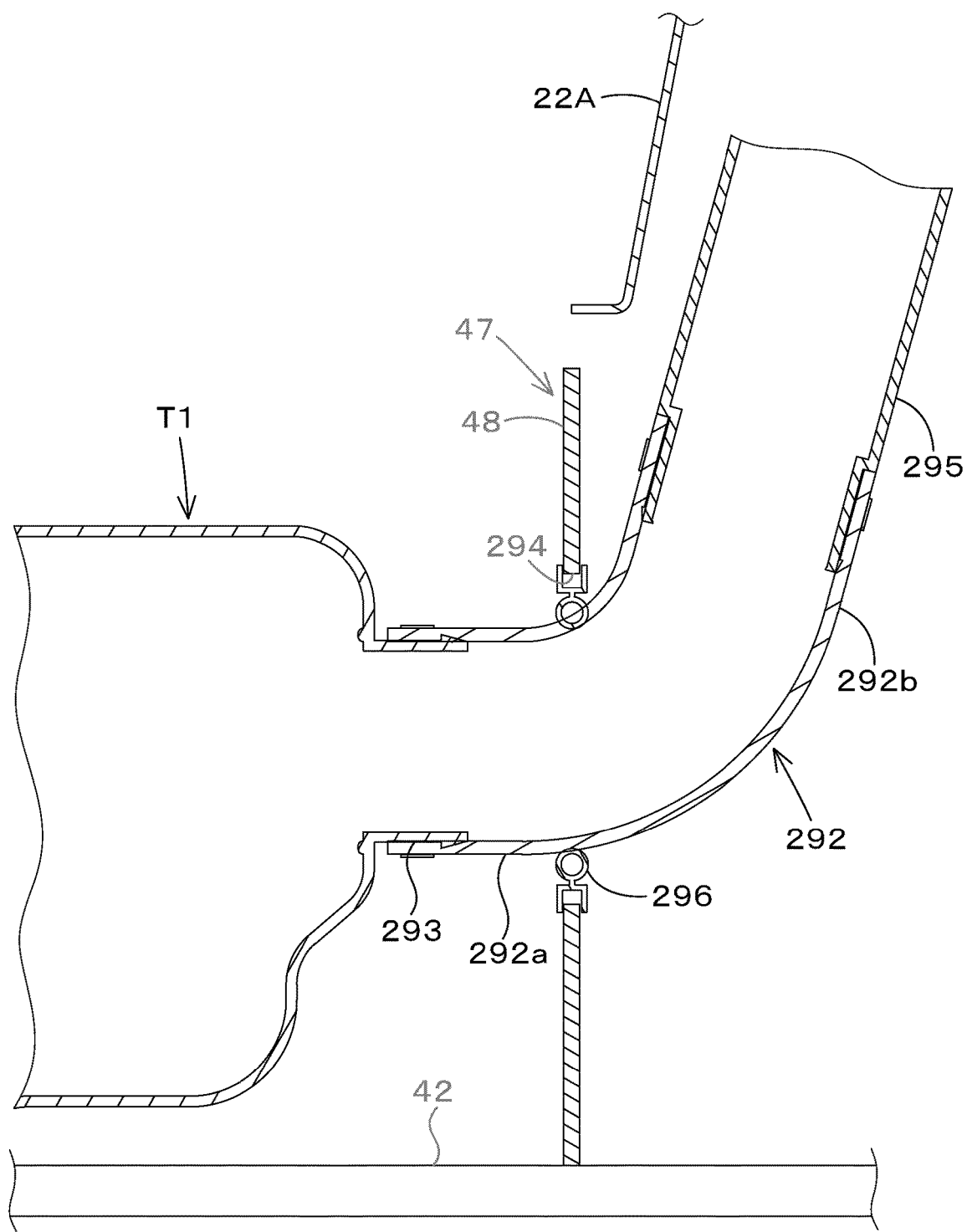
FIG. 48 is a cross section view of side surface of a connecting portion between a fuel tank and a fuel supplier portion.

As shown in FIG. 48, the partition plate 47 has a through hole 294 formed at the rear position of the fuel tank T1. The through hole 294 is a hole through which the connector tube 292 is inserted. The fuel tank T1 has an influent pipe portion 293 for flowing fuel into the rear surface, which is the side corresponding to the through hole 294. The axial direction of the influent pipe portion 293 is roughly parallel to the normal direction of the plate surface of the partition plate 47.

The fuel filler portion 291 has a supply pipe portion 295 for supplying fuel at the bottom. The influent pipe portion 293 and the supply pipe portion 295 are connected to the supply pipe portion 295 by a connector pipe 292.

The connector tube 292 has a first portion 292a and a second portion 292b. The first portion 292a is connected to the influent pipe portion 293. The first portion 292a extends from the influent pipe portion 293 toward the through hole 294 and through the through hole 294. A second portion 292b extends upwardly from the first portion 292a and connects to the supply pipe portion 295. The gap between the through hole 294 and the connector tube 292 is sealed by the sealing member 296. Since the connector tube 292 only inserts the partition plate 47 in an orthogonal manner, the partition structure between the arranged side of the prime mover E1 and the arranged side of the fuel tank T1 can be simplified.

When the connector pipe 292 for flowing fuel into the fuel tank T1 is connected to the side of the fuel tank T1, the fuel tank T1 will not be filled with a full amount of fuel when the air above the inlet pipe portion 293 is not released. Thus, as shown in FIG. 47, the upper portion of the fuel tank T1 and the fuel filler portion 291 are connected to the upper portion of the fuel tank T1 with the air release pipe 297 for venting the air in the fuel tank T1. At the time of refueling, the fuel tank T1 can be filled with fuel to the upper portion of the inlet pipe portion 293 by releasing the air in the fuel tank T1 with the air release pipe 297. The air release pipe 297 connects the upper portion of the fuel tank T1 to the lower portion of the supply pipe portion 295. The air release pipe 297 is provided in an inclined manner that transitions upward from the fuel tank T1 to the fuel filler portion 291

(toward the rear). This allows good air release even when the machine body 2 is at an angle.

As shown in FIG. 47, the fuel filler portion 291 has a sub tank 300 capable of storing fuel and a refueling port 301 for injecting fuel into the sub tank 300. By providing the sub tank 300, the fuel storage capacity is increased. The supply pipe portion 295 extends downwardly from the sub tank 300. Fuel injected into the sub tank 300 flows from the supply pipe portion 295 into the fuel tank T1 via the connector pipe 292 and the inlet pipe portion 293. The sub tank 300 is located at the rear portion of the exterior member (outer layer member) 163, which constitutes the exterior of the cabin 5, and is located in the interior of the machine body.

As shown in FIG. 1, the exterior member 163 includes the exterior of the lower rear portion of the cabin 5 and covers the left side of the prime mover room E2. An opening portion 169 is formed at the rear portion of the exterior member 163. This opening portion 169 is closed by the openable lid 170, which can be opened and closed.

As shown in FIG. 47, a fueling port 301 is located inside the openable lid 170. Thus, when the openable lid 170 is opened, the refueling port 301 can be accessed and refueled.

As shown in FIG. 46, behind the bulkhead member 22A, there is a housing box 401 that houses the fuel filler portion 291. The housing box 401 forms an fuel filler portion housing 291A that houses the fuel filler portion 291. A sedimenter 381 is provided adjacent to the rear portion of the housing box 401. The housing box 401 is located adjacent to the left side of the front portion of the exhaust gas purification system D1, as shown in FIG. 39.

Figure 49:
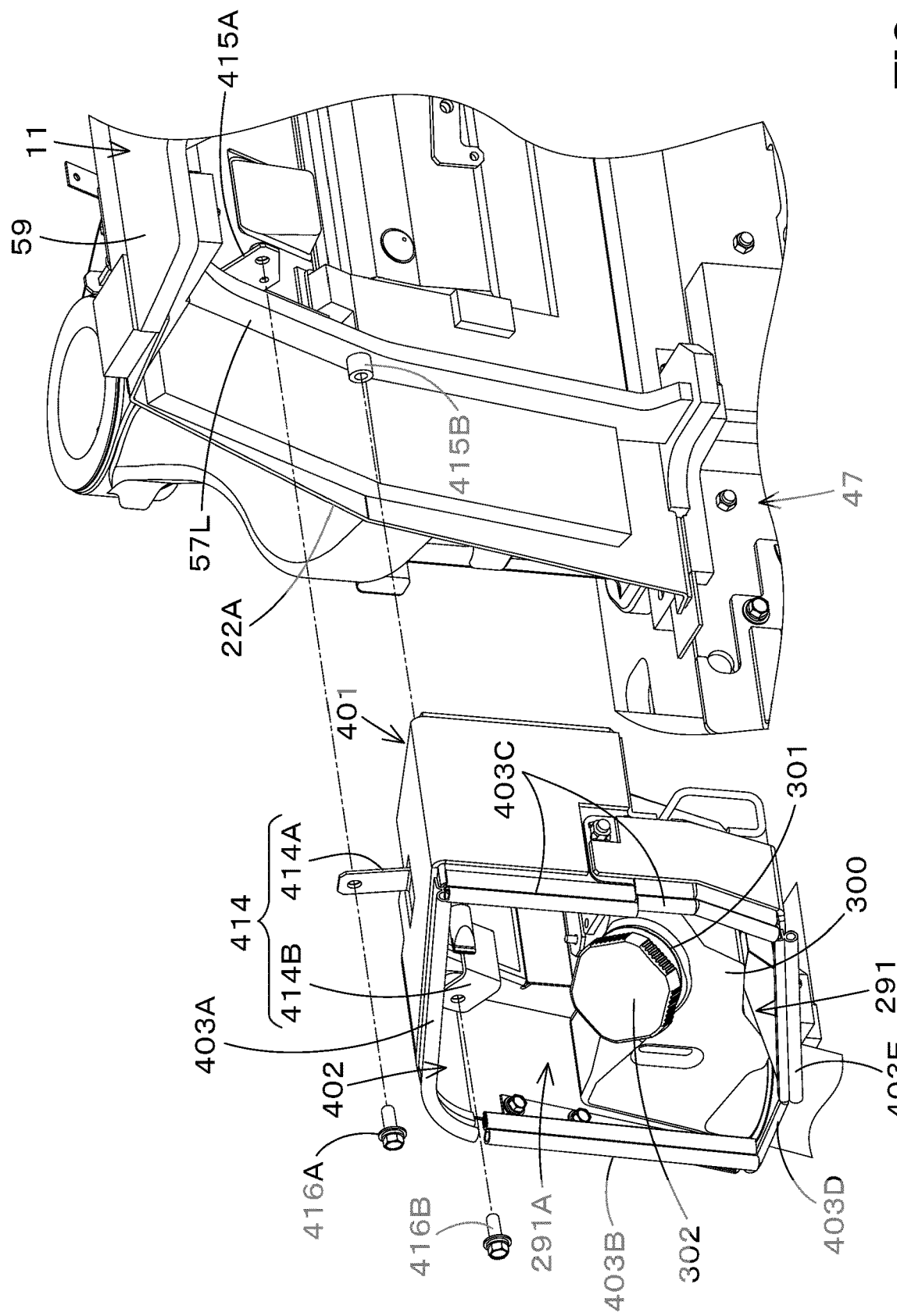
FIG. 49 is a perspective view illustrating development of attachment of a housing box.
Figure 50:
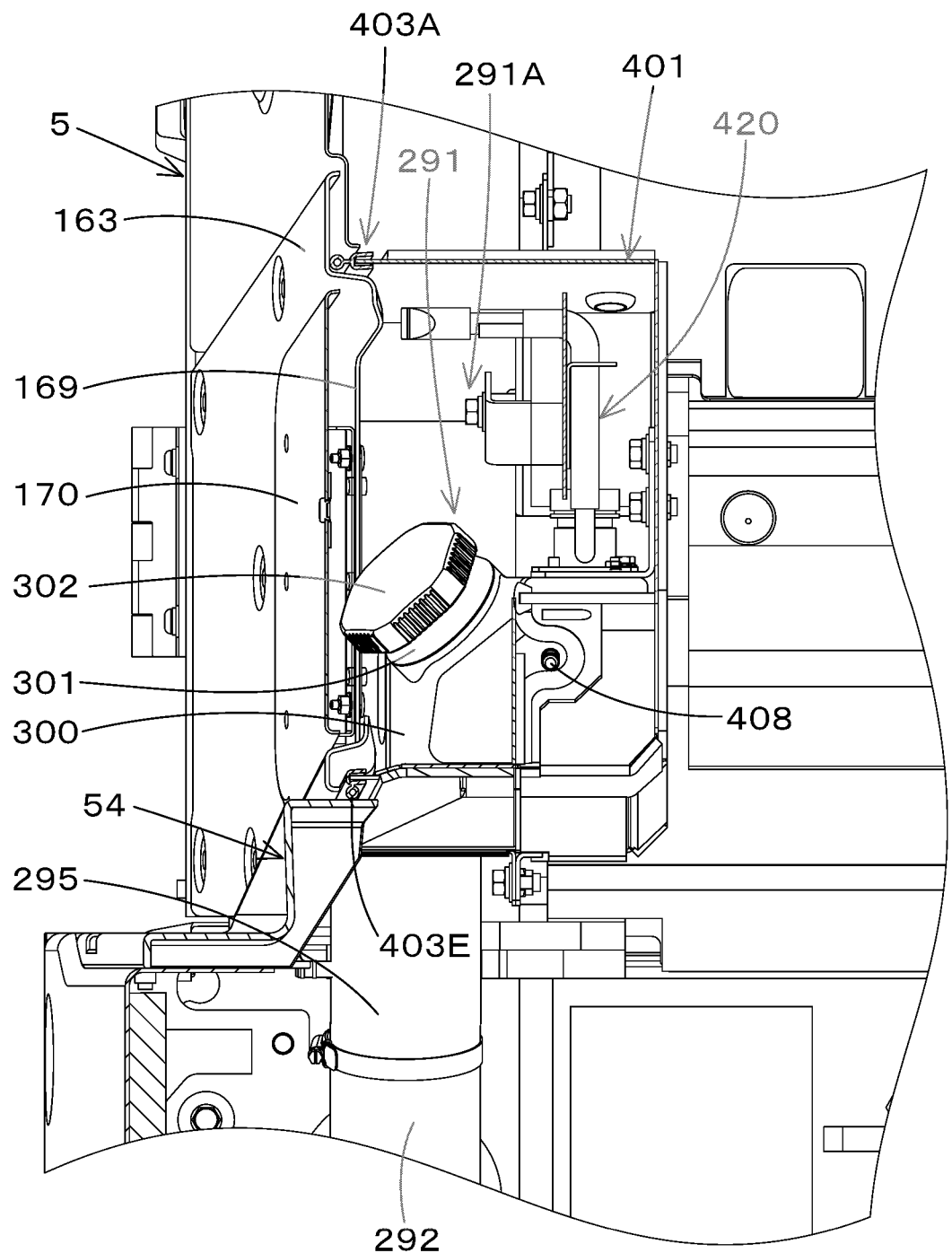
FIG. 50 is a cross section view illustrating a back surface of attachment of a housing box.
Figure 51:
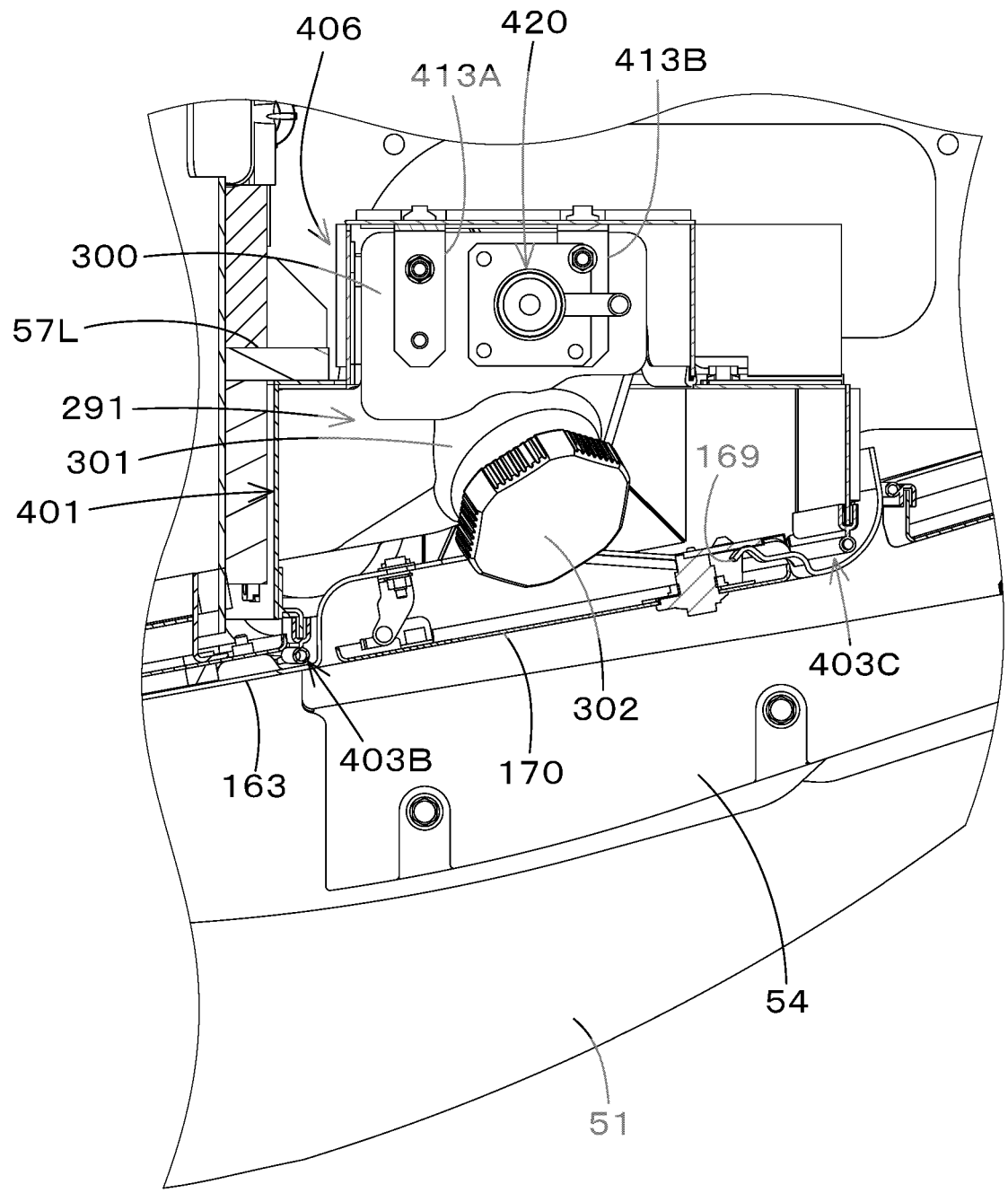
FIG. 51 is a cross section view illustrating a plan surface of attachment of a housing box.

As shown in FIG. 49, one side (left side) of the housing box 401 is open. That is, the housing box 401 has a box opening 402 opening to the left on one side. As shown in FIG. 50 and FIG. 51, the box opening 402 is blocked by an exterior member 163.

As shown in FIG. 49, a plurality of sealing members 403A to 403E are provided at the periphery of the opening of the box opening 402. As shown in FIG. 50 and FIG. 51, the sealing members 403A to 403C and the sealing member 403D are in contact with the exterior member 163. The sealing member 403E is in contact with the upper surface of the auxiliary cover 54, which is an exterior member on the machine body 2 side, as shown in FIG. 50. The auxiliary cover 54 is located above the rear portion of the left side of the swivel cover 51, as shown in FIGS. 1 and 17, and covers the prime mover room E2. The periphery of the box opening 402 is sealed by the sealing members 403A to 403E.

Figure 52:
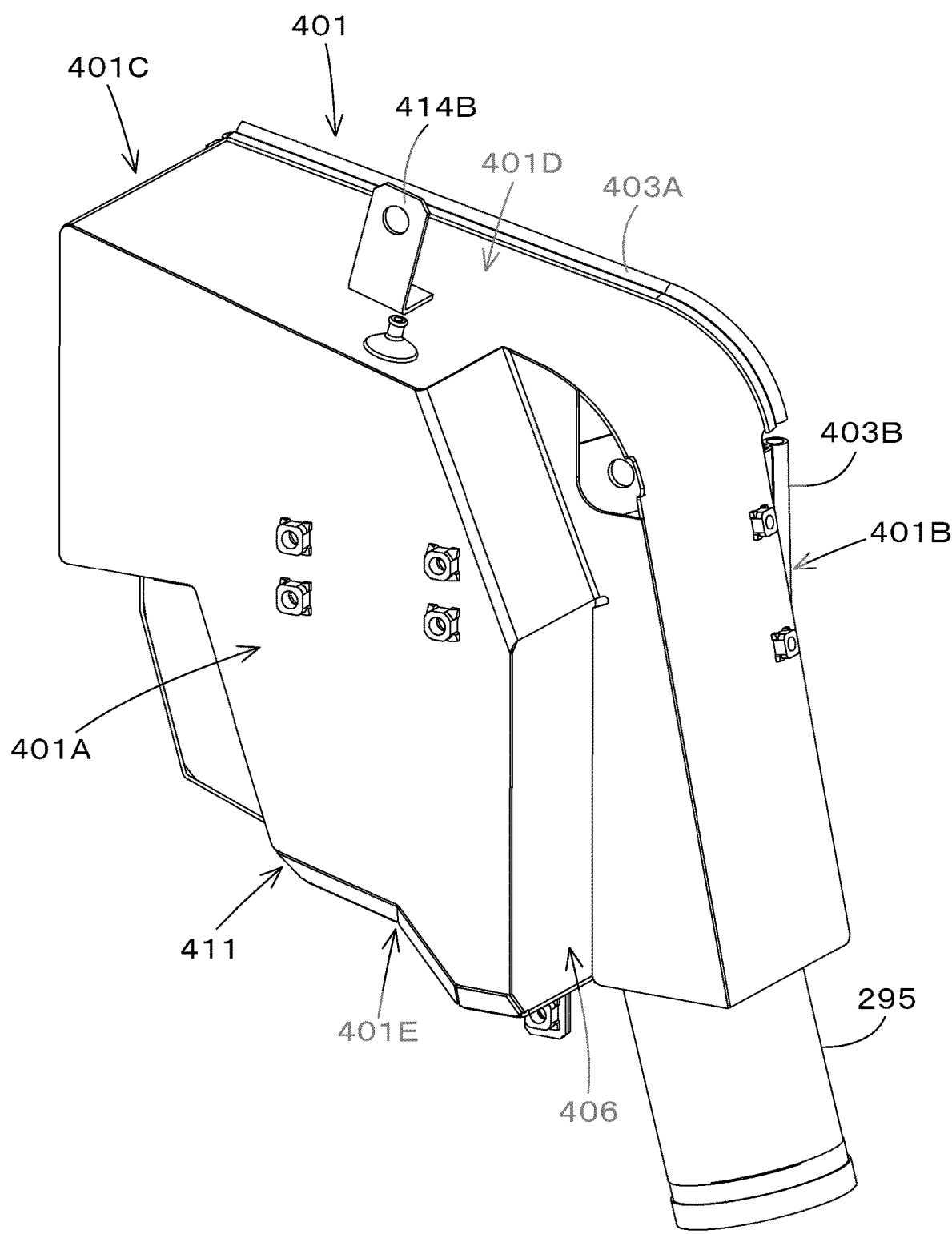
FIG. 52 is a perspective view illustrating a front surface side of a housing box.
Figure 53:
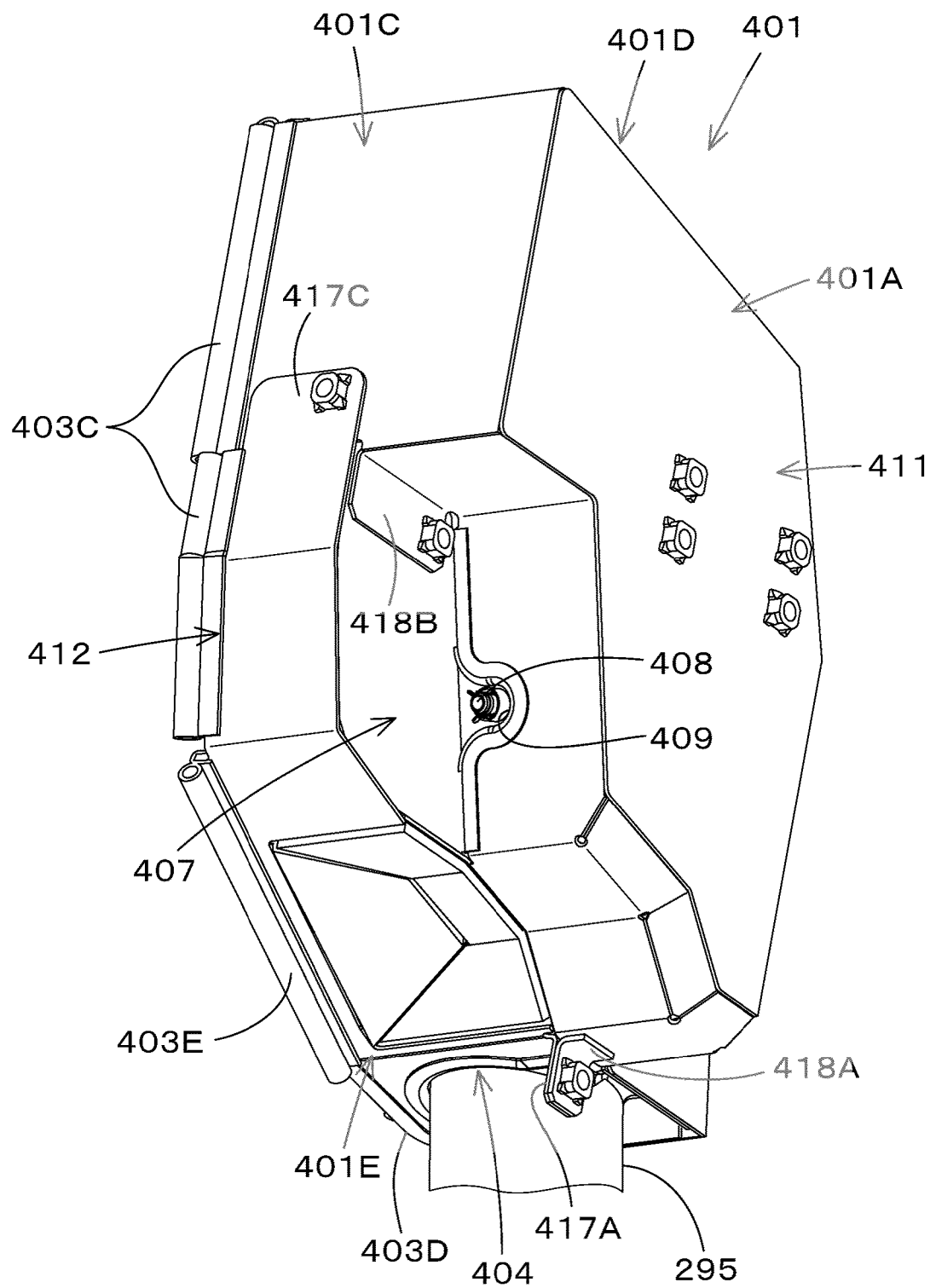
FIG. 53 is a perspective view illustrating a back surface side of a housing box.

As shown in FIG. 52 and FIG. 53, the fuel filler portion housing chamber 291A is closed by the right side portion (other side) 401A, the front side portion 401B, the rear side portion 401C, the upper side portion 401D and the lower side portion 401E of the housing box 401. That is, the fuel filler portion housing chamber 291A is compartmentalized with the engine room E2 in the engine room E2 by the right side portion 401A, the front side portion 401B, the rear side portion 401C, the upper side portion 401D, and the lower side portion 401E.

As shown in FIG. 53, the lower side portion 401E has an insertion portion 404 that inserts the supply tube portion 295. The space between the insertion portion 404 and the supply tube portion 295 is sealed by a sealing member. The lower side face portion 401E is shaped to follow the shape of the lower surface of the sub tank 300 and supports the sub tank 300. The housing box 401 has a recessed portion 407 formed at the corner of the right side portion 401A, the rear side portion 401C and the lower side portion 401E. The recessed portion 407 is provided with an inserting portion 409 that inserts a connector portion 408 to which the return pipeline 393D is connected.

As shown in FIG. 52, the right side portion 401A has a recessed portion 406 on the front side that prevents interference with the first front leg 57L of the support frame 11. As shown in FIG. 51, the sub tank 300 is attached to the housing box 401 via the stays 413A and 413B. An insulating material is affixed to the outer side of the housing box 401, as appropriate.

Figure 54:
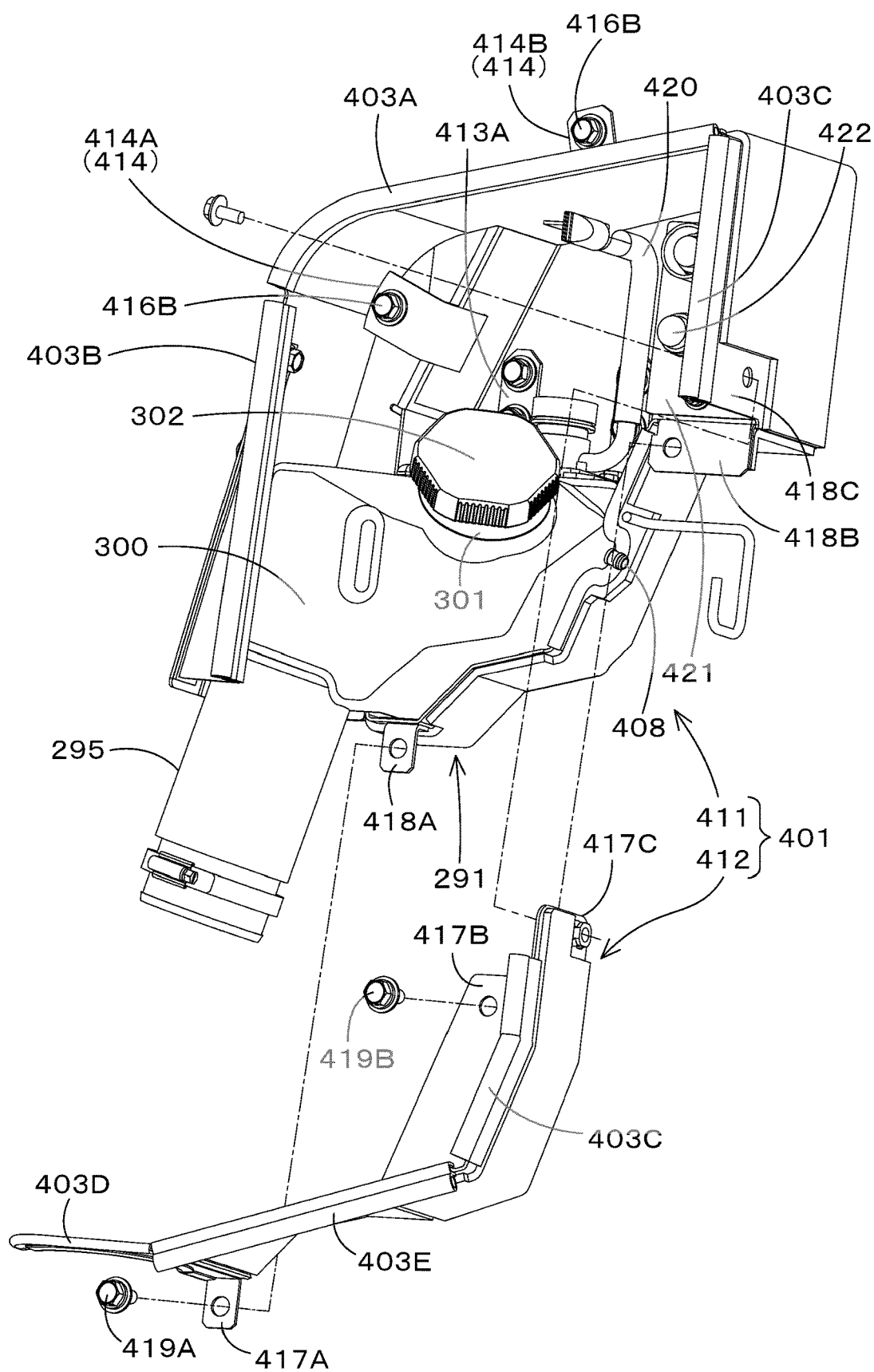
FIG. 54 is a perspective view illustrating development of a housing box.

As shown in FIG. 54, the housing box 401 has a main member 411 attached to the support frame 11 (first front leg 57L) and a sub member 412 detachably attached to the main member 411. The sub member 412 includes the left side of the lower portion of the rear side portion 401C and the left side of the lower side portion 401E. The main member 411 includes a portion other than the sub member 412 in the housing box 401.

As shown in FIG. 49, the main member 411 has a box attachment portion 414 that is attached to the support frame 11. The box attachment portion 414 includes a first member 414A and a second member 414B. The first member 414A is attached to the first attachment portion 415A secured to the first front leg 57L by a bolt 416A. The second member 414B is attached to the second attachment portion 415B secured to the first front leg 57L by a bolt 416B. Thus, by making the fixing point of the housing box 401 to the support frame 11 only, positional adjustment is facilitated and assembly and removal can be performed easily.

As shown in FIG. 54, the sub member 412 has a sub member attachment portion 417 that is attached to the main member 411. The sub member attachment portion 417 has a first portion 417A, a second portion 417B, and a third portion 417C. The first portion 417A is attached to the first fixing portion 418A on the main member 411 by a bolt 419A. The second portion 417B is attached to the second fixing portion 418B provided in the main member 411 by a bolt 419B. The third portion 417C is attached to the third fixing portion 418C provided in the main member 411 by a bolt (not shown in the drawings).

As shown in FIG. 54, the main member 411 is provided with a sensor member 420, a switch box 421, and a buzzer 422. The sensor member 420 is, for example, a sensor that detects the full amount of fuel to be injected. The switch box 421 is, for example, a switch box for operating the refueling device, which is a device for injecting fuel into the sub tank 300. The buzzer 422 is, for example, a buzzer that informs the user that a full amount of fuel has been filled. By removing the sub member 412, the components and devices in the housing box 401 can be easily accessed.

The housing box 401 and the rear portion of the cabin 5 are attached to the support frame 11. That is, by mounting the housing box 401 and the exterior member 163, which blocks the box opening 402 of the housing box 401, on the same member, the accuracy of the positioning of these parts can be achieved.

Figure 55:
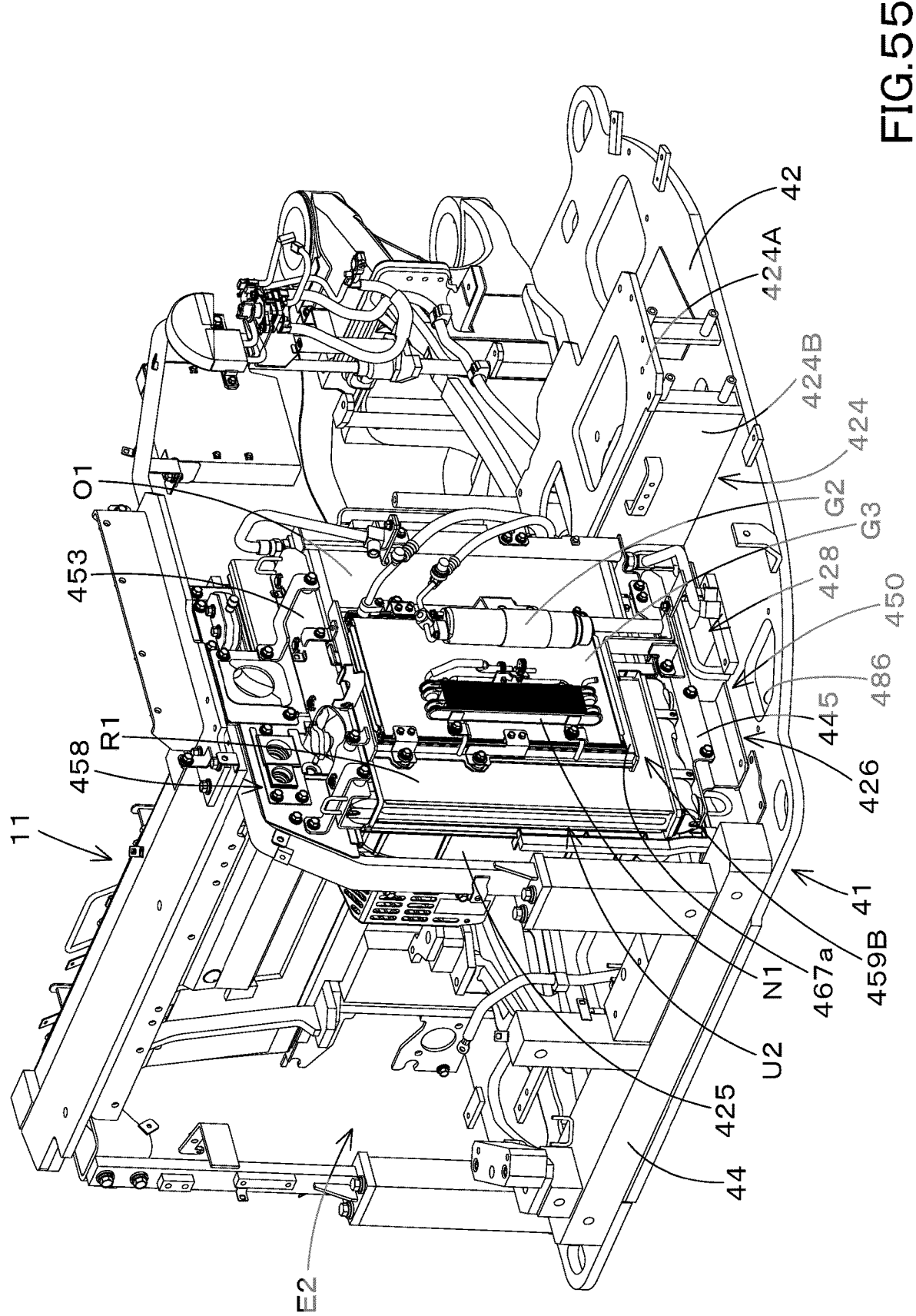
Figure 56:
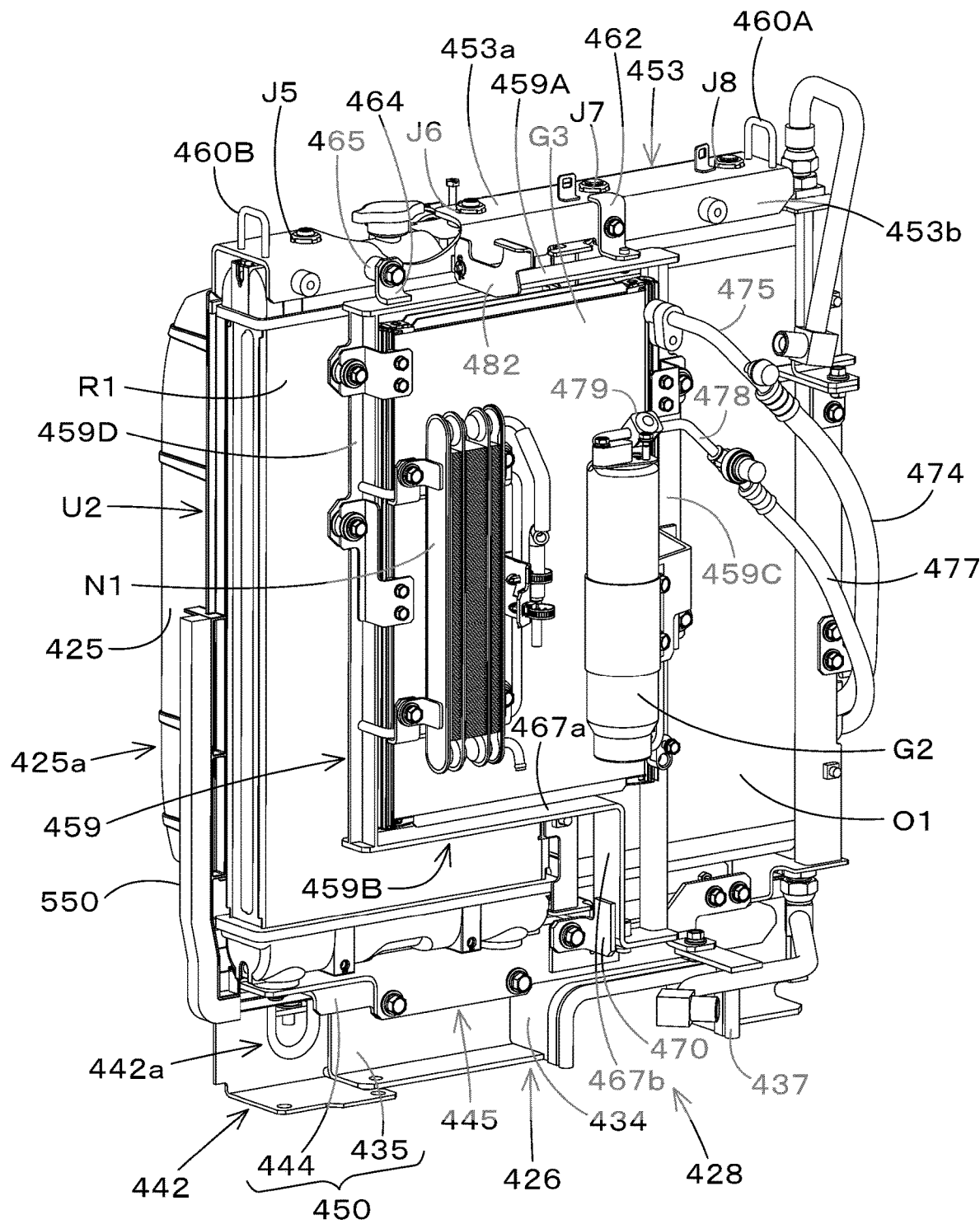

As shown in FIG. 55, the radiator R1, the oil cooler O1, the condenser G3, the fuel cooler N1 and the receiver G2 are located on the rear right side of the swivel frame 41 and on the right side of the prime mover room E2. As shown in FIG. 56, the radiator R1 and the oil cooler O1 are arranged in parallel side by side in the front-to-rear direction, as described above, and are placed and supported on the support portion 426 on the swivel frame 41 (swivel base plate 42).

As shown in FIG. 55, a tank stand 424 is provided in front of the oil cooler O1 to support the hydraulic fluid tank T2.

The tank stand 424 is fixed on the swivel base plate 42. As shown in FIG. 55, the tank stand 424 has a tank attachment plate 424A on which the hydraulic fluid tank T2 is placed and mounted, and a support plate 424B erected on the swivel base plate 42 to support the rear portion of the tank attachment plate 424A. A shroud 425 covering the cooling fan F1 is provided on the left side of the radiator R1 and the oil cooler O1.

Figure 57:
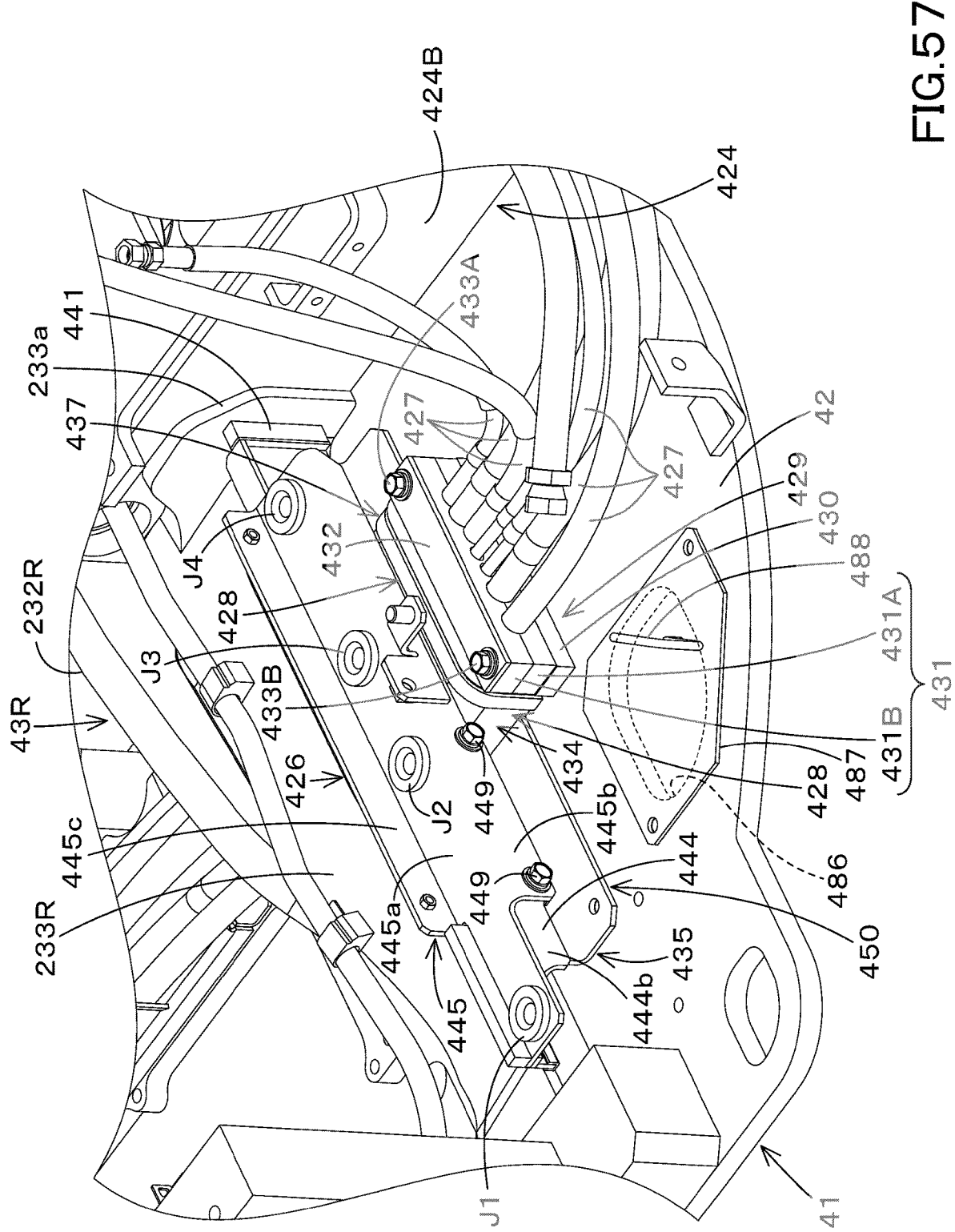
FIG. 57 is a perspective view of a portion where a base member is provided.
Figure 60:
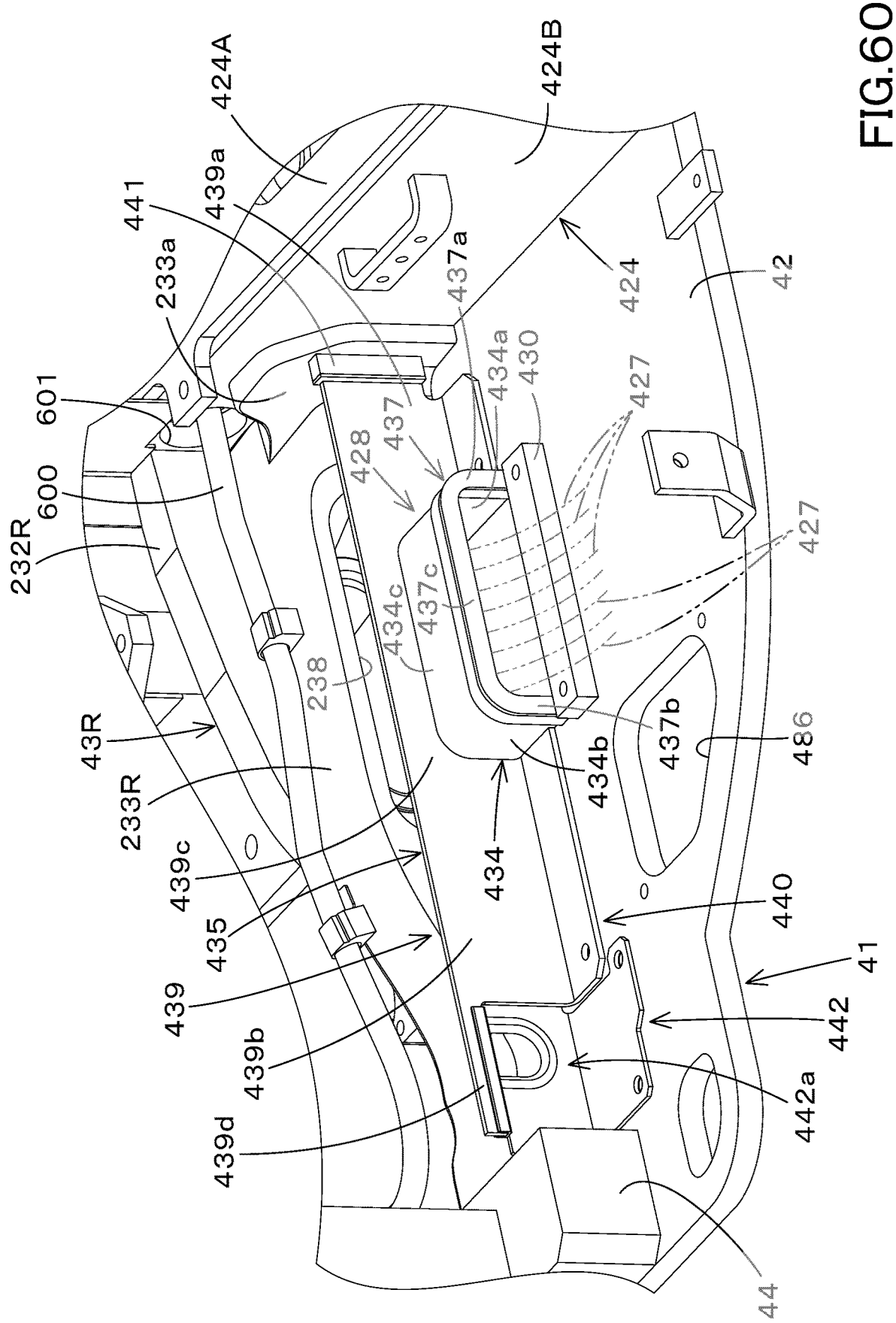
FIG. 60 is a perspective view illustrating an attachment portion if a base member under a state where a support plate is detached.

As shown in FIG. 57, the support portion 426 is arranged on the right side of the area where the front rib 232R and the rear rib 233R of the second rib 43R overlap. As shown in FIG. 60, the rear rib 233R has a reinforcement portion (contacting portion) 233a in front that is in surface contact with and welded to the rear surface of the support plate 424B. In the present embodiment, the front surface of the rear rib 233R is formed on a flat surface (see FIG. 86), and the front portion of the rear rib 233R is in contact with the rear surface of the support plate 424B and fixed by welding to the rear surface of the support plate 424B.

Figure 58:
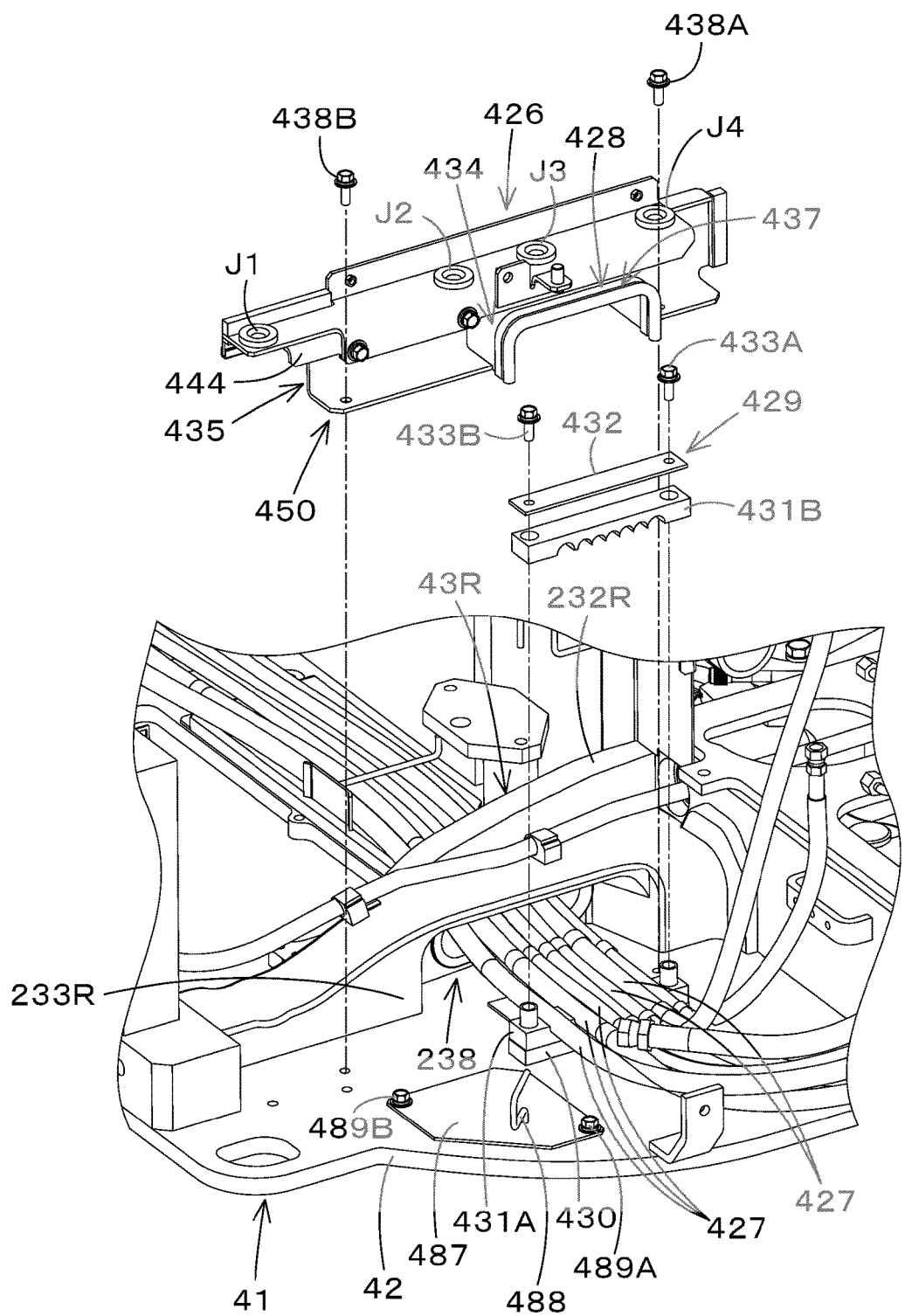
FIG. 58 is a perspective view illustrating development of a support body and an attachment portion of the support body.

As shown in FIG. 57 and FIG. 58, the support body 426 has a passage (opening) 428 through which a plurality of hydraulic pipelines 427 arranged on the swivel frame 41 (swivel base plate 42) are passed. The hydraulic pipelines 427 through these passages 428 include hydraulic piping (including hydraulic hoses and steel pipes), hydraulic fittings and the like, and are, for example, pipelines for sending hydraulic fluid from the hydraulic pump P1 to the control valve V1.

As shown in FIG. 58, the hydraulic pipeline (hydraulic hose) 427 is arranged through a tubing through hole 238 formed in the area where the front rib 232R and the rear rib 233R overlap. The support body 426 covers the right side of the portion of the pipe through hole 238 formed.

As shown in FIG. 57, on the side (right side) of the passage portion 428, a retainer member 429 is provided to hold the hydraulic pipeline 427. The retainer member 429 has an attachment base 430 fixed on the swivel frame 41, a clamping member 431 that holds the hydraulic pipeline 427 in a vertical direction, and a retainer member 432 that holds the clamping member 431 between the retainer member 432 and the attachment base 430.

As shown in FIG. 58, the retainer member 429 is arranged on the right side of the rear rib 233R (tubes through hole 238). The attachment base 430 is formed by a long rectangular plate material in the front-to-rear direction K1 and is fixed to the swivel base plate 42 by welding. The clamping member 431 has a lower material 431A and an upper material 431B including an elastic member. The lower material 431A is arranged under the hydraulic pipeline (hydraulic hose) 427 and placed on the attachment base 430. The upper material 431B is arranged on the upper side of the hydraulic pipeline 427. The retainer member 432 is formed by a rectangular plate material long in the front-to-rear direction K1 and placed on the upper material 431B. The retainer member 429 is secured on the swivel base plate 42 by front bolts 433A and rear bolts 433B that are screwed to the attachment base 430 through the retainer member 432 and the clamping member 431.

As shown in FIG. 56 and FIG. 58, the support body 426 has a passage member 434 and a sealing member 437 including the passage portion 428, the base member 450 attached to the swivel base plate 42 by bolts 438A and 438B, and the support bracket (support stand) 445 attached to the base member 450 (machine body 2).

As shown in FIG. 60, the passage member 434 has a front wall (first vertical wall portion) 434a, a rear wall (second vertical wall portion) 434b, and an upper wall (connecting wall portion) 434c. The front wall 434a and the rear wall 434b are arranged opposite each other in the front-to-rear direction K1 (the horizontal direction intersecting the direction of the distribution of the hydraulic pipeline 427) to sandwich the hydraulic pipeline 427. The upper wall 434c connects the upper portions of the front wall 434a and the rear wall 434b to each other.

As shown in FIG. 57, the sealing member 437 is attached to an edge corresponding to the retainer member 429 in the passage member 434, which contacts the retainer member 429 and seals between the passage member 434 and the retainer member 429. In detail, as shown in FIG. 60, the sealing member 437 has a front portion 437a, a rear portion 437b, and an upper portion 437c, as shown in FIG. 60. These portions 437a to 437c are formed in a continuous manner and touch the left side of the retainer member 429. The front portion 437a is attached to the edge of the front wall 434a, and the rear portion 437b is attached to the edge of the rear wall 434b and is attached to the edge of the upper wall 434c. The sealing member 437 is a trim seal with a contact site including a cushioned tube at the base that fits into the attachment portion.

By the above configuration, the lower material 431A and upper material 431B made of elastic members are sandwiched between the attachment base 430 and the retainer member 432 to adhere tightly around the hydraulic pipeline 427 without any gaps, and furthermore, the retainer member 429 contacts the sealing member 437 attached to the passage member 434. The perimeter of the hydraulic pipeline is sealed and the sealing of the prime mover room E2 is improved. As a result, heat in the prime mover room E2 can be prevented from propagating to the cooler (radiator R1, oil cooler O1, and the like) and reducing the cooling performance. In addition, the noise in the prime mover room E2 can be suppressed from leaking out of the prime mover room E2, thereby reducing the noise level.

Figure 59:
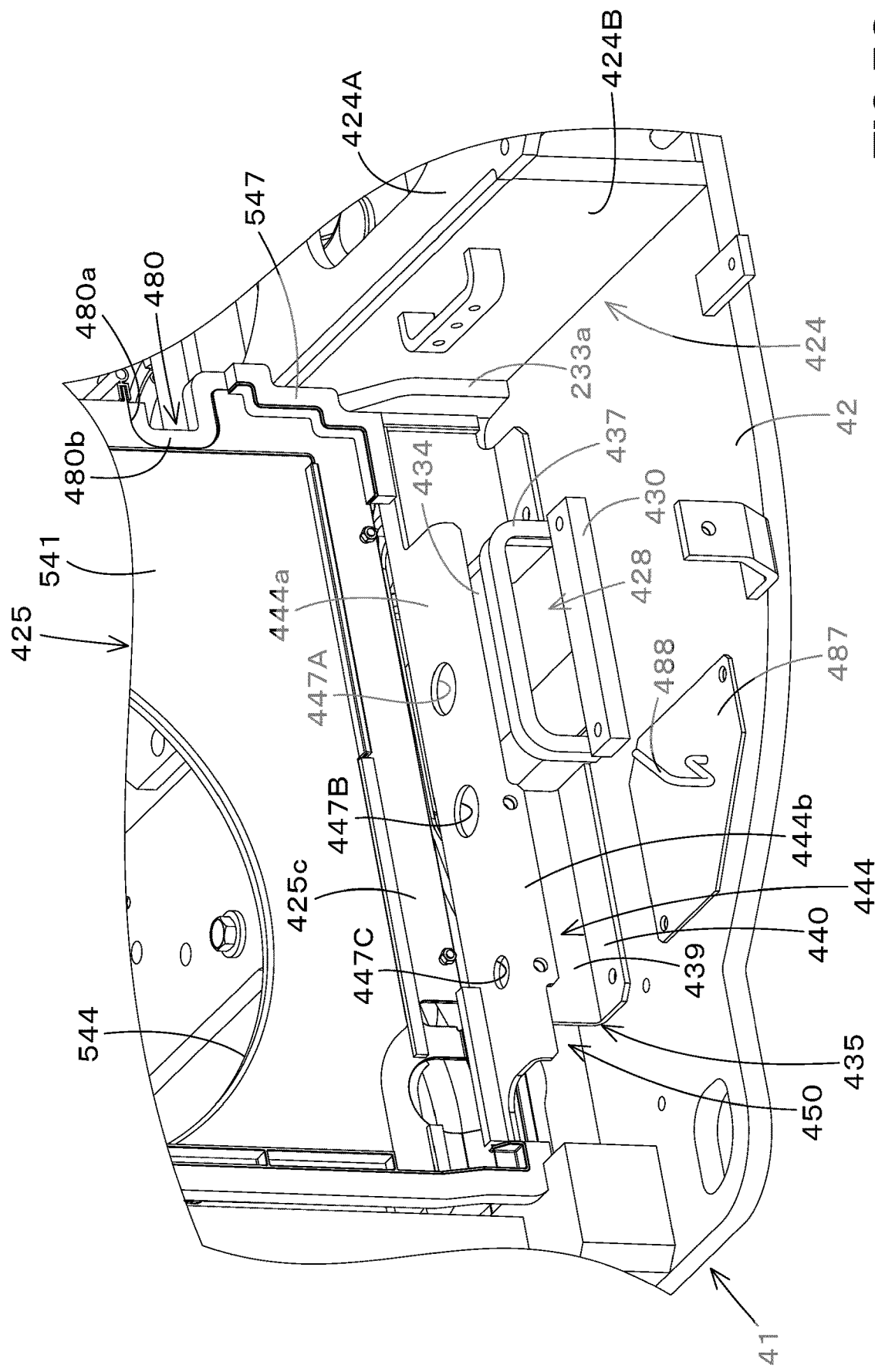
FIG. 59 is a perspective view illustrating an attachment portion of a base member.

As shown in FIG. 59, the base member 450 has an attachment plate 435 and a support plate 444.

As shown in FIG. 60, the attachment plate 435 is arranged on the left portion of the passage member 434. The left portion of the passage member 434 runs through the midpoint of the front-to-rear direction K1 of the attachment plate 435. The passage member 434 is secured to the attachment plate 435 by welding the passage member 434 to the attachment plate 435. The attachment plate 435 has a longitudinal plate portion 439 with a plate surface facing the machine width direction K2 and an attachment plate portion 440 extending to the right from a lower end potion of the longitudinal plate portion 439. The longitudinal plate portion 439 extends forward and backwardly from the passage member 434 to close the gaps on both sides of the front-to-rear direction K1 of the retainer member 429. In detail, the vertical plate portion 439 has the front portion 439a extending forwardly from the passage member 434, the rear portion 439b extending rearwardly from the passage member 434, the upper portion 439c located above the passage member 434 and connecting the upper portions of the front portion 439a and the rear portion 439b to each other, and the protruding portion 439d extending rearwardly from the upper portion of a rear portion 439b.

As shown in FIG. 60, the sealing member 441 (second sealing member) is fixed to the front end potion of the front portion 439a, and the sealing member 441 is in contact with the reinforcement portion 233a. A closing plate 442 is provided between the rear portion 439b and the weight support portion 44 to close the gap between them. The closing plate 442 is bolted to the swivel base plate 42. The closing plate 442 is provided with a passage portion 442a including a trim fitted to the edge of a U-shaped notch opening upward. This passage portion 442a is a part for passing pipes or harnesses and other components. An extended portion 439d is located at the upper end potion of the passage portion 442a.

As shown in FIG. 59, the support plate 444 has an upper wall portion 444a and an attachment wall portion 444b extending downwardly from the right end potion of the upper wall portion 444a. The upper wall portion 444a is superimposed on the upper end potion of the vertical plate portion 439 on the left portion and secured by welding. A first hole 447A, a second hole 447B, and a third hole 447C are formed in the upper wall portion 444A in order from front-to-rear.

As shown in FIG. 55, the support bracket 445 places and supports a load to be mounted on the swivel frame 41. In particular, the support bracket 445 supports the radiator R1 and the oil cooler O1.

As shown in FIG. 57, the support bracket 445 has an upper wall 445a, a first extension wall 445b extending downwardly from the right end potion of the upper wall 445a, and a second extension wall 445c extending upwardly from the left end potion of the upper wall 445a. The upper wall 445a is superimposed on the upper wall portion 444a of the support plate 444. A plurality of first mounting members (first elastic member J1, second elastic member J2, third elastic member J3, fourth elastic member J4; lower elastic member) formed of rubber or other elastic members are spaced in the front-to-rear direction K1 on the upper wall 445a. The first elastic member J1 and the second elastic member J2 are spaced back and forth on the rear portion of the support bracket 445. The third and fourth elastic members J3 and J4 are spaced front-to-rear on the front portion of the support bracket 445. The first elastic member J1 to the fourth elastic member J4 have a hole through which a pin can be inserted. The first elastic member J1 corresponds to the third hole 447C shown in FIG. 59, the second elastic member J2 corresponds to the second hole 447B, and the third elastic member J3 corresponds to the first hole 447A. The fourth elastic member J4 corresponds to a notch in the front portion of the support plate 444.

The first extension wall 445b is secured to the attachment wall portion 444b by bolts 449. To the second extension wall 445c, the lower overhanging wall 425c of the shroud 425 shown in FIG. 59 is attached to the second extension wall 445c by a bolt from the left side.

For example, when the brackets supporting the radiator R1 and the oil cooler O1 are welded and fixed on the swivel base plate 42, a gap is required around the retainer member 429 to prevent interference with the welding torch. In the present embodiment, when bolting the support body 426 supporting the radiator R1 and the oil cooler O1 onto the swivel frame 41, there is no need to provide a gap around the retainer member 429 for welding the bracket supporting the radiator R1 and the oil cooler O1 onto the swivel base plate 42, and the gap (opening portion) between the prime mover room E and the arrangement space of the radiator R1 and the like can be reduced. This allows the cooling air taken into the prime mover room E2 to reduce the leakage of the cooling air into the arrangement side of the radiator R1 and the like. Further, the cooling performance of the hydraulic fluid and the cooling water of the motor E1 and the cooling water of the motor E1 can be improved, and the leakage of noise from the motor chamber E2 can be reduced.

In the present embodiment, the support portion 426 and the closing plate 442 and the like block the lower side of the shroud 425 and between the reinforcement portion 233a of the rear rib 233R and the weight support portion 44, by the support portion 426 and the closing plate 442 and the like. That is, the support portion 426 and the closing plate 442 and the like include a partition structure (the first partition structure) that divides the prime mover room E2 on the lower side of the shroud 425 with as little gap as possible for cooling air to leak out of the shroud 425.

The base member 450 is bolted to the swivel base plate 42 after the hydraulic pipeline 427 is arranged on the swivel base plate 42. Thereafter, the hydraulic pipeline (hydraulic hose) 427 is held by the retainer member 429 while applying the clamp member 431 and the retainer member 432 of the retainer member 429 to the sealing member 437. The base member 450 may be mounted on the swivel base plate 42 with the support bracket 445 assembled on the base member 450.

Figure 63A:
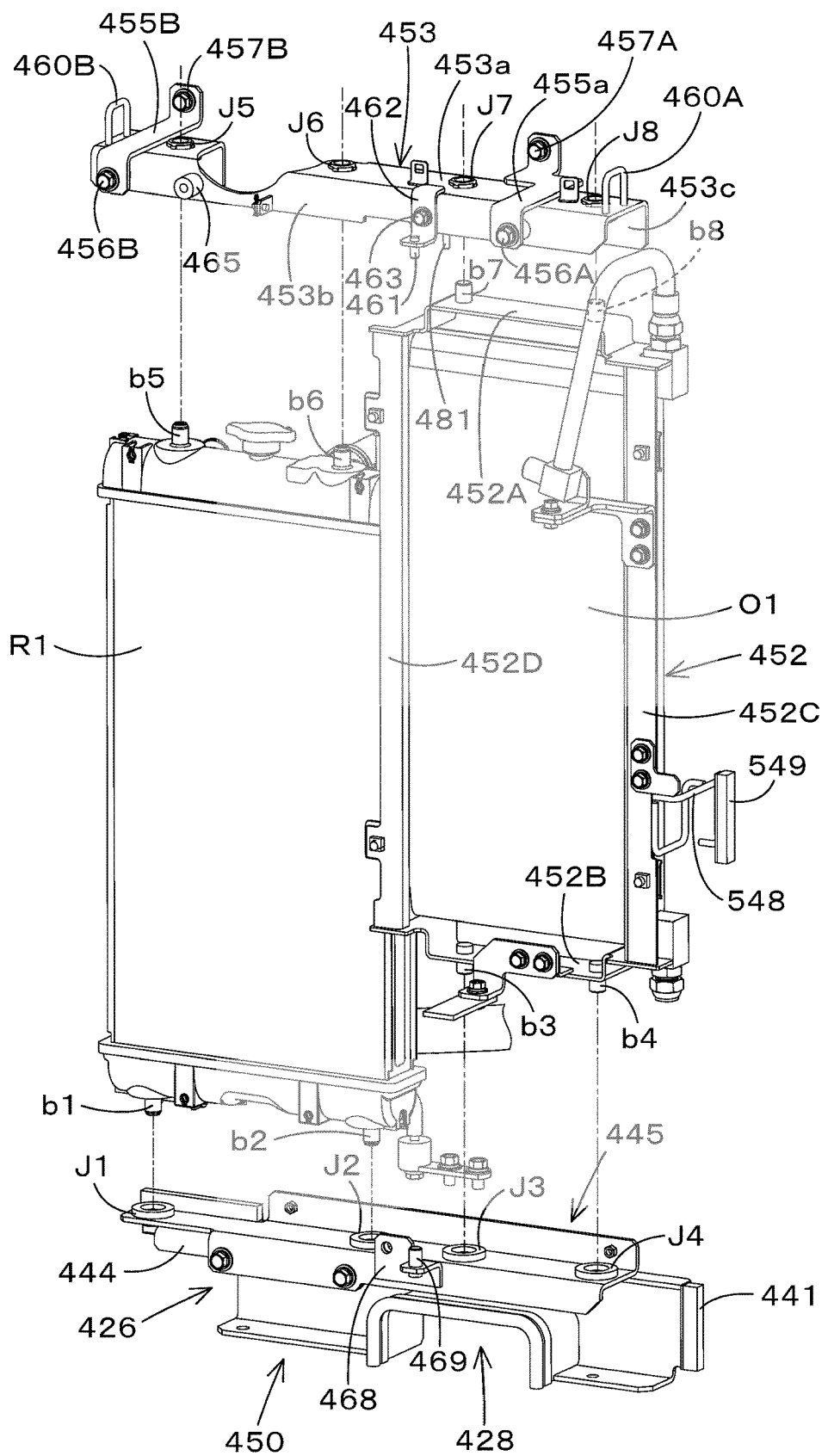
FIG. 63A is a perspective view illustrating development of assembly of a radiator and an oil cooler.

As shown in FIG. 63A, a plurality of pins (first insertion pin b1, second insertion pin b2; first lower protruding portion) protruding downwardly are provided at the bottom of the radiator R1. The first insertion pin b1 is inserted into the first elastic member J1 from above. The second insertion pin b2 is inserted into the second elastic member J2 from above. This causes the radiator R1 to be placed on the support bracket 445 via the first elastic member J1 and the second elastic member J2 (the first mounting member) and supported for vibration isolation.

As shown in FIG. 63A, the oil cooler O1 is attached to the support frame 452. The support frame 452 has an upper frame member 452A located on the upper side of the oil cooler O1, a lower frame member 452B located on the lower side, a front frame member 452C located on the front side, and a rear frame member 452D located on the rear side. The upper frame 452A connects the upper portion of the front frame 452C and the rear frame 452D to each other. The lower frame 452B connects the lower portion of the front frame 452C and the rear frame 452D to each other. The lower frame member 452B is provided with a plurality of pins protruding downwardly (third insertion pin b3, fourth insertion pin b4; the second lower protruding portion). The third insertion pin b3 is inserted into the third elastic member J3 from above. The fourth insertion pin b4 is inserted into the fourth elastic member J4 from above. As a result, the oil cooler O1 is placed on the support bracket 445 via the third elastic member J3 and the fourth elastic member J4 (the first mounting member) and is supported for vibration isolation.

Figure 61:
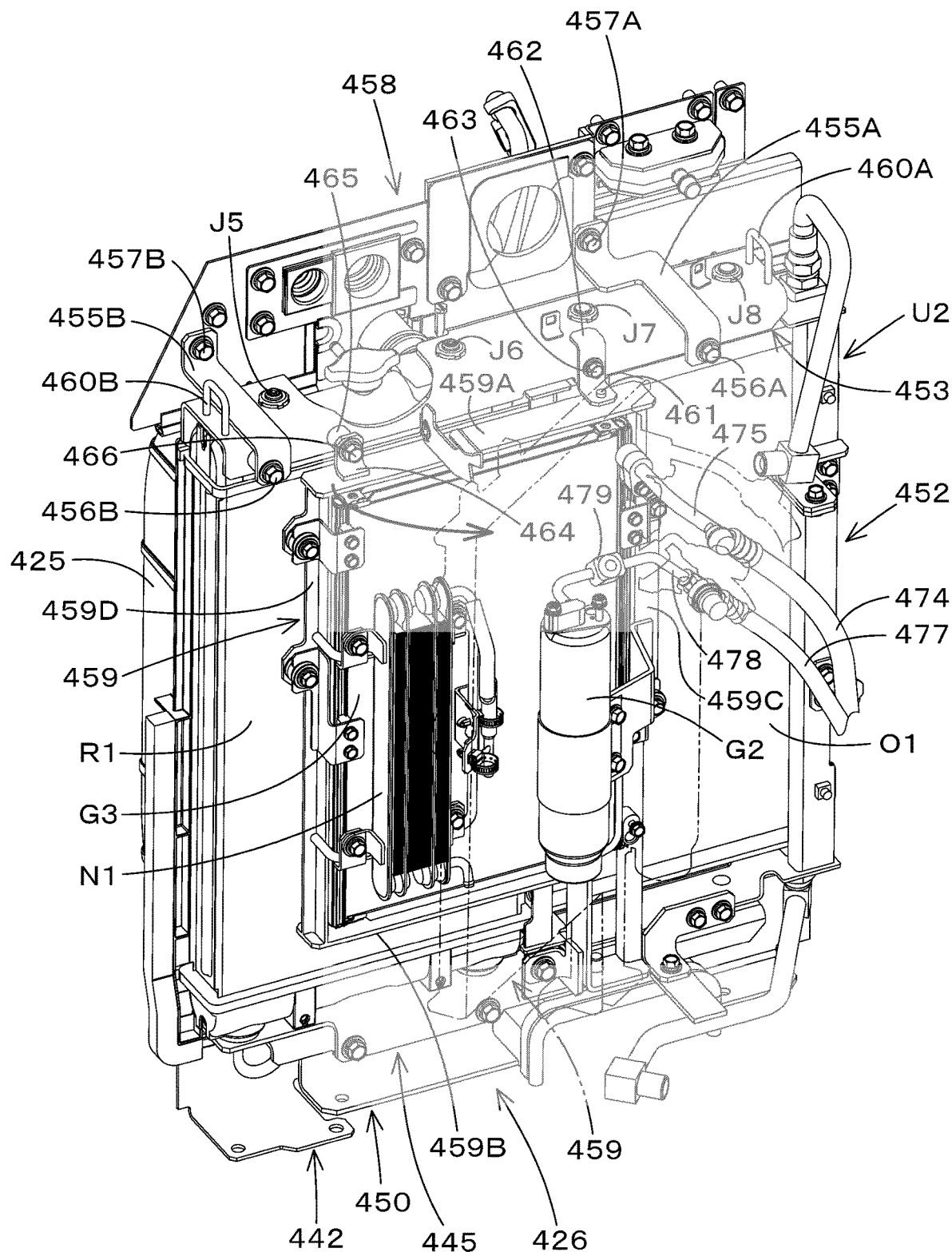
Figure 62:
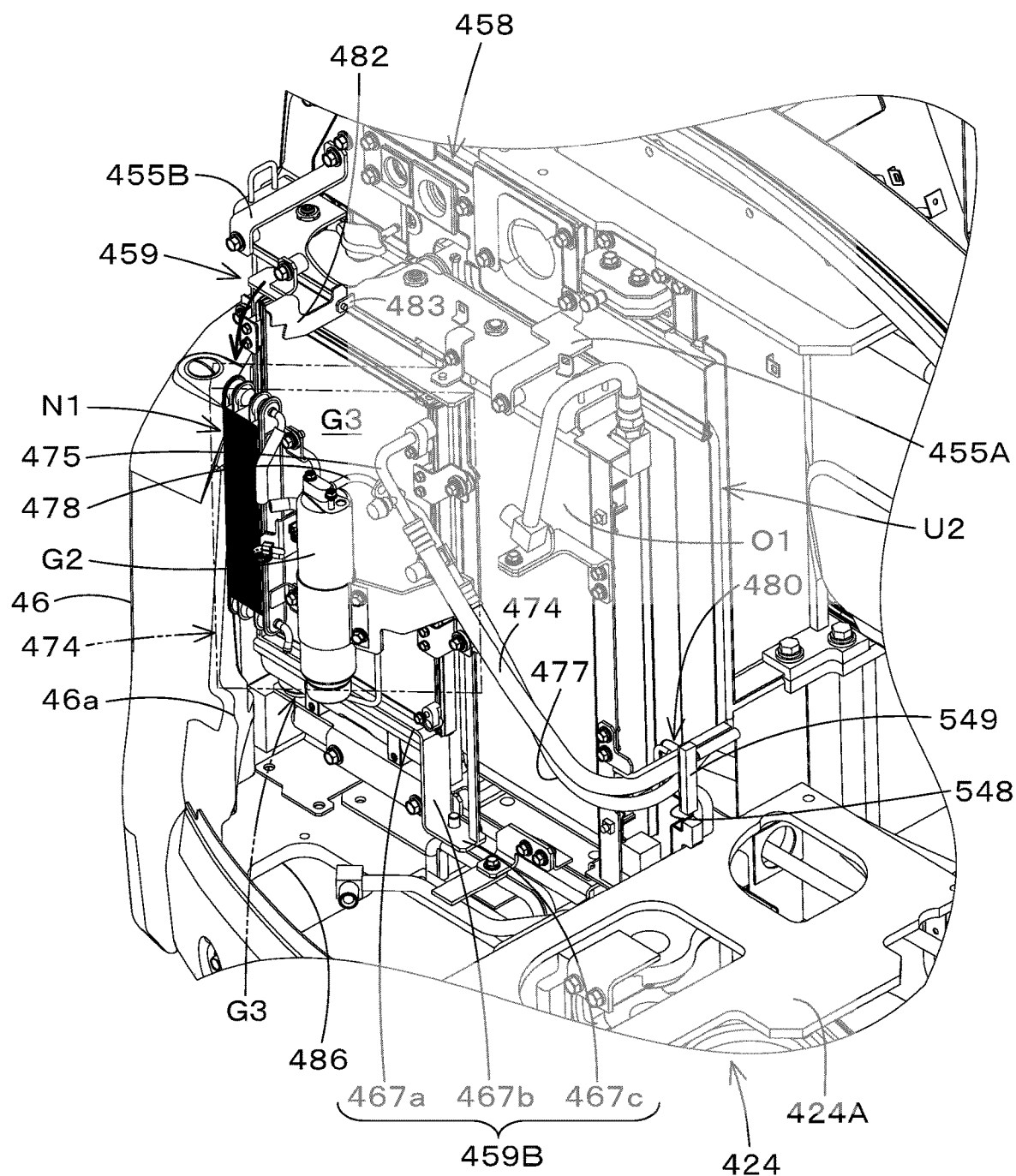
FIG. 62 is a perspective view illustrating a front surface side of an arrangement portion of a cooling device.

As shown in FIG. 61 and FIG. 62, the upper portion of the radiator R1 and the oil cooler O1 is provided with a fitting bracket 453 that is removably fitted to the upper portion of these coolers R1 and O1. The fitting bracket 453 has an upper wall 453a, a first extension wall 453b extending downwardly from the right end potion of the upper wall 453a, and a second extension wall 453c extending downwardly from the left end potion of the upper wall 453a (see FIG. 63B).

The upper wall 453a is located above the coolers R1 and O1. A plurality of second mounting members (fifth elastic member J5, sixth elastic member J6, seventh elastic member J7, eighth elastic member J8; upper elastic member) formed of rubber or other elastic members are spaced in the front-to-rear direction K1 on the upper wall 453a. The fifth and sixth elastic members J5 and J6 are spaced at the rear portion of the fitting bracket 453 in the front-to-rear direction. The seventh elastic member J7 and the eighth elastic member J8 are spaced back and forth at the front portion of the fitting bracket 453. The fifth elastic member J5 to the eighth elastic member J8 have a hole through which a pin can be inserted.

A second mounting member is interposed between the fitting bracket 453 and the radiator R1 and the oil cooler O1, and the radiator R1 and the oil cooler O1 are vibration-proofed and supported on the fitting bracket 453 through this second mounting member.

As shown in FIG. 63A, one end side of the front support stay 455A is attached to the front portion of the first extension wall 453B by a bolt 456A. The other end potion of the support stay 455A is attached to the support frame 11 by a bolt 457A.

As shown in FIG. 63A, one end side of the rear support stay 455B is attached to the rear portion of the first extension wall 453B by a bolt 456B. The other end potion of the support stay 455B is attached to the support frame 11 by a bolt 457B.

Figure 63B:
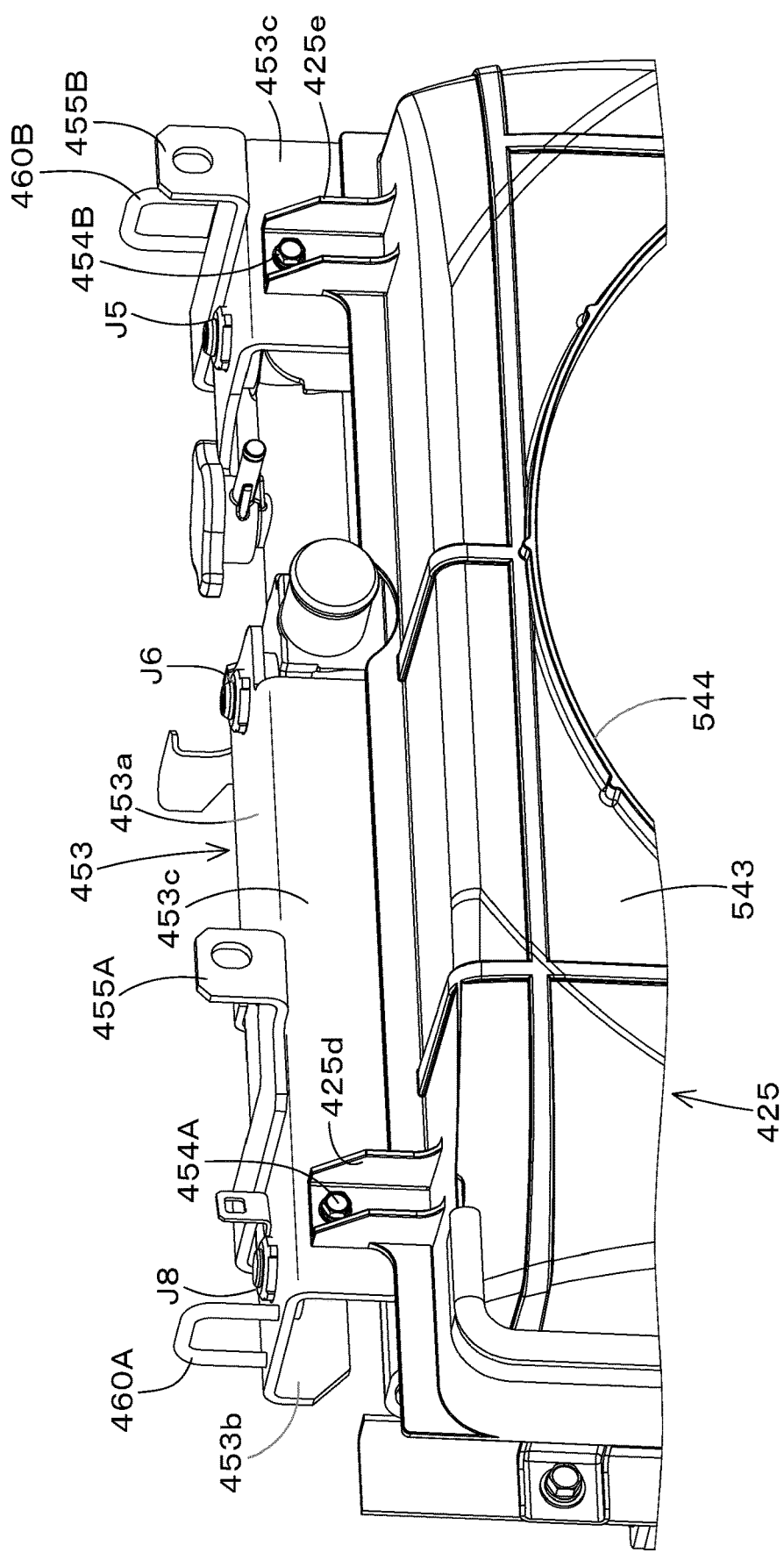
FIG. 63B is a perspective view of an upper portion of a shroud seen from a left side.

As shown in FIG. 63B, the second extension wall 453*c* is divided into front and rear sections. On the front side of the second extension wall 453*c*, a front side stay 425*d* provided at the top front of the shroud 425 is attached to the front side of the second extension wall 453*c* by a bolt 454A. On the rear side of the second extension wall 453*c*, a rear stay portion 425*e* provided at the top rear portion of the shroud 425 is attached to the rear side of the shroud 425 by a bolt 454B.

As shown in FIG. 63A, a plurality of pins protruding upwardly (fifth and sixth insertion pins b5 and b6; the first upper protrusion) are provided in the upper portion of the radiator R1. The fifth insertion pin b5 can be inserted into the fifth elastic member J5. The sixth insertion pin b6 can be inserted into the sixth elastic member J6.

The upper frame member 452A of the support frame 452 is provided with a plurality of pins (the seventh insertion pin b7, the eighth insertion pin b8; the second upper protruding portion) protruding upwardly. The seventh insertion pin b7 can be inserted into the seventh elastic member J7. The eighth insertion pin b8 can be inserted into the eighth elastic member J8.

According to the above configuration, the radiator R1 and the oil cooler O1 can be lifted when the fitting bracket 453 is removed. This allows them to be removed individually from the support bracket 445, respectively, and the radiator R1 and oil cooler O1 can be replaced individually. Accordingly, the configuration can improve serviceability. By arranging the radiator R1 and the oil cooler O1 side-by-side in parallel and supporting the radiator R1 and the oil cooler O1 by the upper and lower mounting members, respectively, the mounting strength can be improved.

As shown in FIG. 56 and FIG. 61, the fitting bracket 453 and the support bracket 445 are connected to by a connecting frame (frame member) 459. A plurality of inverted U-shaped hanging fixing tools 460A and 460B are fixed to the fitting bracket 453. The plurality of hanging fixing tools 460A and 460B include a front hanging fixing tool 460A provided at the front portion of the fitting bracket 453 and a rear hanging fixing tool 460B provided at the rear portion of the fitting bracket 453. The hanging fixing tool may be one hanging fixing tool.

According to the above configuration, with the radiator R1 and oil cooler O1 sandwiched between the fitting bracket 453 and the support bracket 445, and with the fitting bracket 453 and the support bracket 445 connected by the connector frame 459, the cooling device unit U2 including the radiator R1 and the oil cooler O1 can be integrally suspended. Thus, the radiator R1 and the oil cooler O1 can be integrally assembled or removed from the machine body 2, improving the ease of assembly and maintenance of the cooler.

As shown in FIG. 56, the connector frame 459 is a frame member on which the condenser G3 is supported (mounted). Thus, in this embodiment, the cooling device unit U2 including the radiator R1, the oil cooler O1 and the condenser G3 can be integrally assembled or removed with respect to the machine body 2.

The fuel cooler N1 and the receiver G2 are attached to the connector frame 459. Thus, in this embodiment, the cooling device unit U2 including the radiator R1, the oil cooler O1, the condenser G3, the fuel cooler N1, and the receiver G2 can be integrally assembled or removed from the machine body 2.

As shown in FIG. 61, the condenser G3 is arranged on the right side of the radiator R1. The front portion of the condenser G3 is located across the front portion of the radiator R1 and the rear portion of the oil cooler O1 (see FIG. 81 and FIG. 82). The fuel cooler N1 is located to the right and rear portion of the condenser G3. The receiver G2 is located to the right and front of the condenser G3.

As shown in FIG. 61, the connector frame 459 has an upper frame member 459A located above the condenser G3, a lower frame member 459B located below, a front frame member (one end side frame member) 459C located on the front side (one end side), and a rear frame member (other end side frame member) 459D located on the rear side (other end side opposite the one end side). The upper frame 459A connects the upper portions of the front frame 459C and the rear frame 459D to each other. The lower frame member 459B connects the lower portions of the front frame member 459C and the rear frame member 459D to each other.

Figure 66:
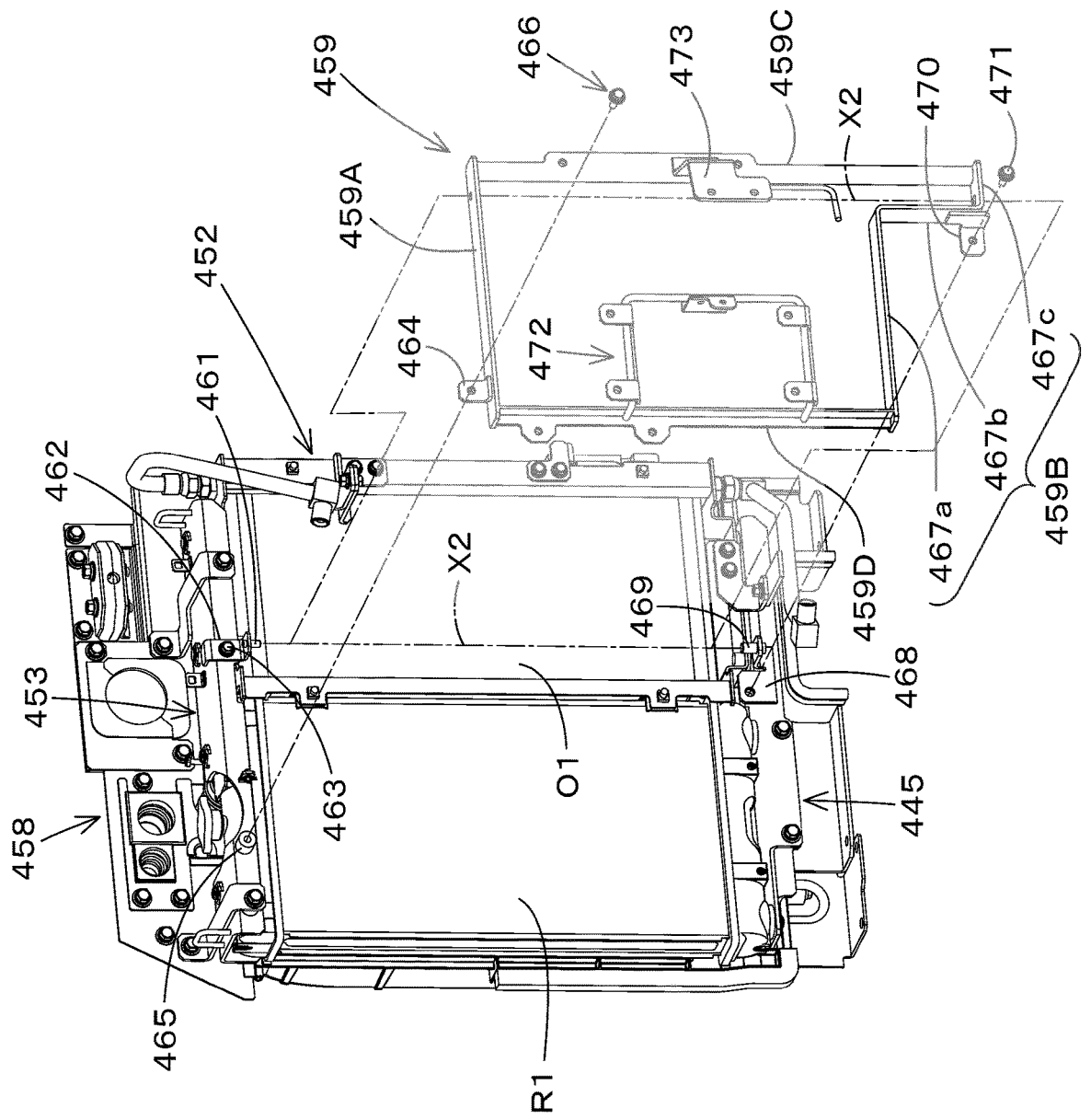
FIG. 66 is a perspective view illustrating a state where a frame member is detached.

As shown in FIG. 61 and FIG. 66, the front portion of the upper frame member 459A is rotatably supported on the fitting bracket 453 by a pivot pin (referred to as the first pivot pin) 461, which is rotatably supported around the vertical axis center. The first pivot pin 461 is provided on a support stay 462 which is detachably attached to the midpoint of the fitting bracket 453 by a bolt 463. The front frame member 459C is located in front of the first pivot pin 461. An attachment stay 464 is fixed to the rear portion of the upper frame member 459A. The attachment stay 464 is detachably attached to a boss 465 at the rear portion of the fitting bracket 453 by a bolt 466. This connects the upper portion of the connector frame 459 to the fitting bracket 453.

As shown in FIG. 66, the lower portion of the rear frame member 459D is shorter than the lower portion of the front frame member 459C. The lower frame member 459B has a first portion 467*a* extending forward from the lower end potion of the rear frame member 459D, a second portion 467*b* extending downwardly from the front end potion of the first portion 467*a*, and a third portion 467*c* extending forwardly from the lower end potion of the second portion 467*b* and connected to the lower end potion of the front frame member 459C. The first portion 467*a* is longer than the third portion 467*c*, and the second portion 467*b* is positioned in close proximity to the front frame member 459C. The front portion of the lower frame member 459B (the third site 467*c*) is rotatably supported by a pivot pin (referred to as the second pivot pin) 469 on the support bracket 445, which is rotatably supported around the vertical axis center. The second pivot pin 469 is provided on a support stay 468 at the midpoint of the support bracket 445.

As shown in FIG. 66, the axis center of the second pivot pin 469 is concentric with the axis center of the first pivot pin 461. That is, the connector frame 459 is supported horizontally with one end side rotatable around the longitudinal axis center (rotational axis center X2), and supports the condenser G3 (the cooler farther away from the prime mover E1) close to and away from the radiator R1 (the cooler arranged on the side near the prime mover E1). The connector frame 459 is opened and closed by rotation around the rotational axis X2, and the condenser G3 is proximate and detached from the radiator R1. In detail, the condenser G3 is supported with the front end side (one end side) rotatable around the rotational axis X2, and the rear end side (other end side) is proximate and detached from the radiator R1.

The direction in which the connector frame 459 is detached from the radiator R1 (detachment direction) is an open direction, and the direction in which the connector frame 459 is close to the radiator R1 is a closed direction. In the present embodiment, the front side of the connector frame 459 is the pivoting side and the rear side is the opening side. The rotational axis center X2 of the connector frame 459 is located closer to the rear side (closer to the rear frame 459D) than the front frame 459C.

As shown in FIG. 66, an attachment stay 470 is secured to the second portion 467b. The attachment stay 470 is detachably attached to the support stay 468 by a bolt 471. This connects the lower portion of the connector frame 459 to the support bracket 445.

Figure 68:
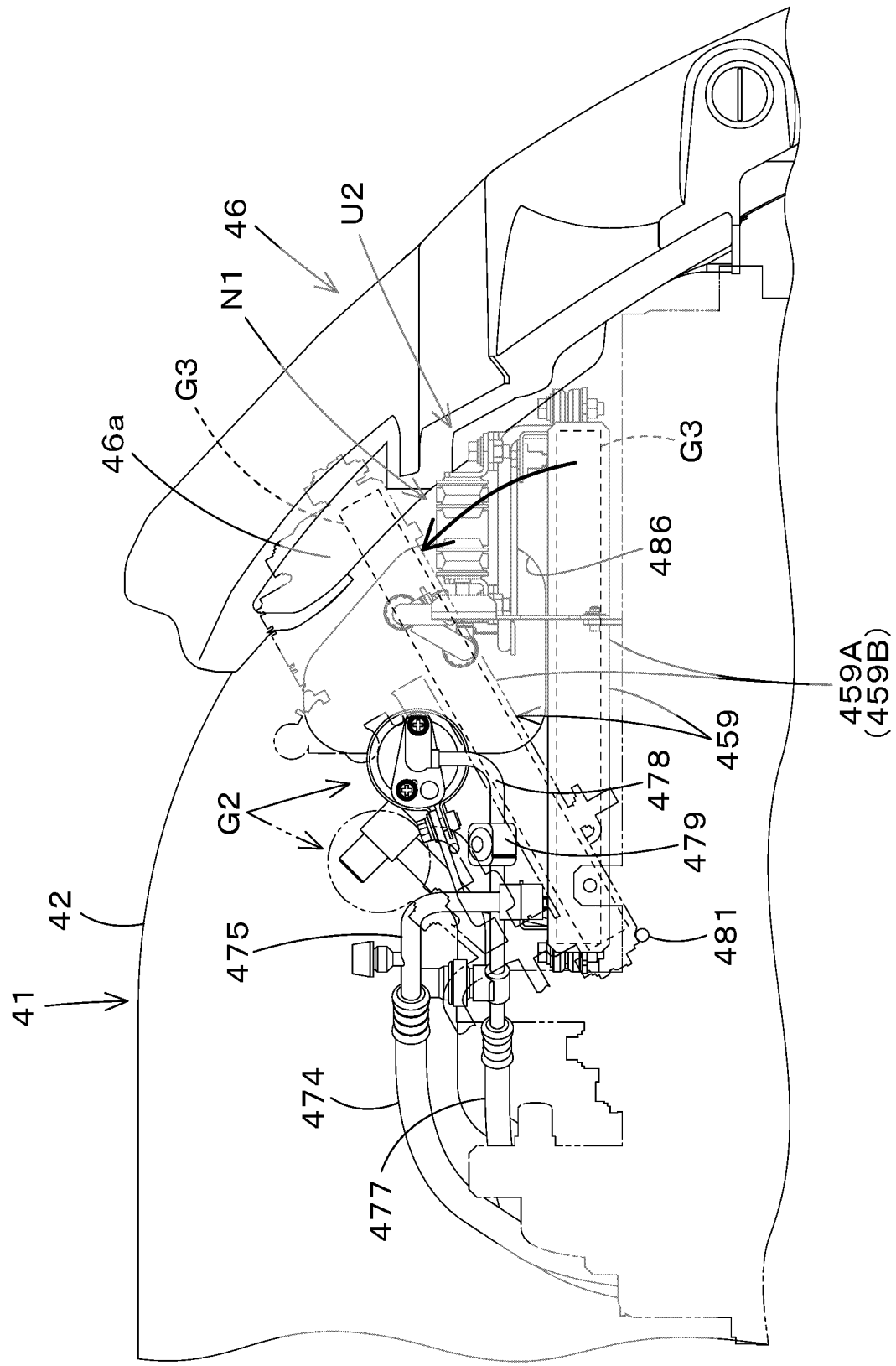
FIG. 68 is a plan view illustrating an arrangement portion of a cooling device.

As shown in FIG. 63A, the fitting bracket 453 has a regulator pin (first regulator portion) 481. The regulator pin 481 is provided in a downward protruding manner at the midpoint of the fitting bracket 453. The regulator pin 481 is a regulator member that regulates the opening angle of the connector frame 459 when the connector frame 459 is rotated in the opening direction, as shown in FIG. 68, by coming into contact with a front upper portion of the connector frame 459. The state in which the opening angle of the connector frame 459 is regulated is referred to as the open state.

Figure 69:
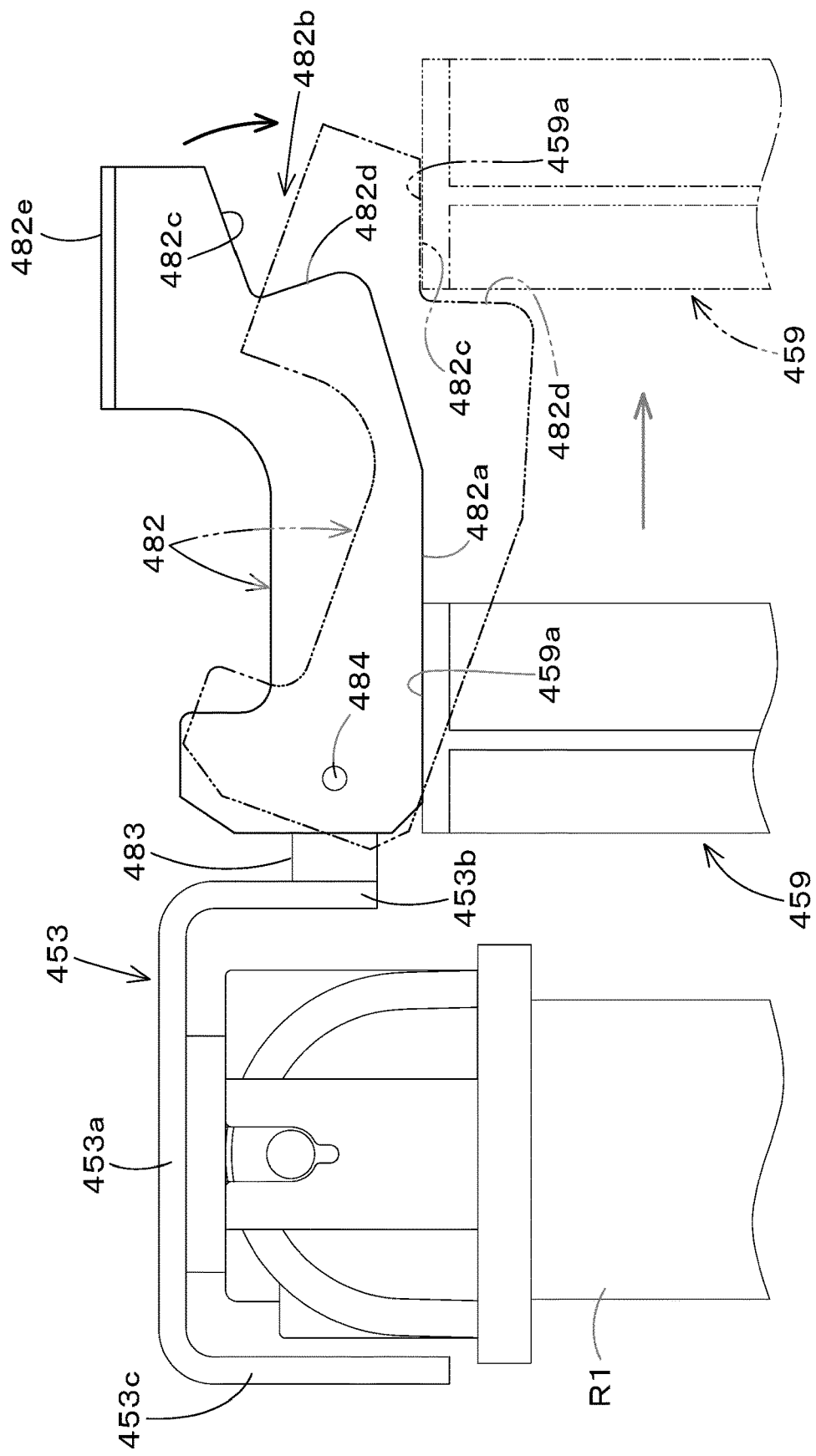
FIG. 69 is a back view illustrating movement of a regulator piece.

As shown in FIG. 62, the fitting bracket 453 has a regulator piece (second regulator portion) 482 and a support piece 483. The regulator piece 482 is provided at the rear portion of the fitting bracket 453. As shown in FIG. 69, the left portion of the regulator piece 482 is pivoted to the support piece 483 via a pivot axis 484. This allows the regulator piece 482 to pivot up and down. The support piece 483 is secured to the first extension wall 453b of the fitting bracket 453. The regulator piece 482 has a lower edge 482a that contacts an upper surface 459a of the connector frame 459. The lower edge 482a is slidable relative to the top surface 459a of the connector frame 459. The regulator piece 482 has a recessed portion 482b at the lower right side. The recessed portion 482b has an upper edge 482c and a side edge 482d and is open on the right side and downward. The regulator piece 482 has a pinch portion 482e at the upper right side.

As shown by the solid line in FIG. 69, when the connector frame 459 is closed, the base of the regulator piece 482 is placed on the top surface 459a of the connector frame 459. When the connector frame 459 is moved from this state in the open direction, the connector frame 459 moves with the upper surface 459a in contact with the lower edge 482a of the regulator piece 482, and when the opening state shown in FIG. 69 is reached, the regulator piece 482 pivots downward so that the recessed portion 482b engages the connector frame 459. Then, the top edge 482c contacts the top surface 459a of the connector frame 459 to regulate the downward pivoting of the regulator piece 482, and the side edge 482d faces the upper left side of the connector frame 459 to regulate the movement of the connector frame 459 in the closing direction. In other words, the regulator piece 482 is a regulator member that regulates the movement of the condenser G3 in the disengagement direction when the condenser G3 is rotated in the disengagement direction away from the radiator R1.

When closing the connector frame 459, the control piece 482 is lifted by grasping the pinch portion 482e. This releases the restriction on movement of the connector frame 459 in the closing direction and allows the connector frame 459 to be closed.

Figure 67:
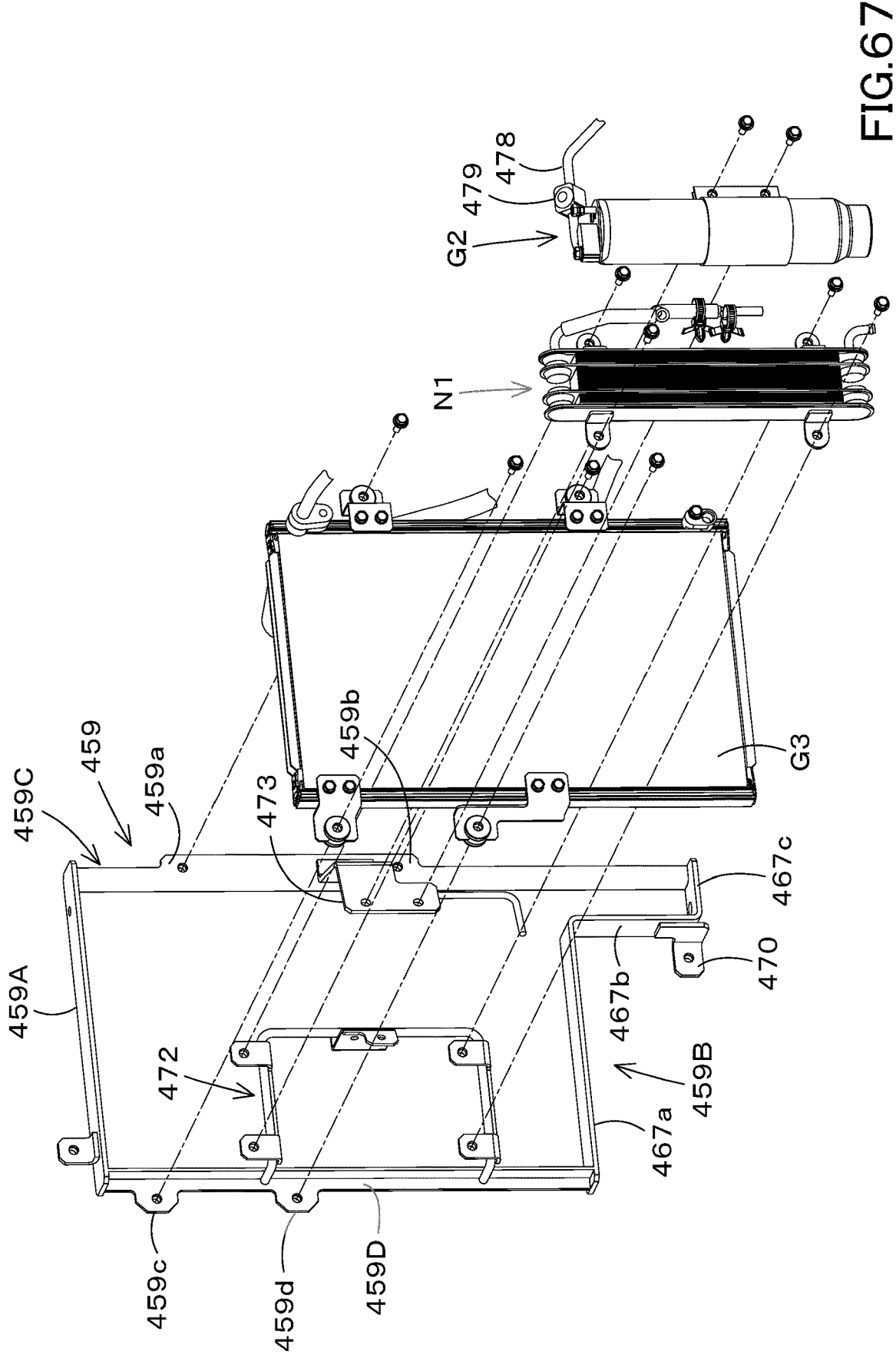
FIG. 67 is a perspective view illustrating development of a frame member, a condenser, a fuel cooler, and a receiver.

As shown in FIG. 67, the front frame 459C and the rear frame 459D have a plurality of mounting sections (attachment portions 459a to 459d) to which the condenser G3 is attached. The condensers G3 are attached to the attachment portions 459a to 459d by bolts. The fuel cooler N1 is mounted on an attachment frame 472 secured to the rear frame member 459D. The receiver G2 is mounted by bolts to an attachment stay 473 secured to the front frame member 459C.

As shown in FIG. 64, the condenser G3 has a first connection joint 475 connecting a coolant hose (referred to as the first coolant hose) 474 to the upper portion of the front end side. The semi-liquid coolant compressed by the compressor G1 is sent to the condenser G3 through the first coolant hose 474 and the first connection joint 475 and the like. The lower portion of the front portion of the condenser G3 and the upper portion of the receiver G2 are connected to the lower portion of the front portion of the condenser G3 and the upper portion of the receiver G2 by the connection hose 476 and the like. The coolant that has been liquefied in the condenser G3 is sent to the receiver G2 via the connecting hose 476, and the like. The receiver G2 has a second connection joint 478 connecting a coolant hose (referred to as the second coolant hose) 477 in the upper portion of the receiver G2. The coolant from which water and impurities are removed by receiver G2 is sent to the air conditioner body 136 via the second connection joint 478 and the second coolant hose 477 and the like.

The first connection joint 475 and the second connection joint 478 are located in the vicinity of the rotational axis center X2. This allows the connector frame 459 (the condenser G3 and the receiver G2) to control the swelling of the first coolant hose 474 and the second coolant hose 477 when the connector frame 459 (the condenser G3 and the receiver G2) moves rotatably toward the open side around the rotational axis X2, and prevents them from interfering with surrounding members. This can also prevent the first coolant hose 474 and the second coolant hose 477 from kinking (being extremely bent and broken).

The first coolant hose 474 and the second coolant hose 477 are arranged in an oblique direction transitioning downwardly as extending forward. As shown in FIG. 64, the first coolant hose 474 and the second coolant hose 477 are arranged on the side of the prime mover room E2 through the insertion portion 480 provided in the shroud 425.

As shown in FIG. 59, the insertion portion 480 is formed by forming a recessed portion 480a at the lower front surface of the shroud 425 and gluing a sealing member 480b to the inner surface of the recessed portion 480a. As shown in FIG. 62, a hose guide 548 is arranged in the vicinity of this insertion portion 480 to guide the first coolant hose 474 and the second coolant hose 477. A sealing member 549 is provided in the hose guide 548. The seal material 549 contacts the hydraulic fluid tank T2 (see FIG. 82).

As shown in FIG. 56, the second connection joint 478 is provided with a gas check member (sight glass) 479 to check the amount of coolant. The sight glass, which checks the coolant status, faces upward. In detail, the visibility surface is an inclined plane that shifts to the left as extending upward.

Figure 65:
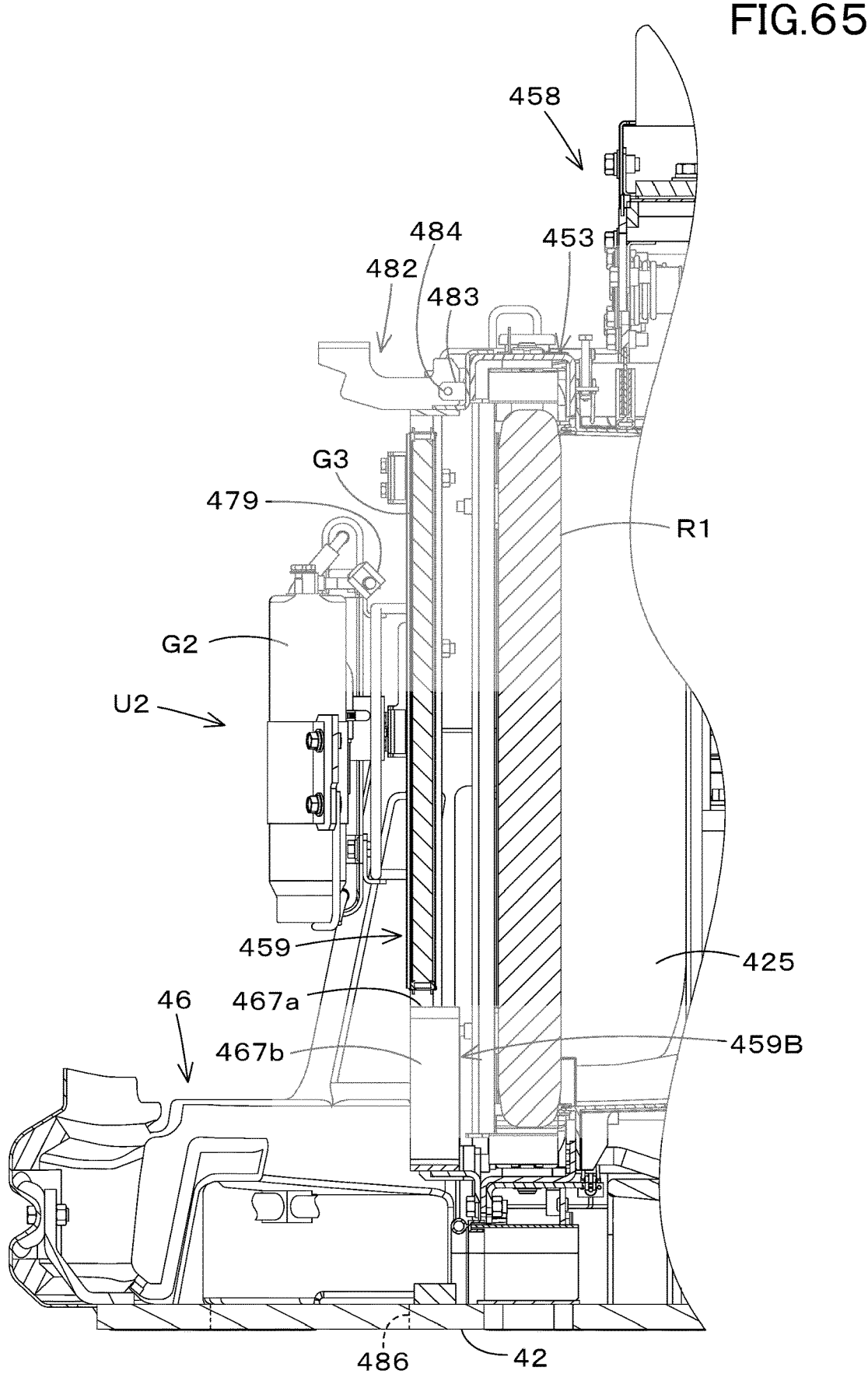
FIG. 65 is a cross section view illustrating FIG. 64 in a Z7-Z7 arrowed line.

As shown in FIG. 64 and FIG. 65, when the first cover member 26 is opened, the right side of the cooling device unit U2 is open (exposed). Thus, with the first cover member 26 open, the gas check member 479 can be easily visible from the right side of the machine body 2, and the coolant can be easily checked.

In the above configuration, by removing the bolts 466 and 471, the connector frame 459 can be rotated around the axis of rotational axis X2 (the axis of the first pivot pin 461 and the axis of the second pivot pin 469), as shown by the virtual line in FIG. 61 and FIG. 68. This allows the condenser G3, the fuel cooler N1, and the receiver G2 to be moved away from the radiator R1 to the right, allowing the core surface (right side) of the radiator R1 or the back side (left side) of the condenser G3 to be cleaned. At this time, the connector frame 459 opens horizontally, so that the radiator R1 and the condenser G3 can be cleaned from a horizontal direction (lateral direction), making cleaning easier.

Since the axis of rotational axis X2 is located farther back than the front frame 459C, when the connector frame 459 is rotated to the open side, the front frame 459C swings to the left side around the axis of rotational axis X2, as shown in FIG. 68. This allows the left side of the front frame member 459C to be cleaned when the connector frame 459 is opened.

As shown in FIG. 62, FIG. 64 and FIG. 68, there is a portion 46a of the weight 46 on the opening side of the connector frame 459. This part of the weight 46 is a seal periphery 46a where the edge of the first cover member 26 contacts the edge of the first cover member 26 through the sealing member. As shown in FIG. 66, the lower portion of the connector frame 459 has an interference avoidance portion upwardly recessed is formed in the lower portion of the connector frame 459 so that the lower portion of the connector frame 459 does not interfere with the seal periphery 46a when the connector frame 459 is rotated in the opening direction. In detail, the interference avoidance portion consists of a first portion 467a and a second portion 467b of the lower frame member 459B.

The connector frame 459 can be removed by removing the bolts 466 and 471 as well as the support stays 462. With the connector frame 459 removed, the fitting bracket 453 can be removed from the radiator R1 and the oil cooler O1 by removing bolts 457A and 457B (see FIG. 61) as well as bolts 454A and 454B (see FIG. 63B).

As shown in FIG. 55, the swivel base plate 42 has a drain hole 486 capable of ejecting foreign matter, such as trash and the like (hereinafter referred to as trash and the like) on the swivel base plate 42. As shown in FIG. 57, the drain hole 486 is formed behind the retainer member 429 and to the right of the rear portion of the base member 450. As shown in FIG. 55 and FIG. 62, the drain hole 486 is formed at the rear (other end side) and right side of the condenser G3. As shown in FIG. 68, the drain hole 486 is formed at a position where it overlaps the condenser G3 and the connector frame 459 (lower frame member 459B) in plan view with the condenser G3 and the connector frame 459 (lower frame member 459B) with the movement of the condenser G3 in the opening direction being regulated by the regulating pin 481. In detail, the first portion 467a of the lower frame member 459B is located above the drain hole 486 with the movement of the condenser G3 in the opening direction regulated by the restrictor pin 481.

Debris and other materials that fall when cleaning the radiator R1 and condenser G3 fall from the drain hole 486. The trash and other debris that does not fall from the drain hole 486 is deposited around the drain hole 486 of the swivel base plate 42 so that it can be easily discharged from the drain hole 486. The dusts and the like deposited around the drain hole 486 can be eliminated with the connector frame 459 closed, but since the lower portion of the connector frame 459 is recessed upwardly from the first and second portions 467a and 467b, the lower portion of the connector frame 459 can be used with the connector frame 459 open, even with the connector frame 459 open, the upper portion of the drain hole 486. Thus, the space is large, making it easy to eliminate trash and other debris.

As shown in FIG. 57, the drain hole 486 is blocked by a lid plate 487 provided on the top side of the swivel base plate 42. As shown in FIG. 58, the lid plate 487 is detachably attached to the upper surface of the swivel base plate 42 from above by bolts 489A and 489B. As a result, the lid plate 487 can be attached and removed from above, and the attachment and removal of the lid plate 487 can be performed easily.

As shown in FIG. 58 and FIG. 59, a guide member 488 is fixed to the lid plate 487. The guide member 488 is a member that guides an arrangement member such as a hose or a harness that is arranged above the swivel base plate 42. The arrangement member is, for example, a fuel hose for distributing fuel, and in this embodiment, the guide member 488 is a hose guide for guiding the return line 393B and the return line 393D, which are fuel hoses. By fixing the guide member 488 to the lid plate 487, the guide member 488 can be used as a gripping member (handle). That is, by holding the guide member 488 and lifting the lid plate 487, the work of opening the drain hole 486 can be easily opened. Conversely, when closing the drain hole 486, the lid plate 487 can also be easily secured to the lid plate 487.

As shown in FIG. 55, a partition structure (second partition structure) 458 is provided on the upper side of the radiator R1 and the oil cooler O1. The partition structure 458 is a structure that divides the prime mover room E2 from the side where the cooler (radiator R1, oil cooler O1, and the like) is located above the shroud 425, as shown in FIG. 70A. The shroud 425 and the partition structure 458 are side members arranged on the side of the prime mover E1.

Figure 70B:
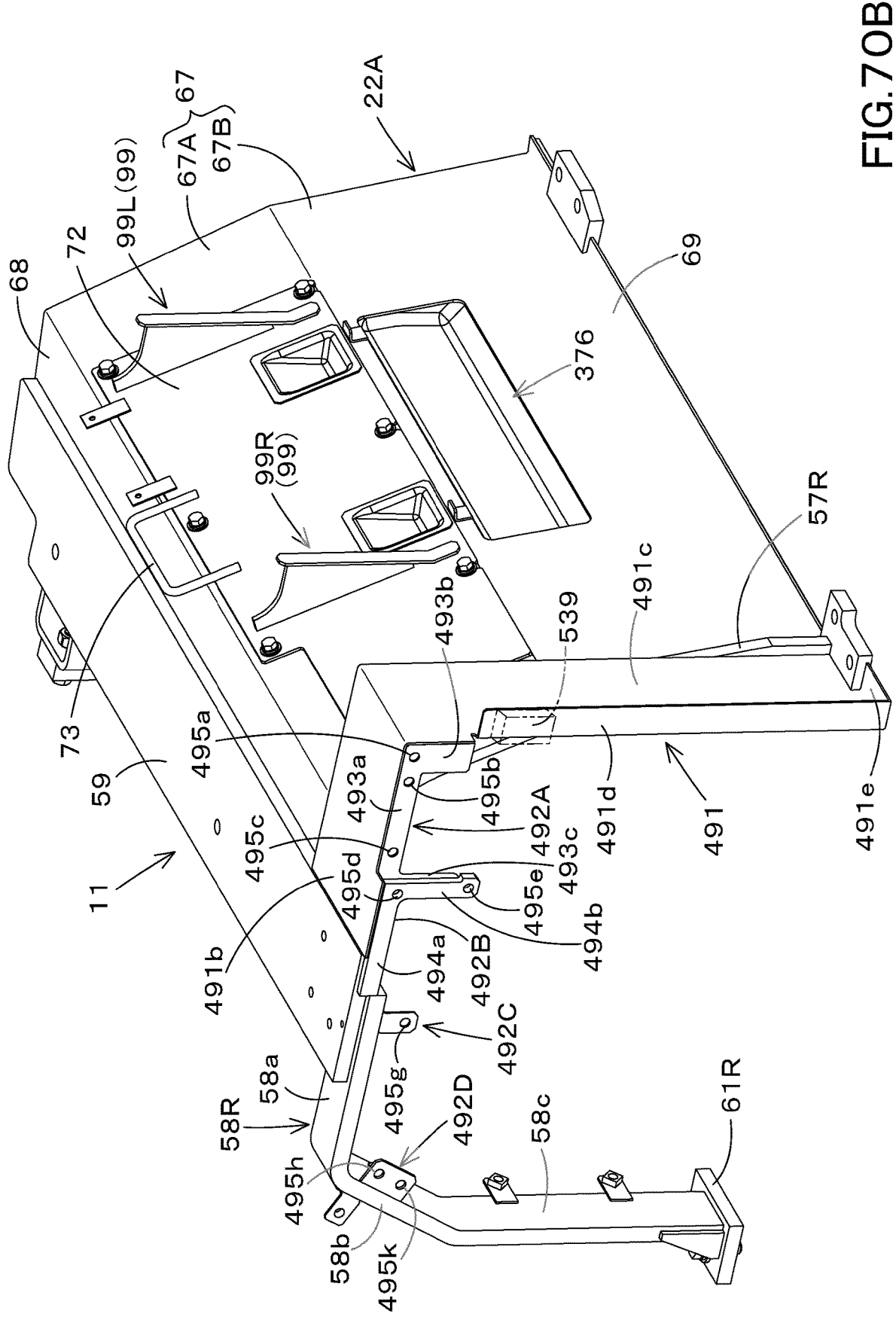
FIG. 70B is a perspective view of a support bracket seen from the left.

As shown in FIG. 30 and FIG. 70B, the support frame 11 has a partition cover 491 that divides the prime mover room E2 on the right side of the bulkhead member 22A. The partition cover 491 is provided on the right front side of the support frame 11. In detail, it is provided on the side of the second front leg 57R, on the side opposite to the bulkhead member 22A.

The partition cover 491 has a side wall portion 491a, an upper wall portion 491b, a front wall portion 491c, a contact wall 491d, and a lower wall portion 491e. The side wall portion 491a is in contact with and welded to the right side of the second front leg 57R. The side wall portion 491a protrudes forward from the second front leg 57R. The upper wall portion 491b extends rightward (laterally) from the upper end potion of the side wall portion 491a. The front wall 491c is extended downwardly from the front end potion of the top wall 491b and is connected to the front end potion of the side wall 491a. The contact wall 491d is extended forward from the right end (side end) of the front wall portion 491c. A seal block 539 is affixed to the top of the contacting wall 491d (see FIG. 72). The lower wall portion 491e is extended leftwardly from the lower end potion of the contacting wall 491d and is connected to the lower end potion of the front wall portion 491c.

The shroud 425 is arranged on the right side of the prime mover E1, the partition structure 458 is arranged above the shroud 425, and the partition cover 491 is arranged between the partition structure 458 and the shroud 425 and the second front leg 57R. Thus, the upper wall portion 491b of the partition cover 491 covers the upper portion between the prime mover E1 and the shroud 425 and the partition structure 458 (side members). The front wall portion 491c covers the front between the prime mover E1, the shroud 425 and the partition structure 458.

As shown in FIG. 70B, the second rear leg 58R has an upper portion 58a, the front portion of which is fixed to the lower surface of the upper plate 59 and protrudes rearwardly from the upper plate 59, an inclined intermediate portion 58b, which transitions downwardly from the upper portion 58a as extending rearwardly, and a lower portion 58c, which extends downwardly from the lower end potion of the intermediate portion 58b and to which the second rear attachment plate 61R is fixed at the lower end.

As shown in FIG. 70B, a plurality of mounting members (first mounting members 492A to fourth mounting members 492D) are provided on the upper right side of the partition cover 491 and on the upper portion of the second rear leg 58R to which the partition structure 458 is attached.

The first attachment member 492A is a first portion 493a secured to the front right end potion of the upper wall 491b of the partition cover 491, a second portion 493b extending downward from the front portion of the first portion 493a and secured to the upper right end potion of the front wall 491c, and a third portion 493c extending downward from the rear end potion of the first portion 493a. The first portion 493a has a plurality (three) of insertion holes 495a, 495b and 495c are formed in the first portion 493A, spaced in the front-to-rear directions. A nut is fixed to a portion corresponding to each of the insertion holes 495a, 495b and 495c on the left side of the first attachment member 492A. The contact wall 491d is formed below the second portion 493b.

The second attachment member 492B has a first portion 494a provided from the right end rear portion of the upper wall 491b over the upper plate 59, and a second portion 494b extending downwardly from the front portion of the first portion 494a and secured to the third portion 493c of the first attachment member 492A. An insertion hole 495d is formed in front of the first portion 494a and an insertion hole 495e is formed at the bottom of the second portion 494b. A nut is fixed to a site corresponding to each of the insertion holes 495d and 495e on the left side of the second attachment member 492B.

The third attachment member 492C is fixed to the front subordinate surface of the upper portion 58a of the second rear leg 58R. An insertion hole 495g is formed in the third attachment member 492C. A nut is fixed to the site corresponding to the insertion hole 495g on the left side of the third attachment member 492C.

The fourth attachment member 492D is fixed to the middle portion 58b of the second rear leg 58R. A plurality (two) of insertion holes 495h and 495k are formed in the fourth attachment member 492D. A nut is fixed to the site corresponding to each of the insertion holes 495h and 495k on the left side of the fourth attachment member 492D.

As shown in FIG. 70A, partition structure 458 blocks the space housed by the top end potion of the shroud 425, the upper portion 58a and middle portion 58b of the second rear leg 58R, and the top of the partition cover 491. The partition structure 458 has a main plate 496, a first subplate 497, a second sub plate 498, and a piping bracket 499.

As shown in FIG. 70A, the main plate 496 is provided above the shroud 425 and over the middle portion 58b of the second rear leg 58R from the contact wall 491d of the partition cover 491.

Figure 71:
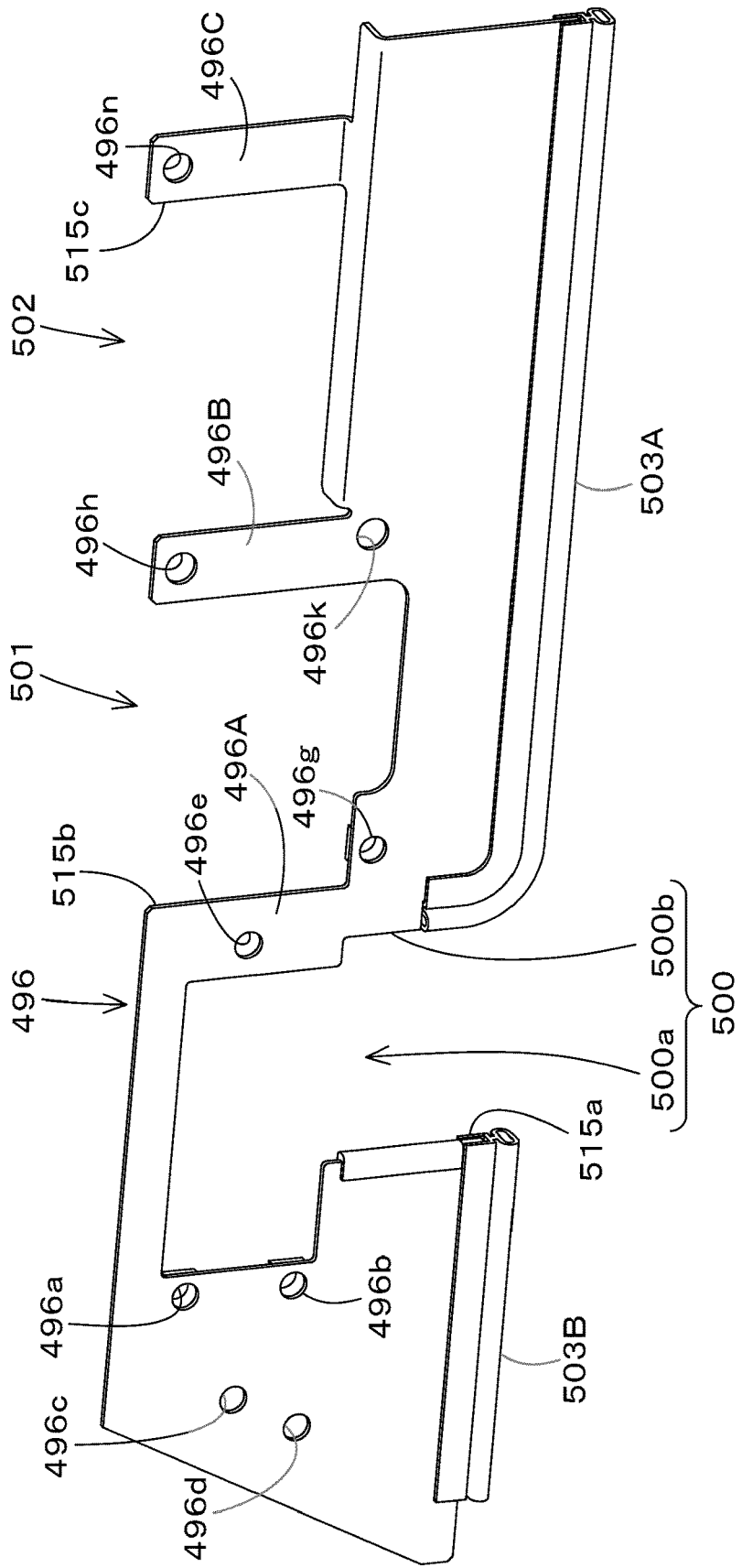
FIG. 71 is a perspective view of a main plate.

As shown in FIG. 71, the main plate 496 has a first notch portion 500 opened downwardly, a second notch portion 501 opened upwardly, and a third notch portion 502 opened upwardly.

Figure 73:
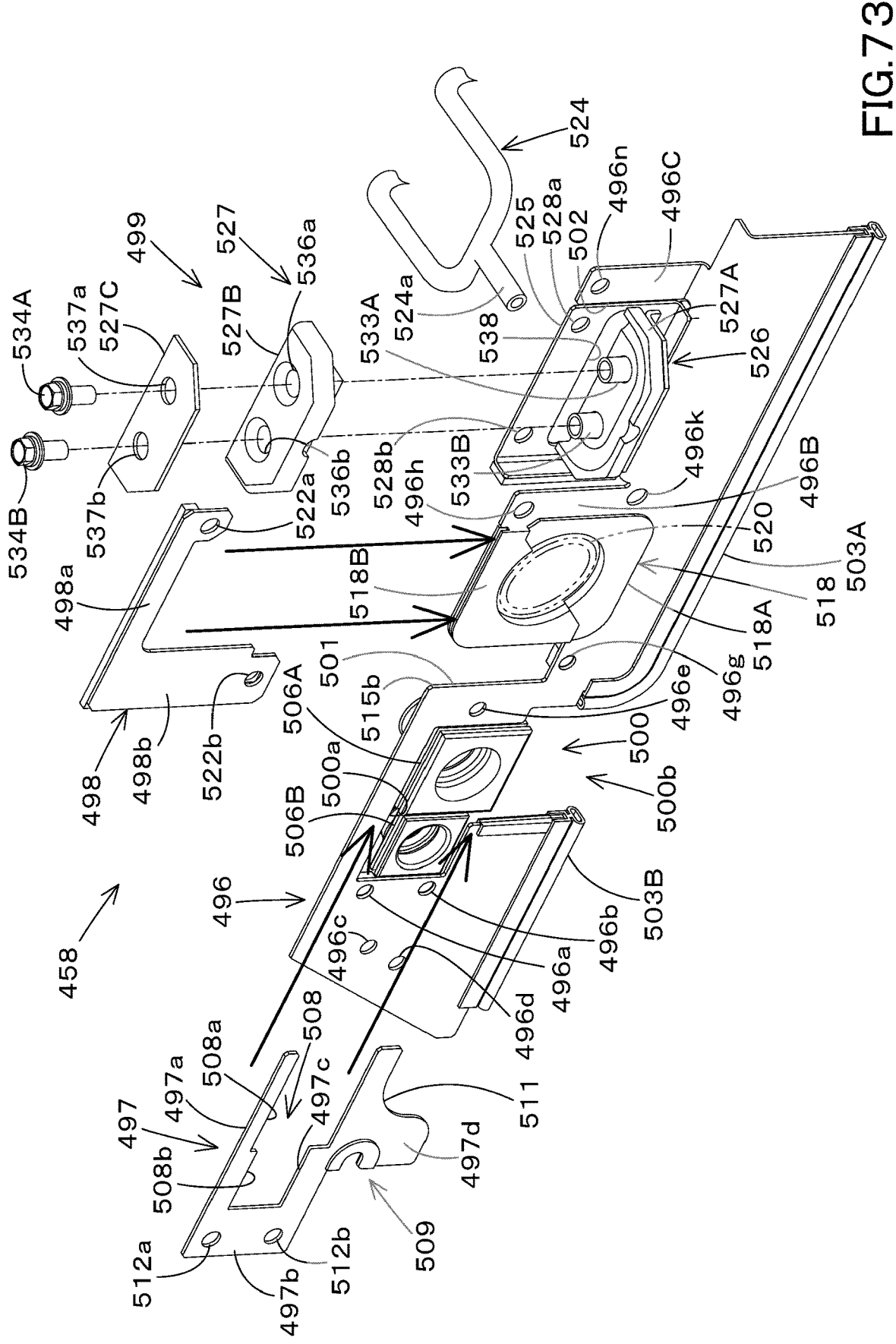
FIG. 73 is a perspective view illustrating development of a partition structure body.

As shown in FIG. 71, the first notch portion 500 has an upper portion 500a formed at the rear and top of the main plate 496 and a lower portion 500b formed at the rear and bottom of the main plate 496. The lower front end potion of the upper portion 500a and the upper end potion of the lower portion 500b are connected to each other. The lower portion 500b has a first opening portion 515a which opens downwardly. As shown in FIG. 73, a grommet 506A (referred to as the first grommet) and a grommet 506B (referred to as the second grommet) are arranged in the upper portion 500A side by side in the front-to-rear direction.

Figure 74:
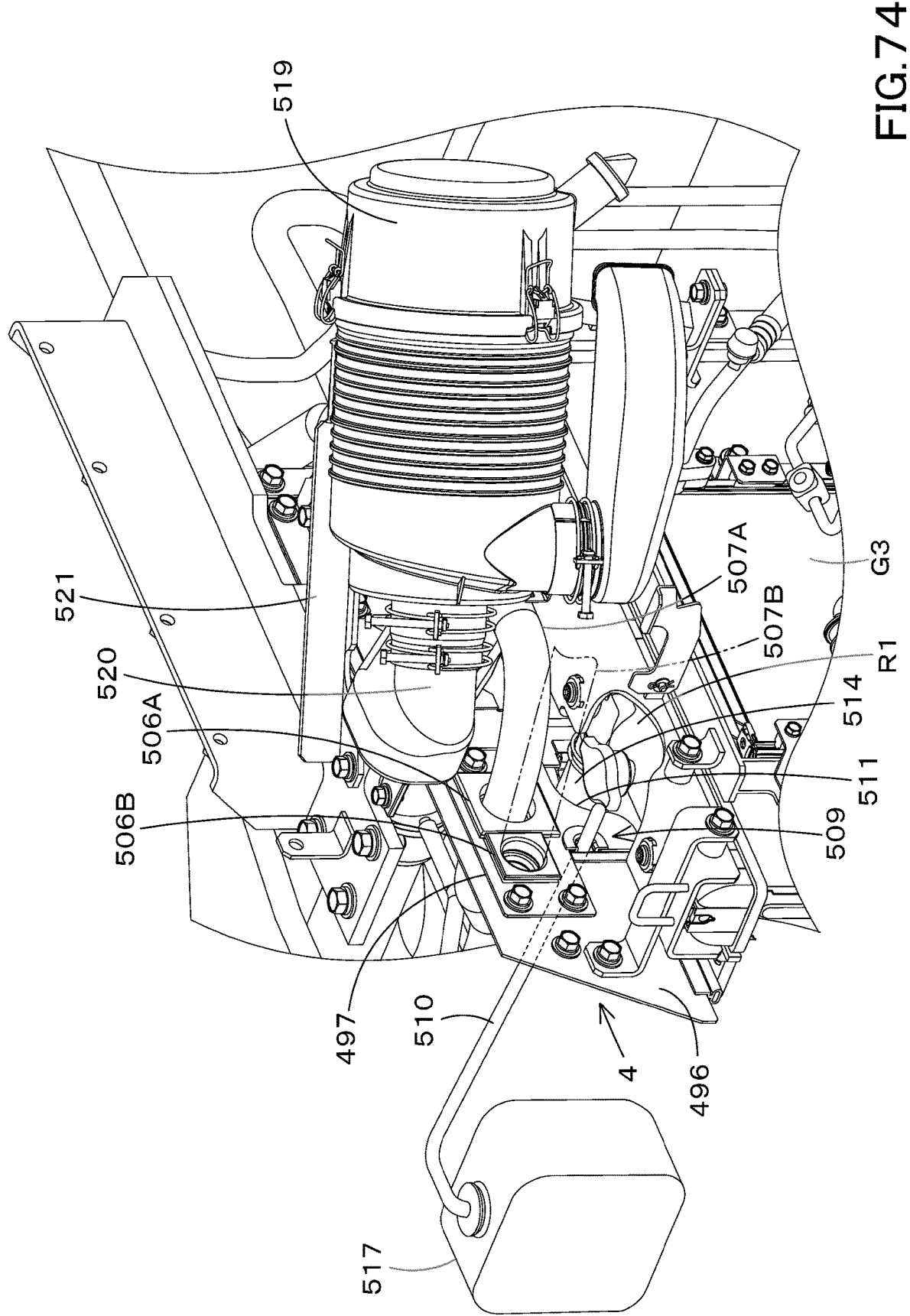
FIG. 74 is a perspective view illustrating a state where a harness, hose and the like are inserted to the partition structure body.

As shown in FIG. 74, a harness 507A (arrangement member), which bundles a plurality of electrical wires, is inserted into the first grommet 506A. The second grommet 506B also has a harness 507B (an arrangement member) inserted into the second grommet 506B. That is, the harnesses 507A and 507B are arranged over the arrangement side of the cooler and the prime mover room E2 through the first notch portion 500, and are connected to the prime mover E1 side.

As shown in FIG. 71, a plurality (four) of insertion holes 496a to 496d are formed at the rear portion of the main plate 496. The insertion holes 496a and the insertion holes 496b are spaced vertically behind the upper portion 500a. The insertion holes 496c and the insertion holes 496d are formed vertically spaced behind the insertion holes 496a and 496b. A nut is fixed to the part corresponding to the insertion holes 496a and 496b on the left side of the main plate 496.

As shown in FIG. 71, the second notch portion 501 is provided at the midpoint of the main plate 496 in the front-to-rear direction K1 (in the middle of an substantially center). The second notch portion 501 has a second opening portion 515b that opens upwardly. An insertion hole 496e is formed in the wall portion 496A between the upper portion 500a and the second notch portion 501 in the main plate 496. An insertion hole 496g is formed in the rear subordinate side of the second notch portion 501 in the main plate 496. A nut is fixed to the portion corresponding to the insertion hole 496g on the left side of the main plate 496.

The third notch portion 502 is formed in the front portion of the main plate 496. The third notch portion 502 has a third opening portion 515c that opens upwardly. A plurality (two) of insertion holes 496h and 496k are formed in the wall 496B between the second notch portion 501 and the third notch portion 502 in the main plate 496, spaced in the vertical direction. The wall portion 496C forming the front portion of the third notch portion 502 in the main plate 496 is formed with the insertion holes 496n.

As shown in FIG. 71, the seal material 503A and the seal material 503B are fitted to the lower edge of the main plate 496. The sealing member 503A is located behind the first notch portion 500 and the sealing member 503B is located forward of the first notch portion 500. As shown in FIG. 70A, the main plate 496 contacts the upper surface of the top wall 542A of the shroud 425 through the seal material 503A and the seal material 503B.

Figure 72:
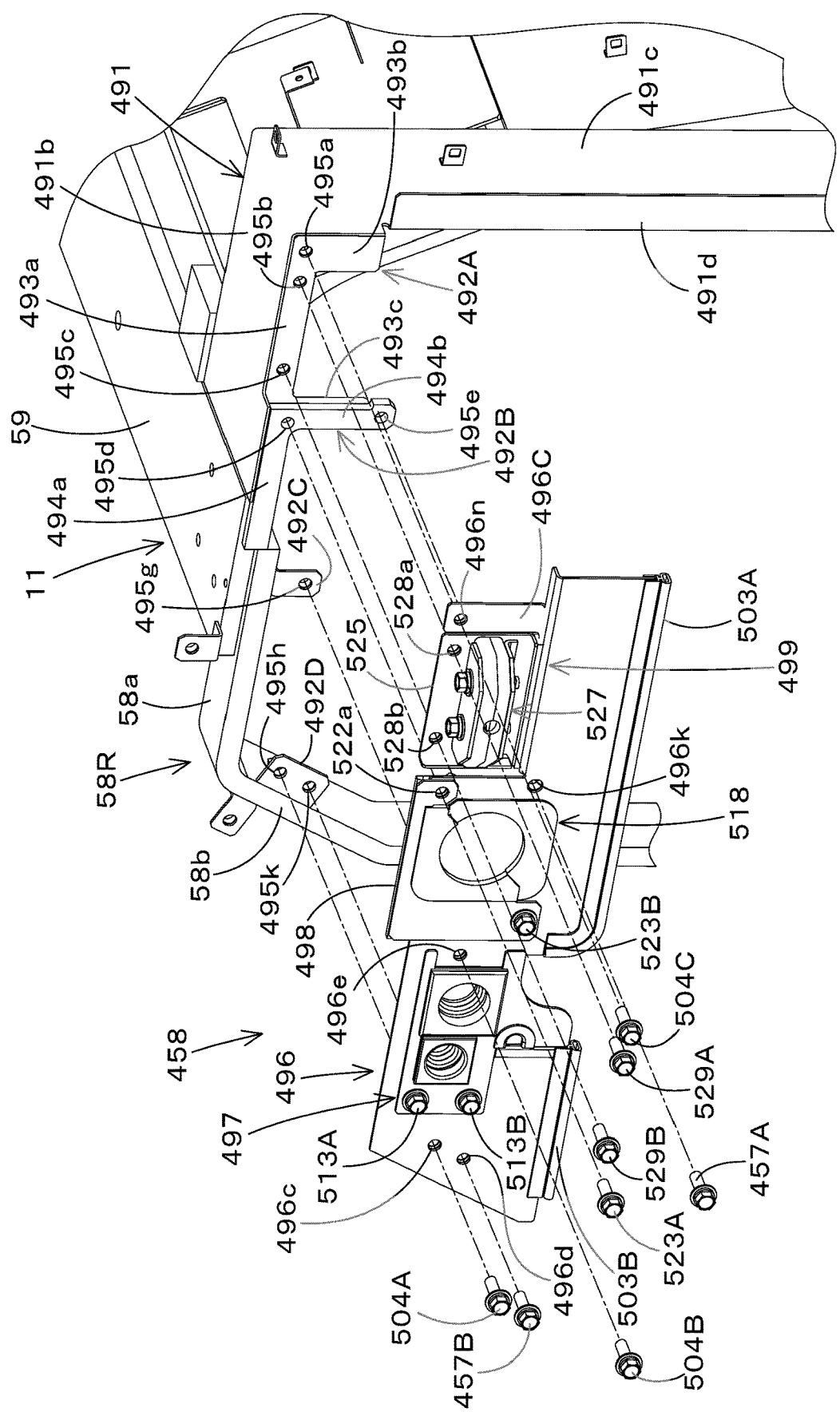
FIG. 72 is a perspective view illustrating development of attachment of a partition structure body.

As shown in FIG. 70A and FIG. 72, the main plate 496 is detachably attached to the attachment member 492A to the attachment member 492D by bolts 504A to 504C. Bolt 504A inserts through the insertion holes 496C and 495H and screws to a nut secured to the left side of the fourth mounting member 492D. The bolt 504B inserts insertion hole 496*e* and insertion hole 495*g* and screws to a nut fixed to the left side of the third attachment member 492C. The bolt 504C inserts insertion holes 496*n* and insertion holes 495*a* and screws to a nut fixed to the left side of the first attachment member 492A.

As shown in FIG. 72, bolt 457A (the bolt that attaches the other end potion of the support stay 455A) is inserted through the insertion holes 496*k* and 495*e*, and is screwed to a nut fixed to the left side of the second attachment member 492B. The bolt 457B (the bolt attaching the other end potion of the support stay 455B) inserts the insertion holes 496*d* and 495*k* and screws to a nut fixed to the left side of the fourth attachment member 492D.

As shown in FIG. 73, the first sub plate 497 has a first portion 497*a*, a second portion 497*b*, a third portion 497*c*, and a fourth portion 497*d*. The first portion 497*a* forms the upper portion of the first subplate 497 and extends in the front-to-rear direction K1. The second portion 497*b* extends downwardly from the rear portion of the first portion 497*a*. The third portion 497*c* extends forward from the lower portion of the second portion 497*b*. The fourth portion 497*d* extends forward and downwardly from the third portion 497*c*. The first sub plate 497 has a forward-opening notch opening portion 508 formed by the first portion 497*a* and the third portion 497*c* and the fourth portion 497*d*. The notch opening portion 508 has a first opening portion 508*a* on the front side and a second opening portion 508*b* on the rear side. The first opening portion 508*a* and the second opening portion 508*b* are connected to each other. An insertion hole 512*a* and an insertion hole 512*b* are formed behind the notched opening portion 508 in the first subplate 497.

As shown in FIG. 70A, the first subplate 497 is arranged such that the notch opening portion 508 corresponds to the upper portion 500*a* of the first notch portion 500 and is fixed to the main plate 496 by bolts 513A and 513B. In detail, the bolt 513A is screwed to a nut secured to the left side of main plate 496 by inserting the insertion hole 512*a* and the insertion hole 496*a*. The bolt 513B is screwed to a nut fixed to the left side of the main plate 496 by inserting the insertion hole 512*b* and the insertion hole 496*b*. The first grommet 506A is held by the upper and lower edges of the first opening portion 508A, and the second grommet 506B is held by the upper, lower and rear edges of the second opening portion 508B. In detail, grooves for fitting are formed all around the outer end surface of the first grommet 506A and the second grommet 506B, and the first grommet 506A and the second grommet 506B are retained by fitting the edges of the notched opening portion 508 into the grooves. The first sub plate 497 engages the first grommet 506A and the second grommet 506B by moving forward from the rear side of the first notch portion 500.

As shown in FIG. 73, a rearwardly opening U-shaped insertion portion 509 is provided at the top of the rear portion of the fourth portion 497D. The insertion portion 509 includes a U-shaped trim fitted to the edge of a U-shaped notch opening at the rear. The insertion portion 509 is a portion through which the reservoir hose (first hose) 510 is passed, as shown in FIG. 74. The reservoir hose 510 is a hose connecting the reservoir tank 517 and the radiator R1, where the prime mover room E2 is located, and is arranged through the first notch portion 500. The reservoir tank 517 is a tank for temporary storage of excess cooling liquid due to the temperature of the cooling liquid cooling the prime mover E1 rising and expanding in volume. The fourth portion 497*d* is a cover portion covering the first notch portion 500 in the perimeter of the reservoir hose 510.

As shown in FIG. 73, an L-shaped notch portion 511 with a curved corner portion is formed in the front lower portion of the third portion 497*c*. The upper hose (second hose) 514 of the radiator R1 is inserted into the insertion space formed by this L-shaped notch portion 511 and the lower portion 500*b* of the first notch portion 500 (see FIG. 70A and FIG. 74). The upper hose 514 is a hose for distributing a cooling liquid to cool the prime mover E1 and is arranged through the first notch portion 500 over the prime mover room E2 and the arrangement side of the radiator R1. As shown in FIG. 70A, the edge of the L-shaped notch portion 511 is fitted with a sealing member 516 that contacts to the upper hose 514. The fourth portion 497*d* is a cover portion covering the first notch portion 500 in the perimeter of the upper hose 514.

In the partition structure 458 of the above configuration, the main plate 496 is attached to the support frame 11 before the support frame 11 is assembled to the swivel frame 41. The reservoir tank 517 is attached to the support frame 11 before the main plate 496 is attached to the support frame 11. The reservoir hose 510 is connected to the reservoir tank 517 before the main plate 496 is installed to the main plate 496. The support frame 11 is assembled to the swivel frame 41 after the prime mover E1 is mounted. Thus, the harnesses 507A and 507B and the upper hose 514 are assembled before the support frame 11 is assembled to the swivel frame 41. The harness 507A is inserted first into first grommet 506A and the harness 507B is also inserted first into second grommet 507B before the support frame 11 is assembled into the swivel frame 41.

To assemble the support frame 11 to the swivel frame 41, the support frame 11 is assembled by lifting the support frame 11 and lowering it onto the swivel frame 41 from above. At this time, the first sub plate 497 is removed from the main plate 496. This allows the harnesses 507A and 507B, the reservoir hose 510 and the upper hose 514 to be inserted into the first notch portion 500 from below through the first opening portion 515*a*. After assembling the support frame 11 to the swivel frame 41, the first sub plate 497 is attached to the main plate 496. First, the first sub plate 497 is fitted into the first and second grommets 506A and 507B, and the reservoir hose 510 is inserted into the insertion portion 509, and the sealing member 516 is pressed against the upper hose 514. Thereafter, the first subplate 497 is bolted to the main plate 496. This allows the first grommet 506A and the second grommet 507B to be held and the harness 507A and 507B, the upper hose 514 and the reservoir hose 510 to be held, and the first notch portion 500 in the periphery of the upper hose 514 and the reservoir hose 510 to be covered.

As described above, the support frame 11 and the partition structure 458 can be assembled with the harnesses 507A and 507B, the upper hose 514 and the reservoir hose 510 preassembled.

When replacing the harnesses 507A and 507B and the like, the harnesses 507A and 507B can be removed simply by removing the first subplate 497, which improves the ease of maintenance.

As shown in FIG. 74, an air cleaner 519 is provided on the arrangement side of the cooler. The air cleaner 519 is supported by a bracket member 521 attached to the support frame 11. The intake air duct 520 connecting the air cleaner 519 to the prime mover E1 is arranged through the second notch portion 501 over the arrangement side of the cooler and the prime mover room E2. The intake air duct 520 is also attached to the support frame 11.

As shown in FIG. 70A, a duct seal 518 is provided in the second notch portion 501 that covers the perimeter of the intake duct 520. The duct seal 518 is divided into a first seal member 518A and a second seal member 518B. The first seal member 518A is held by an edge of the second notch portion 501. In detail, a groove for fitting is formed on the front and lower surface of the first seal member 518A, and the first seal member 518A is held in place by fitting the front edge (edge) and the lower edge (edge) of the second notch portion 501 into the groove.

The second seal member 518B is retained by the second subplate 498. The second subplate 498 has a first portion 498a and a second portion 498b. The first portion 498a includes an upper portion of the second subplate 498 and extends in the front-to-rear direction K1. The second portion 498b extends downwardly from the rear portion of the first portion 498a. A groove for fitting is formed in the top and rear ends of the second seal member 518B, and the second seal member 518B is held in place by fitting the lower edge of the first portion 498a of the second sub plate 498 into the groove of the top end and by fitting the front edge of the second portion 498b of the second sub plate 498 into the groove of the rear edge.

An insertion hole 522a is formed in the front portion of the first portion 498a. An insertion hole 522b is formed in the lower portion of the second portion 498b. The second sub plate 498 is detachably attached to the main plate 496 by bolts 523A and 523B. In detail, as shown in FIG. 72, the bolt 523A is screwed to a fixed nut on the left side of the second attachment member 492B by inserting through the insertion hole 522a and the insertion hole 495d. The bolt 523B is screwed to a nut secured to the left side of the main plate 496 by inserting the insertion hole 496g and screwing it to a nut secured to the left side of the main plate 496.

In the above configuration, the partition structure 458 is assembled to the support frame 11 with the air cleaner 519 and the intake air duct 520 supported by the support frame 11. In the assembly of the partition structure 458, the main plate 496 is attached to the support frame 11 with the second sub plate removed. Since the second notch portion 501 is open upwardly, the intake duct 520 can be inserted into the second notch portion 501 through the second opening portion 515b by moving the main plate 496 upwardly from the lower side of the intake duct 520. The first sealing member 518A of the duct seal 518 is retained on the main plate 496 before inserting the intake air duct 520 into the second notch portion 501. The second sealing member 518B of the duct seal 518 is arranged in the second notch portion 501 after inserting the intake air duct 520 into the second notch portion 501. The second sub plate 498 is then attached to the main plate 496.

As described above, the partition structure 458 can be assembled to the support frame 11 with the air cleaner 519 and the intake air duct 520 preassembled to the support frame 11.

Figure 75:
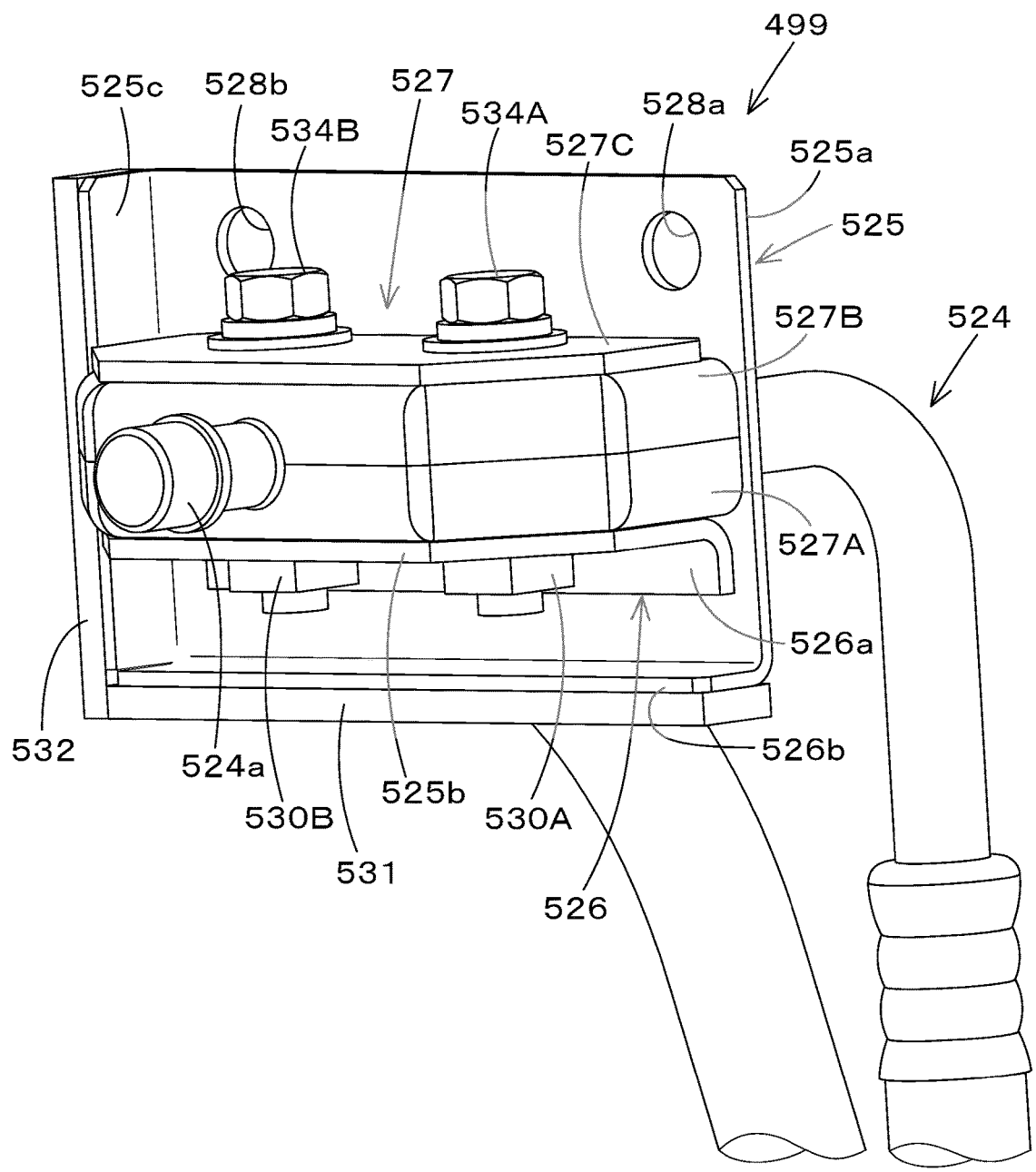
FIG. 75 is a perspective view of a piping bracket.

As shown in FIG. 73 and FIG. 75, the piping bracket 499 is a member that holds the piping member 524 for the air conditioner device. The piping member 524 has a charge port 524a to which a charge hose for injecting coolant is connected. The piping member 524 is formed in two halves, with one pipe of the two halves being connected to the compressor G1 and the other pipe being connected to the air conditioner device 136 side.

As shown in FIG. 73, the piping bracket 499 has a bracket body 525, an attachment bracket 526, and a piping clamp 527. The bracket body 525 is formed from a plate material and has a longitudinal wall 525a with a plate surface facing the machine width direction K2, a lower wall 525b extending rightward from a lower end potion of the longitudinal wall 525a, and a rear wall 525c extending rightward from a rear end potion of the longitudinal wall 525a. A plurality of (two) insertion holes 528a and 528b are formed in the upper portion of the vertical wall 525a at intervals in the front-to-rear direction K1. At the midpoint of the vertical wall 525a in the vertical direction, a long through hole 538 is formed in the front-to-rear direction K1. On the lower surface of the lower wall 525b, a sealing member 531 is adhered to the lower edge of the third notch portion 502. On the rear surface of the rear wall 525c, a sealing member 532 is adhered to the rear surface of the rear wall 525c that contacts the third portion 493c of the first attachment member 492A.

As shown in FIG. 70A and FIG. 72, the vertical wall 525A is attached to the first attachment member 492A by bolts 529A and 529B. In detail, bolt 529A is screwed to a nut secured to the left side of the first attachment member 492A by inserting the insertion hole 528a and the insertion hole 495b. The bolt 529B is screwed to a nut fixed to the left side of the first attachment member 492A by inserting the insertion hole 528b and the insertion hole 495c and screwed to a nut fixed to the left side of the first attachment member 492A.

As shown in FIG. 75, the attachment bracket 526 is formed by a plate material and has a fixed wall 526a fixed in contact with the lower right side of the longitudinal wall 525a, and a receiving wall 526b extended from the upper end potion of the fixed wall 526a to the right. A nut 530A and a nut 530B are provided on the lower surface of the receiving wall 526b, spaced in the front-to-rear direction K1.

As shown in FIG. 75 and FIG. 73, the piping clamp 527 has a lower clamping member 527A, an upper clamping member 527B, and a push plate 527C. The lower clamping member 527A is placed on the receiving wall 526B. The lower clamping member 527A has an insertion cylinder 533A and an insertion cylinder 533B spaced in the front-to-rear direction K1 (see FIG. 73). The upper clamping member 527B is superimposed on the lower clamping member 527A with the piping member 524 in between. The upper clamping member 527B has insertion holes 536A and insertion holes 536B spaced in the front-to-rear direction K1. The piping member 524 is interposed between the lower clamp member 527A and the upper clamp member 527B so that the charge port 524a faces to the right (the side of the cooler arrangement). The push down plate 527C is placed on the upper clamping member 527B. The push down plate 527C has insertion holes 537A and insertion holes 537B spaced in the front-to-rear direction K1. The piping clamp 527 is secured to the attachment bracket 526 by bolts 534A and bolts 534B.

As shown in FIG. 73, the bolt 534A is screwed to the nut 530A (see FIG. 75) by inserting the insertion hole 537a and the insertion hole 536a and inserting the insertion cylinder 533A. The bolt 534B is screwed to the nut 530B (see FIG. 75) by inserting the insertion hole 537B and the insertion hole 536B, and inserting the insertion cylinder 533B.

In the partition structure 458 of the above configuration, the piping member 524 is assembled to the support frame 11 with the piping member 524 preassembled. In the assembly, the bracket main body 525 is first attached to the support frame 11 with the piping clamp 527 removed. Thereafter, the main plate 496 is installed to the support frame 11. At this time, since the third notch portion 502 is opened upwardly, by moving the main plate 496 upwardly from below the bracket main body 525, the third notch portion 502 fits into the bracket main body 525 from below, and the bracket main body 525 can be inserted into the third notch portion 502. Next, the support frame 11 is assembled to the swivel frame 41. Thereafter, the two-legged portion of the piping member 524 is arranged from the side of the prime mover room E2 to the side of the cooler arrangement through the through hole 538. Next, fix the two-legged portion of the piping member 524 to the attachment bracket 526 by the piping clamp 527.

As described above, the support frame 11 and the partition structure 458 can be assembled with the piping member 524 preassembled.

Figure 76A:
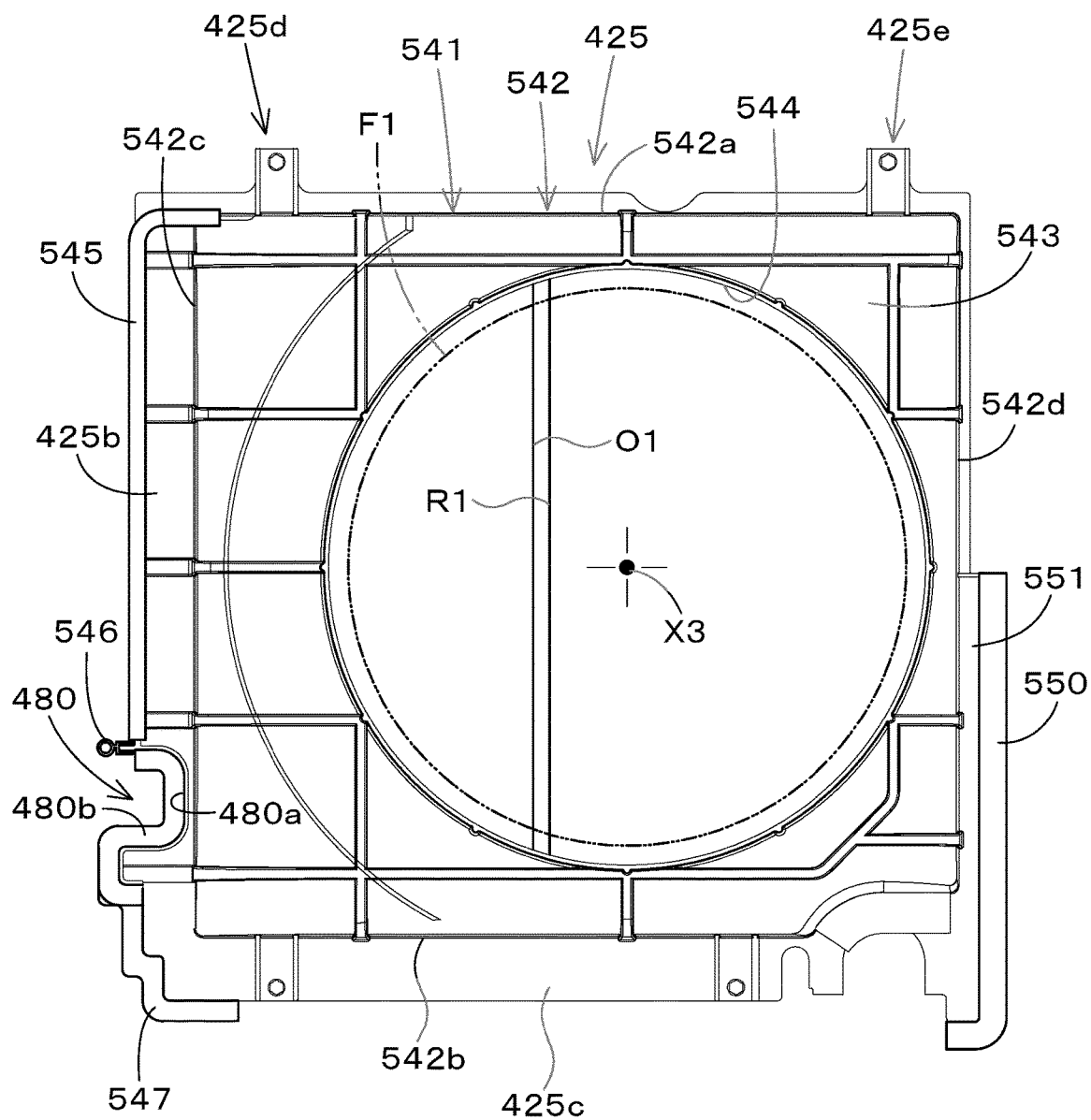
FIG. 76A is a right side view of a shroud.
Figure 81:
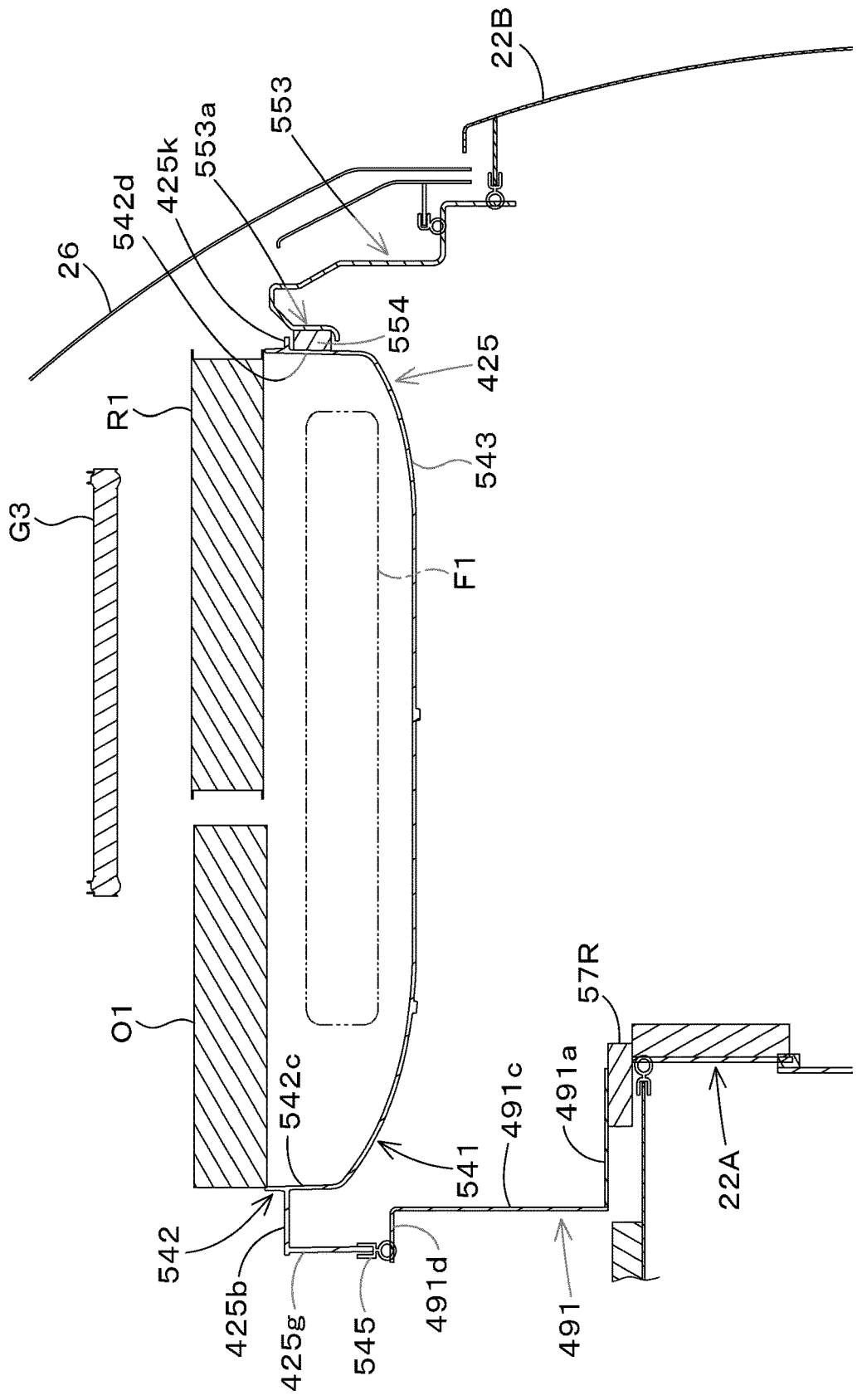
FIG. 81 is a cross section view illustrating FIG. 64 in a Z8-Z8 arrowed line.

As shown in FIG. 76A, the shroud 425 has a shroud body (the main body portion of the shroud 425) 541. The shroud body 541 is the portion that houses the cooling fan F1, as shown in FIG. 81 and FIG. 82.

Figure 76B:
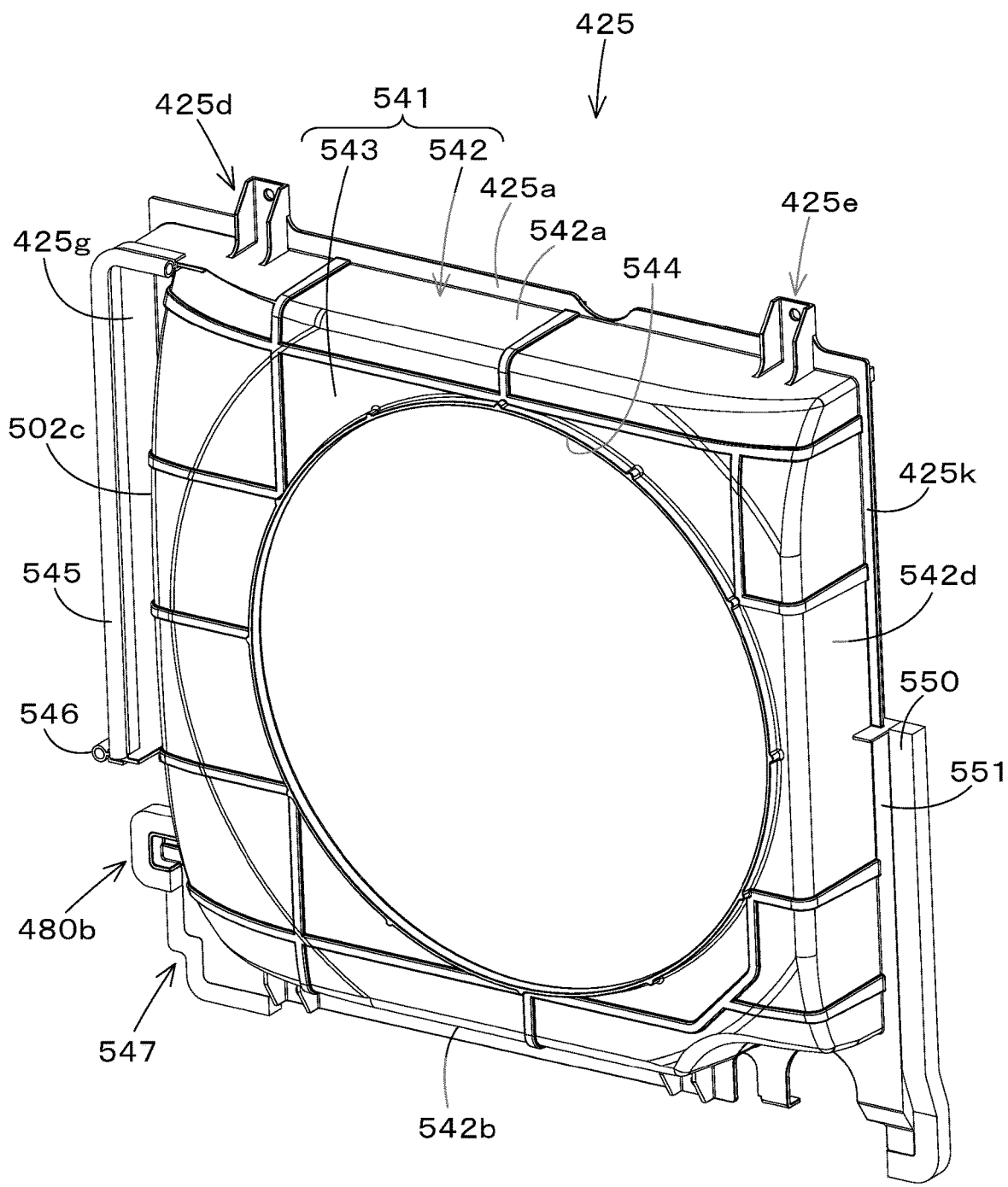
FIG. 76B is a perspective view of a shroud seen from upper rear side on the right.

As shown in FIG. 76A and FIG. 76B, the shroud body 541 has a perimeter wall portion 542 covering the perimeter (periphery) of the cooling fan F1 and a side wall portion 543 covering the left side of the perimeter wall portion 542. As shown in FIG. 81 and FIG. 82, the right side of the shroud body 541 is open. The radiator R1 and the oil cooler O1 are arranged on the right side of the shroud body 541. As shown in FIG. 82, a width of the shroud body 541 in the front-to-rear direction is formed to a width W8 corresponding to the radiator R1 and the oil cooler O1 in the front-to-rear direction. The width W8 of the shroud body 541 in the front-to-rear direction has a wider width W10 on the front side from the axis of rotation X3 for the width W9 on the rear side from the axis of rotation X3 of the cooling fan F1. The front end side of the partition cover 491 is provided at a position corresponding to the front end side of the shroud 425.

Figure 76C:
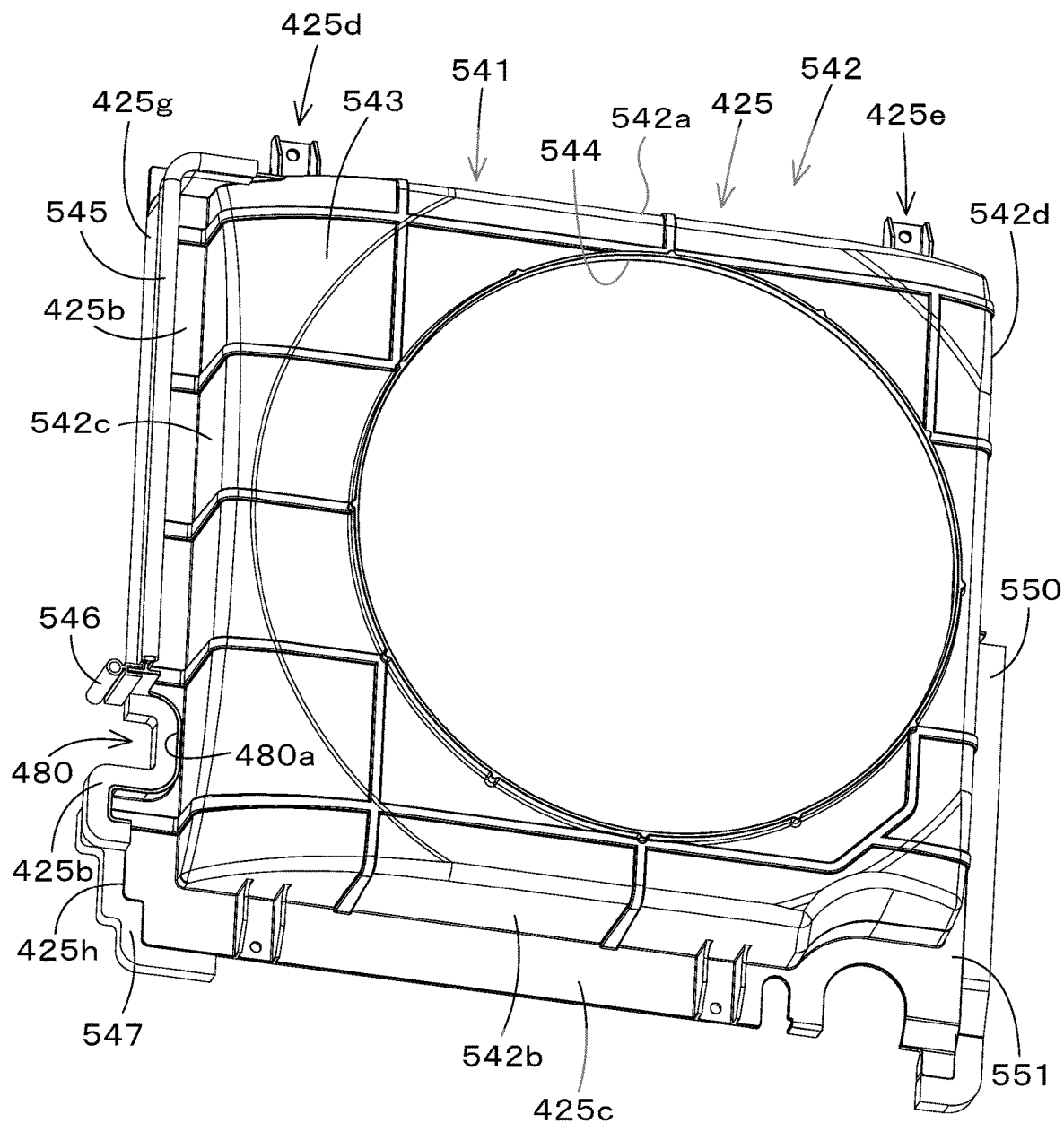
FIG. 76C is a perspective view of a shroud.

As shown in FIG. 76A to FIG. 76C, the perimeter wall portion 542 has an upper wall 542a covering the upper portion of the cooling fan F1, a lower wall 542b covering the lower portion of the cooling fan F1, a front wall 542c covering the front portion of the cooling fan F1, and a rear wall 542d covering the rear portion of the cooling fan F1. The side wall 543 has an airflow opening portion 544 corresponding to an outer circle of the cooling fan F1. The cooling air generated by the cooling fan F1 is blown toward the prime mover E1 through the airflow opening portion 544.

Figure 82:
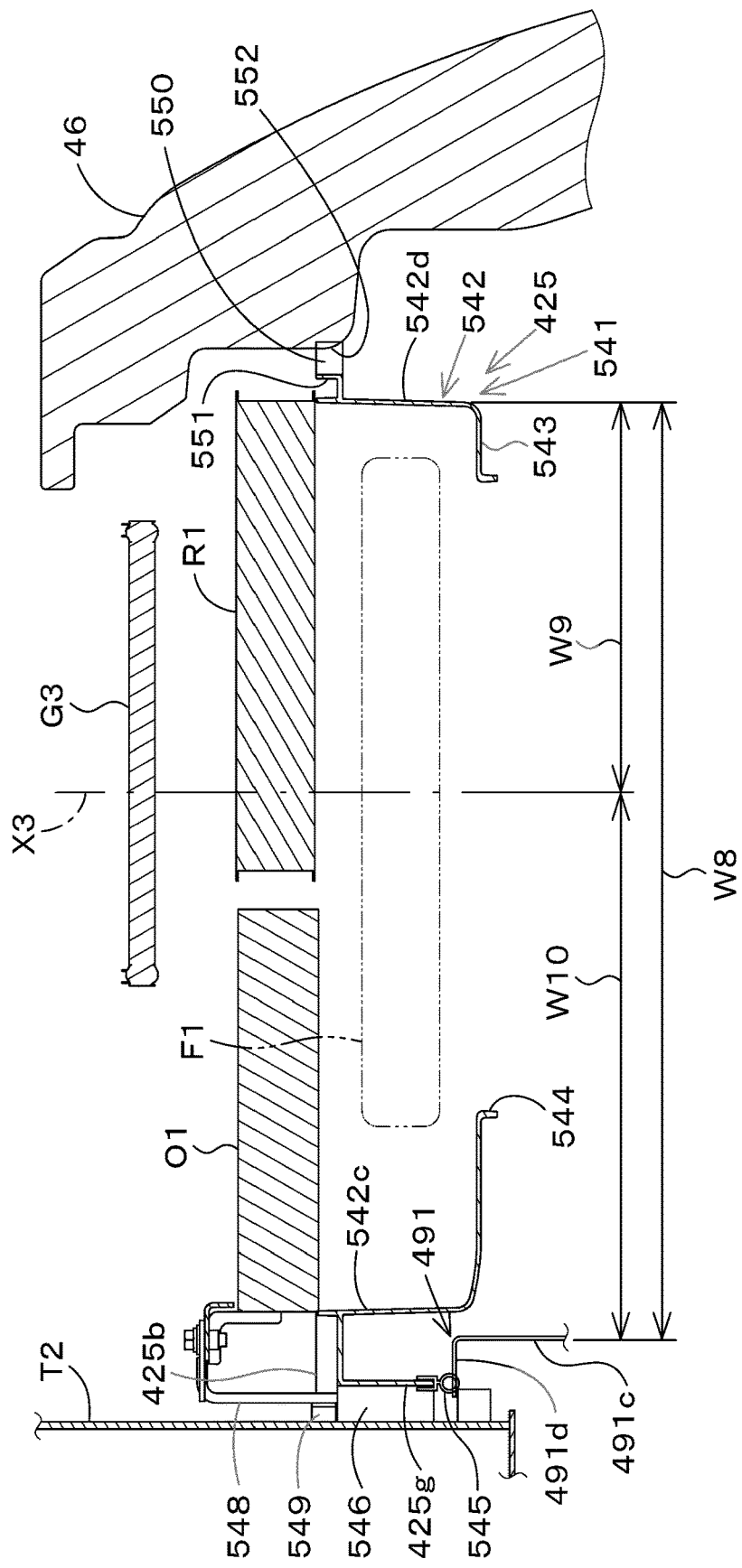
FIG. 82 is a cross section view illustrating FIG. 64 in a Z9-Z9 arrowed line.

As shown in FIG. 82, the airflow opening portion 544 and the cooling fan F1 are deviated from the center of the shroud 425 (the center of the front/rear direction K1) to the radiator R1 side. The condenser G3 and the cooling fan F1 are located closer to the radiator R1 than the boundary between the radiator R1 and the oil cooler O1.

As shown in FIG. 70A, the partition structure 458 is provided above the shroud 425, and the partition structure 458 is sealed between the partition structure 458 and the shroud 425 by the sealing member 503A and the sealing member 503B at the lower end potion of the partition structure 458 touching the upper wall 542a of the shroud body 541.

As shown in FIG. 76A and FIG. 76C, the shroud 425 has an upper overhanging wall 425a extending upwardly from the upper wall 542a. A stay portion 425d is provided at the front portion of the upper overhanging wall 425a and a stay portion 425e is provided at the rear portion of the upper overhanging wall 425a. The shroud 425 has a front overhanging wall 425b extending forward from the front wall 542c. The upper portion of the front overhanging wall 425b is connected to the front portion of the upper overhanging wall 425a. A seal attachment wall 425g is provided from the top of the front overhanging wall 425b to the bottom of the front overhanging wall 425b. The seal attachment wall 425g extends from the front overhang wall 425b toward the left. The upper portion of the seal attachment wall 425g is bent backward and connected to the upper wall 542a of the shroud body 541. A trim seal (first seal material) 545 is attached to the protruding end (left end) of the seal attachment wall 425g.

Figure 77:
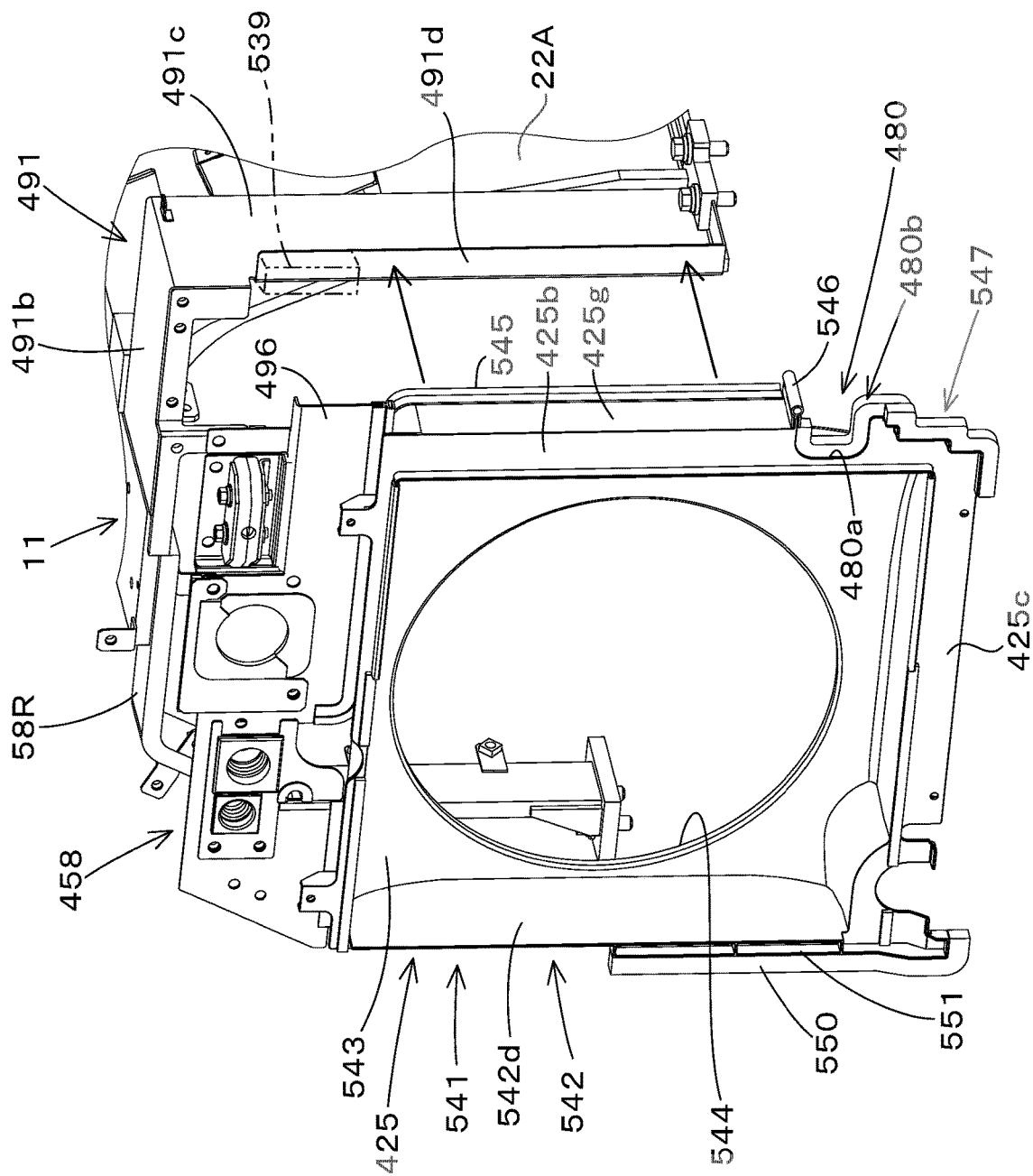
FIG. 77 is a perspective view illustrating development of a sealer structure of a front upper portion of a shroud.

As shown in FIG. 77, FIG. 81 and FIG. 82, the trim seal 545 contacts the right side of the contact wall 491d of the partition cover 491 with the shroud 425 assembled. Thus, the trim seal 545 seals between the front portion of the shroud 425 and the contact wall 491d. In detail, as shown in FIG. 70A and FIG. 77, the upper portion of the contact wall 491d and the front portion of the main plate 496 is sealed by the seal block 539. Thus, the trim seal 545 seals the lower portion of the seal block 539. In particular, the trim seal 545 seals from the seal block 539 to the insertion portion 480 mentioned above.

Figure 78:
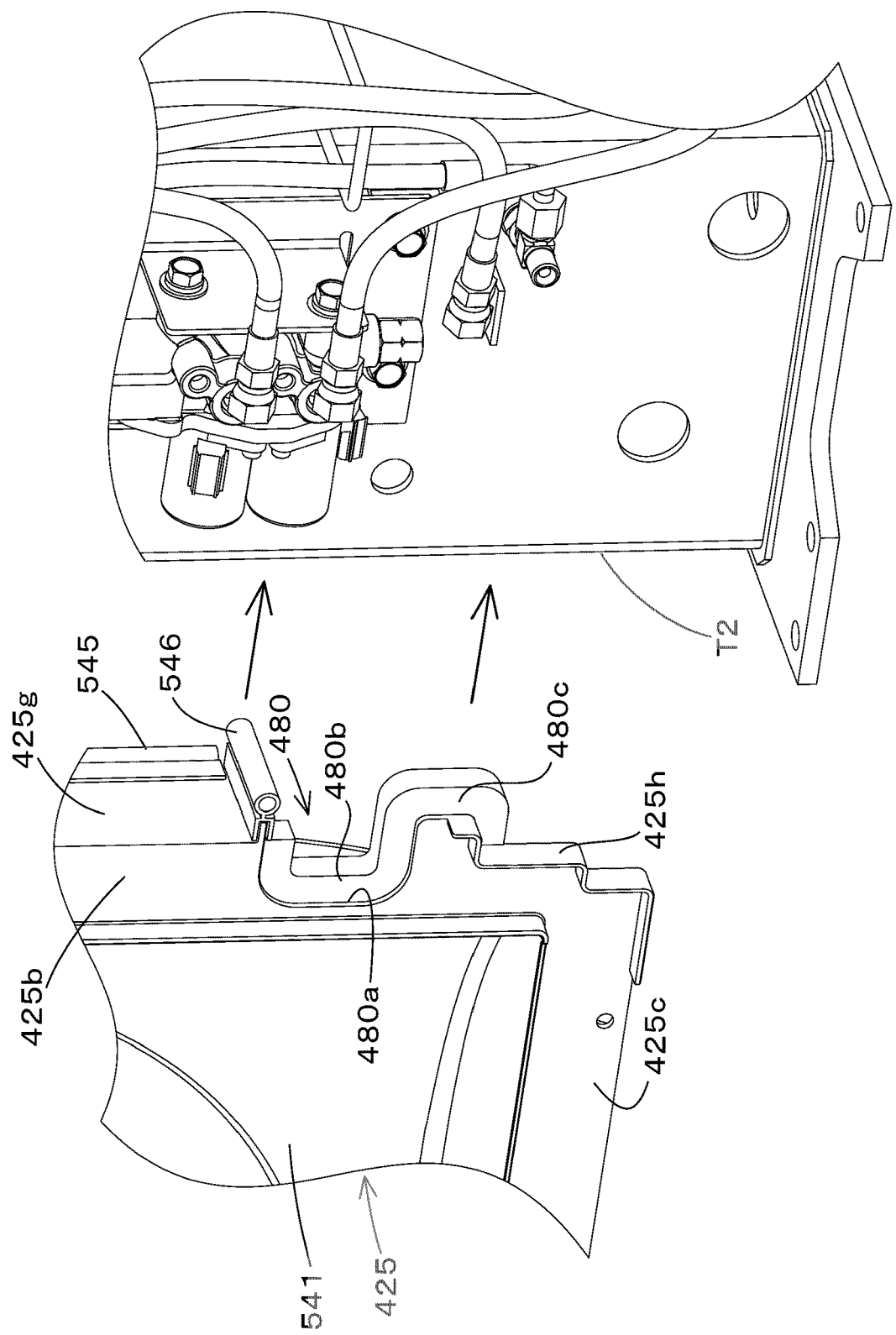
FIG. 78 is a perspective view illustrating development of a sealer structure of a front lower portion of a shroud.

As shown in FIGS. 76A and 76C, a recess portion 480a is formed at the bottom of the front overhanging wall 425b to form an insertion portion 480. The recess portion 480a is provided below the lower end potion of the seal attachment wall 425g. The lower portion 480c of the seal material 480b bonded to the inner surface (front side) of the recess portion 480a is formed by extending downwardly from the lower end potion of the recess portion 480a. A trim seal 546 is provided between the lower end potion of the trim seal 545 and the upper end potion of the seal material 480b. As shown in FIG. 78, the trim seal 546 and the lower portion 480c of the seal material 480b come into contact with the rear surface of the hydraulic fluid tank T2.

As shown in FIG. 78, a seal attachment wall 425h extending to the right is provided at the bottom of the front overhanging wall 425b and on the lower side of the recess portion 480a. The lower wall of the seal attachment wall 425h extends rearwardly and connects to the lower overhanging wall 425c, which extends downwardly from the lower wall 542b. The front portion of the lower overhanging wall 425c is connected to the lower portion of the front overhanging wall 425b. As shown in FIG. 76C, a seal material 547 is glued to the seal attachment wall 425h from the top front edge to the bottom surface of the front surface of the seal attachment wall 425h. The upper portion of this seal material 547 contacts to the hydraulic fluid tank T2.

As shown in FIG. 59, the middle portion of the sealing member 547 contacts the reinforcement portion 233a from the top surface of the tank attachment plate 424A through the rear end potion of the tank attachment plate 424A and the rear surface of the support plate 424B. The lower portion of the seal material 547 is in contact with the upper wall portion 444A. The seal attachment wall 425h and the seal material 547 are stepped to correspond to the shape of the tank attachment plate 424A, the support plate 424B, and the reinforcement site 233a. The lower portion of the front portion of the shroud 425 is sealed by the trim seal 546, the sealing member 480b and the sealing member 547. The trim seal 546, the sealing member 480b and the sealing member 547 include a sealing structure 602 (see FIG. 80) that is provided at the bottom of the shroud 425 and below the trim seal 545 and is in contact with the hydraulic fluid tank T2 and the tank platform 424.

As described above, the trim seal 545, the trim seal 546, the sealing member 480b and the sealing member 547 can improve the sealing of the front portion of the shroud 425 with the trim seal 545, the trim seal 546, the sealing member 480*b* and the sealing member 547. In detail, the sealing members (trim seal 545, trim seal 546, sealing member 480*b*, and sealing member 547) on the shroud 425 can be applied directly to the members on the front side around the shroud 425 to improve the sealing of the front portion around the shroud 425.

Figure 79:
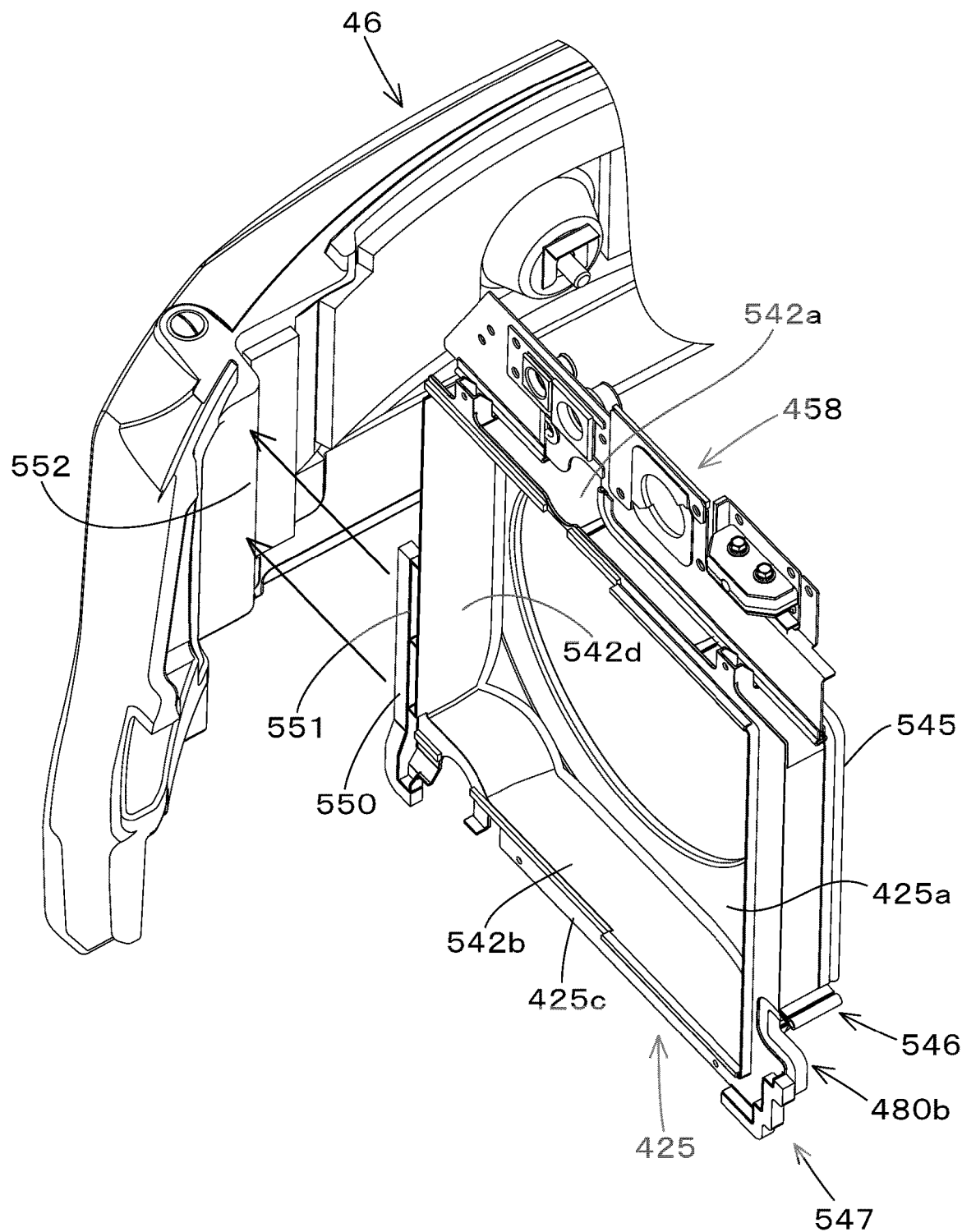
FIG. 79 is a perspective view illustrating development of a sealer structure of a rear upper portion of a shroud.

As shown in FIG. 76A and FIG. 76B, a rearwardly extending posterior overhanging wall 425*k* is provided at the top of the rear wall 542*d*. A seal attachment wall 551 is provided at the bottom of the rear wall 542*d*. A seal material (second seal material) 550 is glued to the rear surface of the seal attachment wall 551. The sealing member 550 is formed in a vertical direction from the top to the bottom of the seal material 550. The lower end potion of the sealing member 550 is bent forward. As shown in FIG. 79 and FIG. 82, the rear surface of the sealing member 550 contacts the seal contact surface 552 of the weight 46. The sealing member 550 seals between the shroud body 541 and the weight 46 and from the center of the shroud body 541 in a vertical direction to a lower end. The lower end potion of the sealant 550 touches the front right end side of the weight support portion 44.

Figure 80:
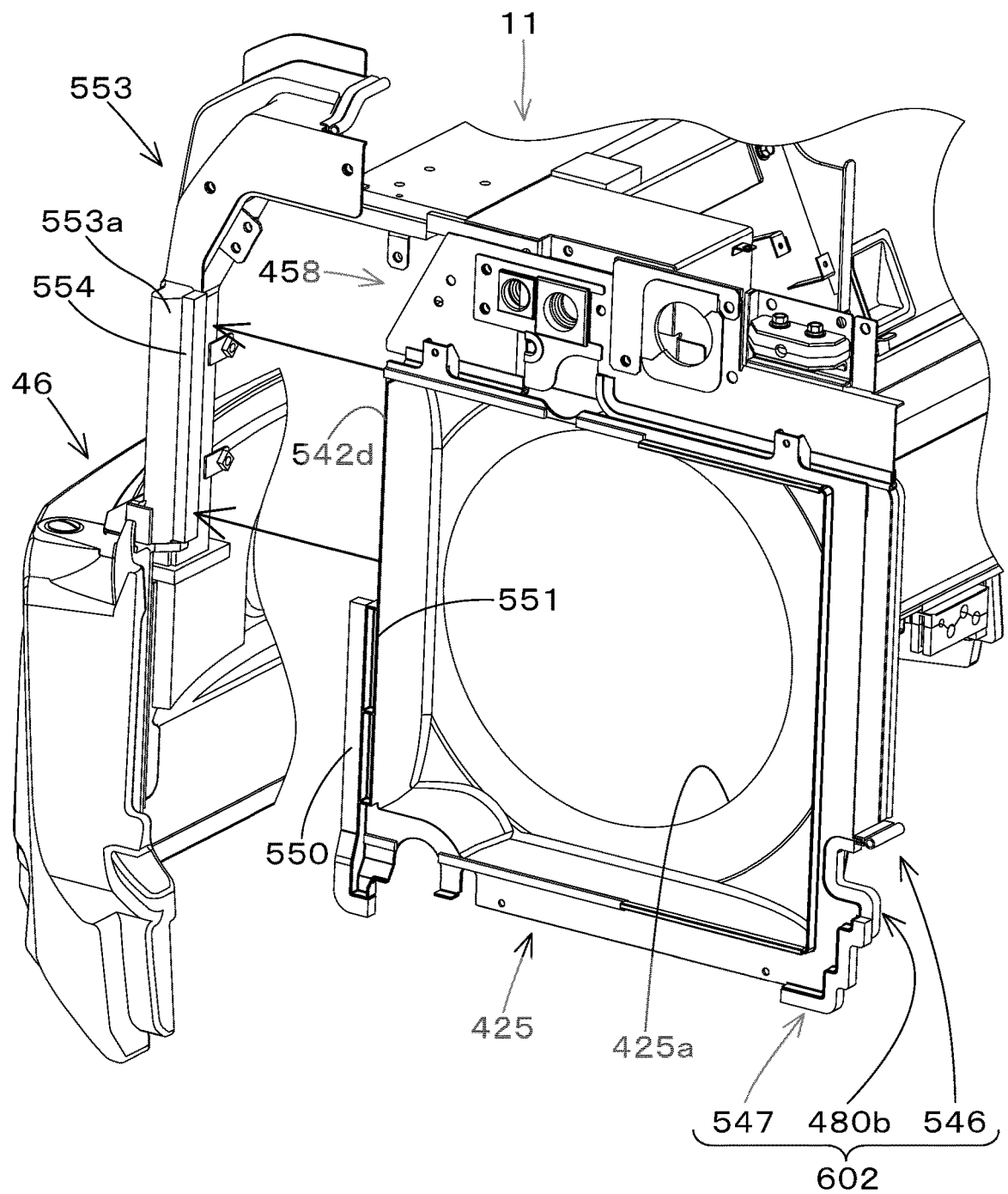
FIG. 80 is a perspective view illustrating development of a sealer structure of a rear lower portion of a shroud.

As shown in FIG. 80 and FIG. 81, a cover panel 553, which forms part of the bonnet 22, is provided inside the area where the bonnet rear portion 22B and the first cover member 26 meet (on the side of the prime mover room E2). The rear portion of the bonnet 22B and the first cover member 26 come into contact with the cover panel 553 via a trim seal. The cover panel 553 has a seal attachment wall 553*a* formed in proximity to the rear wall 542*d* of the shroud body 541 at the right front portion (one end). This seal attachment wall 553*a* is provided at a position corresponding to the upper rear portion of the shroud 425. A seal material (third seal material) 554 is provided in a vertical direction. When the shroud 425 is assembled, the sealing member 554 contacts the upper portion of the rear wall 542*d* (rear portion of the shroud 425) of the shroud body 541. The sealing member 554 seals between the shroud body 541 and the cover panel 553 and above the sealing member 550 (weight 46).

As described above, the rear portion of the shroud 425 can be well sealed by the sealing member 550 and the sealing member 554. In detail, the sealing members 550 and 554 on the shroud 425 can be applied directly to the rear side members around the shroud 425 to improve the sealing of the rear portion of the shroud 425 around the shroud 425.

Figure 83:
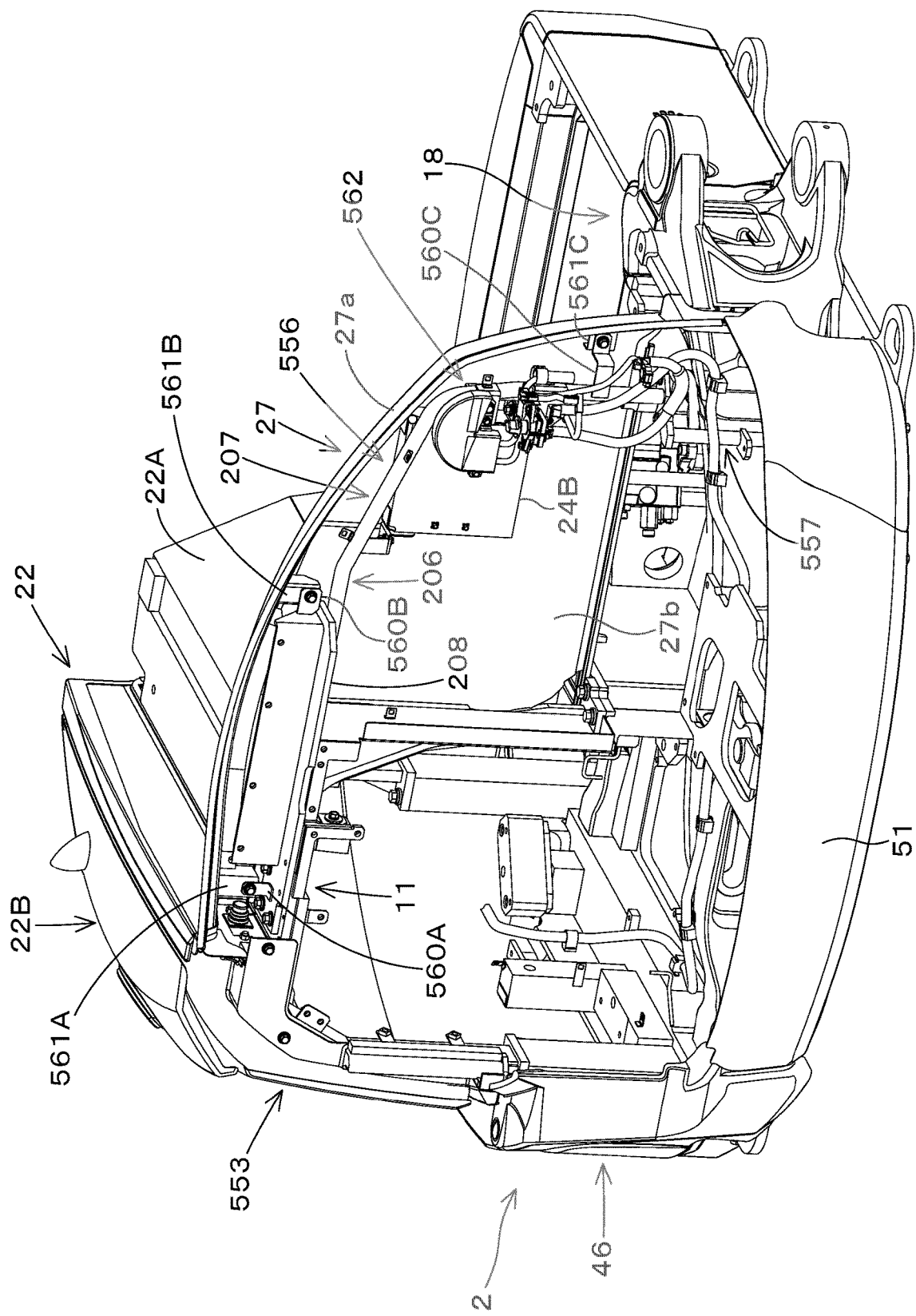
FIG. 83 is a perspective view illustrating a right side of a machine body.
Figure 84:
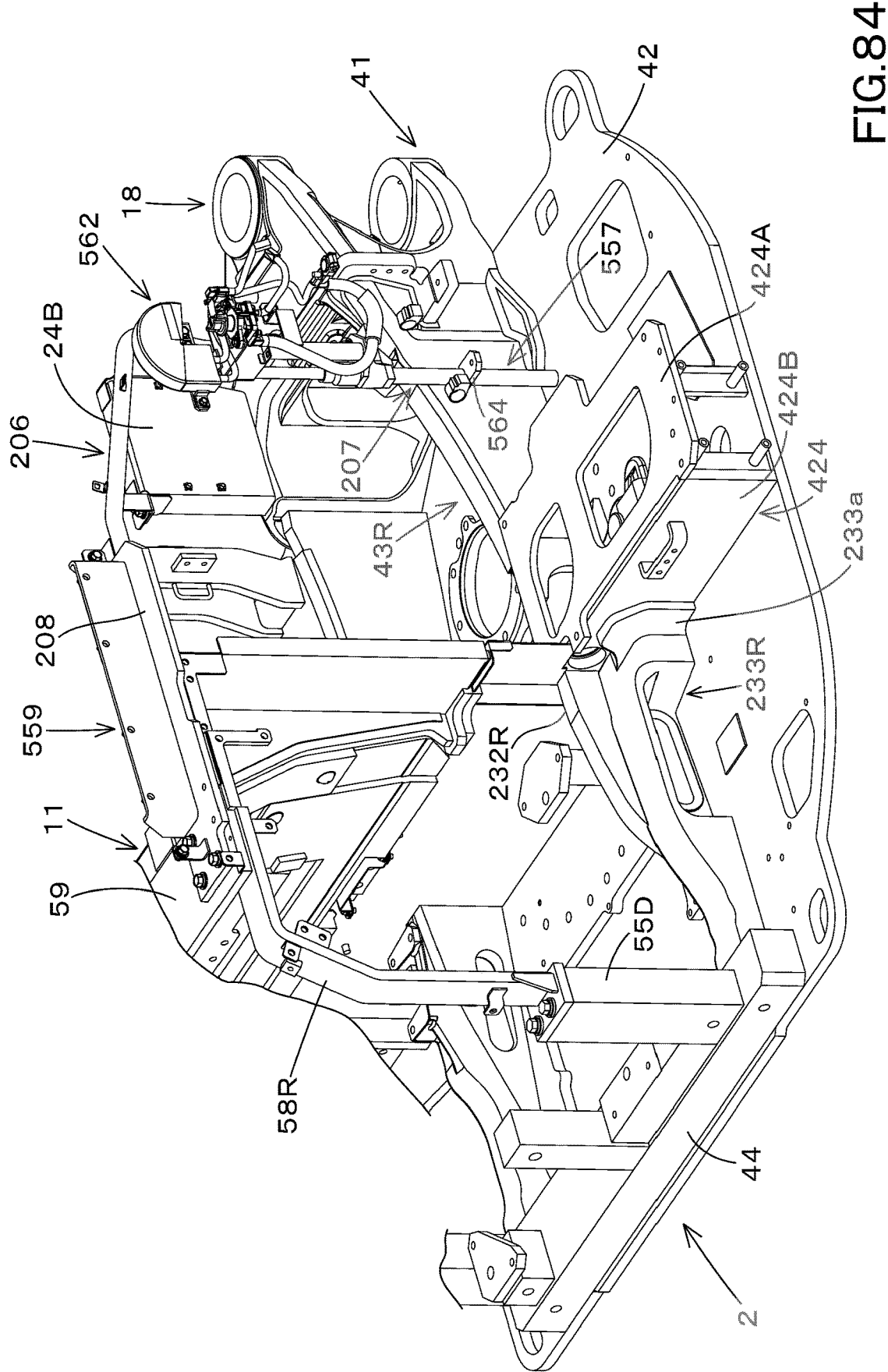
FIG. 84 is a perspective view illustrating a right side of a swivel frame.

As shown in FIG. 83, a frame constituent member 206 is arranged inside the second cover member 27 (inside the side cover 21). The frame constituent member 206 is attached to the machine body 2. In detail, as shown in FIG. 84, the frame constituent member 206 is connected to the support frame 11 and extends from the support frame 11 to the front portion of the machine body 2 (the swivel frame 41), and the front part is erected on the machine body 2, as shown in FIG. 84. The frame constituent member 206 also supports the side cover 21 (first cover member 26, second cover member 27). Since the frame constituent member 206 connects the support frame 11 to the machine body 2, the support strength to the side covers 21 is strong. The frame constituent member 206 can also function as a reinforcing member of the support frame 11.

Figure 85:
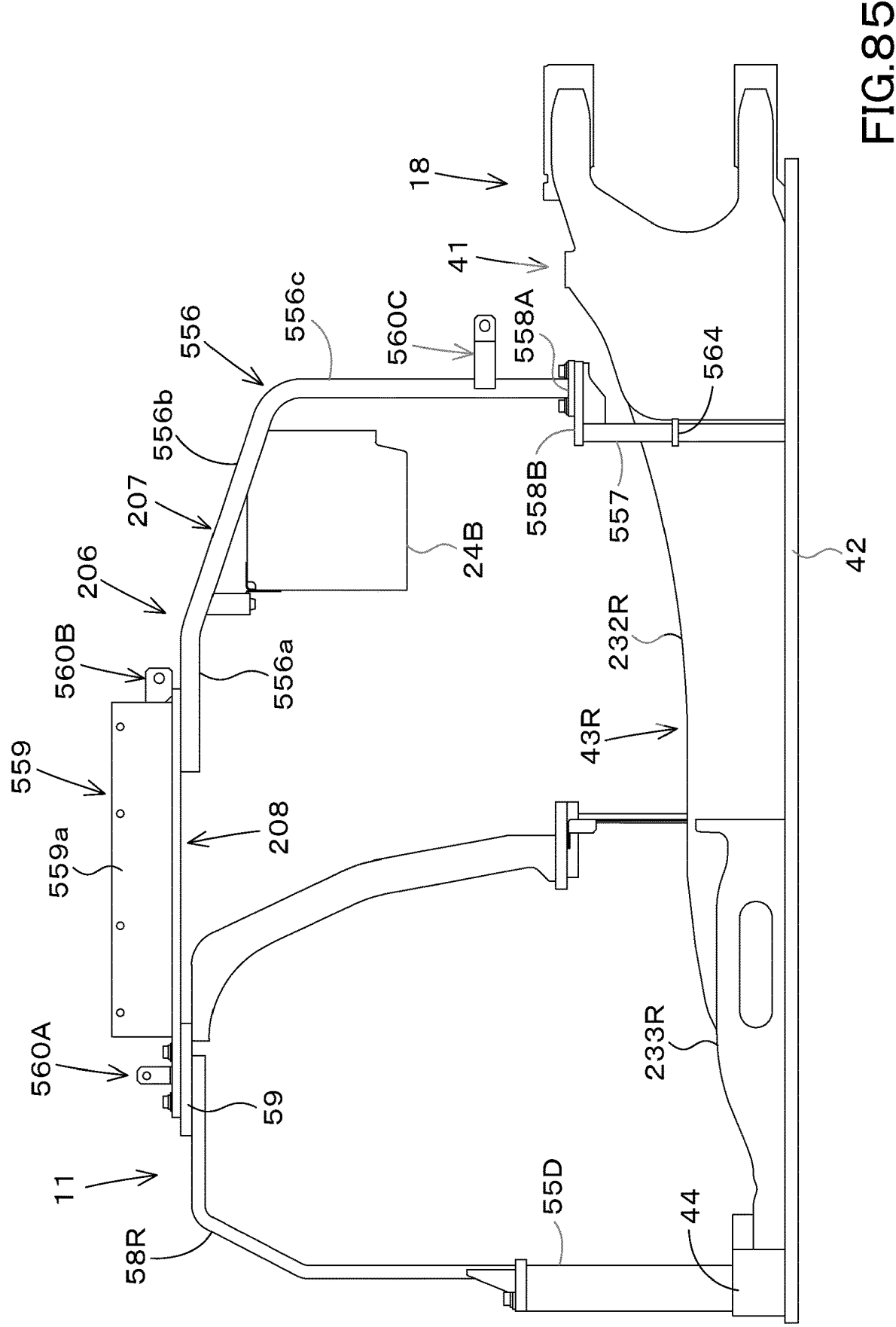
FIG. 85 is a right side view of a frame member.
Figure 86:
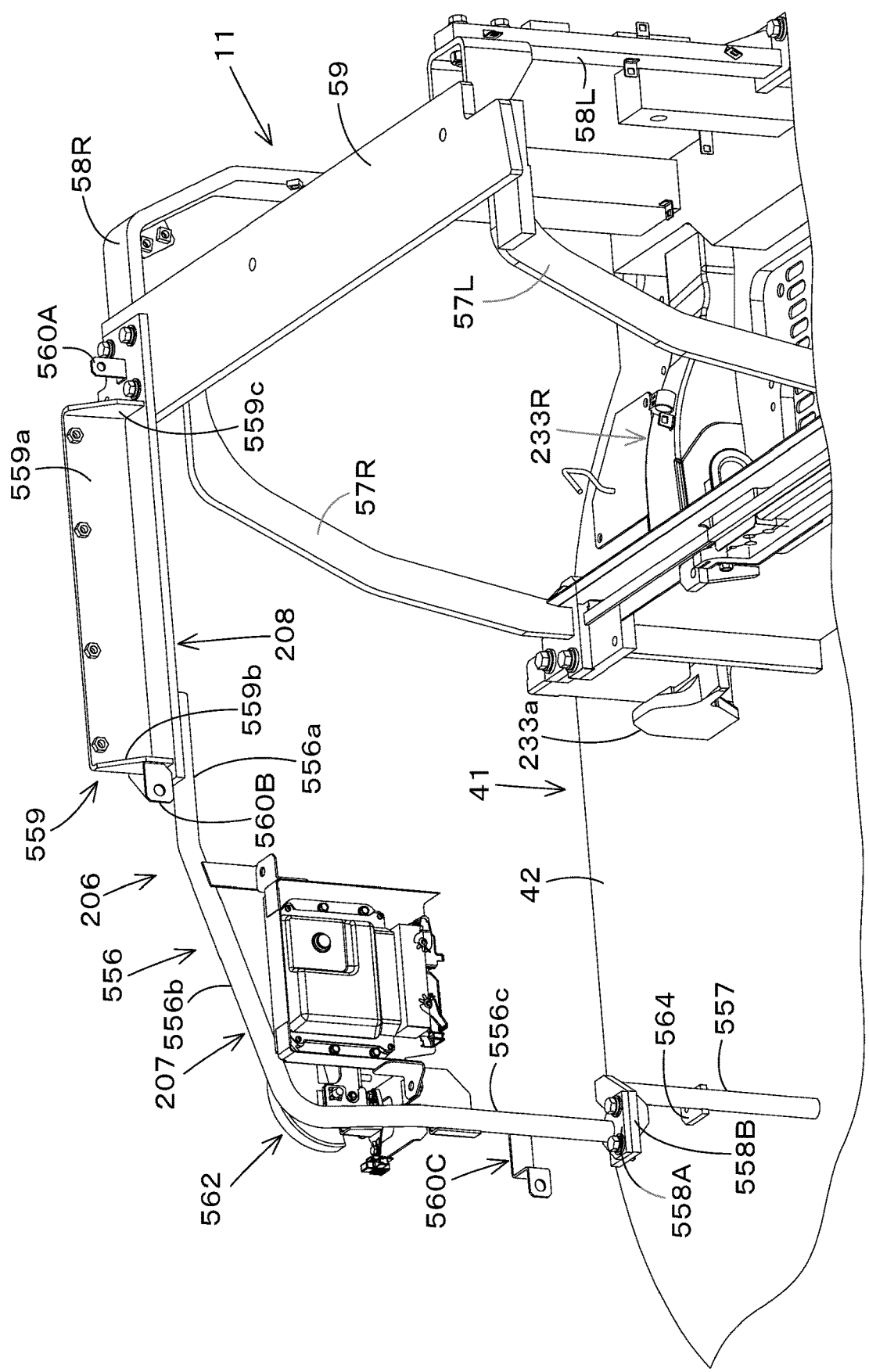
FIG. 86 is a perspective view of a frame member seen from a left side.

As shown in FIG. 84 to FIG. 86, the frame constituent member 206 has a first frame constituent member 208 and a second frame constituent member 207. The first frame constituent member 208 is formed of a rectangular-shaped thick plate material long in the front-to-rear direction K1 and is attached to the upper portion of the support frame 11 and protrudes forward from the support frame 11. In detail, the first frame constituent member 208 is arranged so that the plate surface faces up and down, and is superimposed and bolted to the left portion of the upper plate 59 at the rear and protrudes forward from the upper plate 59. As shown in FIG. 83, the first frame constituent member 208 is arranged on the rear side of the upper portion of the perimeter wall 27*a* and on the lower side.

As shown in FIG. 85 and FIG. 86, the second frame constituent member 207 extends forward from the first frame constituent member 208 and is bent so that the front part extends downwardly from the first frame constituent member 208, and is fixed to the machine body 2. In detail, the second frame constituent member 207 includes a first frame portion 556 and a second frame portion 557. The first frame portion 556 and the second frame portion 557 are formed by a rod material such as a pipe material. The first frame portion 556 has a first portion 556*a*, a second portion 556*b*, and a third portion 556*c*. The first portion 556*a* has a rear portion 556*a* which is fixed to the lower surface of the first frame constituent member 208 and protrudes forward from the first frame constituent member 208. The second portion 556*b* extends from the first portion 556*a* in an inclined direction transitioning downwardly from the first portion 556*a* as extending forward. The third portion 556*c* extends downwardly from the front end potion of the second portion 556*b*.

Figure 88:
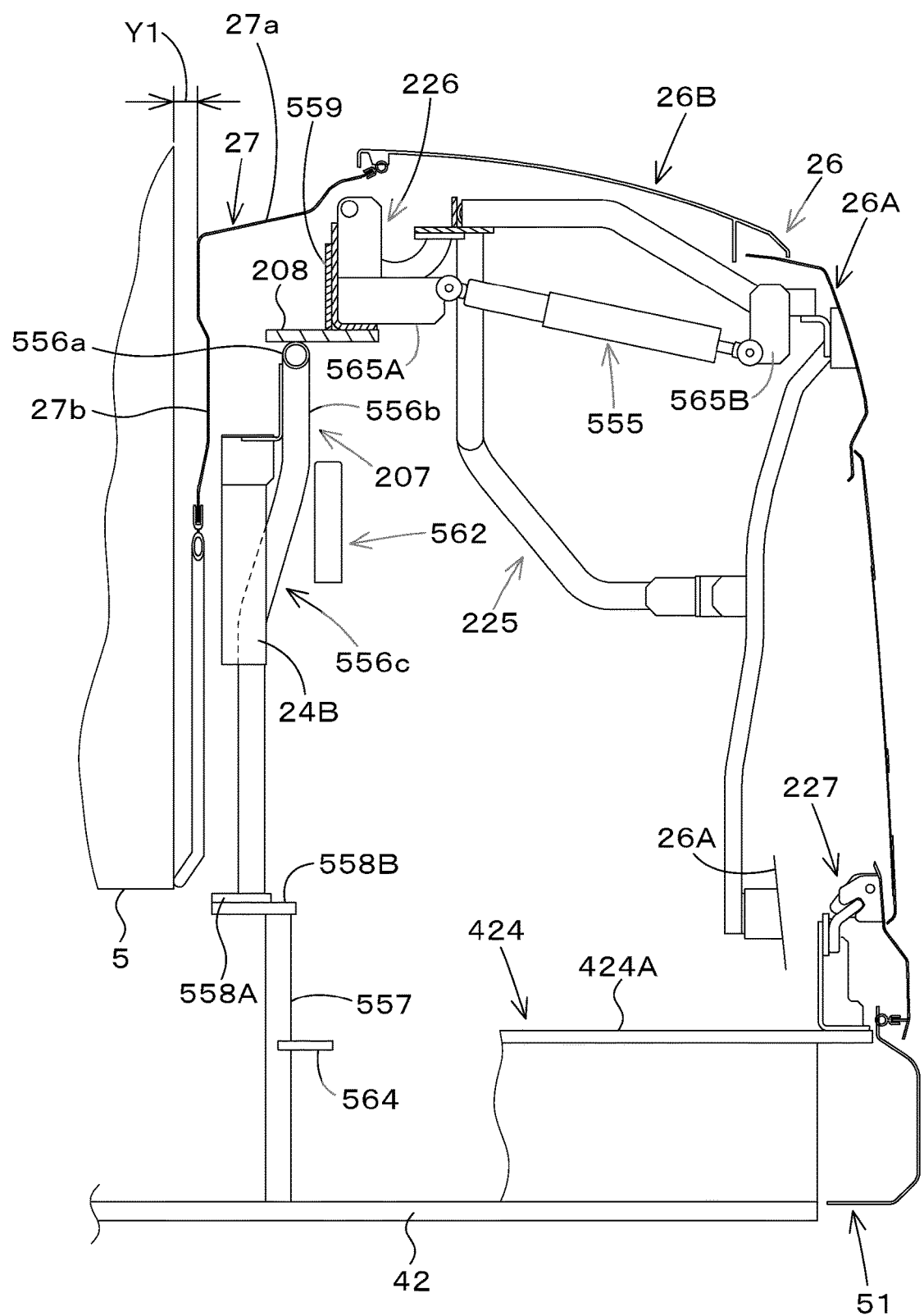
FIG. 88 is a cross section view illustrating a back surface of a right side of a machine body.

The third portion 556*c* is transitional and sloping, with the upper portion transitioning inward into the machine body as shown in FIG. 88, and the lower portion extending vertically downward. As shown in FIG. 83, the second portion 556*b* is arranged on the front and lower side of the upper portion of the perimeter wall 27*a*. The third portion 556*c* is arranged at the rear portion of the front portion of the perimeter wall portion 27*a*.

The second frame portion 557 is arranged below and behind the third portion 556*c* in the side view shown in FIG. 85. The second frame portion 557 is erected on the swivel frame 41 (swivel base plate 42) at a position behind the support bracket 18. The second frame portion 557 is flange-coupled to the first frame portion 556 (third portion 556*c*). In detail, a flange portion 558A is fixed to a lower end potion of the third portion 556*c*, and a flange portion 558B is fixed to an upper end potion of the second frame portion 557, and the flange portion 558A and the flange portion 558B are joined by a bolt.

As shown in FIG. 85 and FIG. 86, a hinge support plate 559 is provided on the first frame constituent member 208. The hinge support plate 559 has a side plate 559*a* having a plate surface facing in the machine width direction K2, a front plate 559*b* extending leftward from a front end potion of the side plate 559*a*, and a rear plate 559*c* extending leftward from a rear end potion of the side plate 559*a*.

Figure 87:
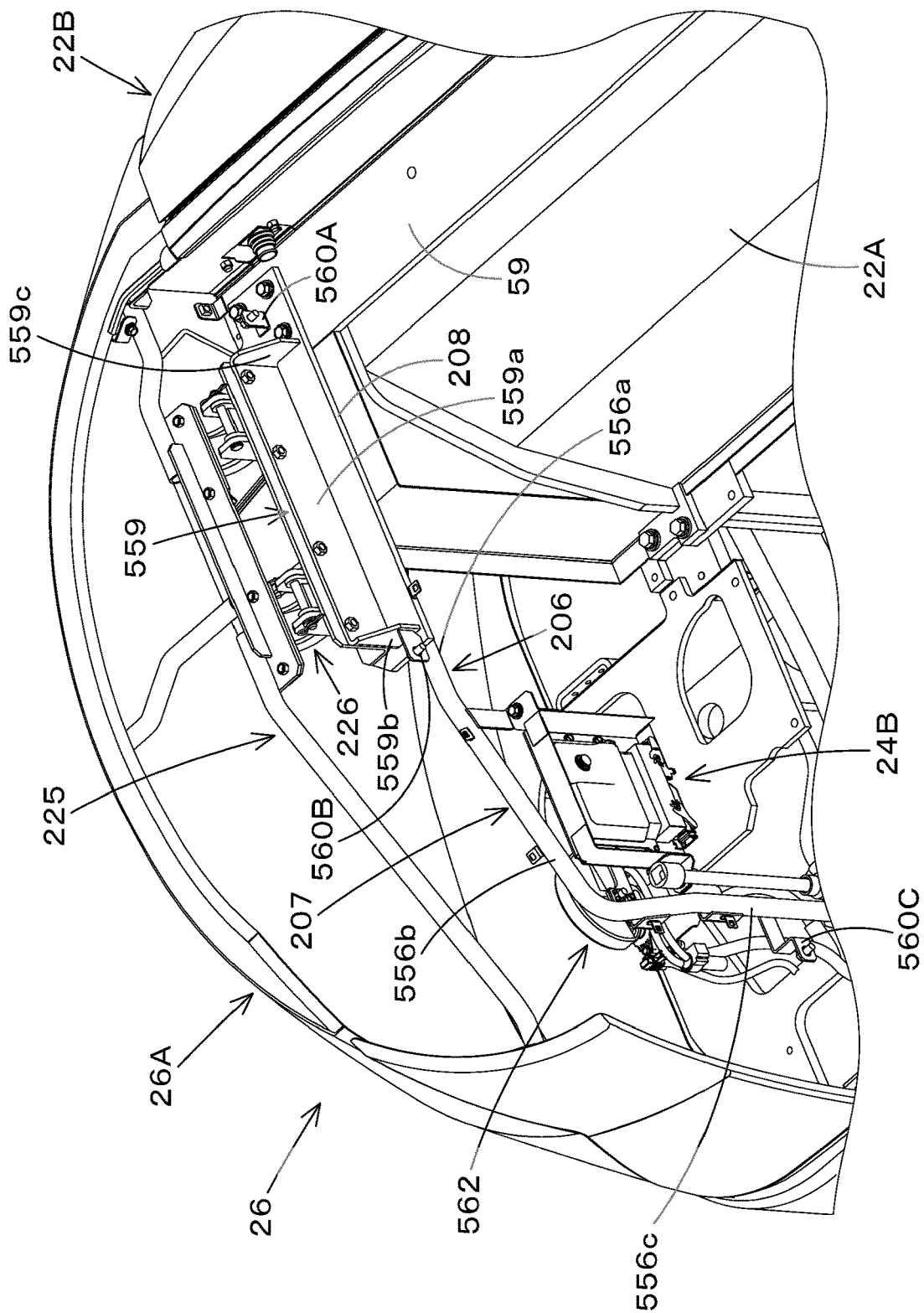
FIG. 87 is a perspective view illustrating a support portion of a first cover member.

As shown in FIG. 87 and FIG. 88, a hinge mechanism 226 is provided on the right side of the side plate portion 559*a* of the hinge support plate 559. Inside the first cover member 26, a frame 225 is provided to support the first cover member 26.

The frame 225 is connected to the first frame constituent member 208 via a hinge mechanism 226 and a hinge support plate 559. The frame 225 can be engaged (locked) to the machine body 2 via the engagement mechanism 227 at the bottom. By releasing the lock by the engagement mechanism 227, the first cover member 26 can be pivoted up and down (open and close) by the hinge mechanism 226. A damper device (for example, a gas damper) 555 is provided over the support piece 565A provided in the hinge mechanism 226 and the support piece 565B provided in the frame body 225. The damper device 555 allows the first cover member 26 to be held open.

As shown in FIG. 85 and FIG. 86, the frame constituent member 206 has a cover attachment portion including a plurality of attachment pieces (attachment pieces 560A to 560C). The second cover 27 is attached to this cover attachment portion. The attachment piece 560A is fixed to the rear portion of the first frame constituent member 208. The attachment piece 560B is secured to the front portion of the hinge support plate 559. The attachment piece 560C is secured to a third portion 556C of the first frame portion 556.

As shown in FIG. 83, the inner surface of the second cover member 27 is provided with fixing portions 561A to 561C that are fixed to the attachment pieces 560A to 560C. The fixing portion 561A is provided at a position corresponding to the attachment piece 560A and is bolted to the attachment piece 560A. The fixing portion 561B is provided in a position corresponding to the attachment piece 560B and is bolted to the attachment piece 560B. The fixing portion 561C is provided in a position corresponding to the attachment piece 560C and is bolted to the attachment piece 560C.

As described above, the second cover member 27 is detachable from inside the second cover member 27 to the frame constituent member 206. By configuring the second cover member 27 so that it can be detachable from the inside, the gap Y1 between the second cover member 27 and the cabin 5 can be narrowed, thereby increasing the interior of the cabin 5 or the interior space of the side cover 21, or the space between the second cover member 27 and the cabin 5. The sealing properties of the seal can be improved.

As shown in FIG. 83, the controller 24B and the isolator 562 (equipment) are attached to the third portion 556c of the first frame portion 556 (second frame constituent member 207). The controller 24B is the prime mover ECU, as described above. The isolator 562 is a device that properly charges the excess power of battery BT1 to the sub-battery during driving based on the voltage safety monitoring system.

By removing the second cover member 27, the controller portion 24B and the isolator 562 can be easily accessed by removing the second cover member 27. That is, by removing the second cover member 27, the controller 24B and the isolator 562 can be easily checked visually, and can be easily removed from the frame constituent member 206 or installed in the frame constituent member 206. The frame constituent member 206 serves as both the mounting of the side cover 21 and the mounting of the controller portion 24B and isolator 562, thus allowing for dual use of the members.

By attaching the first cover member 26 and the second cover member 27 to the frame constituent member 206, the misalignment of the position of these cover members 26 and 27 is reduced, and the adjustment of the position of the cover members 26 and 27 to each other can be omitted.

For example, when the frame member is formed by bending a single strip of material, the thickness of the entire plate must be matched to the plate thickness of the part requiring strength, and the weight of the frame member is increased. In contrast, in the present embodiment, weight reduction is achieved by forming the frame constituent member 206 from a first frame constituent member 208 and a second frame constituent member 207. That is, the frame constituent member 206 is formed with the first frame constituent member 208 of a thick plate material where strength is required, and the rest of the frame constituent member 206 is formed with the second frame constituent member 207 of a rod material. This reduces the weight of the frame constituent member 206.

Figure 89:
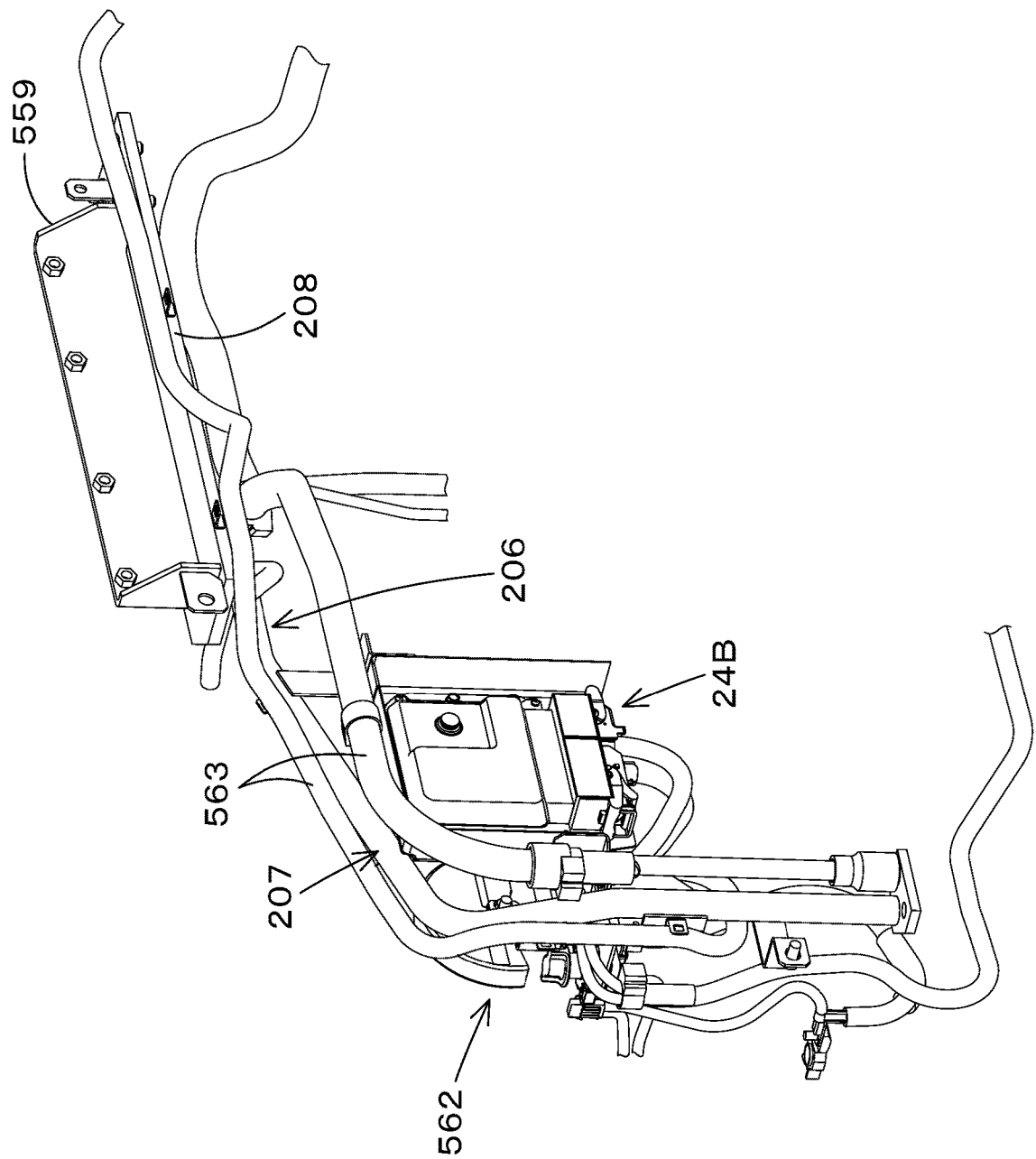
FIG. 89 is a perspective view illustrating a state where a harness is arranged on the frame member.

As shown in FIG. 89, the harness 563 arranged to crawl over the frame constituent member 206 is attached to the frame constituent member 206. The harness 563 is a harness connected to the controller 24B and the isolator 562. Thus, the frame constituent member 206 also serves as a member that supports the harness 563.

As shown in FIG. 84, the attachment stay 564 is fixed to the second frame portion 557 in a protruding manner to the right. To this attachment stay 564, a battery stand 566, as described below, is mounted. Thus, the frame constituent member 206 also serves as a member to which the battery stand 566 is attached.

Other equipment, such as a fuse box (slow blow fuse box), for example, may be attached to the frame constituent member 206.

Figure 90:
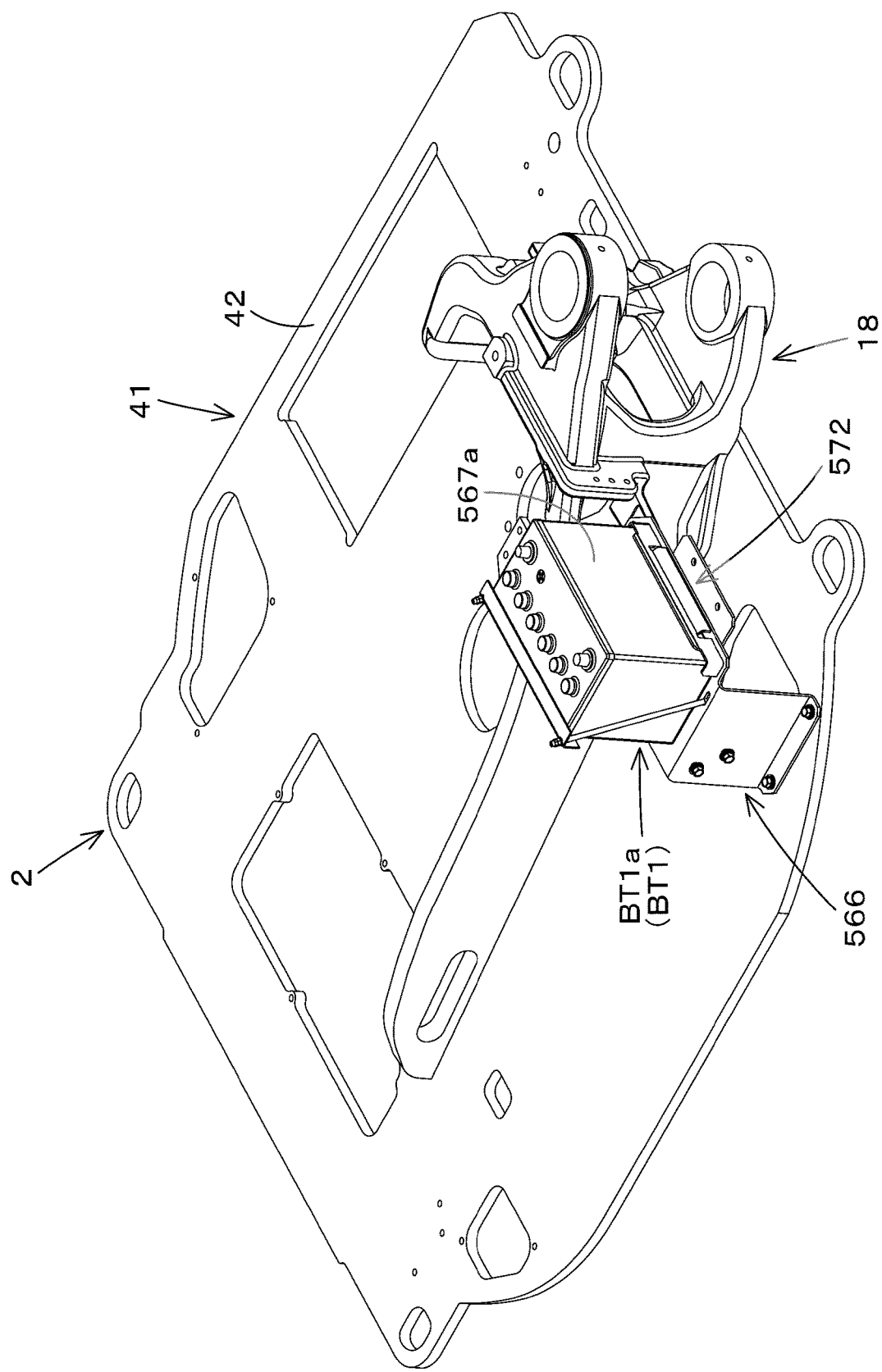
FIG. 90 is a perspective view illustrating arrangement of a battery.
Figure 91:
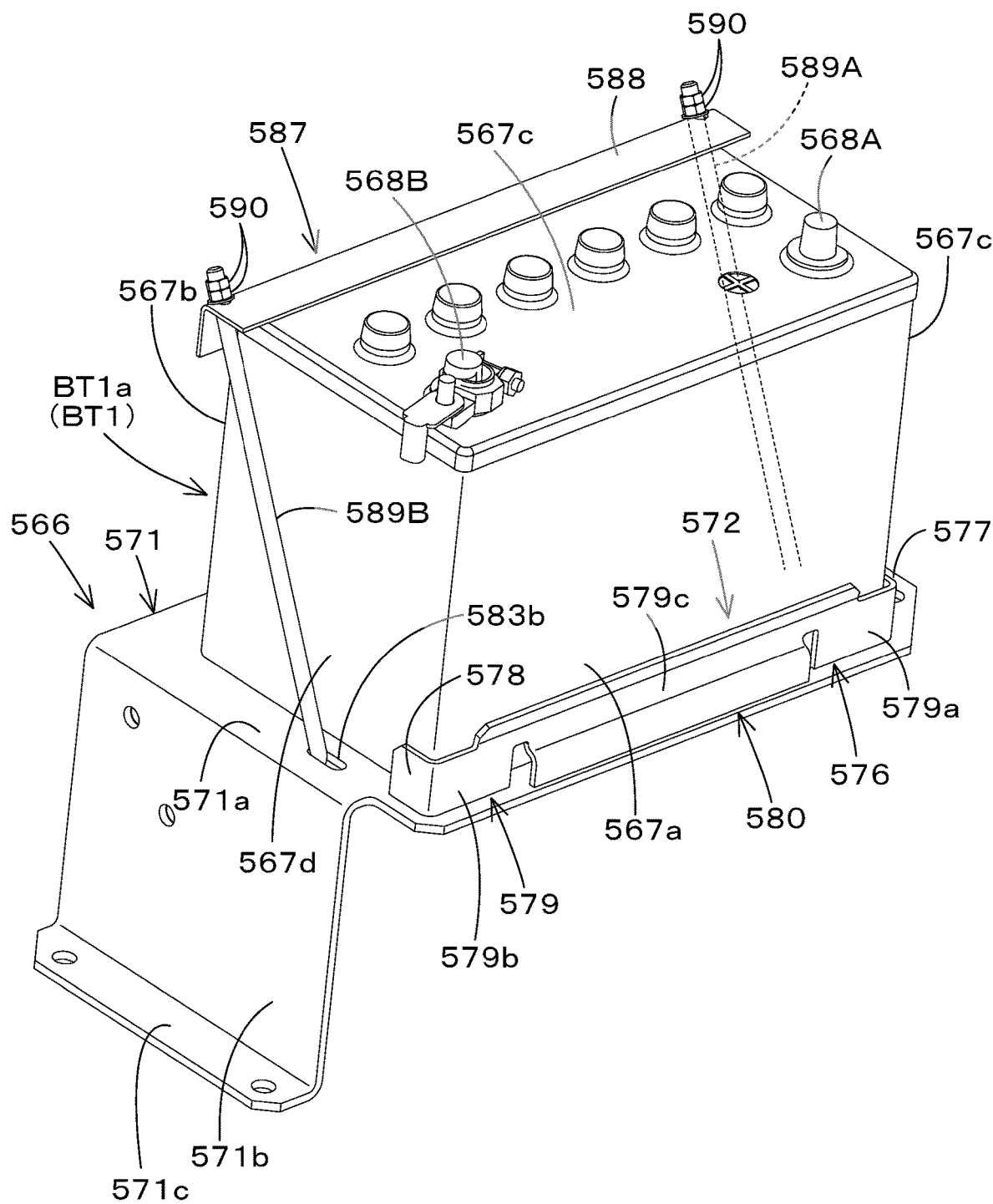
FIG. 91 is a perspective view of a first battery seen from a front surface side.
Figure 92:
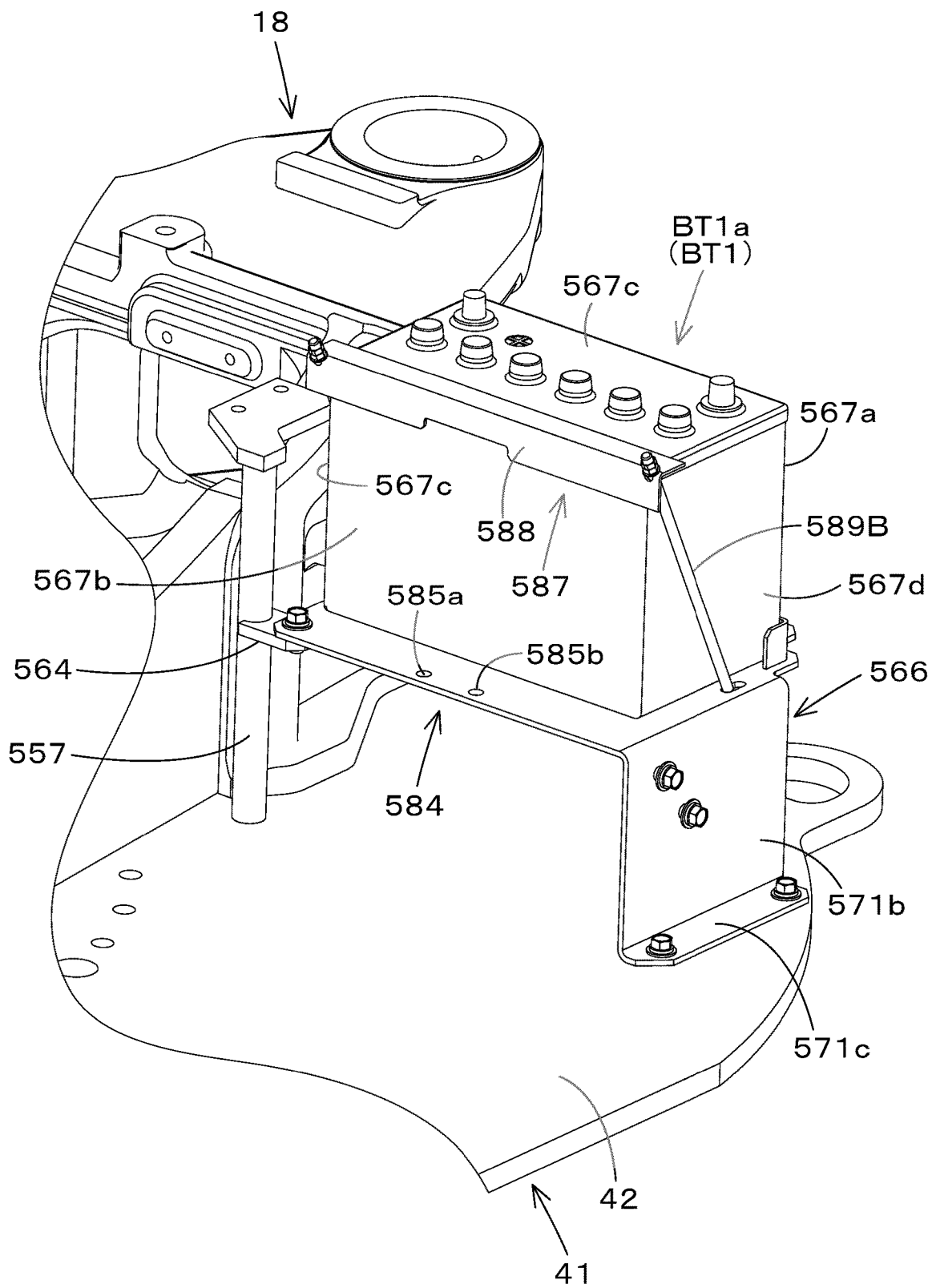
FIG. 92 is a perspective view of a first battery seen from a back surface side.
Figure 97:
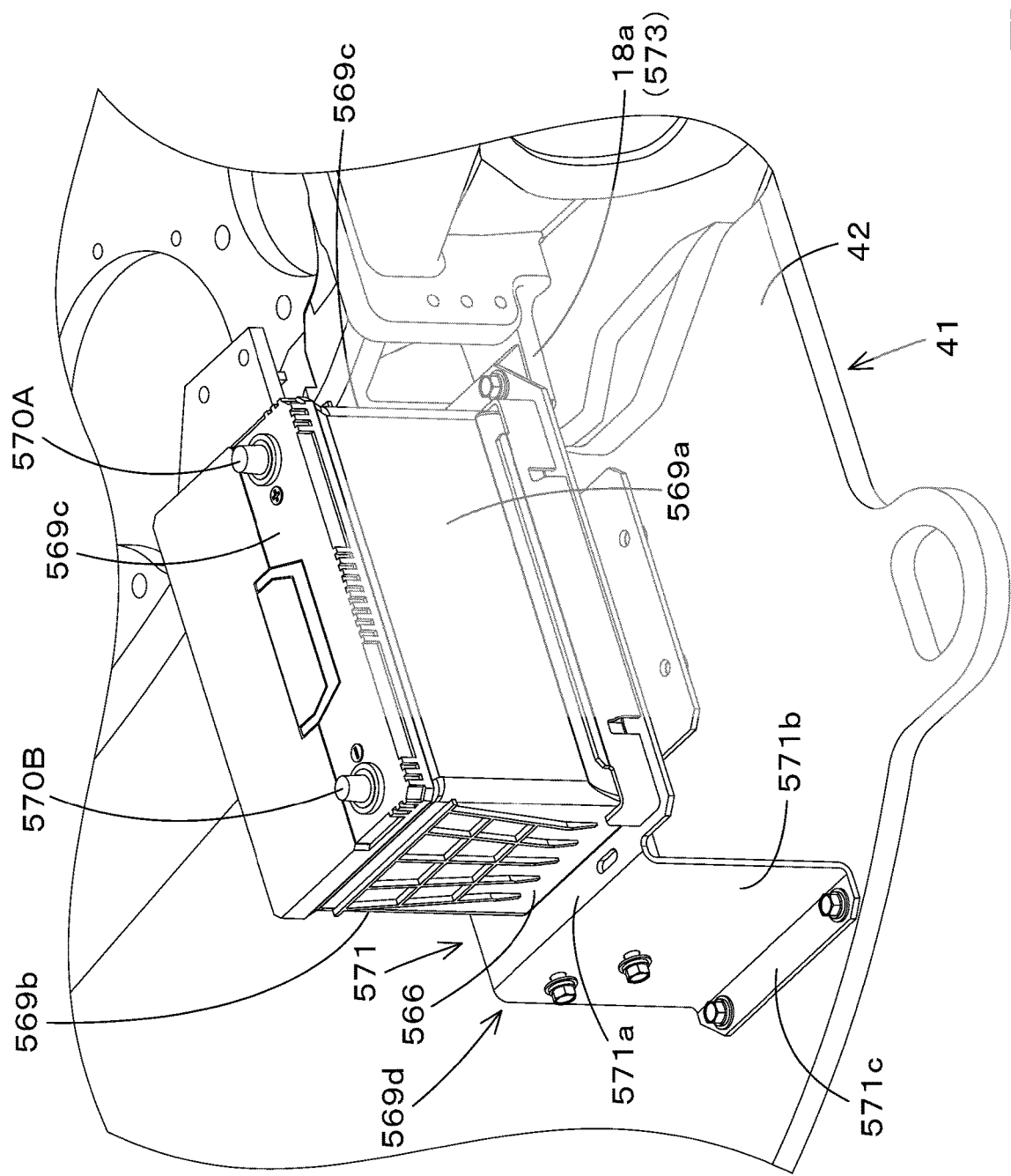
FIG. 97 is a perspective view of a second battery seen from a front surface side.

As shown in FIG. 90, the battery stand 566 to which a battery BT1 is mounted is provided at the front portion of the right portion of the swivel frame 41. The battery stand 566 is capable of selectively mounting a plurality of battery BT1s of different mounting formats. In this embodiment, two types of battery BT1s, a first battery BT1a and a second battery BT1b, can be selectively installed. The first battery BT1a has a rectangular three-dimensional shape, as shown in FIG. 91, and has a terminal (electricity terminal) 568A and a terminal (electricity terminal) 568B on the front surface 567a side of the upper surface 567c. The second battery BT1b has a rectangular three-dimensional shape, as shown in FIG. 97, and has a terminal (electricity terminal) 570A and a terminal (electricity terminal) 570B on the front surface 569a side of the upper surface 569c.

In the present embodiment, the first battery BT1a and the second battery BT1b are shown in the case where the first battery BT1a and the second battery BT1b are mounted on the battery stand 566 with the front surfaces 567a and 569a facing the front portion of the machine body and the rear surfaces 567b and 569b facing the rear portion of the machine body, but this is not limited to the case where the first battery BT1a and a second battery BT1b may be mounted with the front surfaces 567a and 569a facing the right or left side of the machine body or the rear portion of the machine body or at an angle to the front-to-rear direction K1.

As shown in FIG. 91, the first battery BT1a has a flat front surface 567a and a rear surface 567b.

Figure 99:
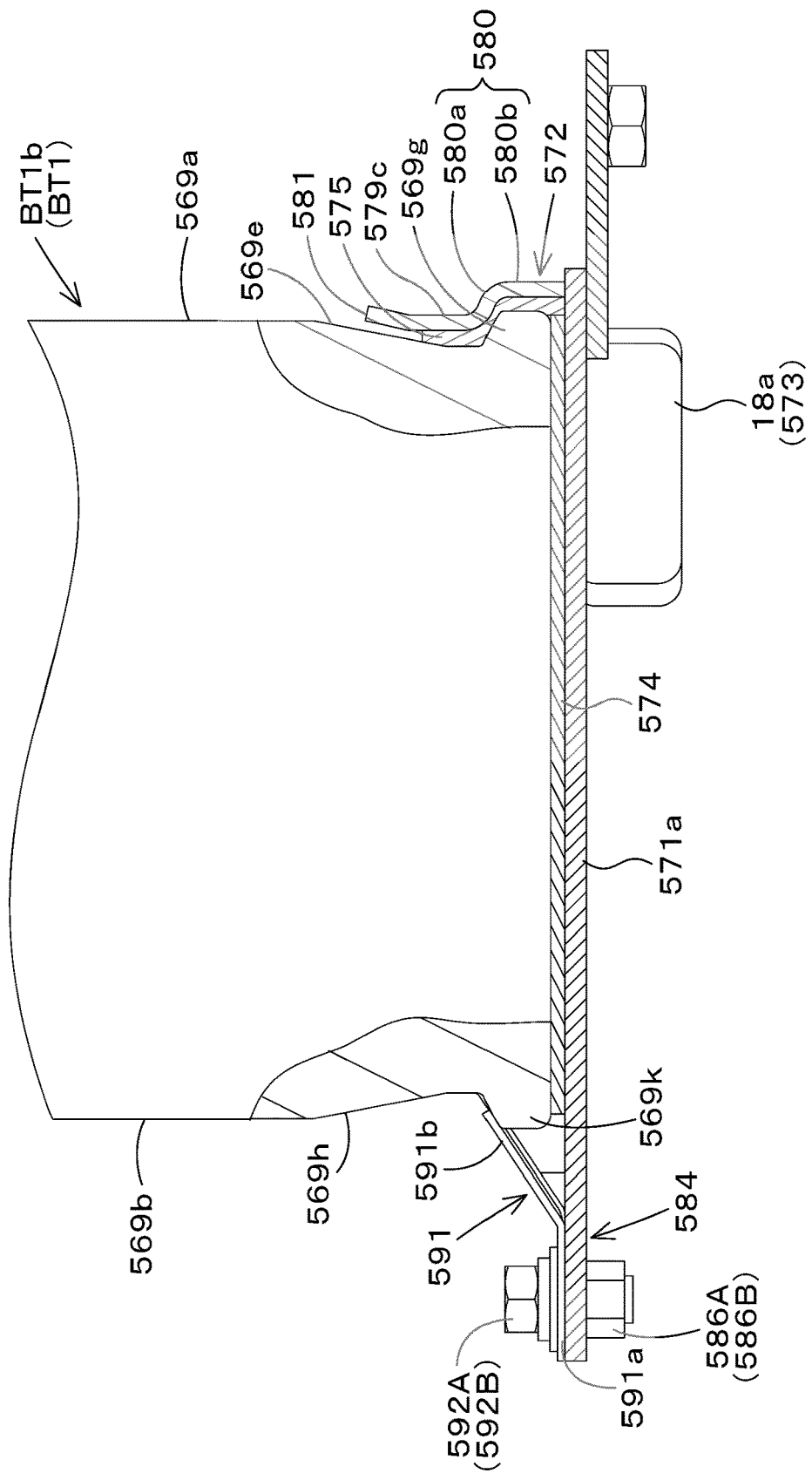
FIG. 99 is a cross section view illustrating a side surface of a lower portion of a second battery.

As shown in FIG. 99, the second battery BT1b has a first recessed portion 569e recessed backwardly at the bottom of the front surface 569a and a first engagement protrusion 569g protruding forward at the bottom of the first recessed portion 569e. The second battery BT1b has a second recessed portion 569h recessed forwardly at the bottom of the back 569b and a second engagement protrusion 569k provided in a rearwardly protruding manner at the bottom of the second recessed portion 569h.

The first engagement protrusion 569g and the second engagement protrusion 569k are formed in a long protrusion formed at the center of the second battery BT1b in the machine width direction K2 and along the machine width direction K2.

Figure 93:
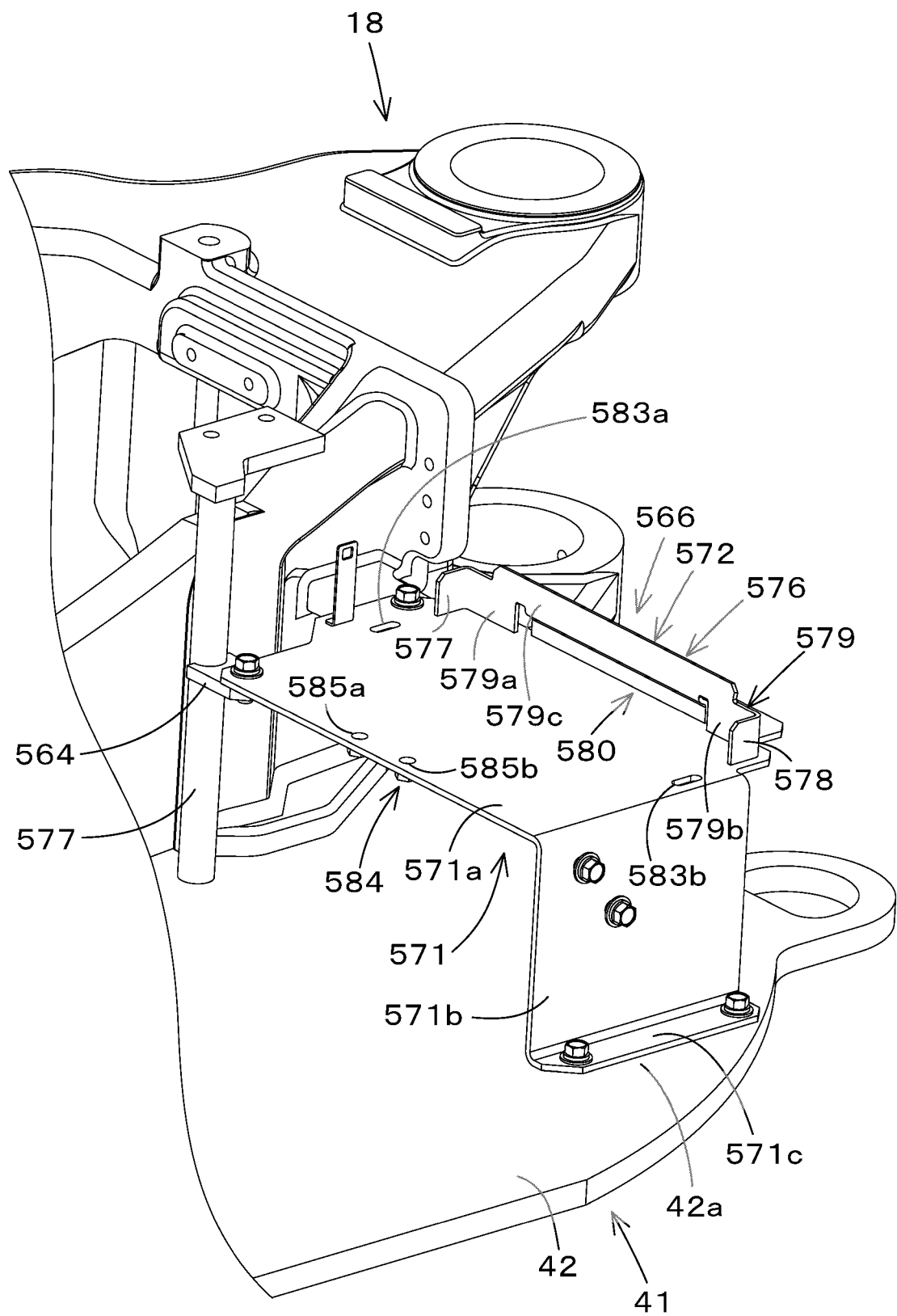
FIG. 93 is a perspective view of a battery base seen from a back surface side.
Figure 96:
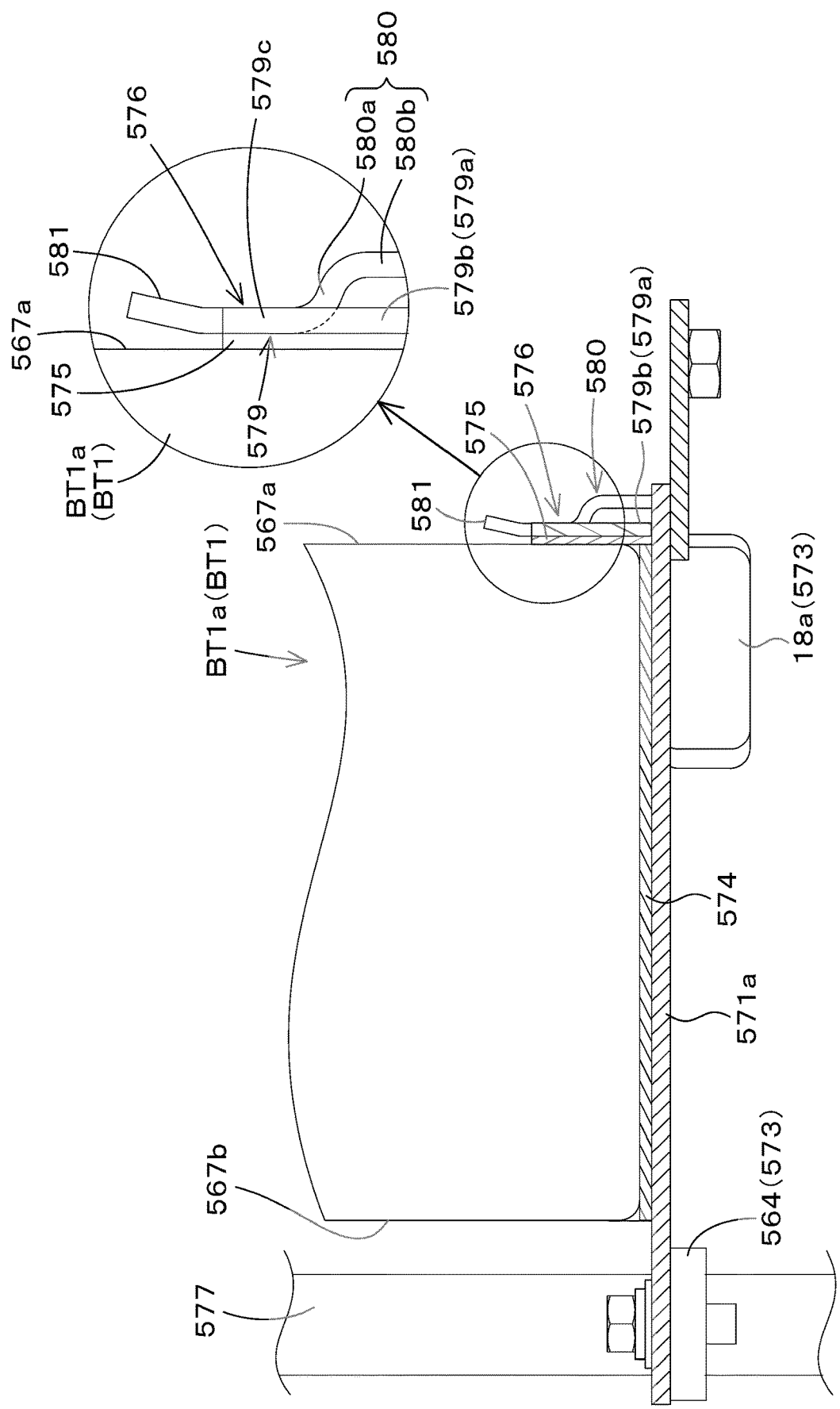
FIG. 96 is a cross section view illustrating a side surface of a lower portion of a first battery.

As shown in FIG. 93, the battery stand 566 has a mounting platform 571 and a control plate (regulator member) 572 fixed to the front portion of the mounting platform 571. The mounting platform 571 is formed by folding a single plate of wood and has a mounting wall 5a, a vertical support wall 571b, and a mounting wall 571c. As shown in FIG. 96 and FIG. 99, a battery BT1 (first battery BT1*a* and second battery BT1*b*) is placed on the mounting wall 571*a* via a cushioning material 574.

As shown in FIG. 93, the mounting wall 571*a* has a left fixing tool insertion hole 583*a* formed through the left portion and a right fixing tool insertion hole 583*b* formed through the right portion. The fixing tool insertion holes 583 and the fixing tool insertion holes 583 are formed by long holes in the front-to-rear direction. The mounting wall 571*a* has a fixing tool attachment section 584 at the rear and in the center of K2 in the width direction of the machine.

As shown in FIG. 93, the fixing tool attachment portion 584 has a first insertion hole 585*a* and a second insertion hole 585*b*. The first insertion hole 585*a* and the second insertion hole 585*b* are formed by penetrating the mounting wall 571*a* up and down. The first and second insertion holes 585*a* and 585*b* are formed side by side in the machine width direction K2.

Figure 94:
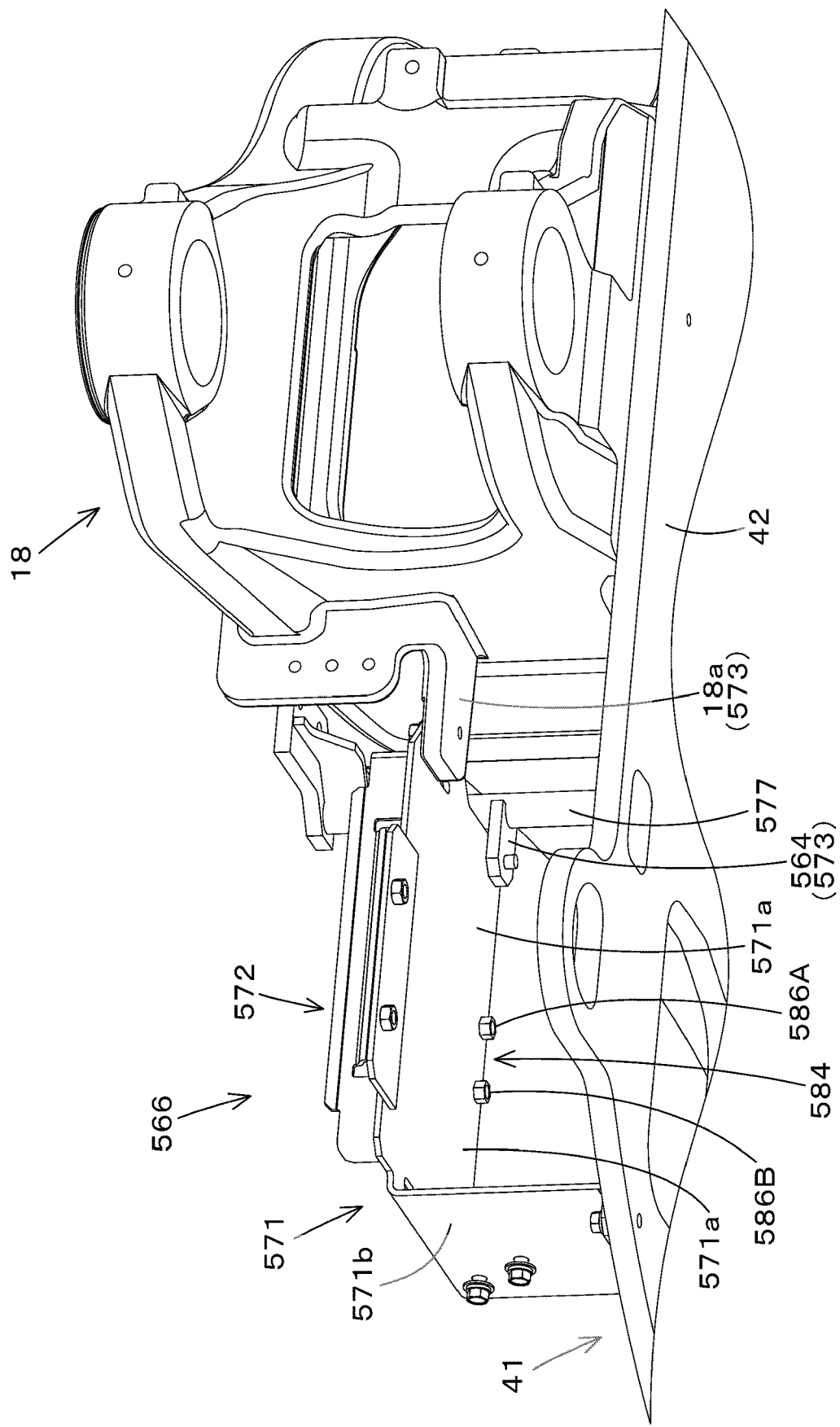
FIG. 94 is a perspective view of a battery base seen from a front lower side.

As shown in FIG. 94, the fixing tool attachment portion 584 has a first nut 586A and a second nut 586B. The first nut 586A corresponds to the first insertion hole 585*a*, and the second nut 586B corresponds to the second insertion hole 585*b*.

As shown in FIG. 94, the left side (one end side) of the mounting wall 571A is attached to the placing wall attachment portion 573 provided on the machine body 2. The placing wall attachment portion 573 includes a receiving wall 18*a* to which the front portion of the mounting wall 571*a* is attached and an attachment stay 564 to which the rear portion of the mounting wall 571*a* is attached. The receiving wall 18*a* is integrally formed on the right side of the support bracket 18. The attachment stay 564 is secured to the second frame portion 557 of the frame constituent member 206, as described above.

As shown in FIG. 93, the vertical support wall 571*b* is extended downwardly from the right end (other end) of the mounting wall 571*a*. The mounting wall 571*c* extends outwardly from the lower end potion of the longitudinal support wall 571*b* and is bolted to the longitudinal support wall attachment portion 42*a* of the swivel base plate 42 (machine body 2).

As shown in FIG. 93, the regulator plate 572 is made of a plate material, arranged on the front side of the upper surface of the mounting wall 571*a*, and fixed to the mounting wall 571*a* by welding or otherwise.

Figure 95:
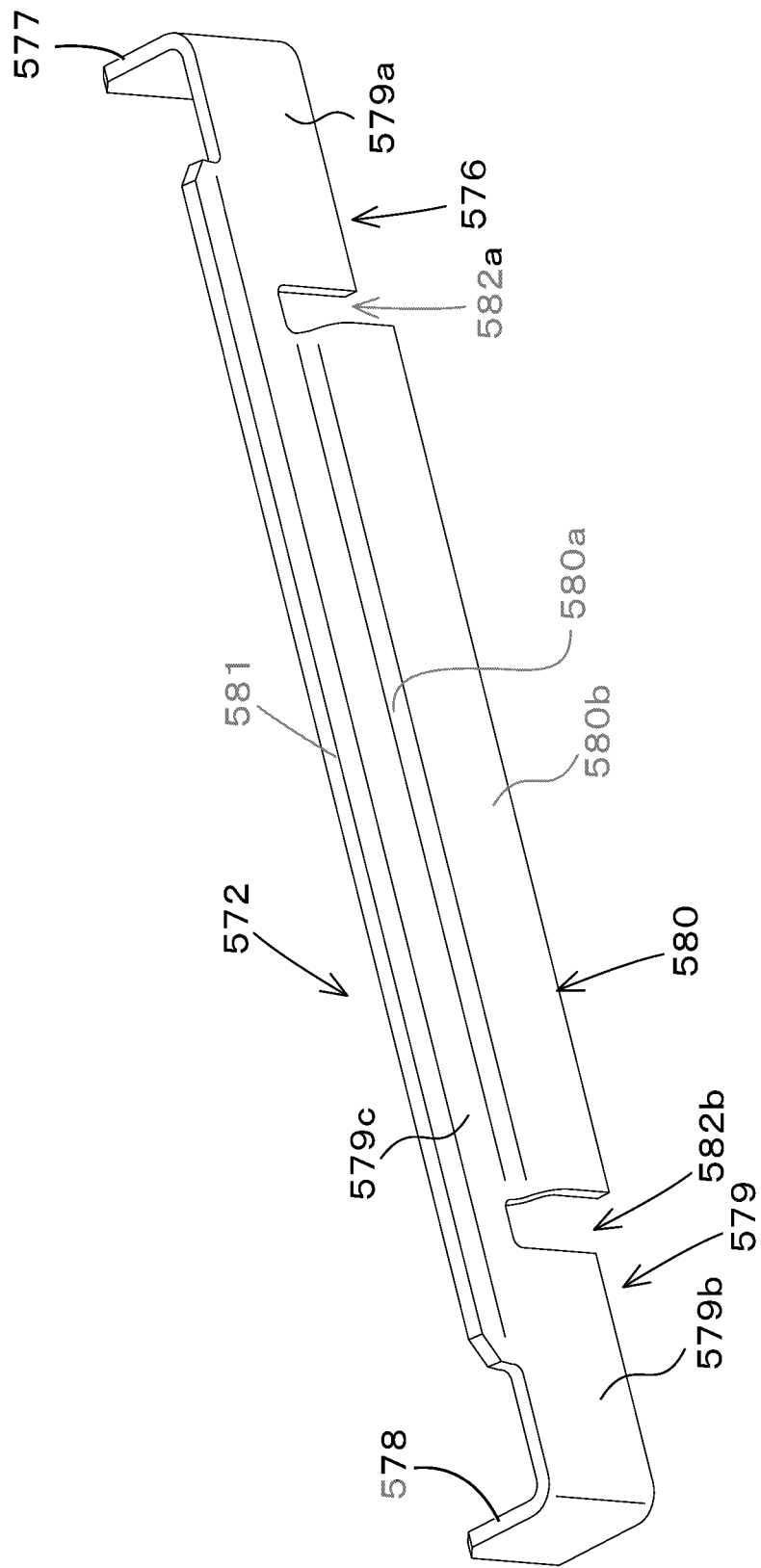
FIG. 95 is a perspective view of a regulator member.

As shown in FIG. 95, the regulator plate 572 has a main plate portion 576 standing on the mounting wall 5*a* and extending in the machine width direction K2, a first side plate portion 577 extending rearwardly from one end (left end) of the main plate portion 576, and a second side plate 578 extending rearwardly from the other end (right end) of the main plate portion 576.

As shown in FIG. 95, the main plate portion 576 has a first regulator portion (regulator portion) 579, a second regulator portion (regulator portion) 580 and an inclined portion 581. The first regulator portion 579 has one end side portion 579*a*, the other end side portion 579*b*, and a connecting portion 579*c* arranged with the plate surface facing the front-to-rear direction K1. The one end side portion 579*a* includes the left portion of the main plate portion 576. The other end side portion 579*b* includes the right portion of the main plate portion 576. The connecting portion 579*c* connects the upper portions of the one end side portion 579*a* and the other end side portion 579*b* to each other.

The second regulator portion 580 is formed between one end portion 579 and the other end portion 579*b*. The second regulator portion 580 is formed by cutting up the plate material including the main plate portion 576. In detail, it is formed by a cut-up piece formed by cutting up the main plate portion between a left notch portion 582*a* formed in the main plate portion 576 from a lower end upwardly and a right notch portion 582*b* formed in the same manner as the notch portion 582*a*. The second regulator portion 580 has an upper portion 580*a*, whose upper end is connected to the connecting portion 579*c* and shifts forward as extending downwardly, and a lower portion 580*b*, which extends downwardly from the lower end potion of the upper portion 580*a*.

The inclined portion 581 is formed in an inclined manner that shifts forward as extending upwardly from a portion of the one end portion 579*a* and the other end portion 579*b* and the connecting portion 579*c*.

Next, the installation of the first battery BT1*a* will be described.

As shown in FIG. 91 and FIG. 96, the main plate portion 576 corresponds to the front portion of the first battery BT1*a*, and the lower portion of the front surface 567*a* of the first battery BT1*a* is engaged (touched) via the cushioning material 575. This regulates the forward movement (movement to the front side) of the first battery BT1*a*.

The first side plate 577 engages the lower portion of the left side of the first battery BT1*a* via a cushioning material, and the second side plate 578 engages the lower portion of the right side of the first battery BT1*a* via a cushioning material. This regulates the movement of the first battery BT1*a* in the machine width direction K2.

As shown in FIG. 91, the first battery BT1*a* is secured to the battery stand 566 (mounting wall 571*a*) by the first fixing tool 587, which is held from the top side. In detail, the first fixing tool 587 has the attachment stay 587, a first rod member 589A, and a second rod member 589B. The attachment stay 587 is formed in an angular shape and is in contact with a corner of a upper surface 567*c* and a rear surface 567*b* of the first battery BT1*a*. The first rod member 589A has an upper portion penetrating the left portion of the attachment stay 587 and a lower portion penetrating the fixing tool insertion hole 577 and engaging the lower surface of the mounting wall 571*a*. The second rod member 589B has an upper portion penetrating the right portion of the attachment stay 587 and a lower portion penetrating the fixing tool insertion hole 578 and engaging the underside of the installation wall 571*a*. A fixing nut 590 is screwed to a male screw formed in the upper portion of the first and second rod members 589A and 589B, respectively. By tightening the fixing nuts 590, the first battery BT1*a* is secured (mounted) to the battery stand 566 by being pressed against the first regulator portion 579 and the mounting wall 571*a* from the top side.

Next, the installation of the second battery BT1*b* will be described.

As shown in FIG. 97 and FIG. 99, the main plate portion 576 corresponds to the front surface 569*a* of the second battery BT1*b*. The first engagement butt portion 569*g* of the second battery BT1*b* enters the rear side of the second regulator portion 580. The lower portion of the front surface 569*a* of the second battery BT1*b* engages (contacts) the connecting portion 579*c* and the second regulator portion 580 via the cushioning material 575. This regulates the forward movement (movement to the front side) of the second battery BT1*b*. The upward movement of the second battery BT1*b* is also regulated by the upper portion 580*a* of the second regulator portion 580.

The first side plate 577 engages the lower portion of the left side of the second battery BT1*b* via a cushioning material, and the second side plate 578 engages the lower portion of the right side of the second battery BT1*b* via a cushioning material. This regulates the movement of the second battery BT1*b* in the machine width direction K2.

Figure 98:
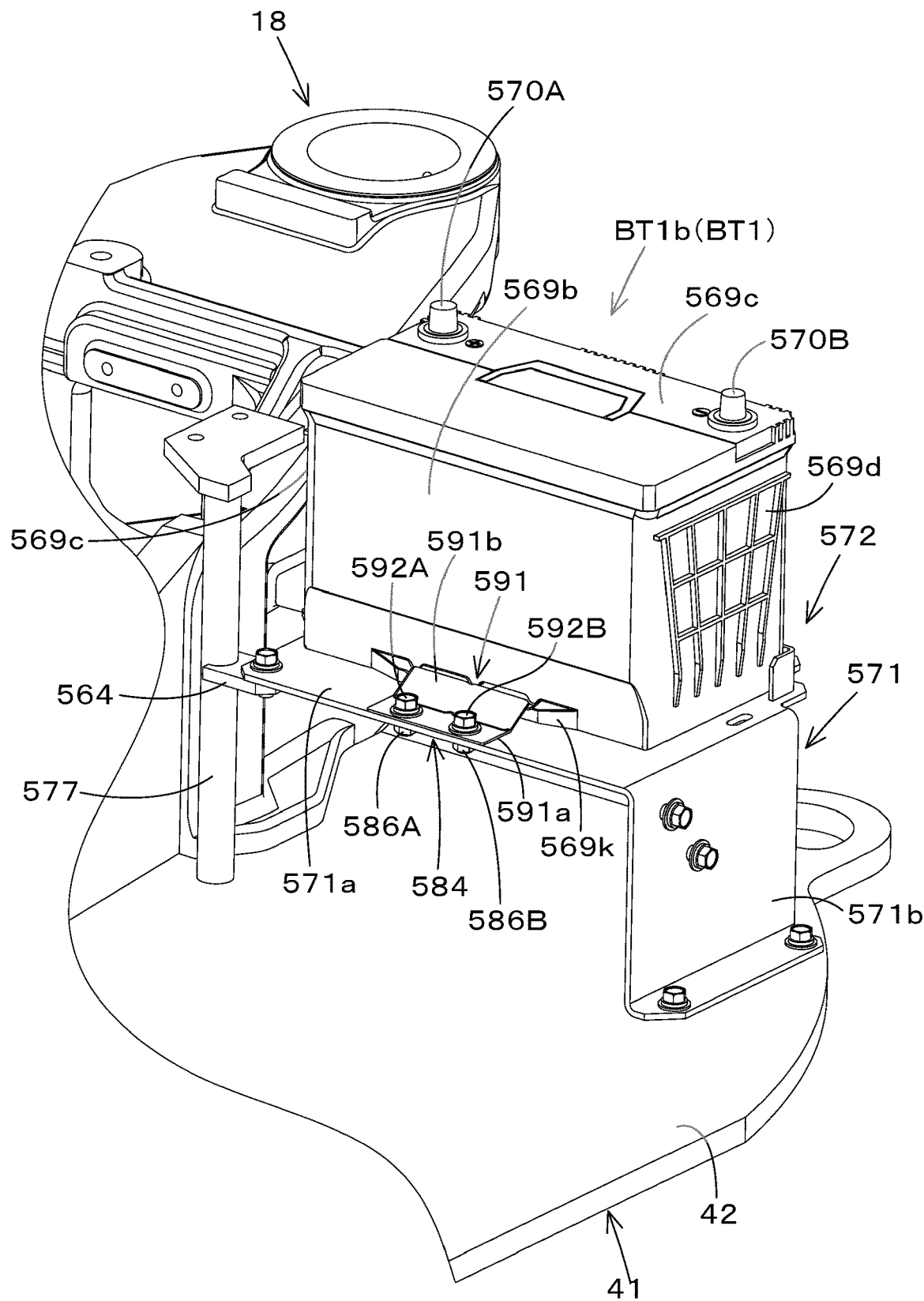
FIG. 98 is a perspective view of a second battery seen from a back surface side.

As shown in FIG. 98, the fixing tool attachment portion 584 is located behind the second engagement protrusion 569*k* with the second battery BT1*b* placed on the mounting wall 571*a* and the first engagement protrusion 569*g* entering the rear side of the second regulation portion 580. A second fixing tool 591 is attached to the fixing tool attachment portion 584.

As shown in FIG. 99, the second fixing tool 591 has a base section 591*a* and a holding portion 591*b*. The base portion 591*a* is superimposed on the fixing tool attachment portion 584 (placement wall 571*a*) and is attached to the fixing tool attachment portion 584 by means of the first bolt 592A and the second bolt 592B. In particular, the first bolt 592A is screwed to the first nut 586A by inserting through the base 591A and the first insertion hole 585A. The second bolt 592B is screwed to the second nut 586B by inserting through the base 591*a* and the second insertion hole 585*b*.

As shown in FIG. 99, the holding portion 591*b* is formed in an inclined shape that shifts upwardly from the front end potion of the base 591*a* as extending forward, and contacts the upper surface of the second engagement butt portion 569*k*. As a result, the second fixing tool 591 holds down the second engagement protrusion 569*k* and regulates the rearward movement (to the rear side) and upward movement of the second battery BT1*b*.

The second battery BT1*b* is fixed (mounted) to the battery stand 566 by having its forward movement regulated by the main plate portion 576 and its forward and upward movement regulated by the second regulator portion 580, and its backward and upward movement regulated by the second fixing tool 591.

As described above, the first battery BT1*a* and the second battery BT1*b* can be selectively mounted on the battery stand 566 (machine body 2). That is, the working machine 1 can be used for both a working machine of the first battery attachment specification and a working machine of the second battery attachment specification.

Since the inclined portion 581 is inclined to shift forward as extending upwardly, it is possible to guide the front lower end potion of the battery BT1 to the rear side of the main plate portion 576 when the battery BT1 is placed on the mounting wall 5*a* from above.

Figure 100:
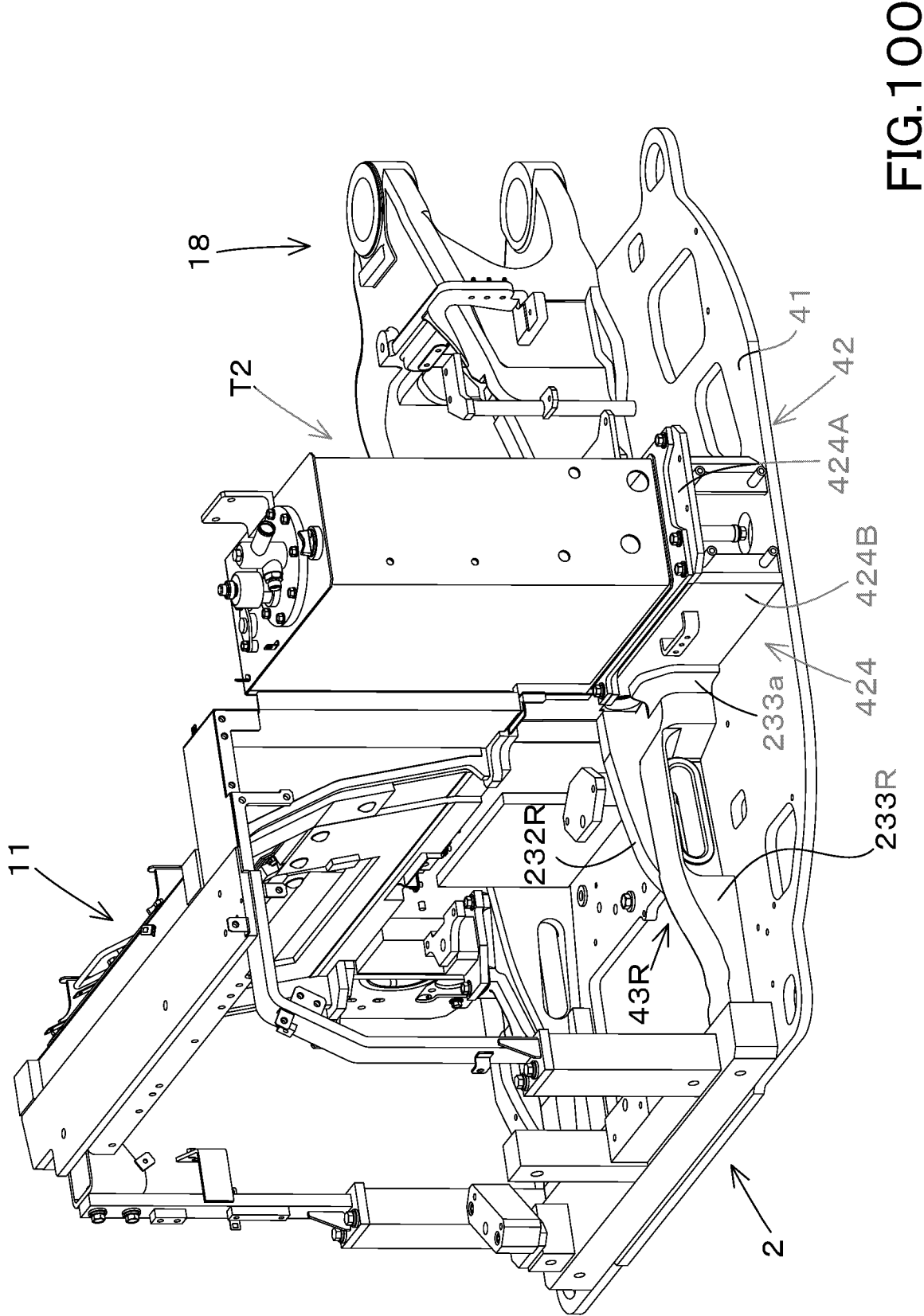
FIG. 100 is a perspective view illustrating an arrangement portion of an operation fluid tank.
Figure 101:
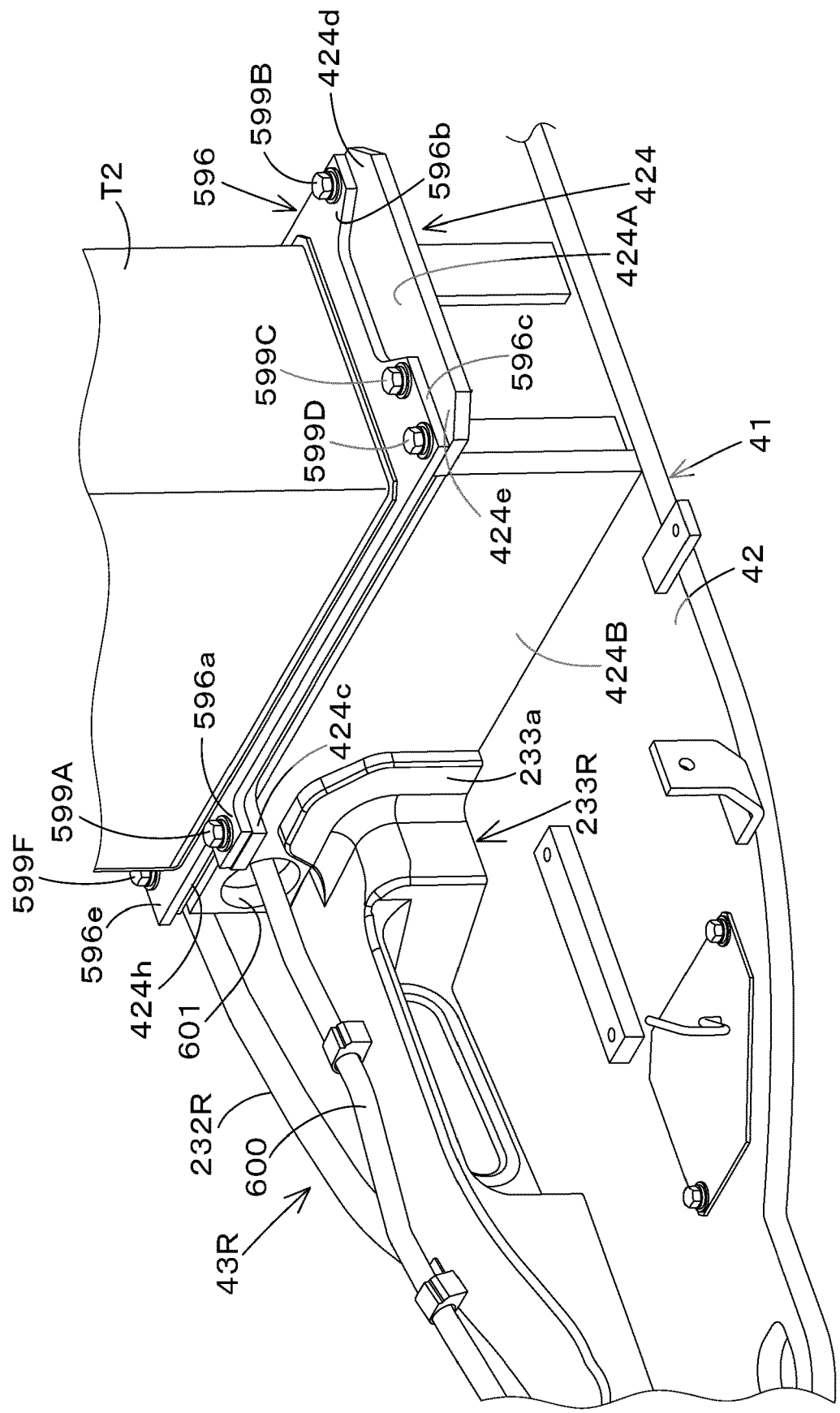
FIG. 101 is a perspective view of an attachment portion of an operation fluid tank seen from a back surface side.

As shown in FIG. 100, the tank platform 424 is fixed at the midpoint of the right side of the swivel frame 41 (machine body 2) in the front-to-rear direction. As shown in FIG. 101, a flange plate 596 is provided at the bottom of the hydraulic fluid tank T2. The flange plate 596 is fixed to the bottom surface of the hydraulic fluid tank T2 by welding it to the bottom surface of the hydraulic fluid tank T2. The flange plate 596 is provided protruding from the bottom of the hydraulic fluid tank T2.

Figure 102:
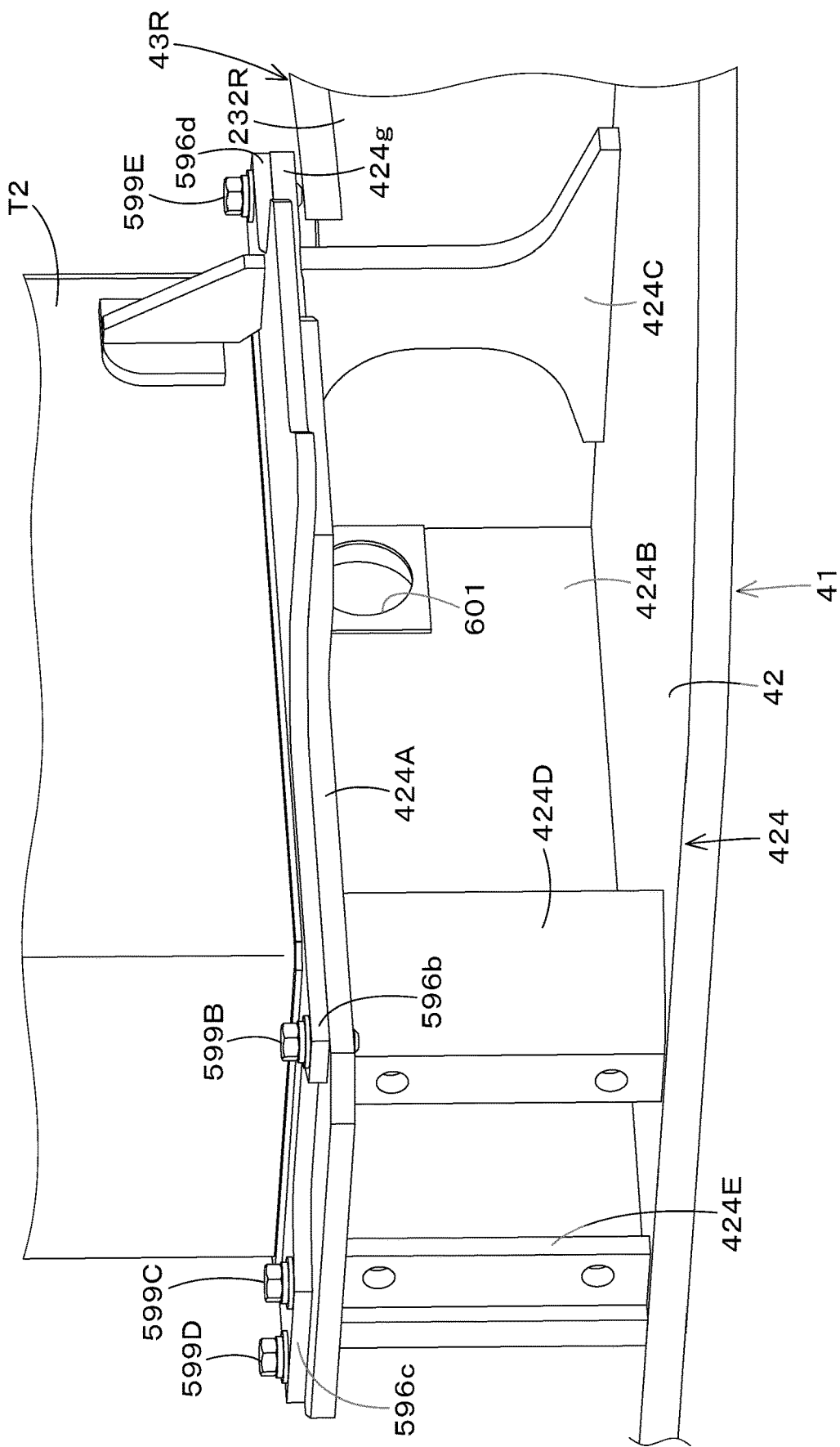
FIG. 102 is a perspective view of an attachment portion of an operation tank seen from a front surface side.

As shown in FIG. 101, the fixed portion 596*a* is provided at the rear portion of the flange plate 596. The fixed portion 596*b* and the fixed portion 596*c* are provided on the right side of the flange plate 596. The fixed portion 596*b* is provided on the right front portion of the flange plate 596 and the fixed portion 596*c* is provided on the right rear portion of the flange plate 596. As shown in FIG. 102, a fixed portion 596*d* is provided at the front portion of the left side of the flange plate 596. As shown in FIG. 101, a fixed portion 596*e* is provided at the rear portion of the left portion of the flange plate 596.

Figure 103:
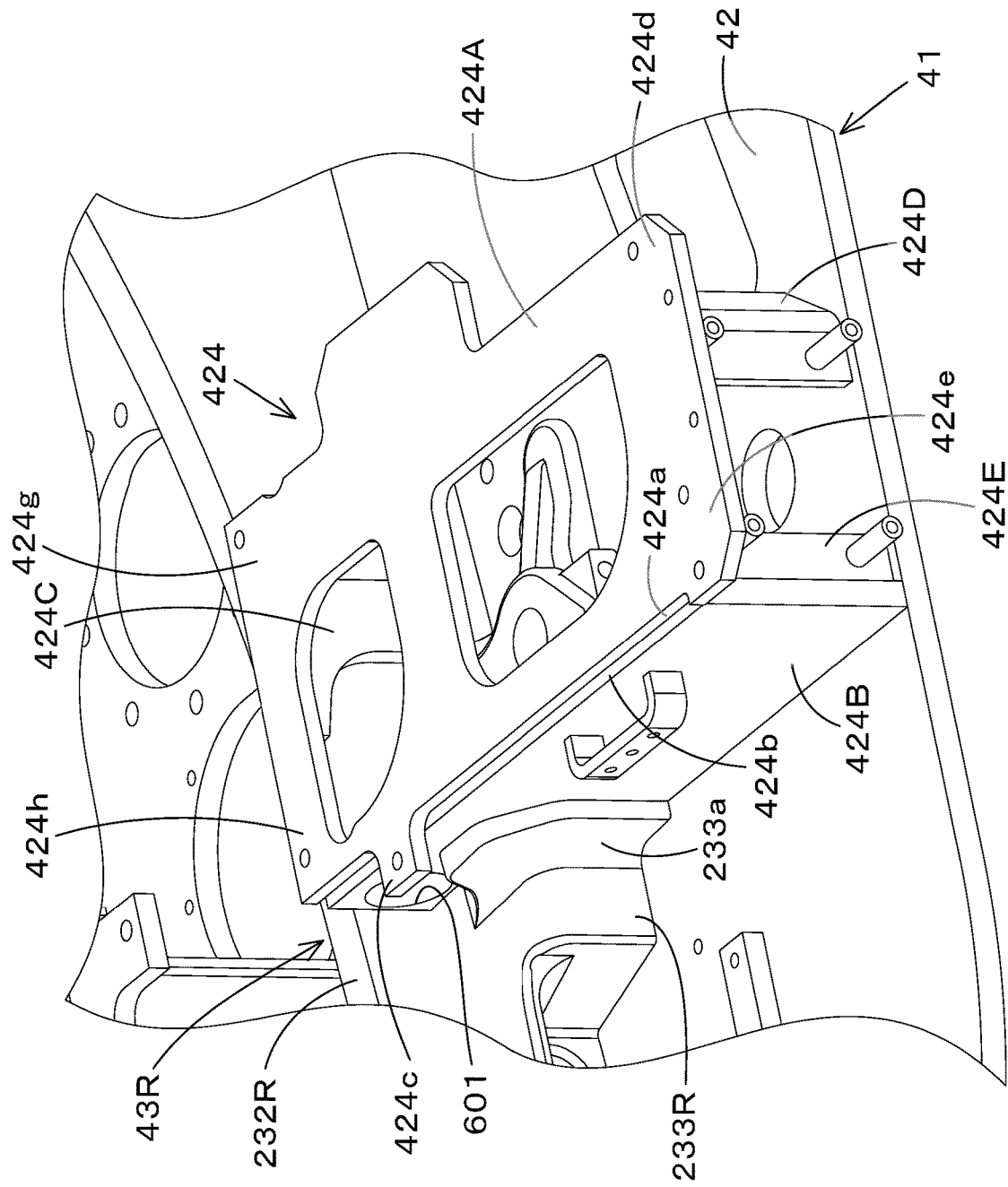
FIG. 103 is a perspective view of a tank base.

As shown in FIG. 101 to FIG. 103, the tank platform 424 has a plurality of support legs (first support leg 424C, second support leg 424D, and third support leg 424E) that support the tank attachment plate 424A, in addition to the tank attachment plate 424A and support plate 424B as described above. The first support legs 424C to the third support leg 424E are arranged below the tank attachment plate 424A and are welded to the swivel frame 41 (swivel base plate 42) and the tank attachment plate 424A. The first support leg 424 is arranged in front of the left end side of the tank attachment plate 424A and to the right of the front rib 232R of the second rib 43R. The second support leg 424D is arranged on the right front side of the tank attachment plate 424A. The third support leg 424E is arranged at the right rear portion of the tank attachment plate 424A and behind the support plate 424B.

Figure 104:
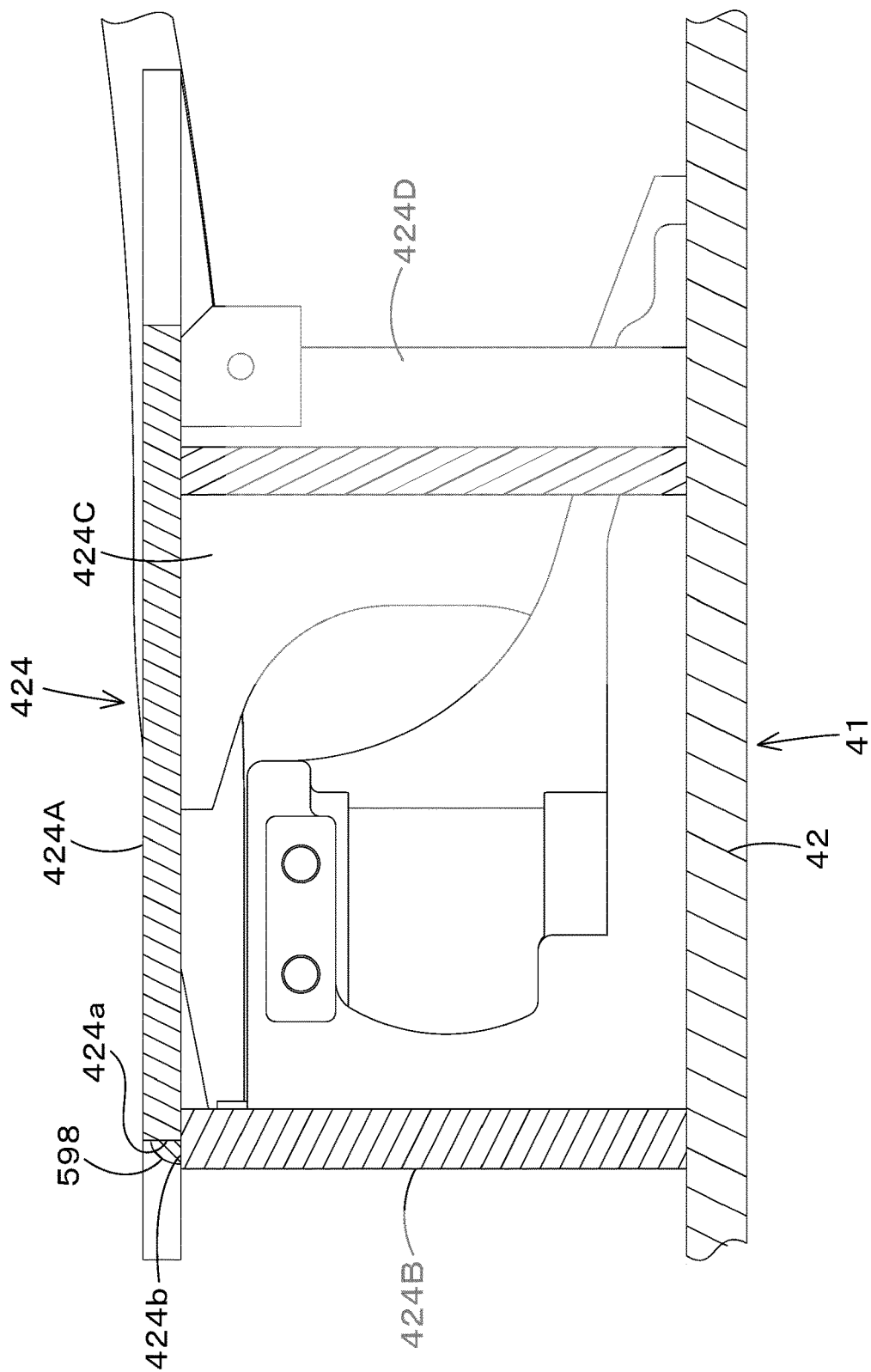
FIG. 104 is a cross section view of a tank base.

As shown in FIG. 104, the support plate 424B is formed by a thicker plate material that is thicker than the tank attachment plate 424A. The support plate 424B is arranged so that the plate surface faces the front-to-rear direction K1 (horizontal direction) and is welded and fixed to the swivel frame 41. In other words, the support plate 424B is erected on the swivel frame 41 with the plate thickness direction coinciding with the front-to-rear direction K1.

As shown in FIG. 103, the tank attachment plate 424A is arranged so that the plate surface faces up and down in the vertical direction and is fixed in contact with the support plate 424B and the upper ends of the plurality of support legs 424C to 424E. The tank attachment plate 424A has a joining surface 424*a* formed along the longitudinal direction (in the machine width direction) of the upper end surface 424B of the support plate 424B at the rear end (at one end in the direction along the plate surface). The joining surface 424*a* is located at a midpoint (center) in the thickness direction of the plate at the top end surface 424B of the support plate 424B. In the present embodiment, the joining surface 424*a* is located in the middle of the plate thickness direction at the top end surface 424B, and the rear end potion of the tank attachment plate 424A is placed on the front side of the top end surface 424B of the support plate 424B.

As shown in FIG. 104, the joining surface 424*a* is joined to the upper end surface 424B of the support plate 424B by welding portion 598. This connects the tank attachment plate 424A to the support plate 424B.

As shown in FIG. 103, the tank attachment plate 424A has the attachment piece 424*c* protruding rearwardly from the joining surface 424*a* on the left side of the rear side of the tank attachment plate 424A. The attachment piece 424*c* protrudes rearwardly from the support plate 424B. As shown in FIG. 101, a fixed portion 596*a* of the flange plate 596 is superimposed on the attachment piece 424*c*, and the attachment piece 424*c* and the fixed portion 596*a* are secured by bolts 599A.

As shown in FIG. 103, the tank attachment plate 424A has the attachment portion 424*d* at the front portion of the right portion and the attachment portion 424*e* at the rear portion of the right portion. The attachment portion 424*d* and the attachment portion 424*e* protrude to the right from the support plate 424B. The rear portion of the attachment portion 424*e* protrudes rearwardly from the joining surface 424*a*.

As shown in FIG. 101, the fixed portion 596*b* of the flange plate 596 is superimposed on the attachment portion 424*d*, and the attachment portion 424*d* and the fixed portion 596*b* are secured by bolts 599B. The fixed portion 596*c* of the flange plate 596 is superimposed on the attachment portion 424e, and the attachment portion 424e and the fixed portion 596c are secured by bolts 599C and bolts 599D.

As shown in FIG. 103, the tank attachment plate 424A has the attachment portion 424g at the front portion of the left portion and the attachment portion 424h at the rear portion of the left portion.

As shown in FIG. 102, a fixed portion 596d of the flange plate 596 is superimposed on the attachment portion 424g, and the attachment portion 424g and the fixed portion 596d are secured by bolts 599E. The fixed portion 596e of the flange plate 596 is superimposed on the attachment portion 424h, and the attachment portion 424h and the fixed portion 596e are secured by bolts 599F.

According to the above configuration, the joint surface 424A of the tank attachment plate 424A is placed on the upper end surface 424B of the support plate 424B, and the joint surface 424A and the upper end surface 424B are welded together, so that no welding distortion in the direction of hanging down acts on the rear portion of the tank attachment plate 424A. Welding distortion can be reduced. Also, the joint between the tank attachment plate 424A and the support plate 424B can be welded from above, and welding can be performed easily, thus improving the production efficiency.

As shown in FIG. 101, the rear rib 233R of the second rib 43R is fixed to the rear left portion of the support plate 424B. Also, a threaded hole 601 is formed on the back left portion of the support plate 424B for passing a harness or other arrangement member 600 through the back left portion of the support plate 424B.

FIG. 105 to FIG. 113 show other embodiments of the working machine 1.

Figure 105:
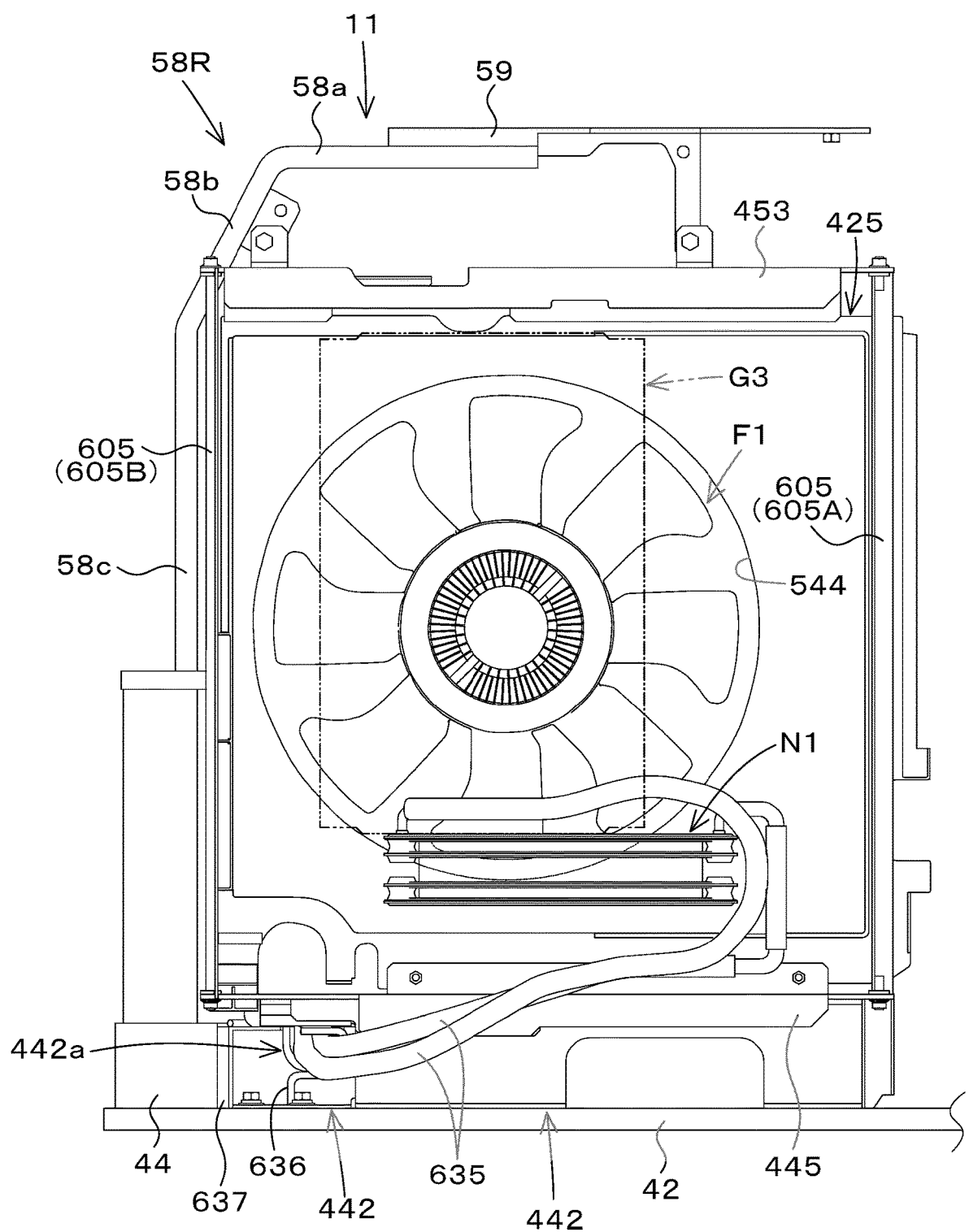
FIG. 105 is a side view illustrating a structure body to which a cooling device is attached.
Figure 106:
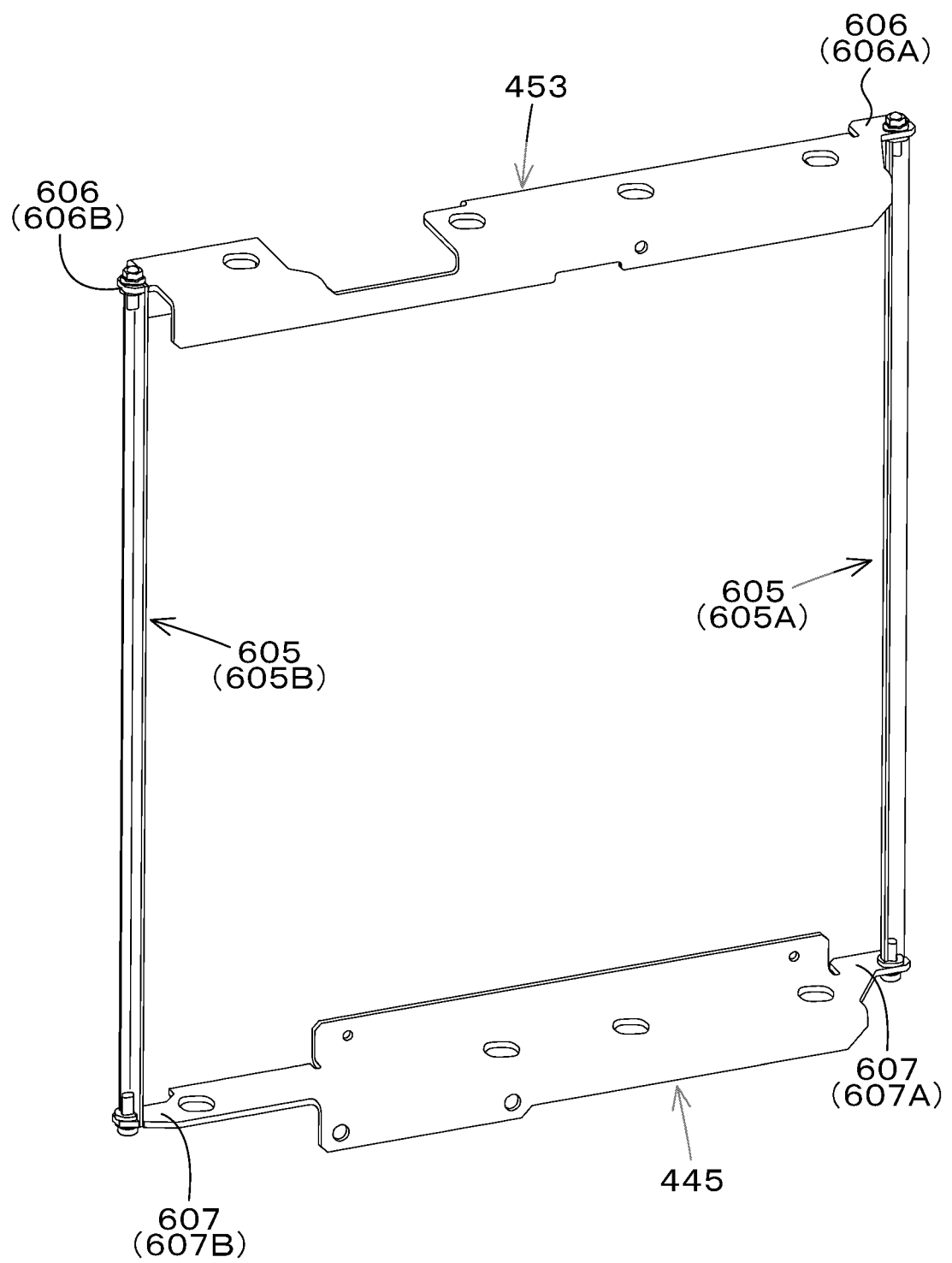
FIG. 106 is a perspective view illustrating a support bracket, a fitting bracket, and a coupler body.

As shown in FIG. 105, the working machine 1 according to the other embodiment is provided with a coupler body 605 connecting one end (front end side) and the other end (rear end) of the fitting bracket 453 and the support bracket 445 to each other. In detail, as shown in FIG. 105 and FIG. 106, the coupling body 605 includes a coupling body (first coupling body) 605A connecting the front end side of the fitting bracket 453 and the front end side of the support bracket 445 to each other, and a coupling body (second coupling body) 605B connecting the support bracket 445 and the rear end side of the fitting bracket 453 to each other. The first coupler body 605A connects the support bracket 445 and the fitting bracket 453 on the front end side of the oil cooler O1 The second coupler body 605B connects the support bracket 445 and the fitting bracket 453 at the rear end side of the radiator R1.

As shown in FIG. 106, the fitting bracket 453 has a first connecting piece 606 provided on the front end side and the rear end side. In detail, the first connecting piece 606 includes a front first connecting piece 606A integrally formed on the front end side of the fitting bracket 453 and a rear first connecting piece 606B integrally formed on the rear end side of the fitting bracket 453. The support bracket 445 also has a second connecting piece 607 on the front-to-rear direction end sides. In detail, the second connecting piece 607 includes a front side second connecting piece 607A integrally formed on the front end side of the support bracket 445 and a rear side second connecting piece 607B integrally formed on the rear end side of the support bracket 445.

Figure 107:
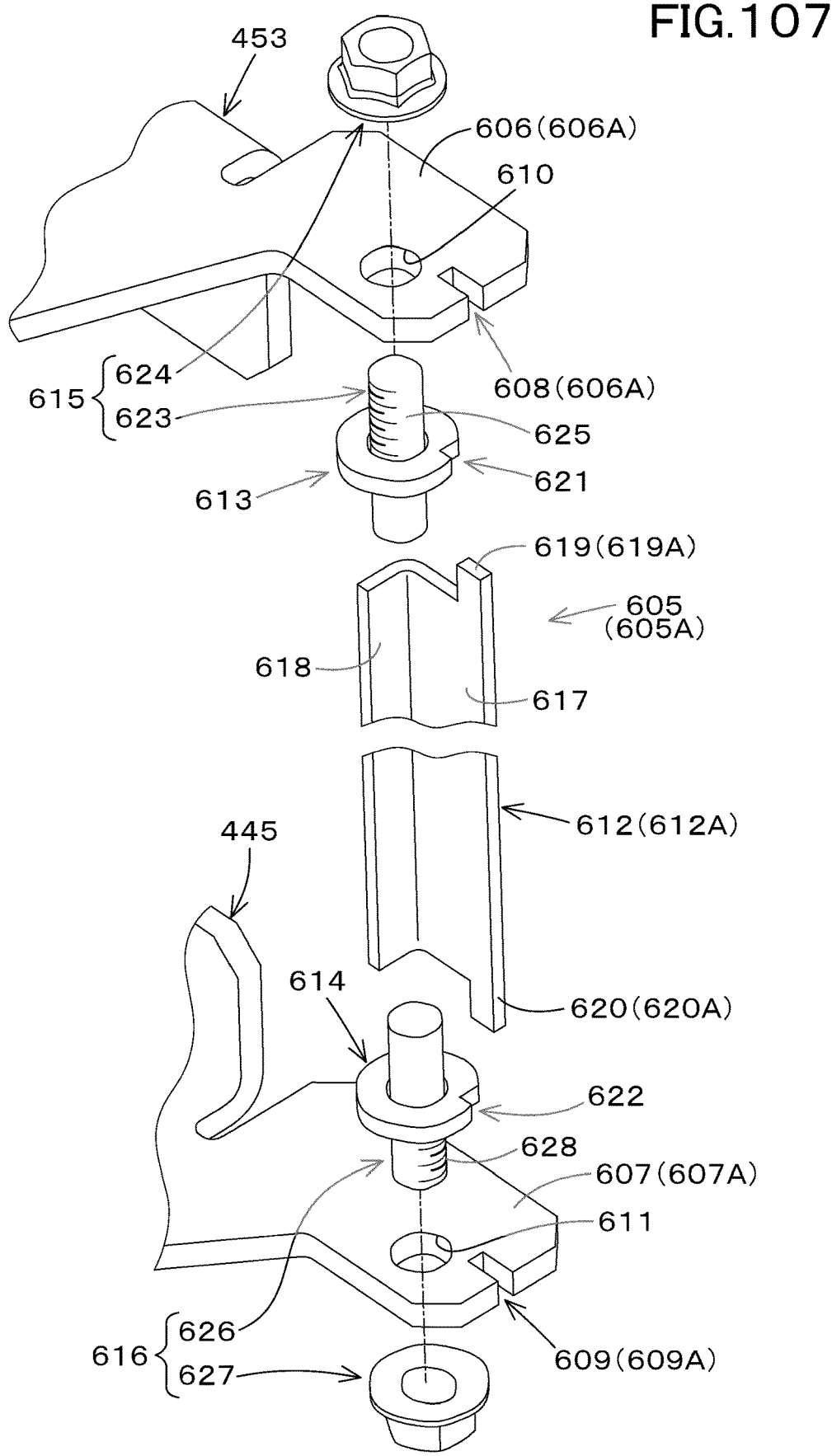
FIG. 107 is a perspective view illustrating development of a first connector member.
Figure 108:
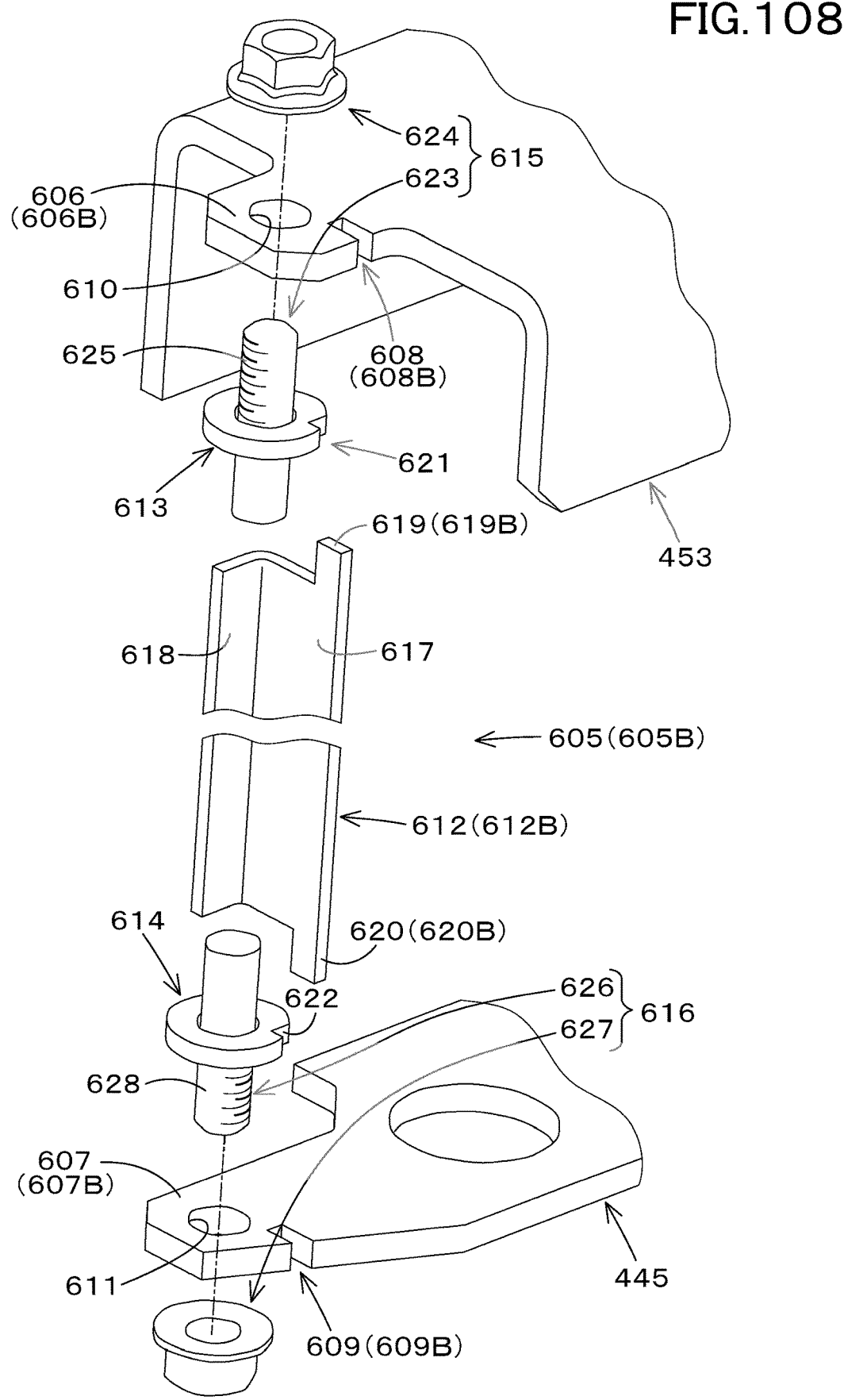
FIG. 108 is a perspective view illustrating development of a second connector member.

As shown in FIG. 107 and FIG. 108, the first connecting piece 606 and the second connecting piece 607 are formed in the form of a plate with a plate surface facing up and down. The first connecting piece 606 has a first groove 608. In detail, the first groove portion 608 includes a forward-opening front side first groove portion 608A formed in the first connecting piece 606A and a right-opening first groove portion 608B on the rear side formed in the first connecting piece 606B. The second connecting piece 607 has a second groove portion 609. In detail, the second groove portion 609 includes a forward opening, front side second groove portion 609A formed in the second connecting piece 607A and a rightward opening, rear side second groove portion 609B formed in the second connecting piece 607B. The first connecting piece 606A and the first connecting piece 606B have an insertion hole 610 formed in the vertical direction in a penetrating manner. The second connecting piece 607A and the second connecting piece 607B have an insertion hole 611 formed in the vertical direction in a penetrating manner.

As shown in FIG. 107 and FIG. 108, the connecting body 605 has a vertical member 612, a first contacting portion 613, a second contacting portion 614, a first fastener tool 615, and a second fastener tool 616. The vertical member 612 is formed by a plate material and is provided over the first connecting piece 606 and the second connecting piece 607. The vertical member 612 is formed in the form of a flat cross-sectional L-shape from a first wall 617 and a second wall 618 extending from the first wall 617. In the first connecting body 605A, the first wall 617 has a plate surface facing K2 in the machine body width direction, and the second wall 618 is extended to the right from the rear end potion of the first wall 617. In the second coupler body 605B, the first wall 617 has a plate surface facing K1 in the front-to-rear direction and the second wall 618 is extended backwardly from the left end potion of the first wall 617.

The vertical member 612 has a first protrusion 619 that fits into the first groove portion 608 at the top and a second protrusion 620 that fits into the second groove portion 609 at the bottom. In detail, the first protrusion 619 includes a first protrusion 619A, which is provided in the vertical member 612A of the first linkage 605A and fits into the first groove 608A, and a first protrusion 619B, which is provided in the vertical member 612B of the second linkage 605B and fits into the first groove 608B. The second protrusion 620 includes a second protrusion 620A, which is provided in the vertical member 612A and fits into the second groove 609A, and a second protrusion 620B, which is provided in the vertical member 612B and fits into the second groove 609B.

The first and second contacting portions 613 and 614 are formed in the form of a disc ring. The first contacting portion 613 is fixed to the upper portion of the vertical member 612. In detail, the first contact portion 613 is fixed to an upper surface of the second wall 618 and an upper surface of the first wall 617 continuous with the upper surface. The first contacting portion 613 has a first notch 621 for preventing interference with the first protrusion 619. The first contacting portion 613 contacts the lower surface of the first connecting piece 606.

The second contacting portion 614 is fixed to the lower portion of the vertical member 612. In detail, the second contacting portion 614 is fixed to the lower surface of the second wall 618 and to the lower surface of the first wall 617, which is continuous with the lower surface. The second contacting portion 614 has a second notch 622 for preventing interference with the second protrusion 620. The second contacting portion 614 contacts the top surface of the second connecting piece 607.

The first contact portion may be configured at the top end potion of the vertical member 612 and the second contact portion may be configured at the top end potion of the vertical member 612.

The first fastener tool 615 is a member that attaches the vertical member 612 to the first connecting piece 606. The first fastening fixing tool 615 has a first bolt member 623 and a first nut member 624. The first bolt member 623 is formed in a rod shape and has a male threaded portion 625 at the top. The first bolt member 623 inserts the first contact portion 613, and the lower portion is fixed to the upper portion of the vertical member 612. In detail, the first bolt member 623 is fixed to the corner of the first wall 617 and the second wall 618. The male threaded portion 625 of the first bolt member 623 protrudes upwardly from the first contact portion 613 and inserts the insertion hole 610 of the first connection piece 606. By screwing the first nut member 624 into the male threaded portion 625 of the first bolt member 623, the upper portion of the vertical member 612 is attached to the first connection piece 606.

The second fastener tool 616 is a member that attaches the vertical member 612 to the second connecting piece 607. The second fastener tool 616 has a second bolt member 626 and a second nut member 627. The second bolt member 626 is formed in a rod shape and has a male threaded portion 628 at the bottom. The second bolt member 626 inserts the second contacting portion 614 and is fixed at the bottom of the vertical member 612 by the upper portion. In detail, the second bolt member 626 is secured to the second wall 618 and the corner of the second wall 618. The male threaded portion 628 of the second bolt member 626 protrudes downwardly from the second contacting portion 614 and inserts the insertion hole 611 of the second connection piece 607. By screwing the second nut member 627 into the male threaded portion 628 of the second bolt member 626, the lower portion of the vertical member 612 is attached to the second connection piece 607.

As shown in FIG. 106, a rectangular structure is formed by the support bracket 445, the fitting bracket 453, the first linkage 605A and the second linkage 605B. This allows the first and second linkages 605A and 605B to reinforce the support bracket 445 and the fitting bracket 453 and improve their strength.

The vertical member 612 is arranged between the first and second connection pieces 606 and 607, and the first contact portion 613 is brought into contact with the lower surface of the first connection piece 606 and the second contact portion 614 is brought into contact with the upper surface of the second connection piece 607, thereby regulating the vertical distance between the fitting bracket 453 and the support bracket 445. The shroud 425 is attached to the fitting bracket 453 and the support bracket 445, but the spacing between the fitting bracket 453 and the support bracket 445 can be regulated by the first coupler body 605A and the second coupler body 605B, so that the fitting bracket 453 and the support bracket 445 and the dimensional accuracy of the installation with the shroud 425 can be improved.

As shown in FIG. 105, in other embodiments, the fuel cooler N1 is placed horizontally in front of the lower portion of the shroud 425. This allows for better ventilation of the cooling airflow to the condenser G3 and improves the heat balance of the condenser G3.

Figure 109:
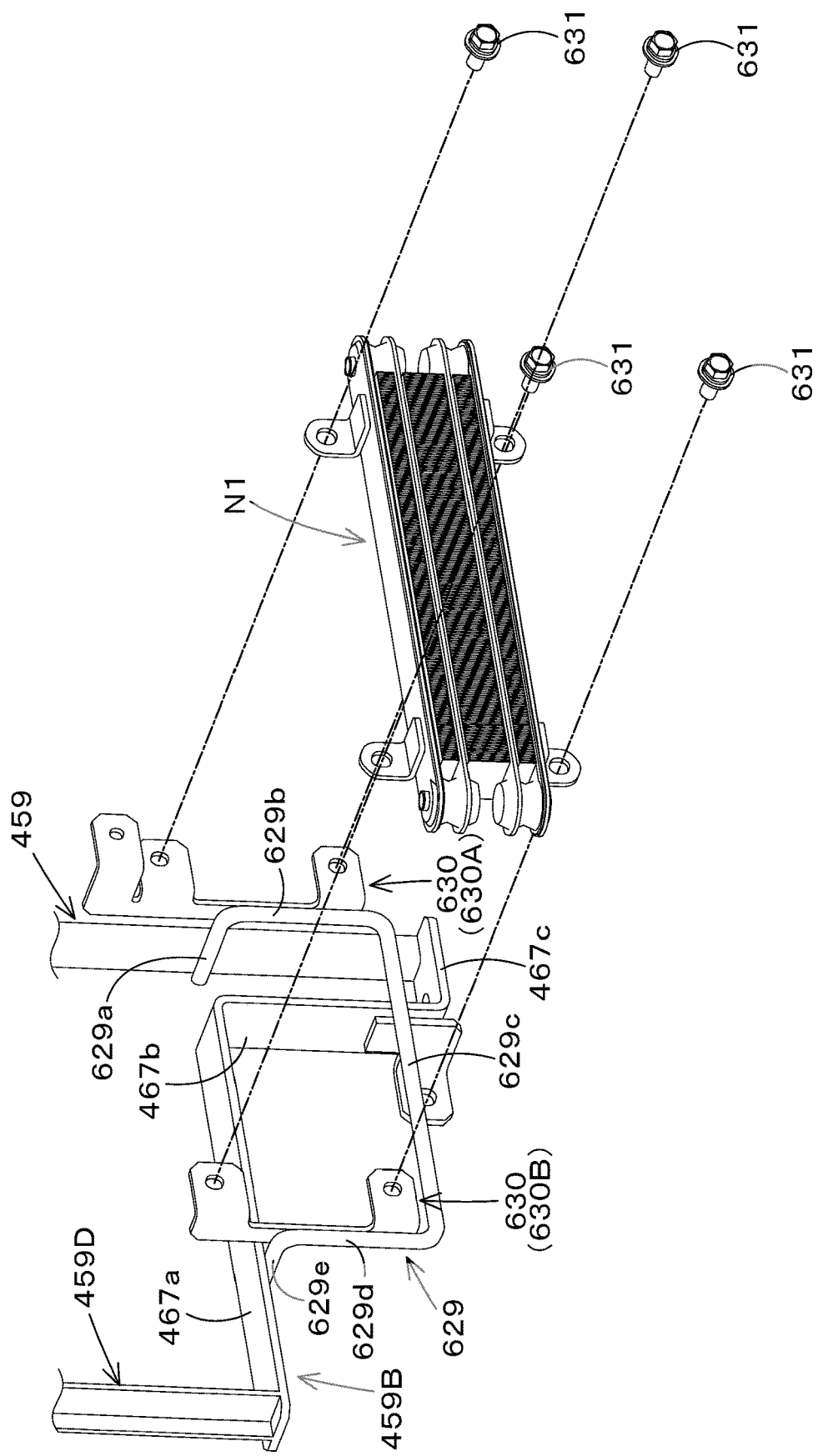
FIG. 109 is a perspective view of a fuel cooler and an attachment frame.

As shown in FIG. 109, the attachment frame 472 for mounting the fuel cooler N1 is located at the bottom of the connector frame 459. The attachment frame 472 has a support rod 629 and the attachment stay 630.

The support rods 629 have a first portion 629*a* fixed to the lower portion of the front frame member 459C, a second portion 629*b* extending downwardly from the right end potion of the first portion 629*a*, a third portion 629*c* extending backwardly from the lower end potion of the second portion 629*b*, a fourth portion 629*d* extending upwardly from the rear end potion of the third portion 629*c*, and a fifth portion 629*e* extending leftwardly from the upper end potion of the fourth portion 629*d* and fixed to the first portion 467*a* of the lower frame member 459B.

The attachment stay 630 has the first attachment stay 630A secured to the second portion 629B and the second attachment stay 630B secured to the fourth portion 629D.

The fuel cooler N1 is attached to the first attachment stay 630A and the second attachment stay 630B by means of bolts 631 and a nut that screws into the bolts 631.

Figure 110:
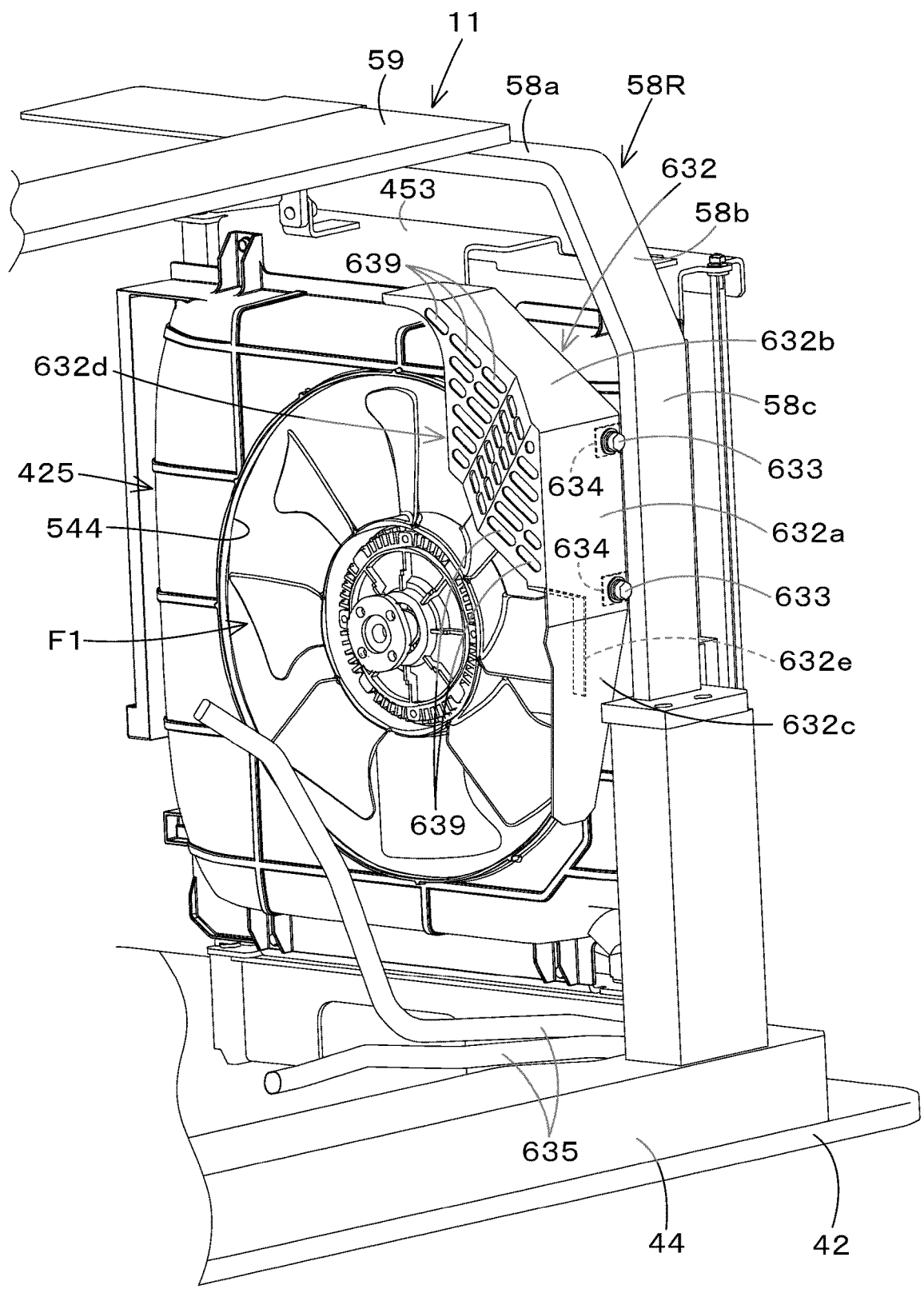
FIG. 110 is a perspective view illustrating an attachment portion of a fan cover.
Figure 111:
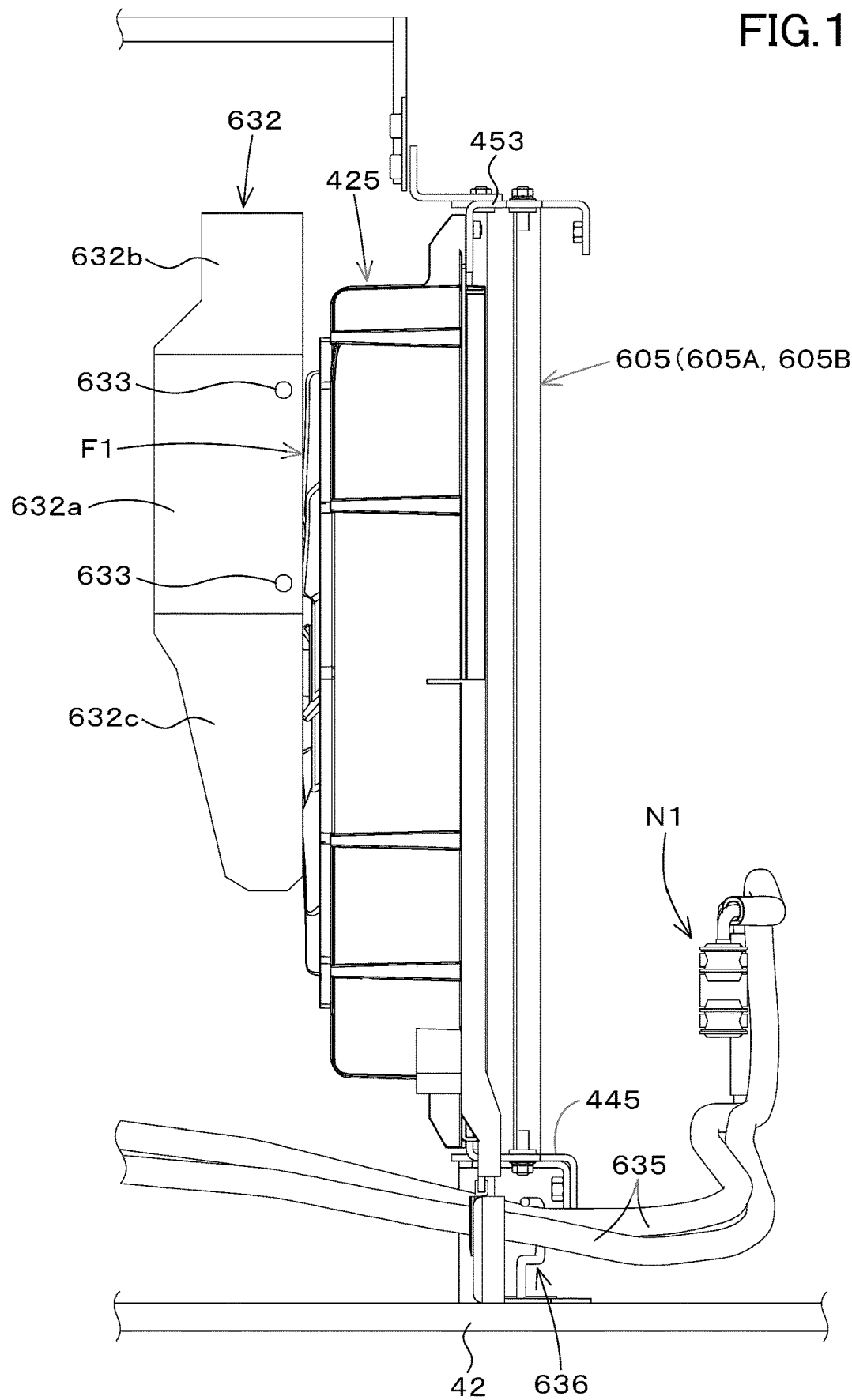
FIG. 111 is a back view illustrating an attachment portion of a fan cover.
Figure 112:
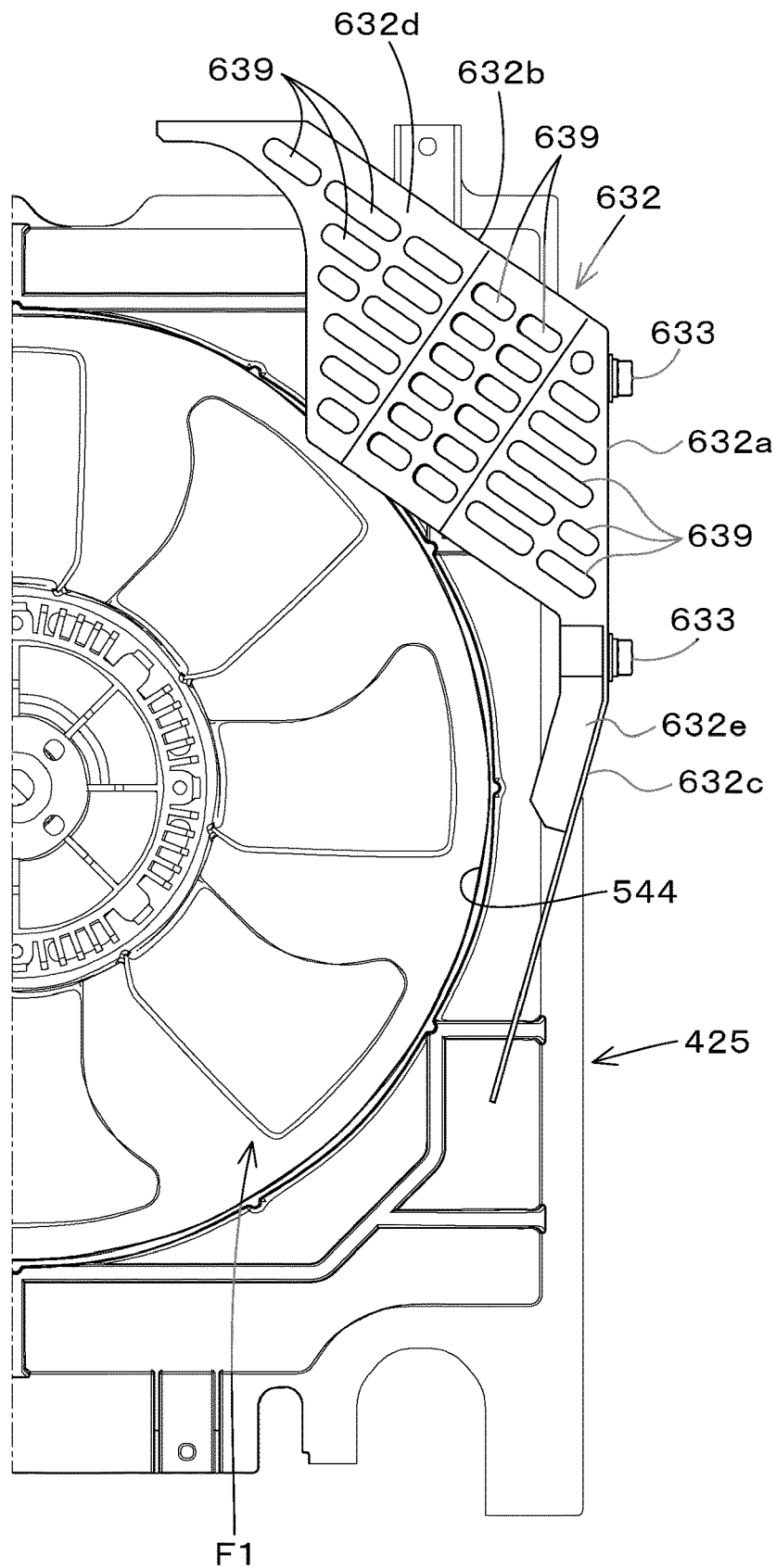
FIG. 112 is a side view illustrating an attachment portion of a fan cover.

FIG. 110 to FIG. 112 show a portion of the fan cover 632 arranged on the rear side of the cooling fan F1. The fan cover 632 is positioned near the left side of the shroud 425 and on the rear side. The fan cover 632 is formed from a plate material and has the first plate portion 632*a*, the second plate portion 632*b*, the third plate portion 632*c*, the fourth plate portion 632*d*, and the fifth plate portion 632*e*.

The first plate portion 632*a* is arranged on the side (to the right) of the lower portion 58*c* of the second rear leg 58R with the plate surface facing forward and backward, and is attached to the stay 634 fixed to the lower portion 58*c* by bolts 633 and the like. The second plate portion 632*b* extends from the top end potion of the first plate portion 632*a* in an inclined direction that transitions forward as extending upwardly from the top end potion of the first plate portion 632*a* and then extends forward. The upper portion of the second plate portion 632*b* is located above the top edge of the shroud body 541. The third plate portion 632*c* extends in an inclined direction that transitions forward from the lower end potion of the first plate portion 632*a* downwardly. The fourth plate portion 632*d* is formed so that the plate surface faces the machine width direction K2, and its rear end is connected to the right end potion of the first plate portion 632*a* and its upper end is connected to the right end potion of the second plate portion 632*b*. The fourth plate portion 632*d* is spaced on the left side of the upper rear portion of the shroud 425 and is positioned so as not to obstruct the airflow path of the cooling airflow. The fourth plate portion 632*d* has a number of ventilation holes 639. The fifth plate portion 632*e* extends from the lower end potion of the fourth plate portion 632*d* in an inclined direction that shifts to the right as extending downwardly from the lower end potion of the fourth plate portion 632*d*, and then extends downwardly. The fifth plate portion 632*e* is fixed to the front surface of the third plate portion 632*c* and reinforces the third plate portion 632*c*. The fan cover 632 functions as a guard for the cooling fan F1 and as a guiding member for the cooling airflow.

Figure 113:
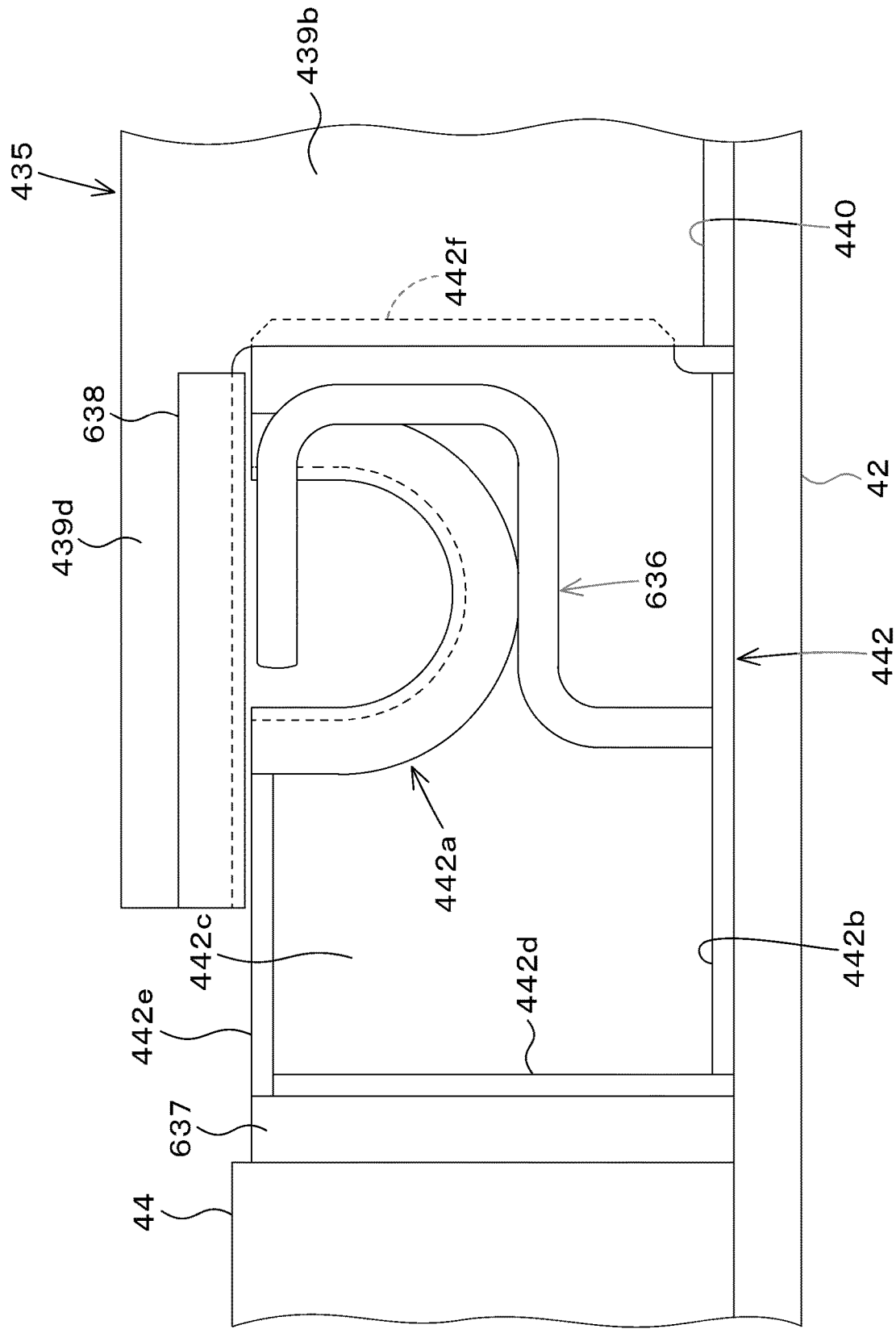
FIG. 113 is a side view of a closer plate and periphery thereof.
Figure 114:
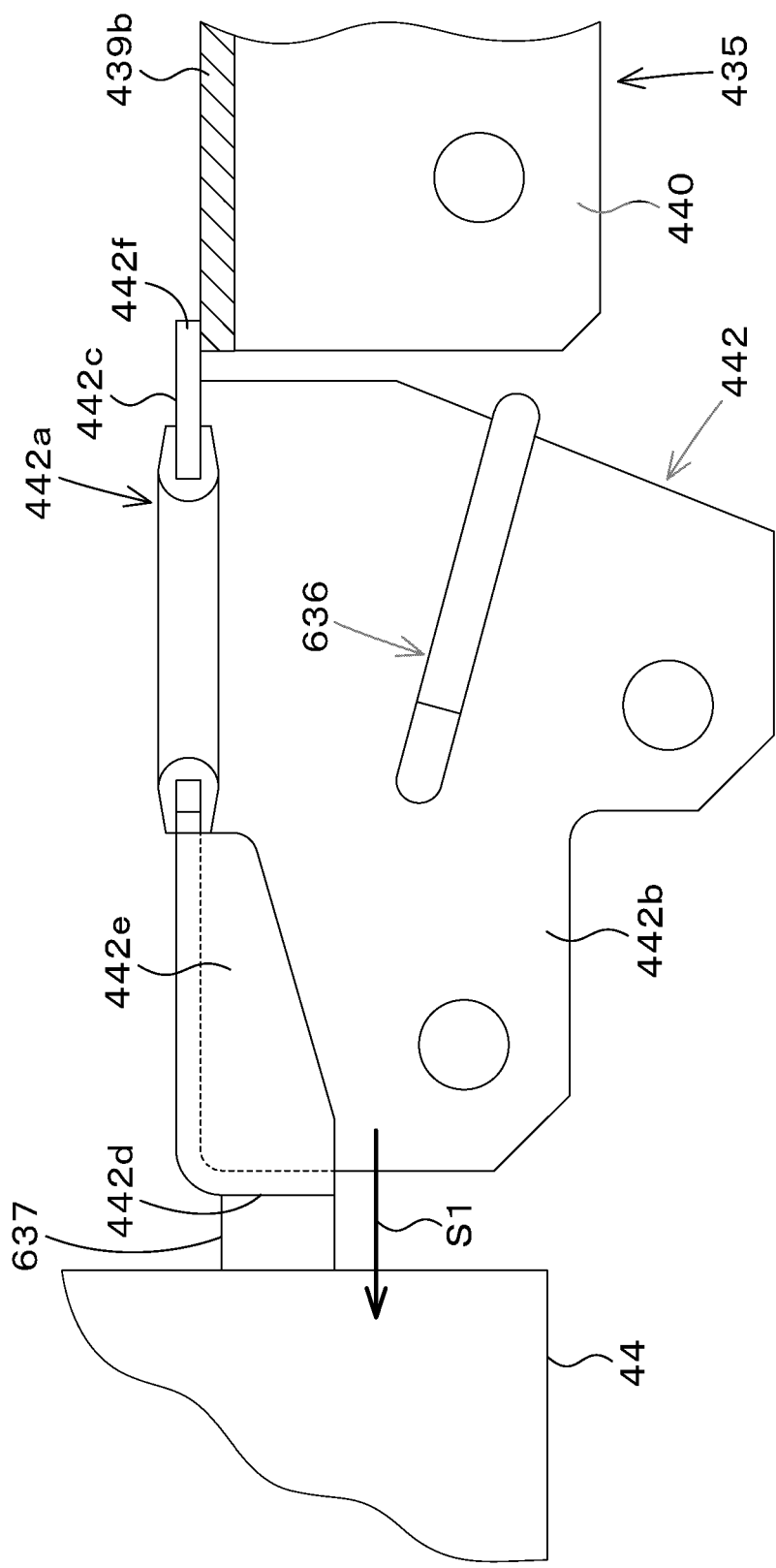
FIG. 114 is a plan view of a closer plate and periphery thereof.

FIG. 113 shows the right side of the arrangement portion of the closing plate 442. FIG. 114 shows a plan view of the arranged portion of the blockage plate 442. The closing plate 442 consists of a base portion 442*b* bolted to the swivel base plate 42, a closure portion 442*c* extending upwardly from the right end potion of the base portion 442*b*, a rear wall 442*d* extending outwardly (to the right) from the rear end potion of the closure portion 442*c*, and a rear upper wall portion 442*e* extending outwardly from the rearward side of the passage portion 442*a* in the closure portion 442*c*.

The guide member 636 is fixed to the base portion 442*b* to guide the fuel hose 635 which is arranged through the passage portion 442*a*. The front end portion 442*f* of the closing portion 442*c* is arranged on the inner side of the machine body of the rear portion 439*b* of the vertical plate portion 439. The rear surface of the rear wall portion 442*d* is a seal contact surface touching a seal material (noise insulator material) 637 provided between the rear wall portion 442d and the weight support portion 44. The upper surface of the rear upper wall portion 442e is a seal-attached surface that contacts the trim seal 638 on the lower edge of the extended portion 439d of the longitudinal plate portion 439 and the seal material 550 (see FIG. 56) attached to the shroud 425 seal attachment wall 551.

When replacing the fuel hose 635, it is necessary to remove the closing plate 442. However, since the front end portion 442f of the closure portion 442c is located on the inner side of the machine body of the rear portion 439b of the vertical plate portion 439, it is not possible to remove the closing plate 442 on the outer side of the machine body as it is. Thus, to remove the closing plate 442, first release the fixing of the base portion 442b to the swivel base plate 42, and move the closing plate 442 in the direction of the arrowed line S1 (rearward) in FIG. 114. Then, due to elastic deformation of the seal material 637, the front end portion 442f of the closure portion 442c is removed rearwardly from the rear portion 439b of the vertical plate portion 439. This allows the closing plate 442 to be removed outwardly from the machine body.

The other configurations of the other embodiments described above are configured in the same manner as the one embodiment described above.

In the working machine of this embodiment, the following effects are achieved.

The working machine 1 has the swivel frame 41 supported by the traveling device 3 and capable of turning around the longitudinal axis center (swivel axis center X1), the swivel joint 334 arranged in the longitudinal axis center position and inserting an opening hole (first opening hole 321) formed in the swivel frame 41, and the closing cover 343 mounted on the swivel frame 41 and contacting the swivel joint via a sealing member 348 to cover the gap between the opening hole and the swivel joint 334.

According to this configuration, the closing cover 343 prevents foreign matter from falling from between the swivel joint 334 and the opening hole of the swivel frame 41.

The closing cover 343 has the cover plate 349 covering the opening hole with the notched edge portion 352 spaced against the outer circumference surface 336b of the swivel joint 334, and the sealing member 348 protrudes from the notched edge portion 352 toward the outer circumference surface 336b of the swivel joint 334 and contacts the outer circumference surface 336b.

According to this configuration, the gap between the opening hole and the swivel joint 334 can be well covered.

The cover plate 349 has the first plate member 355 and the second plate member 356 arranged between the first plate member 355 and the swivel joint 334, and the sealing member 348 has the first sealing member 348A attached to the first plate member 355 and the second sealing member 348B attached to the second plate member 356.

According to this configuration, with the swivel joint 334 in place, the closing cover 343 can be installed by retrofit with the swivel joint 334 in place.

The cover plate 349 has the notched groove 354 that prevents interference with the pipe joints 353 that are selectively attached to the swivel joint 334, and the closing cover 343 has an auxiliary cover 350 that can cover the notched groove 354 in a state where the pipe joints 353 are not attached.

This configuration allows for the installation of an optional hydraulic actuator.

The swivel joint 334 has the outer sleeve 335 mounted on the traveling device 3, and an inner shaft 336 inserted through the opening hole and rotatably inserted into the outer sleeve 335 around the longitudinal axis and regulated in rotation with respect to the swivel frame 41, and the closing cover 343 covers the gap between the opening hole and the inner shaft 336.

According to this configuration, the closing cover 343 prevents foreign matter from falling from between the inner shaft 336 and the opening hole of the swivel frame 41.

The swivel joint 334 has the locking member 344 attached to the swivel frame 41, and the swivel joint 334 has an engagement member 338 which is provided on the inner shaft 336 and regulates the rotation of the inner shaft 336 with respect to the swivel frame 41 by engaging with the locking member 344, and the first plate member 355 has the first edge portion 355a facing the locking member 344 in a circumferential direction C6 around the longitudinal axis center, and the second plate member 356 has the second edge portion 356a sandwiching the locking member 344 with the first edge portion 355a in a circumferential direction C6.

According to this configuration, the gap between the opening hole and the swivel joint 334 in the attachment portion of the locking member 344 can be well covered.

The outer sleeve 335 has a receiver portion 335a at the top, the inner shaft 336 has the attachment portion 336a supported by the receiver portion 335a, and the swivel joint 334 has the sealing cover 358 covering the space between the receiver portion 335a and the attachment portion 336a.

According to this configuration, foreign objects such as dust, water, oil and the like can be prevented from entering the swivel joint 334 from the joint between the inner shaft 336 and the outer sleeve 335.

The working machine 1 also includes the swivel base plate 42 rotatably supported on the traveling device 3 around a longitudinal axis center (swivel axis center X1), the weight 46 provided at the rear portion of the swivel base plate 42, and the weight support portion 44 to which the weight 46 is attached, the weight support portion 44 being formed by a thicker plate material thicker than the swivel base plate 42 and fixed on the swivel base plate 42, and having the weight support surface 361 for placing and supporting the weight 46.

According to this configuration, by placing the weight 46 on the weight support portion 44 including a thick plate material provided on the swivel base plate 42, the assembly accuracy of the weight 46 can be improved with a simple configuration.

The weight support portion 44 has the mounting hole (first attachment hole 362) in which a bolt (first attachment bolt 363) for mounting the weight 46 is threaded through the weight 46 in a horizontal direction.

According to this configuration, since the weight 46 is placed on the weight support portion 44, which is made of a thick plate material, shear stress on the bolts to which the weight 46 is attached can be effectively suppressed. Since there is no distortion in the surface on which the weights 46 are placed, the height of the weights 46 can be made more accurate because there is no distortion in the surface on which the weights 46 are placed.

The weight support portion 44 is formed from one side to the other side of the machine width direction K2 of the swivel base plate 42, and the weight support surface 361 includes the first support surface 361L provided on one side of the machine width direction K2 in the weight support portion 44 and the second support surface 361R provided on the other side of the machine width direction K2. The mounting holes include a first screw hole 362A on one side of the machine width direction K2 in the weight support portion 44 and the second screw hole 362B on the other side of the machine width direction K2.

According to this configuration, the weight 46 can be supported in a balanced manner on the first support surface 361L and the second support surface 361R in the machine width direction K2.

It also has the weight support member 45 erected on the weight support portion 44, and the weight support member 45 has another mounting hole (second attachment hole 366) in the upper portion of the back where another bolt (second attachment bolt 365) is threaded through the weight 46 in a horizontal direction.

According to this configuration, shear stresses on the other bolts to which the weights 46 are attached can be effectively suppressed.

The motor E1 mounted on the rear portion of the swivel base plate 42 and a support platform (third support platform 50C, fourth support platform 50D) that is fixed on the weight support portion 44 and supports the motor E1.

According to this configuration, the support stand can be fixed to the swivel base plate 42 together with the weight support portion 44, thereby improving the ease of assembly.

It has the prime mover E1 mounted on the rear portion of the swivel base plate 42, the bonnet 22 covering the prime mover E1, the support frame 11 supporting the bonnet 22, and the frame mounting portion (fourth frame attachment portion 55D) fixed on the weight support portion 44 to which the support frame 11 is attached.

According to this configuration, the frame mounting portion can be fixed to the swivel base plate 42 together with the weight support portion 44, thus improving the ease of assembly.

The working machine 1 is provided with the machine body 2, the prime mover E1 mounted on the machine body 2, the operator seat portion 6 arranged in front of the prime mover E1 and supported by the machine body 2 forwards and backwards movement, the first stopper 98L and the second stopper 98R spaced in the operator seat portion 6 in the width direction of the machine body K2, and the first contacting member 99L with which the first stopper 98L contacts and the second contacting member 99R with which the second stopper 98R contacts, and the bulkhead member 22A separating the area on the operator seat portion 6 side from the prime mover room E2, which houses the prime mover E1, the bulkhead member 22A has the inspection opening 71 for accessing the prime mover room E2, and the inspection opening 71 has the closer plate 72 that closes the inspection opening 71, and the first contacting member 99L and the second contacting member 99R are provided on the closer plate 72.

According to this configuration, the inspection opening 71 can be formed without being restricted by the first contacting member 99L and the second contacting member 99R, and the opening area of the inspection opening 71 can be made larger.

The opening width W3 of the inspection opening 71 in the machine width direction K2 is wider than the width W4 of the machine width direction K2 between the members of the first and second contacting members 99L and the second contacting members 99R.

According to this configuration, the inspection opening 71, which has a wide opening width W3, allows good inspection of the prime mover room E2.

It is also provided with the rail device (second rail device 86) for supporting the operator seat portion 6 in a forward and backward direction, and the closer plate 72 has the prevention recess portion 108 that prevents interference with the rail device.

According to this configuration, the operator seat portion 6 can be moved closer to the bulkhead member 22A, and, in turn, the forward space of the operator seat portion 6 can be made wider.

The bulkhead member 22A has the bulkhead body 67 including the first portion 67A, which is an upper portion, and the second portion 67B, which is a lower portion, and the first portion 67A has an inspection opening 71 and is formed in an inclined shape that shifts backwardly from the upper end potion of the second portion 67B as extending upward.

According to this configuration, inspection in the prime mover room E2 can be performed from an angle and maintenance can be made easier.

The bulkhead member 22A includes the bulkhead body 67 having the inspection opening 71 and the plate attachment portion 371 to which the closer plate 72 is attached with the fixing bolt, and the seal perimeter surface 22a around the inspection opening 71 in the bulkhead body 67 and an outer circumference of the closer plate 72 corresponding to the seal perimeter surface 22a. The seal perimeter surface 22a has an edge seal 372 that seals the seal perimeter surface 22a, and the plate attachment portion 371 is integrally formed in the bulkhead body 67 such that the plate-contacting surface 371a with which the closer plate 72 contacts is located forward of the sealing contact surface 22a.

According to this configuration, the bulkhead member 22A can be easily formed.

The working machine 1 is provided with the machine body 2, the operator seat portion 6 arranged in front of the prime mover E1, the movable body 85 supporting the operator seat portion 6 as well as being supported by the machine body 2 in an adjustable forward and backward position, the hydraulic hose 368 arranged on a rear side of the movable body 85, and the bulkhead member 22A separating the area on the operator seat portion 6 side from the prime mover room E2 housing the prime mover E1, the bulkhead member 22A having a recessed rearwardly recessed relief recess portion 376 to accommodate the hydraulic hose 368.

This configuration prevents the hydraulic hose 368 from being trapped between the bulkhead member 22A and the movable body 85 without increasing the interior space of the cabin.

The rail device (first rail device 84) is provided to support the movable body 85 in a forward and backward direction, and the relief recess portion 376 includes a recess to prevent interference with the rail device.

According to this configuration, the structure of the bulkhead member 22A can be simplified. In addition, the front space of the operator seat portion 6 can be made wider.

The operator seat portion 6 is provided with the first stopper 98L and the second stopper 98R spaced in the width direction of the machine body K2, and the bulkhead member 22A has a first contacting member 99L with which the first stopper 98L contacts and the second contacting member 99R with which the second stopper 98R contacts when the movable body 85 is moved backward. The relief recess portion 376 is located below the first and second contacting members 99L and 99R, and is formed in a length extending from the first contacting member 99L side to the second contacting member 99R side.

According to this configuration, interference with the hydraulic hoses can be sufficiently prevented.

The movable body 85 is provided with another rail device (the second rail device 86) that supports the operator seat portion 6 in a forward and backward direction, and the bulkhead member 22A has a prevention recess portion 108, which is provided between the first contacting member 99L and the second contacting member 99R and prevents interference with the other rail device.

The movable body is provided with the operation lever 77L, and the hydraulic hose 368 may be connected to the operation lever 77L.

The working machine 1 is provided with the prime mover E1, the cooling fan F1 which generates a cooling airflow to cool the prime mover E1, the exhaust gas purification system D1 which purifies exhaust gas discharged from the prime mover E1, and the sedimenter 381 which separates and removes water mixed in the fuel of the prime mover E1, the sedimenter 381 being arranged at the downwind side of the cooling airflow from the exhaust gas purification system D1 and overlapping the exhaust gas purification system D1 in the width direction K2 of the machine.

According to this configuration, direct contact of the cooling air with the sedimenter 381 is prevented and fuel waxy can be prevented.

The sedimenter cover 383 is provided that shields the space between the sedimenter 381 and the exhaust gas purification system D1.

According to this configuration, the sedimenter cover 383 can prevent the fuel temperature from rising too high, and the sedimenter 381 can be compactly placed close to the exhaust gas purification system D1.

The sedimenter cover 383 is detachable separately from the sedimenter 381.

According to this configuration, the sedimenter cover 383 can be installed or removed, depending on the circumstances.

The working machine 1 is provided with the machine body 2 mounted with the prime mover E1 and the fuel tank T1 for storing fuel of the prime mover E1, the exhaust gas purification system D1 and the sedimenter 381 are provided on one side of the prime mover E1, the cooling fan F1 is provided on the other side of the prime mover E1, and the fuel tank T1 is located on one side and forward of the prime mover E1.

According to this configuration, it is easy to arrange the fuel line from the fuel tank T1 to the sedimenter 381. In addition, the fuel pipeline can be shortened.

The engine is provided with the bonnet rear portion 22B which covers the rear portion of the prime mover E1 in an openable manner, and the fuel filter F2 arranged behind the prime mover E1, and the sedimenter 381 is arranged on the side of the midway in the front-to-rear direction of the exhaust gas purification system D.

According to this configuration, the sedimenter 381 and fuel filter F2 can be maintained in one side from the rear by opening the rear portion of the hood 22B.

The working machine 1 also includes the fuel cooler N1 for cooling the fuel, the circular flow valve 386 that switches the return fuel from the prime mover E1 to a state where the fuel is sent to the sedimenter 381 or to the fuel cooler N1, the check valve 387 that prevents the backflow of fuel from the circular flow valve 386, and the bracket member 389 that installs the circular flow valve 386 and the check valve 387, the bracket member 389 being arranged below the fuel filter F2.

According to this configuration, the circular flow valve 386 and the check valve 387 can be mounted on the machine body 2 by sub-assembling the circular flow valve 386 and the check valve 387 to the bracket member 389, and the circular flow valve 386 and the check valve 387, together with the sedimenter 381 and the fuel filter F2, can be maintained in one side from the rear by opening the rear portion of the bonnet 22B.

The working machine 1 is provided with the prime mover E1, the fuel tank T1 for storing fuel for the prime mover E1, the fuel filler portion 291 connected to the fuel tank T1 that is injected with fuel to be refilled into the fuel tank T1 and capable of storing fuel, and the housing box 401 provided in the prime mover room E2 that houses the prime mover E1 and forms the refueling section stowage chamber 291A that houses the fuel filler portion 291.

According to this configuration, the housing box 401 can isolate the arrangement space in which the fuel filler portion 291 is arranged from the prime mover room E2 by the housing box 401, and can suppress the influence of heat of the prime mover room E2 on the fuel filler portion 291.

The housing box 401 has the machine body 2 carrying the prime mover E1, the cabin 5 mounted on the machine body 2, and the exterior member 163 covering a portion of the cabin 5 and a portion of the prime mover room E2, and the housing box 401 has the box opening 402 that is closed by the exterior member 163.

According to this configuration, a portion of the housing box 401 can be composed of the exterior member 163 of the cabin 5, which simplifies the structure.

The fuel filler portion 291 has the sub tank 300 capable of storing fuel and the fueling port 301 for injecting fuel into the sub tank 300, and the exterior member 163 has the opening portion 169 that allows access to the fueling port 301 through the box opening 402, and the openable lid 170 that can open and close the opening portion 169.

According to this configuration, the fuel storage capacity can be increased by the sub tank 300. The configuration also allows access to the fueling port 301 in the housing box 401.

The exhaust gas purification system D1 is provided to purify the exhaust gas emitted from the prime mover E1, and the housing box 401 is provided adjacent to the exhaust gas purification system D1.

According to this configuration, the fuel filler portion 291 can be provided in close proximity to the exhaust gas purification system D1, and the fuel filler portion 291 can be compactly arranged.

The working machine 1 has the bonnet 22 forming the prime mover room E2 and the support frame 11 supporting the bonnet 22 in the prime mover room E2, and the housing box 401 has the box attachment portion 414 which is attached to the support frame 11.

According to this configuration, the attachment position of the housing box 401 can be made with high accuracy.

The housing box 401 has the main member 411 attached to the support frame 11 and the sub member 412 detachably attached to the main member 411.

According to this configuration, it is possible to easily access the components equipped inside the housing box 401.

The box is provided with the connector pipe 292 connecting the side of the fuel tank T1 to the fuel filler portion 291, and the partition plate 47 provided with the through hole 294 for dividing the prime mover room E2 and the arrangement side of the fuel tank T1 and passing the connector pipe 292.

According to this configuration, by connecting the connector tube 292 to the side of the fuel tank T1, the connector tube 292 can be inserted into the through hole 294 of the partition plate. This simplifies the partition structure between the side of the prime mover E1 and the side of the fuel tank T1.

The working machine 1 also includes the swivel frame 41 rotatably supported on the traveling device 3 around a longitudinal axis center (swivel axis center X1), the passage member 434 having an opening for the hydraulic pipeline 427 arranged on the swivel frame 41 as well as demarcating a space on the swivel frame 41, and the passage member 434 arranged in the vicinity of the passage member 434 together with the retainer member 429, which covers the perimeter of the hydraulic pipeline 427 and holds the hydraulic pipeline 427, and the sealing member 437, which seals between the passage member 434 and the retainer member 429.

According to this configuration, the seal around the hydraulic pipeline 427 arranged through the passage member 434 can be improved.

The passage member 434 has the first longitudinal wall portion (front wall 434a) and the second longitudinal wall portion (rear wall 434b) that are oppositely arranged across the hydraulic pipeline 427, and the connecting wall portion (top wall 434c) that connects the upper portions of the first longitudinal wall portion (front wall 434a) and the second longitudinal wall portion (rear wall 434b) to each other, and the sealing member 437 is provided over the first longitudinal wall portion (front wall 434a), the second longitudinal wall portion (rear wall 434b), and the connecting wall portion 434b (top wall 434c).

According to this configuration, the seal between the retainer member 429 and the hydraulic pipeline 427 can be improved with a simple structure.

The passage member 434 is fixed and has the attachment plate 435 attached to the swivel frame 41 by the bolts 438A and 438B, and the attachment plate 435 has the longitudinal plate portion 439 extending from the passage member 434 to both sides in a flat direction intersecting the direction of the hydraulic pipeline 427 arrangement.

According to this configuration, the perimeter of the passage member 434 can be covered, for example, to reduce the leakage of cooling air drawn into the prime mover room E2 and the leakage of noise from the prime mover room E2.

The working machine 1 also includes the support stand (support bracket 445) on which the on-board equipment (radiator R1, oil cooler O1) attached to the attachment plate 435 and mounted on the swivel frame 41 are placed.

According to this configuration, the attachment plate 435 functions as an attachment member of the support platform, allowing for dual use of the members.

The working machine 1 is provided with the prime mover E1 mounted at the rear portion of the swivel frame 41, and the on-board equipment are coolers (radiator R1, oil cooler O1) arranged on the side of the prime mover E1.

According to this configuration, the attachment plate 435 functions as a mounting member of the support platform supporting the cooler, allowing for dual use of the members.

The attachment plate 435 separates the arrangement side of the prime mover E1 from the arrangement side of the onboard equipment below the onboard equipment.

According to this configuration, the sealing below the onboard equipment can be improved.

The swivel frame 41 has a reinforcement rib (second rib 43R) that is provided from the front to the rear and reinforces the swivel frame 41, and the reinforcement rib has a contact point (reinforcement portion 233a) where the sealing member (second sealing member) 441 attached to the attachment plate 435 contacts.

According to this configuration, the components can be used in a dual-purpose manner and the structure can be simplified.

The working machine 1 is provided with the support bracket 445 attached to the machine body 2, the first mounting member (first elastic member J1 to fourth elastic member J4) formed by an elastic member and provided on the support bracket 445, and the support bracket 445 arranged in parallel with respect to a direction orthogonal to the horizontal direction. The first cooler (radiator R1) and the second cooler (oil cooler O1), which are placed via the first mounting member in the first cooling unit and the second cooler (oil cooler O1), the fitting bracket 453 removably fitted to the upper portion of the first and second coolers, and the fitting bracket 453, which is formed by an elastic member and which is attached to the fitting bracket 453 and the first and second coolers. The second mounting member (fifth to eighth elastic members J5 to J8) interposed with the cooler.

According to this configuration, the first and second coolers can be removed separately from the first and second coolers by removing the fitting bracket 453. This allows for easy replacement of the coolers. The mounting strength can be improved by mounting each of the first cooler and the second cooler via an elastic member.

The first cooler has a plurality of downwardly projecting first lower protrusions, and the second cooler is mounted on a support frame having a plurality of downwardly projecting second lower protrusions, wherein the first mounting member is arranged in correspondence with each first lower protrusion and each second lower protrusion, and the first lower protrusion or a plurality of the second lower elastic members having a plurality of holes through which the protruding portions are inserted, and the first cooler and the second cooler are vibration-proofed and supported on a support bracket by the insertion of each first lower protrusion and each second lower protrusion into the holes of the lower elastic members.

According to this configuration, the lower portions of the first and second coolers can be positioned by the first mounting member.

The first cooler has a plurality of first upper protrusions protruding upwardly, the support frame has a plurality of second upper protrusions protruding upwardly, and the second mounting member has a hole arranged corresponding to each first upper protrusion and each second upper protrusion and a plurality of upper elastic members through which the first upper protrusion or the second upper protrusion is inserted. The fitting brackets are fitted to the upper portions of the first and second coolers with each first upper protrusion and each second upper protrusion being inserted into the holes of the upper elastic members.

According to this configuration, the upper portion of the first and second coolers can be positioned by the second mounting member.

The working machine 1 also includes the frame member (connector frame 459) connecting the support bracket 445 and the fitting bracket 453, and the hanging fixing tools 460A and 460B secured to the fitting bracket 453.

According to this configuration, the first and second coolers can be easily removed and assembled.

The frame member has attachment portions 459a to 459d for attaching the third cooler (condenser G3).

According to this configuration, the first cooler, the second cooler and the third cooler can be easily removed and assembled.

The frame member also has the attachment frame 472 to which the fourth cooler (fuel cooler N1) is attached.

According to this configuration, the first cooler, second cooler, third cooler, and fourth cooler can be easily removed and assembled.

The first cooler is provided with the prime mover E1 on the side of the first and second coolers, the shroud 425 between the prime mover E1 and the first and second coolers, and the cooling fan F1 arranged in the shroud 425 and driven by the power of the prime mover E1. The second cooler is an oil cooler that cools the hydraulic fluid, and the shroud 425 has the blower opening portion 544 that opens to blow the cooling air generated by the cooling fan F1 to the prime mover E1 side, and the blower opening portion 544 and the cooling fan F1 are in the center of the shroud 425. The working machine 1 has a deviation from the part to the radiator R1 side.

According to this configuration, cooling of the prime mover E1 can be performed efficiently in a structure in which the radiator R1 and the oil cooler O1 are arranged in parallel with respect to the machine width direction K2 at the side of the prime mover E1.

The working machine 1 also includes the coupling body 605 connecting one end to another and the other end potion of the fitting bracket 453 and the support bracket 445.

According to this configuration, a rectangular structure is formed by connecting the fitting bracket 453 and the support bracket 445 from one end side to another and from the other end side to each other by a coupling body 605, thereby improving the strength of the fitting bracket 453 and the support bracket 445.

The fitting bracket 453 has the first connecting piece 606 on one end and the other end, the support bracket 445 has the second connecting piece 607 on one end and the other end, and the coupling body 605 has the vertical member 612 provided over the first connecting piece 606 and the second connecting piece 607, the first fastener tool 615 to attach the vertical member 612 to the first connecting piece 606, and the second fastener tool 616 to attach the vertical member 612 to the second connecting piece 607.

According to this configuration, the coupling body 605 can be removed from the fitting bracket 453 and the support bracket 445, so that the assembly and removal of the first and second coolers to the fitting bracket 453 and the support bracket 445 can be performed easily.

The coupler body 605 has the first contact portion 613 fixed to the upper portion of the vertical member 612 and in contact with the lower surface of the first connecting piece 606, and the second contact portion 614 fixed to the lower portion of the vertical member 612 and in contact with the upper surface of the second connecting piece 607, and the first fastener tool 615 inserts the first contact portion 613 and the first connecting piece 606, and the both have the first bolt member 623 fixed to the upper portion of the first vertical member 612 and the first nut member 624 screwed into the first bolt member 623, and the second fastener tool 616 has the second bolt member 626 that inserts the second contacting portion 614 and the second connecting piece 607 and is fixed to the lower portion of the vertical member 612, and the second nut member 627 that is threaded into the bolt member 626.

According to this configuration, the distance between the fitting bracket 453 and the support bracket 445 can be regulated by the coupler body 605. The dimensional accuracy of the mounting of the fitting bracket 453 and the support bracket 445 and the members attached thereto can be increased.

The first connecting piece 606 has the first groove 608, the second connecting piece 607 has the second groove 609, and the vertical member 612 has the first protrusion 619 that fits into the first groove 608 at the top and the second protrusion 620 that fits into the second groove 609 at the bottom.

According to this configuration, the coupler body 605 can be rotated against the fitting bracket 453 and the support bracket 445, and the coupler body 605 can be easily installed.

The working machine 1 is provided with the plurality of coolers (radiator R1, condenser G3) arranged in series with respect to the horizontal direction, and the frame member (connector frame 459) that proximally supports the other cooler with respect to the one cooler in a detachable manner, the frame member having one end side in the horizontal direction rotatable about a vertical axis center (rotational axis center X2) and having the cooling system device (receiver G2) attached to one end potion of the frame member and connected to the other cooler via a connection hose, the other cooler having a first connection joint 475 to which a first coolant hose 474 is connected at a position near the longitudinal axis center (rotational axis center X2), and the cooling system device has the second connection joint 478 to which a second coolant hose 478, different from the first coolant hose, is connected at a position near the longitudinal axis center (rotational axis center X2).

According to this configuration, since the other cooler opens horizontally in relation to the one cooler, foreign matter such as removed dust and other foreign matter can be easily dropped down, and since the cleaning work is done from the side, the cooler can be cleaned easily. In addition, swelling of the first coolant hose 474 and the second coolant hose 477 can be controlled when the frame member is rotated, and interference with the surrounding members can be prevented. Furthermore, the first coolant hose 474 and the second coolant hose 477 can be prevented from kinking.

The first connection joint 475 and the second connection joint 478 are arranged in an oblique direction that shifts downwardly as extending away from the vertical axis center (rotation axis center X2).

According to this configuration, the first coolant hose 474 and the second coolant hose 477 can be effectively prevented from swelling and kinking of the first coolant hose 474 and the second coolant hose 477 when the frame member is rotated.

The second connection joint 478 has the gas check member 479 for checking the amount of coolant in the second connection joint 478, and the gas check member 479 is arranged so that the normal direction of the visible surface faces diagonally upward.

According to this configuration, the coolant can be checked easily.

The working machine 1 may be further provided with the third cooler (oil cooler O1) arranged in parallel with one of the coolers in a horizontal direction.

The working machine1 is provided with the support bracket 445 for placing and supporting the one cooler and the third cooler, and the fitting bracket 453 that is removably fitted to the top of the one cooler and the third cooler, and the frame member connects the support bracket 445 and the fitting bracket 453.

According to this configuration, one and the other cooler and the third cooler can be attached and removed from the support bracket 445, the fitting bracket 453, and the frame member in a state of assembly, improving ease of assembly and serviceability.

The fitting bracket 453 has a first regulator portion (regulation pin 481) that regulates the opening angle of the frame member when the frame member is rotated in a direction away from one of the coolers, a second regulator portion (regulator piece 482) that regulates the rotation of the frame member in the direction of proximity to one of the coolers in the open state where the opening angle is regulated, and the support piece 483 which supports the regulator portion up and down pivotally, and the second regulator portion is placed on the frame member with the frame member closed and engages the frame member by pivoting downward when the frame member is in the open state.

According to this configuration, when the frame member is opened, the frame member is automatically regulated to an open state, thus preventing the frame member from interfering with the surrounding parts and improving the workability of cleaning.

The frame member has the upper frame member 459A located on the upper side of the other cooler, the lower frame member 459B located on the lower side, a one end frame member (front frame member 459C) located on one end side, and the other end frame member (rear frame member 459D) located on the other end side opposite to the one end frame member, with the vertical axis center (rotational axis center X2) located closer to the other end frame member than the one end frame member.

According to this configuration, the back side of the one end side frame member can be cleaned when the frame member is opened.

The lower portion of the lower portion of the other end side frame member is shorter than the lower portion of the one end frame member, and the lower frame member 459B has the first portion 467a extending from the lower end potion of the other end frame member toward one end, the second portion 467b extending downwardly from one end side of the first portion 467a, and the third portion 467c extending from the lower end potion of the second portion 467b toward one end side and connected to the lower end side of the one end frame member.

According to this configuration, a recess is formed at the bottom of the frame member by the first portion 467a and the second portion 467b, which prevents the bottom of the frame member from interfering with the surrounding parts when the frame member is opened.

The frame member is provided with the cooling fan F1 that generates cooling air, one cooler being the radiator R1 that cools the cooling water of the prime mover E1, the other cooler being a condenser G3 that cools the coolant of the air conditioner, and the third cooler being the oil cooler O1 that cools the hydraulic fluid of the hydraulic device, with the condenser G3 and the cooling fan F1 arranged closer to the radiator R1 than to the boundary between the radiator R1 and the oil cooler O1.

According to this configuration, in a structure in which the radiator R1 and the oil cooler O1 are arranged in parallel with respect to the machine width direction K2, the cooling of the prime mover E1 can be efficiently performed.

The working machine 1 is provided with the swivel base plate 42 capable of swiveling around the longitudinal axis center (swivel axis center X1) and the cooler (radiator R1) mounted on the swivel base plate 42, the swivel base plate 42 having the drain hole 486 formed through the swivel base plate 42 at a position near the cooler and capable of discharging foreign matter on the swivel base plate 42, and the lid plate 487 that blocks the drain hole 486 and can be removed from above.

According to this configuration, when the cooler is cleaned, dust falling into the swivel base plate 42 can be discharged from the drain hole 486 when cleaning the cooler, and cleaning work of the dust can be performed easily. Since the drain hole 486 can be blocked with the lid plate 487, the drain hole 486 can prevent mud and other debris from entering the swivel base plate 42 from underneath, and since the lid plate 487 can be attached and removed from above the swivel base plate 42, it is easy to attach and remove the lid plate.

The guide member 488 is provided to guide the arrangement members (return pipelines 393B and 393D) arranged above the swivel base plate 42, and the guide member 488 is fixed to the lid plate 487.

According to this configuration, the guide member 488 can be used as a gripping member for attaching and detaching the lid plate 487.

The cooler and the other cooler (condenser G3) are arranged in series with the cooler in the width direction of the machine body K2 and pivoted at one end in the horizontal direction around the longitudinal axis center (rotational axis center X2) and rotatable in the direction away from the cooler, and the drain hole 486 is provided at the other end opposite to the one end side of the other cooler.

According to this configuration, when the cooler is cleaned, dust and other foreign matter falling from the cooler can be efficiently discharged when the cooler is cleaned.

A regulator member (regulator piece 482) is provided to regulate the movement of the other cooler in the disengagement direction when the other cooler is rotated in the disengagement direction, and the drain hole 486 is formed at a position where the drain hole 486 overlaps the other cooler in plan view in an open state where the movement of the other cooler is regulated by the regulator member.

According to this configuration, dust and other foreign matter can be efficiently discharged when cleaning the cooler.

The frame member (connector frame 459) is provided with a frame member (connector frame 459) that supports the other cooler and is rotatable around a vertical axis center (rotational axis center X2), and the frame member has an upper frame member 459A located above the other cooler, the lower frame member 459B located below the other cooler, a frame member (front frame member 459C) located at one end, a frame member (front frame member 459C) located at one end, and a frame member (front frame member 459C) located at the other end. The lower portion of the other end frame member is shorter than the lower portion of the one end frame member, and the lower frame member 459B has the first portion 467a extending from the lower end potion of the other end frame member toward one end, the second portion 467b extending downward from one end potion of the first portion 467a, and the second portion 467b extending downward from one end potion of the first portion 467a, and the second portion 449 has the third portion 467c extending from the lower end of 67b to one end side and connected to the lower end side of the single end frame member, and the drain hole 486 is formed at a position where it overlaps in plan view with the lower frame member 459B in the open state of the other cooler.

According to this configuration, even when the frame member is rotated, dust and other foreign matter can be easily discharged.

The working machine 1 is provided with the prime mover E1, the cooler arranged on the side of the prime mover E1, the shroud 425 provided between the cooler and the prime mover E1, the partition structure 458 dividing the prime mover room E2 housing the prime mover E1 and the side where the cooler is arranged above the shroud 425, and the partition structure 4 58 has a main plate 496 having a first notch portion 500 through which the arrangement members (harnesses 507A and 507B) arranged over the prime mover room E2 and the side where the cooler is arranged, and the first sub plate 497 holding grommets 506A and 506B that cover the periphery of the arrangement members in the first notch portion 500. The first notch portion 500 has the first opening portion 515a through which an arrangement member can pass and opens downwardly, and the first sub plate 497 can be attached to the main plate 496 with the arrangement member inserted into the first notch portion 500.

According to this configuration, when replacing an arrangement member, the arrangement member can be removed simply by removing the first sub plate 497, thereby improving the ease of assembly and maintenance.

By lowering the main plate 496 from above to the arrangement member arranged over the prime mover room E2 and the side where the cooler is arranged, the arrangement member is inserted into the first notch portion 500 through the first opening portion 515a, and then attaching the first subplate 497 to the main plate 496 and holding the grommets 506A and 506B covering the periphery of the arrangement member, the partition structure 458 can be assembled with the arrangement member preassembled.

A first hose (reservoir hose 510) is provided to connect the tank (reservoir tank 517) arranged in the prime mover room E2 to the cooler through the first notch portion 500, and the first sub plate 497 is attached to the main plate 496 with the first hose inserted into the first notch portion 500 and has a cover portion (fourth portion 497d) covering the first notch portion 500 around the first hose.

According to this configuration, the partition structure 458 can be assembled with the first hose preassembled. Also, when replacing the first hose, the serviceability is improved because the first subplate 497 is only removed.

A second hose (upper hose 514) is provided to connect the prime mover E1 to the cooler through the first notch portion 500, and the cover portion covers the first notch portion 500 in the perimeter of the second hose.

According to this configuration, the partition structure 458 can be assembled with the second hose preassembled. When replacing the second hose, the serviceability is improved because the first sub plate 497 is only removed when the second hose is replaced.

The main plate 496 is provided with the bonnet 22 forming the prime mover room E2, the support frame 11 supporting the bonnet 22, the air cleaner 519 provided on the side where the cooler is arranged, and the intake air duct 520 connecting the air cleaner 519 to the prime mover E1. And, the main plate 496 is provided with a second notch portion 501 for passing the intake air duct 520, the second notch portion 501 having the second opening portion 515c which opens upwardly to insert the intake duct 520 into the second notch portion 501 with the intake duct 520 supported by the support frame 11.

According to this configuration, the partition structure 458 can be assembled with the air cleaner 519 and the intake air duct 520 assembled in advance.

The working machine 1 is provided with the duct seal 518 covering the perimeter of the intake air duct 520 in the second notch portion 501, the duct seal 518 has the first seal member 518A held at the edge of the second notch portion 501 and the second seal member 518B that sandwiches the intake air duct 520 with the first seal member 518A, and the partition structure 458 has the second sub plate 498 that is attached to the main plate 496 and holds the second seal member 518B.

According to this configuration, the intake air duct 520 can be partitioned around the intake air duct 520 with the intake air duct 520 preassembled. When the intake air duct 520 is replaced, the second sub plate 498 need only be removed, thus improving the ease of maintenance.

The engine room E2 is provided with the bonnet 22 forming the engine room E2, the support frame 11 supporting the bonnet 22, and the piping member 524 arranged in the engine room E2, the partition structure 458 has the piping bracket 499 attached to the support frame 11 and supporting the piping member 524, and the main plate 496 has the third notch portion 502 that is open above and fits into the piping bracket 499 from below.

According to this configuration, the partition structure 458 can be assembled with the piping member 524 preassembled.

The working machine 1 is provided with the machine body 2, the prime mover E1 mounted on the machine body 2, the bonnet 22 forming the prime mover room E2 housing the prime mover E1, the support frame 11 standing on the machine body 2 and supporting the bonnet 22, and a side member (shroud 425 and partition structure 458) arranged on the side of the prime mover E1, the support frame 11 having a contact wall 491d touching a seal material (trim seal 545) provided on the side member.

According to this configuration, the partitioning nature of the prime mover room E2 can be enhanced by placing the seal material (trim seal 545) provided on the side member arranged on the side of the prime mover E1 against the contacting wall 491d provided in the support frame 11.

The support frame 11 has the partition cover 491, which is arranged on the side member side and divides the prime mover room E2, and the partition cover 491 has the contact wall 491d.

According to this configuration, the partitioning nature of the prime mover room E2 can be further enhanced.

The bulkhead member 22A is provided to partition the front portion of the prime mover room E2, and the support frame 11 has two front legs 57L and 57R spaced in the machine width direction K2 and at least one of the rear legs 58L and 58R arranged rearwardly from the front legs 57L and 57R, the bulkhead member 22A is provided between the two front legs 57L and 57R, and the partition cover 491 is fixed on the side opposite the bulkhead member 22A on the front leg 57R, which is closer to the side member.

According to this configuration, the partitioning between the support frame 11 and the side members can be further enhanced.

The partition cover 491 has the side wall portion 491a fixed to one front leg, the upper wall portion 491b extending from an upper end potion of the side wall portion 491a toward the side and covering the upper portion between the prime mover E1 and the side member, and the front wall portion 491c extending downwardly from a front end potion of the upper wall portion 491b and connected to the side wall portion 491a and covering the front portion between the prime mover E1 and the side member.

According to this configuration, the partitioning between the prime mover E1 and the side members can be further enhanced.

The contact wall 491d extends forward from the end potion of the side member side in the front wall 491c.

According to this configuration, the sealing ability between the side member and the partition cover 491 can be improved.

The working machine 1 is provide with the cooling fan F1 driven by the power of the prime mover E1 and the shroud 425 covering the cooling fan F1, the side member has the shroud 425, and the sealing member (trim seal 545) is provided in the shroud 425.

According to this configuration, the seal between the shroud 425 and the partition cover 491 can be improved.

The shroud 425 is provided with a first cooler (radiator R1) and a second cooler (oil cooler O1) arranged on the side of the shroud 425 and opposite to the prime mover E1, and the first and second coolers are arranged in parallel and side by side front-to-rear with respect to the machine width direction K2, the width of the shroud 425 in the front-to-rear direction K1 is formed to a front-to-rear width W8 corresponding to the first and second coolers, and the front end side of the partition cover 491 is located at a position corresponding to the front end side of the shroud 425.

According to this configuration, the partitioning nature of the prime mover room E2 can be enhanced in a structure in which the first and second coolers are arranged side by side on the side of the prime mover E1 in front and back in parallel.

The width W8 in the front-to-rear direction of the main body of the shroud 425 (shroud body 541) has a wider width W10 from the axis of rotation X3 to the front side of the cooling fan F1 than the width W9 from the axis of rotation X3 to the rear side of the cooling fan F1.

According to this configuration, the partitioning nature of the prime mover room E2 can be enhanced.

The working machine 1 is provided with the machine body 2, the prime mover E1 mounted on the rear portion of the machine body 2, the cooling fan F1 driven by the power of the prime mover E1, the shroud 425 covering the cooling fan F1, the bonnet 22 forming the prime mover room E2 accommodating the prime mover E1, the bonnet 22 standing on the machine body 2 to support the bonnet 22. The support frame 11 has the support frame 11, the weight 46 covering the lower rear portion of the prime mover E1, the first partition structure dividing the prime mover room E2 below the shroud 425, the second partition structure dividing the prime mover room above the shroud 425, and the weight 46 installed in front of the shroud 425 on the support frame 11 side. The first sealing member (trim seal 545) is provided in contact with the contacting wall 491d, and a second sealing member (sealing member 550) is provided at the rear portion of the shroud 425 and in contact with the weight 46.

According to this configuration, the sealing around the shroud 425 can be improved.

The partition cover 491 is provided between the shroud 425 and the support frame 11 and divides the prime mover room E2, and the contact wall 491d is provided in the partition cover 491.

According to this configuration, the sealing of the prime mover room E2 can be enhanced.

The tank platform 424 arranged forward of the shroud 425 and fixed to the machine body 2, the tank (hydraulic fluid tank T2) mounted on the tank platform 424, and the sealing structure 602 provided underneath the shroud 425 and below the first sealing member and in contact with the tank and the tank platform 424.

According to this configuration, the sealing of the front portion of the shroud 425 can be improved.

The bonnet 22 has the seal attachment wall 553a at a position corresponding to the upper rear portion of the shroud 425 and a third seal material (seal material 554) attached to the seal attachment wall 553a, wherein the third seal material contacts the rear portion of the shroud 425 above the second seal material.

According to this configuration, the sealing of the rear portion of the shroud 425 can be improved.

The first partition structure has the passage member 434 having an opening through which the hydraulic pipeline 427 is passed, the retainer member 429 arranged in the vicinity of the passage member 434 and covering the perimeter of the hydraulic pipeline 427 to hold the hydraulic pipeline 427, and the sealing member 437 that seals between the passage member 434 and the retainer member 429.

According to this configuration, the seal around the hydraulic pipeline 427 arranged through the passage member 434 can be improved.

The working machine 1 is provided with the main plate 496 having the first notch portion 500 through which arrangement members (harnesses 507A and 507B) arranged over the inside and outside of the prime mover room E2 are passed, and the first sub plate 497 that holds grommets 506A and 506B covering the periphery of the arrangement members in the first notch portion 500, and the first notch portion 500 has the first opening portion 515a through which an arrangement member can pass and opens downwardly, and the first sub plate 497 can be attached to the main plate 496 with the arrangement member inserted into the first notch portion 500.

According to this configuration, when replacing an arrangement member, the arrangement member can be removed simply by removing the first sub plate 497, which improves the ease of assembly and maintenance.

The working machine 1 is provided with the machine body 2, the prime mover E1 mounted on the rear portion of the machine body 2, the bonnet 22 covering the prime mover E1, the support frame 11 standing on the machine body 2 to support the bonnet 22, and the frame constituent member 206 supporting a member arranged on the side of the machine body 2, the frame constituent member 206 being connected at the rear to the support frame 11 and extending from the support frame 11 to the front portion of the machine body of the machine body 2, and the front portion being erected on the front portion of the machine body.

According to this configuration, the frame constituent member 206 is connected to the support frame 11 and the machine body 2, thus improving the support strength.

A cover body (side cover 21) is provided that covers equipment arranged on the side of the machine body 2, and the frame constituent member 206 is housed inside the cover body to support the cover body.

According to this configuration, the cover body can be firmly supported.

The frame constituent member 206 has the first frame constituent member 208 fixed to the support frame 11 and projecting forward from the support frame 11, and the second frame constituent member 207 extending forward from the first frame constituent member 208 and having the front portion bent downward and fixed to the front portion of the machine body.

According to this configuration, the frame constituent member 206 can be reduced in weight.

The cover body (side cover 21) is provided with a cover body (side cover 21) that covers equipment arranged on the side of the machine body 2 and also houses the frame constituent member 206 inside, and the cover body has the first cover member 26 that can be supported openly by the first frame constituent member 208.

According to this configuration, the first cover member 26 can be firmly supported.

The cover body has the second cover member 27 that covers the frame member and also houses the equipment supported on the second frame component member 207, and the second cover member 27 is detachably attached to the frame member.

According to this configuration, the equipment supported by the second frame member can be inspected by removing the second cover member 27. By attaching the first cover member 26 and the second cover member 27 to the frame constituent member 206, the misalignment between these cover members 26 and 27 can be reduced to a minimum.

The working machine 1 is provided with the cabin 5 mounted on the machine body, and the second cover member 27 is provided between the cabin 5 and the first cover member 26, and is detachably attached to the frame constituent member 206 from inside the second cover member 27.

According to this configuration, the gap between the cabin 5 and the first cover member 26 can be narrowed.

The battery stand 566 has the mounting wall 5a for selectively placing the first battery BT1a and the second battery BT1b of different installation formats, a regulator member (regulator plate 572) provided on the mounting wall 5a to regulate the movement of the first battery BT1a and the second battery BT1b toward the front side of the cabin 5. The regulator member has a regulator portion (first regulator portion 579) that engages with the first engagement protrusion 569g provided at the bottom of the front surface of the second battery BT1b to regulate the upward movement of the second battery BT1b.

According to this configuration, batteries of different installation formats can be installed.

The regulator member (regulator plate 572) has the main plate portion 576 corresponding to the front surface of the first battery BT1a and the front surface of the second battery BT1b, and the regulator portion is provided between one end portion of the main plate 576 and the other end portion and is formed by cutting up a portion of the main plate 576.

According to this configuration, the structure of the regulator member (regulator plate 572) can be simplified.

The regulator member (regulator plate 572) has the first side plate 577 extending from one end portion of the main plate 576 and the second side plate 578 extending from the other end portion, wherein the first side plate 577 contacts one side of the first battery BT1a and the second battery BT1b to contact one side of the first battery BT1a and the second battery BT1b, and the second side plate 578 regulates the movements of the first battery and the second battery to the other side of the first battery BT1a and the second battery BT1b by contacting the other side of the first battery BT1a and the other side of the second battery BT1b.

According to this configuration, the first side plate 577 and the second side plate 578 provided on the regulator member (regulator plate 572) can regulate the movement of the first battery BT1a and the second battery BT1b to the side, thereby simplifying the structure.

The mounting wall 571a has the fixing tool insertion hole 583b and the fixing tool attachment portion 584, the fixing tool insertion hole 583b permits a portion of the first fixing tool 587 for holding and securing the first battery BT1a to the mounting wall 571a from the top side, and the fixing tool attachment portion 584 permits attachment of the second fixing tool 591 that engages with the second engagement protrusion 569k provided on the back side of the second battery BT1b to regulate movement to the back side and upward movement of the second battery BT1b.

According to this configuration, the first fixing tool 587 for securing the first battery BT1a and the second fixing tool 591 for securing the second battery BT1b can be installed.

The working machine 1 may also be provided with the machine body 2 and the battery stand 566 as described above.

The working machine 1 may be provided with the battery stand 566 having a vertical support wall extending downwardly from the other end potion of the loading wall, and the machine body 2 may have the mounting wall attachment portion 573 wherein one end potion of the mounting wall 5a is placed and mounted, and the vertical support wall attachment portion 42a wherein a lower end potion of the vertical support wall 571a is placed and mounted.

According to this configuration, the structure of the battery stand 566 can be simplified.

The working machine 1 is provided with the machine body 2, the tank stand 424 fixed to the machine body 2, and the tank (hydraulic fluid tank T2) attached to the tank stand 424, the tank stand 424 is provided with the support plate 424B erected on the machine body 2, and the tank attachment plate 424A whose plate surface is arranged along the horizontal direction and to which the tank is bolted, wherein the tank attachment plate 424A has the joining surface 424a formed in a longitudinal direction of the upper end surface 424B of the support plate 424B at one end in a direction along the plate surface, the joining surface 424a being located at a midway point in the plate thickness direction at the upper end surface 424B of the support plate 424B and being welded to the upper end surface 424B by welding.

According to this configuration, the welding distortion of the tank attachment plate 424A can be reduced, and the strength of the tank can be prevented from being reduced. In addition, the tank can be welded from above and production efficiency can be improved.

The tank attachment plate 424A has the attachment piece 424C that protrudes from the joining surface 424a and to which the tank is bolted.

According to this configuration, it is possible to prevent a stress in the direction of pulling down on the attachment piece 424c.

The machine body 2 is provided with the swivel base plate 42 rotatably supported on the traveling device 3 around a longitudinal axis center (swivel axis center X1) and a reinforcement rib (second rib 43R) arranged and fixed from front to rear on the swivel base plate 42, and the reinforcement rib has a reinforcement portion 233a that is fixed in contact with the surface of the support plate 424B.

According to this configuration, it is possible to improve the strength of the support plate 424B.

The support plate 424B is formed in the vicinity of the reinforcement portion 233A and has the through hole 601 through which the arrangement member 600 can be passed.

According to this configuration, a decrease in the strength of the support plate 424B due to the formation of the through hole 601 can be prevented.

The reinforcement ribs have sheet metal ribs 232R made of sheet metals and cast steel ribs 233R made of cast steels, and the reinforcement portion 233A is provided in the cast steel ribs 233R.

According to this configuration, the support plate 424B can be easily reinforced.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working machine comprising:
a support bracket attached to a machine body;
a first mounting member provided to the support bracket and formed of an elastic member;
a first cooler and a second cooler arranged in parallel to a horizontal direction and mounted on the support bracket with the first mounting member;
a fitting bracket detachably fitted to upper portions of the first and second coolers; and
a second mounting member arranged between the fitting bracket and the first and second coolers and formed of elastic member, wherein
the first cooler includes a plurality of first upper protruding portions that protrude upward,
the second cooler is attached to a support frame including a plurality of second upper protruding portions that protrude upward,
the second mounting member is arranged corresponding to each of the first upper protruding portions and each of the second upper protruding portions, and includes a plurality of upper elastic members having holes to which the first upper protruding portions and the second upper protruding portions are inserted, and
the fitting bracket is fitted to the upper portions of the first and second coolers under a condition where the first upper protruding portions and the second upper protruding portions are inserted to the holes of the upper elastic members.

2. A working machine comprising:
a support bracket attached to a machine body;
a first mounting member provided to the support bracket and formed of an elastic member;
a first cooler and a second cooler arranged in parallel to a horizontal direction and mounted on the support bracket with the first mounting member;
a fitting bracket detachably fitted to upper portions of the first and second coolers; and
a second mounting member arranged between the fitting bracket and the first and second coolers and formed of elastic member, wherein
the first cooler includes a plurality of first lower protruding portions that protrude downward,
the second cooler is attached to a support frame including a plurality of second lower protruding portions that protrude downward,
the first mounting member is arranged corresponding to each of the first lower protruding portions and each of the second lower protruding portions, and includes a plurality of lower elastic members having holes to which the first lower protruding portions and the second lower protruding portions are inserted, and
the first lower protruding portions and the second lower protruding portions are inserted to the holes of the lower elastic members, thereby supporting the first and second coolers with vibrations suppressed.

3. The working machine according to claim 2, wherein
the first cooler includes a plurality of first upper protruding portions that protrude upward,
the support frame includes a plurality of second upper protruding portions that protrude upward,
the second mounting member is arranged corresponding to each of the first upper protruding portions and each of the second upper protruding portions, and includes a plurality of upper elastic members having holes to which the first upper protruding portions and the second upper protruding portions are inserted, and
the fitting bracket is fitted to upper portions of the first and second coolers under a condition where the first upper protruding portions and the second upper protruding portions are inserted to the holes of the upper elastic members.

4. The working machine according to claim 1, comprising:
a frame member connecting the support bracket and the fitting bracket; and
a suspender tool fixed to the fitting bracket.

5. The working machine according to claim 4, wherein the frame member includes
an attachment portion to which a third cooler is attached.

6. The working machine according to claim 4, wherein the frame member includes
an attachment frame to which a fourth cooler is attached.

7. The working machine according to claim 1, comprising:
a prime mover arranged on sides of the first and second coolers;
a shroud provided between the prime mover and the first and second coolers; and
a cooling fan to be driven by power from the prime mover, the cooling fan being arranged in the shroud, wherein
the first cooler is a radiator to cool coolant of the prime mover,
the second cooler is an oil cooler to cool operation fluid of a hydraulic device,
the shroud includes
a blower opening from which cooling wind generated by the cooling fan is supplied to the prime mover, and
the blower opening and the cooling fan are provided with offset from a center of the shroud to be closer to the radiator.

8. A working machine comprising:
a support bracket attached to a machine body;
a first mounting member provided to the support bracket and formed of an elastic member;
a first cooler and a second cooler arranged in parallel to a horizontal direction and mounted on the support bracket with the first mounting member;
a fitting bracket detachably fitted to upper portions of the first and second coolers; and
a second mounting member arranged between the fitting bracket and the first and second coolers and formed of elastic member; and
a connector body to connect one ends of the fitting bracket and the support bracket and connect the other ends of the fitting bracket and the support bracket, wherein
the fitting bracket includes first connector pieces provided on one end side of the fitting bracket and on the other end side of the fitting bracket,
the support bracket includes second connector pieces provided on one end side of the support bracket and on the other end side of the fitting bracket, and
the connector body includes:
longitudinal members provided between the first connector pieces and the second connector pieces;

first fastening tools to attach the longitudinal members to the first connector pieces; and
second fastening tools to attach the longitudinal members to the second connector pieces.

9. The working machine according to claim 8, wherein the connector body includes
first contact portions to contact lower surfaces of the first connector pieces, the first contact portions being fixed to upper portions of the longitudinal members; and
second contact portions to contact upper surfaces of the second connector pieces, the second contact portions being fixed to lower portions of the longitudinal members,
the first fastening tools include:
first bolt members inserted to the first contact portions and the first connector pieces and fixed to the upper portion of the longitudinal members; and
first nut members screwed with the first bolt members, and the second fastening tools include:
second bolt members inserted to the second contact portions and the second contact pieces and fixed to the lower portions of the longitudinal members; and
second nut members screwed with the second bolt members.

10. The working machine according to claim 8, wherein
the first connector pieces include first groove portions,
the second connector pieces include second groove portions, and
the longitudinal members include:
first protruding pieces at the upper portions, the first protruding pieces to be fitted to the first groove portions; and
second protruding pieces at the lower portions, the second protruding pieces to be fitted to the second groove portions.

* * * * *